US011204612B2

(12) United States Patent
von Flotow et al.

(10) Patent No.: US 11,204,612 B2
(45) Date of Patent: Dec. 21, 2021

(54) ROTORCRAFT-ASSISTED SYSTEM AND METHOD FOR LAUNCHING AND RETRIEVING A FIXED-WING AIRCRAFT

(71) Applicant: Hood Technology Corporation, Hood River, OR (US)

(72) Inventors: Andreas H. von Flotow, Hood River, OR (US); Corydon C. Roeseler, Hood River, OR (US); Caleb Andrew Woodruff, White Salmon, WA (US); Daniel Pepin Reiss, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 902 days.

(21) Appl. No.: 15/873,487

(22) Filed: Jan. 17, 2018

(65) Prior Publication Data

US 2019/0033889 A1    Jan. 31, 2019

Related U.S. Application Data

(60) Provisional application No. 62/449,321, filed on Jan. 23, 2017.

(51) Int. Cl.
*G05D 1/08* (2006.01)
*B64C 39/02* (2006.01)
(Continued)

(52) U.S. Cl.
CPC ......... *G05D 1/0858* (2013.01); *B64C 39/024* (2013.01); *B64F 1/029* (2020.01);
(Continued)

(58) Field of Classification Search
CPC .. G05D 1/0858; G05D 1/0808; G05D 1/0661; G05D 1/104; B64C 39/024;
(Continued)

(56) References Cited

U.S. PATENT DOCUMENTS

| 968,339 A | 8/1910 | Geraldson |
|---|---|---|
| 1,144,505 A | 6/1915 | Steffan |

(Continued)

FOREIGN PATENT DOCUMENTS

| CA | 781808 | 4/1968 |
|---|---|---|
| CA | 839101 | 4/1970 |

(Continued)

OTHER PUBLICATIONS

"Trapeze" Wikipedia, Aug. 4, 2006, available at http://en.wikipedia.org/w/index.php?title=Trapeze&oldid=67584367.

(Continued)

*Primary Examiner* — Geepy Pe
*Assistant Examiner* — Daniel Tyler Reich
(74) *Attorney, Agent, or Firm* — Neal, Gerber & Eisenberg LLP

(57) ABSTRACT

A rotorcraft-assisted launch and retrieval system, and a method for controlling an airborne rotorcraft which includes controlling by a controller a first feedback loop about a longitudinal roll axis of the airborne rotorcraft and controlling by the controller a second feedback loop about a horizontal pitch axis of the airborne rotorcraft, without controlling a vertical yaw axis of the airborne rotorcraft.

5 Claims, 68 Drawing Sheets

(51) Int. Cl.
*G05D 1/10* (2006.01)
*G05D 1/06* (2006.01)
*B64F 1/02* (2006.01)

(52) U.S. Cl.
CPC ........... *G05D 1/0661* (2013.01); *G05D 1/104* (2013.01); *B64C 2201/021* (2013.01); *B64C 2201/027* (2013.01); *B64C 2201/082* (2013.01); *B64C 2201/104* (2013.01); *B64C 2201/108* (2013.01); *B64C 2201/146* (2013.01); *B64C 2201/182* (2013.01)

(58) Field of Classification Search
CPC ........ B64C 2201/021; B64C 2201/027; B64C 2201/082; B64C 2201/104; B64C 2201/108; B64C 2201/146; B64C 2201/182
See application file for complete search history.

(56) References Cited

U.S. PATENT DOCUMENTS

| | | | |
|---|---|---|---|
| 1,306,860 A | | 6/1919 | Smith |
| 1,383,595 A | | 7/1921 | Black |
| 1,499,472 A | | 7/1924 | Pratt |
| 1,582,188 A | | 4/1926 | Mummert |
| 1,625,020 A | | 4/1927 | Guillermo |
| 1,686,298 A | | 10/1928 | Uhl |
| 1,716,670 A | | 6/1929 | Sperry |
| 1,731,091 A | | 10/1929 | Clayton |
| 1,748,663 A | | 2/1930 | Tucker |
| 1,836,010 A | | 12/1931 | Audrain |
| 1,848,828 A | | 3/1932 | Griffin |
| 1,912,723 A | | 6/1933 | Perkins |
| 2,415,071 A | | 2/1947 | Brie |
| 2,435,197 A | | 2/1948 | Brodie |
| 2,440,574 A | | 4/1948 | Cotton |
| 2,448,209 A | | 8/1948 | Boyer et al. |
| 2,488,050 A | | 11/1949 | Brodie |
| 2,488,051 A | | 11/1949 | Brodie |
| 2,552,115 A | | 5/1951 | Replogle |
| 2,807,429 A | | 9/1957 | Hawkins, Jr. et al. |
| 2,843,337 A | | 7/1958 | Bennett |
| 2,944,815 A | | 7/1960 | Moyer |
| 3,017,138 A | | 1/1962 | Flint |
| 3,029,049 A | | 4/1962 | Melville |
| 3,146,974 A | | 9/1964 | Petoia |
| 3,351,325 A | | 11/1967 | Cotton |
| 3,389,880 A | | 6/1968 | Ferguson |
| 3,785,316 A | | 1/1974 | Leming et al. |
| 3,980,259 A | | 9/1976 | Greenhalgh et al. |
| 4,079,901 A | | 3/1978 | Mayhew et al. |
| 4,116,408 A | | 9/1978 | Soloy |
| 4,123,020 A | | 10/1978 | Korsak |
| 4,147,317 A | | 4/1979 | Mayhew et al. |
| 4,267,987 A | | 5/1981 | McDonnell |
| 4,311,290 A | | 1/1982 | Koper |
| 4,523,729 A | | 6/1985 | Frick |
| 4,575,026 A | | 3/1986 | Brittain et al. |
| 4,680,962 A | | 7/1987 | Durbin |
| 4,753,400 A | | 6/1988 | Reuter et al. |
| 4,757,959 A | | 7/1988 | Schroder et al. |
| 4,790,497 A | | 12/1988 | Yoffe |
| 4,842,222 A | | 6/1989 | Baird |
| 5,000,398 A | * | 3/1991 | Rashev .................. B64C 27/08 244/110 E |
| 5,039,034 A | | 8/1991 | Burgess et al. |
| 5,042,750 A | | 8/1991 | Winter |
| 5,054,717 A | | 10/1991 | Taylor |
| 5,092,540 A | | 3/1992 | Burgess et al. |
| 5,687,930 A | | 11/1997 | Wagner et al. |
| 5,799,900 A | | 9/1998 | McDonnell |
| 5,806,795 A | | 9/1998 | Ortelli |
| 6,089,501 A | * | 7/2000 | Frost .................... B64C 27/028 244/8 |
| 6,264,140 B1 | | 7/2001 | McGeer et al. |
| 6,824,102 B2 | | 11/2004 | Haggard |
| 6,874,729 B1 | | 4/2005 | McDonnell |
| 6,961,018 B2 | | 11/2005 | Heppe et al. |
| 7,000,883 B2 | | 2/2006 | Mercadal et al. |
| 7,028,947 B2 | | 4/2006 | Burns |
| 7,059,564 B2 | | 6/2006 | Dennis |
| 7,066,430 B2 | | 6/2006 | Dennis et al. |
| 7,090,166 B2 | | 8/2006 | Dennis et al. |
| 7,097,137 B2 | | 8/2006 | McDonnell |
| 7,104,495 B2 | | 9/2006 | McGeer |
| 7,114,680 B2 | | 10/2006 | Dennis |
| 7,121,507 B2 | | 10/2006 | Dennis et al. |
| 7,128,294 B2 | | 10/2006 | Roeseler et al. |
| 7,140,575 B2 | | 11/2006 | McGeer et al. |
| 7,143,974 B2 | | 12/2006 | Roeseler et al. |
| 7,143,976 B2 | | 12/2006 | Snediker et al. |
| 7,152,827 B2 | | 12/2006 | McGeer |
| 7,165,745 B2 | | 1/2007 | McGeer et al. |
| 7,175,135 B2 | | 2/2007 | Dennis et al. |
| 7,219,856 B2 | | 5/2007 | Watts et al. |
| 7,264,204 B1 | | 9/2007 | Portmann |
| 7,344,108 B2 | | 3/2008 | Muylaert et al. |
| 7,360,741 B2 | | 4/2008 | McGeer et al. |
| 7,410,125 B2 | | 8/2008 | Steele |
| 7,464,650 B2 | | 12/2008 | Steinkerchner et al. |
| 7,510,145 B2 | | 3/2009 | Snediker |
| 7,530,527 B2 | | 5/2009 | Kelleher |
| 7,543,780 B1 | | 6/2009 | Marshall et al. |
| 7,562,843 B2 | | 7/2009 | Lipponen |
| 7,578,467 B2 | | 8/2009 | Goodrich |
| 7,581,702 B2 | | 9/2009 | Olson et al. |
| 7,602,415 B2 | | 10/2009 | von Flotow et al. |
| 7,665,691 B2 | | 2/2010 | Hanzlick et al. |
| 7,712,702 B2 | | 5/2010 | McGeer et al. |
| 7,798,445 B2 | | 9/2010 | Heppe et al. |
| 7,806,366 B2 | | 10/2010 | Jackson |
| 7,876,359 B2 | | 1/2011 | von Flotow et al. |
| 7,883,059 B2 | | 2/2011 | Kunz |
| 7,954,758 B2 | | 6/2011 | McGeer et al. |
| 8,091,883 B2 | | 1/2012 | von Flotow et al. |
| 8,140,200 B2 | | 3/2012 | Heppe et al. |
| 8,162,256 B2 | | 4/2012 | Goossen |
| 8,172,177 B2 | | 5/2012 | Lovell |
| 8,226,039 B2 | | 7/2012 | von Flotow et al. |
| 8,231,083 B2 | | 7/2012 | Kutzmann et al. |
| 8,245,968 B2 | | 8/2012 | McGeer et al. |
| 8,276,844 B2 | | 10/2012 | Kariv |
| 8,292,215 B2 | | 10/2012 | Olm et al. |
| 8,313,057 B2 | | 11/2012 | Rednikov |
| 8,348,193 B2 | | 1/2013 | McGeer et al. |
| 8,405,723 B2 | | 3/2013 | von Flotow et al. |
| 8,453,966 B2 | | 6/2013 | McGeer et al. |
| 8,464,981 B2 | | 6/2013 | Goldie et al. |
| 8,573,536 B2 | | 11/2013 | McGeer et al. |
| 8,596,576 B1 | | 12/2013 | McGeer et al. |
| 8,672,264 B1 | | 3/2014 | McGeer et al. |
| 8,708,277 B1 | | 4/2014 | McGeer et al. |
| 8,708,278 B2 | | 4/2014 | McGeer et al. |
| 8,714,482 B2 | | 5/2014 | McGeer et al. |
| 8,740,134 B2 | | 6/2014 | Suzuki |
| 8,740,142 B2 | | 6/2014 | McGeer et al. |
| 8,944,373 B2 | | 2/2015 | Dickson |
| 8,950,698 B1 | | 2/2015 | Rossi |
| 8,955,800 B2 | | 2/2015 | McGeer et al. |
| 8,955,801 B2 | | 2/2015 | McGeer et al. |
| 9,004,402 B2 | | 4/2015 | McGeer et al. |
| 9,010,683 B2 | | 4/2015 | Gundlach et al. |
| 9,132,916 B2 | | 9/2015 | Hanna et al. |
| 9,193,481 B2 | | 11/2015 | McGeer et al. |
| 9,266,609 B1 | | 2/2016 | Kunz |
| 9,290,269 B2 | | 3/2016 | Walker et al. |
| 9,340,301 B2 | | 5/2016 | Dickson et al. |
| 9,359,075 B1 | | 6/2016 | von Flotow et al. |
| 9,434,481 B2 | | 9/2016 | McGeer et al. |
| 9,456,185 B2 | | 9/2016 | Oakley et al. |
| 9,475,575 B2 | | 10/2016 | Rossi |
| 9,685,091 B2 | | 6/2017 | Hayes |
| 9,816,816 B2 | | 11/2017 | Hayes |

(56) References Cited

U.S. PATENT DOCUMENTS

| | | | |
|---|---|---|---|
| 9,856,036 | B2 | 1/2018 | Dickson et al. |
| 9,896,222 | B2 | 2/2018 | Kunz et al. |
| 2002/0100838 | A1 | 8/2002 | McGeer et al. |
| 2003/0222173 | A1 | 12/2003 | McGeer et al. |
| 2004/0256519 | A1 | 12/2004 | Ellis et al. |
| 2005/0006525 | A1* | 1/2005 | Byers ............... B64C 39/024 244/118.1 |
| 2005/0017129 | A1 | 1/2005 | McDonnell |
| 2010/0025528 | A1 | 2/2010 | Jackson |
| 2011/0049290 | A1* | 3/2011 | Seydoux ............ G05D 1/0858 244/17.13 |
| 2012/0091259 | A1* | 4/2012 | Morris ............... B64C 27/02 244/17.13 |
| 2012/0223182 | A1 | 9/2012 | Gilchrist et al. |
| 2014/0117147 | A1 | 5/2014 | Hanna et al. |
| 2015/0115096 | A1 | 4/2015 | Rossi |
| 2015/0129716 | A1 | 5/2015 | Yoffe |
| 2015/0314871 | A1 | 11/2015 | von Flotow |
| 2016/0023760 | A1 | 1/2016 | Goodrich |
| 2016/0090176 | A1* | 3/2016 | Eglin ................. B64C 5/18 244/17.21 |
| 2016/0114906 | A1 | 4/2016 | McGeer et al. |
| 2016/0221683 | A1 | 8/2016 | Roberts et al. |
| 2016/0327945 | A1 | 11/2016 | Davidson |
| 2016/0375983 | A1* | 12/2016 | Yan ................... A63H 33/005 701/4 |
| 2017/0072812 | A1 | 3/2017 | Von Novak et al. |
| 2017/0225784 | A1 | 8/2017 | Hayes et al. |
| 2017/0274997 | A1 | 9/2017 | von Flotow et al. |
| 2017/0297738 | A1 | 10/2017 | von Flotow et al. |
| 2017/0369185 | A1 | 12/2017 | Grubb |
| 2018/0050823 | A1 | 2/2018 | McGeer |
| 2019/0329886 | A1* | 10/2019 | Pinto ................. B64D 9/00 |

FOREIGN PATENT DOCUMENTS

| | | |
|---|---|---|
| CN | 204822072 | 12/2015 |
| EP | 0 472 613 | 4/1992 |
| EP | 2 186 728 | 5/2010 |
| GB | 2 071 031 | 9/1981 |
| WO | WO 01/07318 | 2/2001 |
| WO | WO 2008/015663 | 2/2008 |
| WO | WO 2013/171735 | 11/2013 |
| WO | WO 2014/204550 | 12/2014 |
| WO | WO 2016/167849 | 10/2016 |

OTHER PUBLICATIONS

A miniature powerplant for very small, very long range autonomous aircraft, S.P. Hendrickson and T. McGeer, Final Report under U.S. DoE contract No. DE-FG03-96ER82187, Sep. 1999, (25 pp.).

Aerosonde hazard estimation, T. McGeer, 1994, (6 pp).

Aerosonde Pacific reconnaissance: ready when you are!, T. McGeer, Pacific Northwest Weather Workshop, Mar. 2005, (15 pp).

An Airspeed Vector Sensor for V/STOL Aircraft, E. J. Durbin and T. McGeer, Journal of Aircraft, vol. 19 No. 6, Jun. 1982, (7 pp).

Aviastar, "Bell QTR Quad Tiltrotor", Jul. 27, 2015 (3 pages).

Automated Launch, Recovery, and Refueling for Small Unmanned Aerial Vehicles, K. Mullens et al., 2004 (11 pp).

Autonomous Aerosondes for Economical Atmospheric Soundings Anywhere on the Globe, G. J. Holland, T. McGeer and H.H. Youngre, Bulletin of the American Meteorological Society, vol. 73 No. 12, Dec. 1992 (12 pp).

Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).

Laima: The First Atlantic Crossing by Unmanned Aircraft, T. McGeer, Feb. 1999, (25 pp).

Mini-RPV Recovery System Conceptual Study, Prepared for Eustis Directorate U.S. Army Air Mobility Research and Development Laboratory, Aug. 1977 (322 pages).

Quantitative Risk Management as a Regulatory Approach to Civil UAVs, T. McGeer, L. Newcombe, and J. Vagners, International Workshop on UAV Certification, Jun. 1999, (11 pp).

Regulatory Issues Involving Long-Range Weather Observation by Aerosonde Autonomous Aircraft, T. McGeer, Oct. 1998, (8 pp).

Rotary Action, description of scene of License to Kill, available at http://www.rotaryaction.com/pages/licetkil.html (2 pp).

Safety, Economy, Reliability and Regulatory Policy of Unmanned Aircraft, T. McGeer, Mar. 2007, (9 pp).

Skyhook (Harrier handling system); Harpoon Head Quarters; available at http://www.harpoondatabases.com/encyclopedia/Entry2979.aspx; printed Jun. 21, 2013 (3 pages).

The Beartrap—A Canadian Invention, Crowsnest Magazine, vol. 17, No. 3 and 4 [online], Mar.-Apr. 1965, [retrieved on Sep. 14, 2007]. Retrieved from the Internet at <URL: http://www.readyayeready.com/timeline/1960s/beartrap/index.htm>. (4 pp).

Wide-Scale Use of Long-Range Miniature Aerosondes Over the World's Oceans, T. McGeer and J. Vagners, 1999, (25 pp).

* cited by examiner

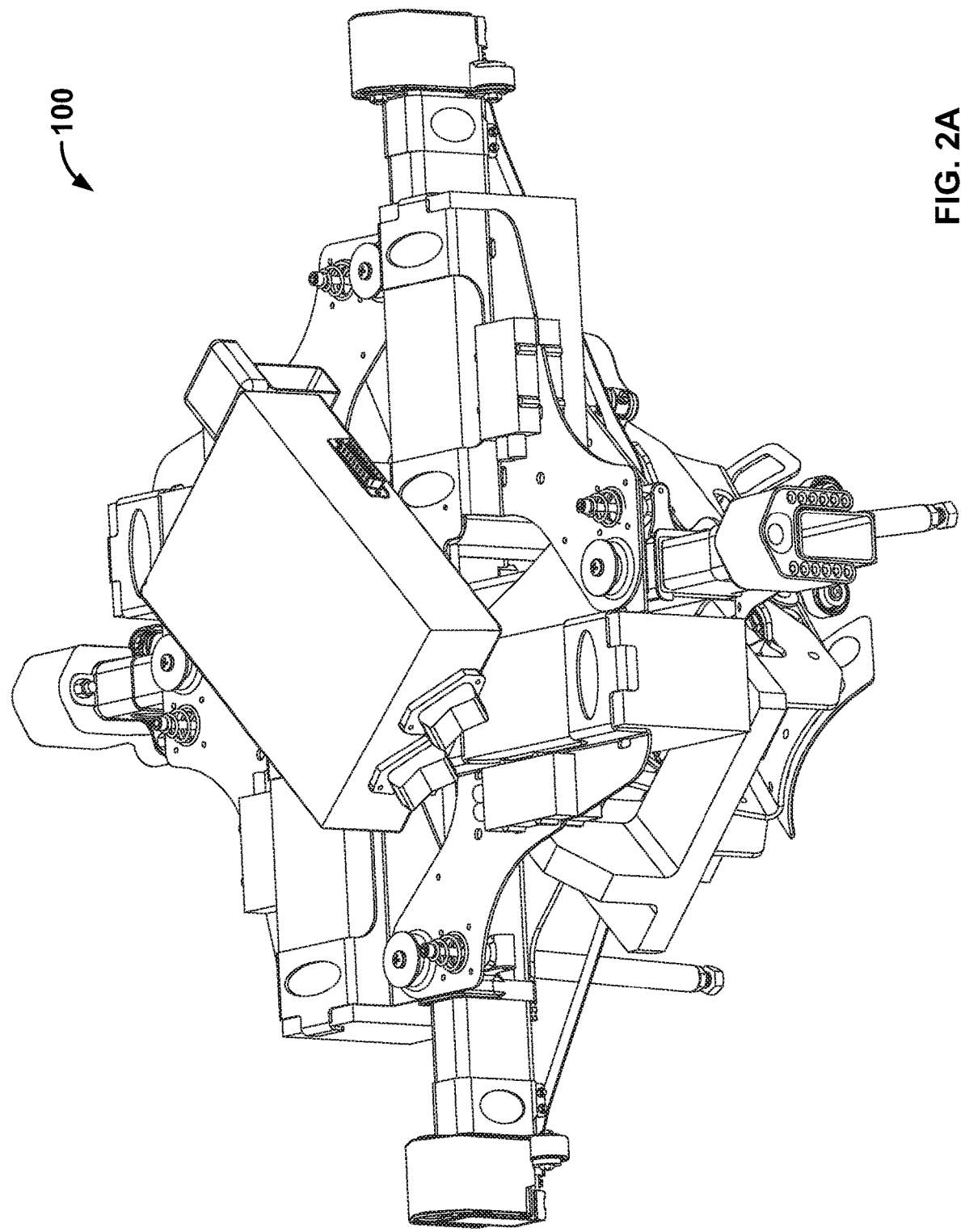

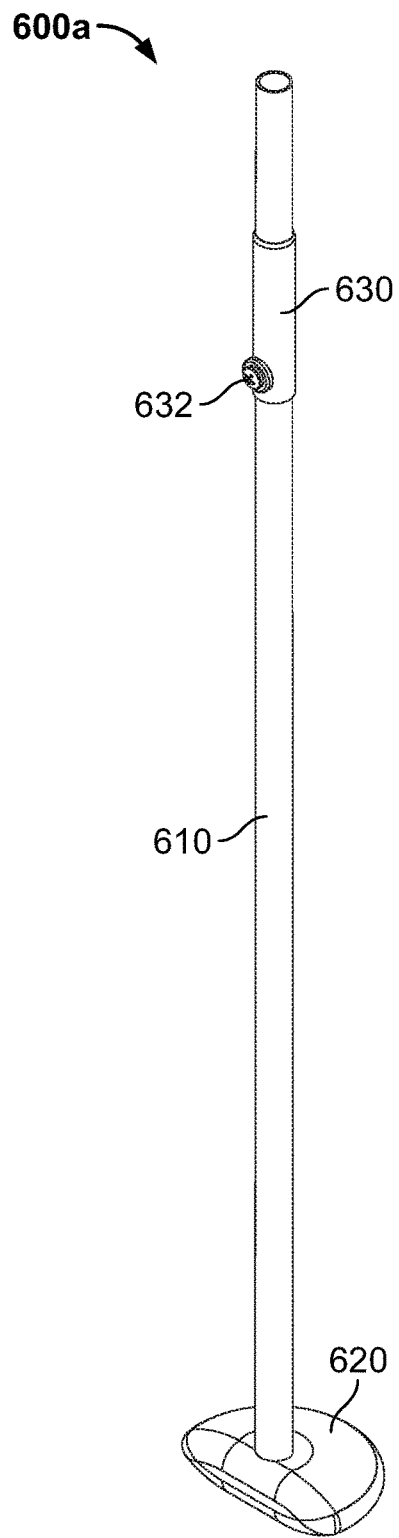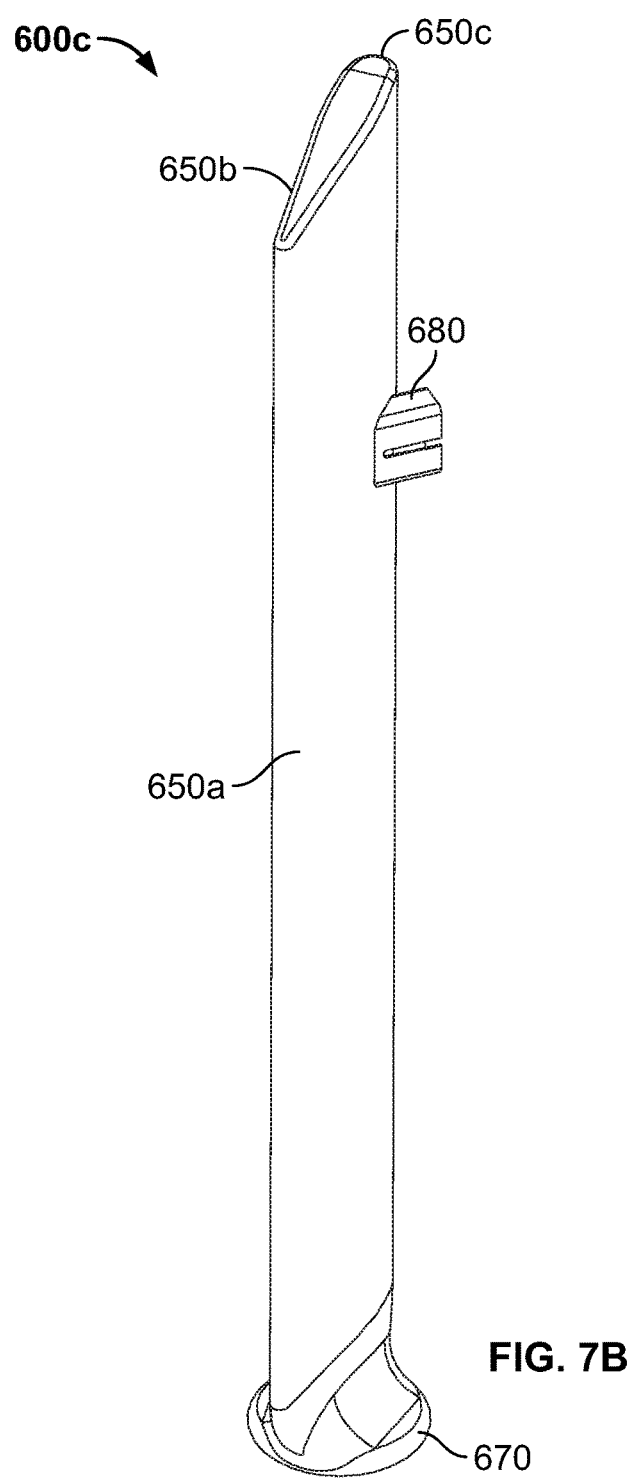
FIG. 7A
FIG. 7B

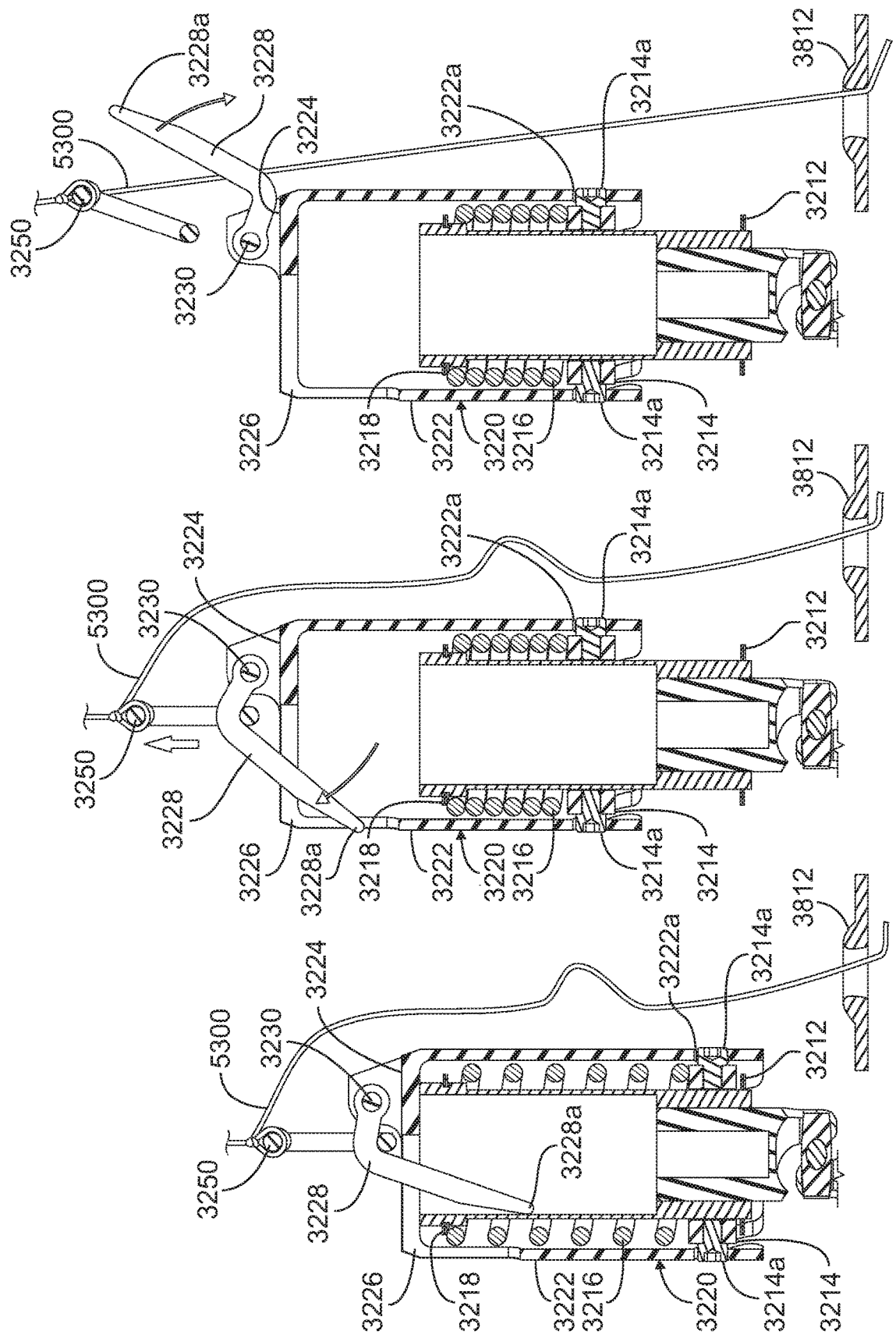

ROTORCRAFT-ASSISTED SYSTEM AND METHOD FOR LAUNCHING AND RETRIEVING A FIXED-WING AIRCRAFT

PRIORITY

This application claims priority to and the benefit of U.S. Provisional Patent Application No. 62/449,321, filed Jan. 23, 2017, the entire contents of which are incorporated herein by reference.

BACKGROUND

It is well-known in the aeronautical sciences that an aircraft capable of hover and/or of slow flight is typically not well-suited to long-distance efficient cruising flight. One drawback of aircraft capable of long-distance efficient cruising flight is that such aircraft typically require long runways to be utilized for take-off and landing. This becomes problematic when there is not sufficient space for the requisite runway, meaning that such aircraft may not be used. There is a need for new systems and methods by which aircraft that otherwise require a long runway may be launched and retrieved from small spaces that solve these problems.

SUMMARY

The rotorcraft-assisted launch and retrieval system of various embodiments of the present disclosure generally includes: (1) an eight-rotor modular multicopter attachable to (and detachable from) a fixed-wing aircraft to facilitate launch of the fixed-wing aircraft into wing-borne flight; (2) a storage and launch system usable to store the modular multicopter and to facilitate launch of the fixed-wing aircraft into wing-borne flight; and (3) an anchor system usable (along with the multicopter and a flexible capture member) to retrieve the fixed-wing aircraft from wing-borne flight.

Generally, to launch the fixed-wing aircraft into wing-borne flight, an operator (or operators): (1) removes the disassembled multicopter from a container of the storage and launch system; (2) assembles the multicopter; (3) mounts the fixed-wing aircraft to a launch-assist assembly of the storage and launch system; (4) attaches the fixed-wing aircraft to the multicopter; (5) remotely controls the multicopter to lift the fixed-wing aircraft to a desired altitude and to accelerate the fixed-wing aircraft to a desired speed; and (6) remotely causes the fixed-wing aircraft to detach from the multicopter, thereby releasing the fixed-wing aircraft into wing-borne flight.

Generally, to retrieve the fixed-wing aircraft from wing-borne flight, the operator (or operators): (1) attaches one end of a flexible capture member to the multicopter and the other end to the anchor system; (2) remotely controls the multicopter to fly above the anchor system until the flexible capture member is tensioned to a designated level; and (3) controls the fixed-wing aircraft to capture the flexible capture member.

Additional features and advantages of the present disclosure are described in, and will be apparent from, the following Detailed Description and the Figures.

BRIEF DESCRIPTION OF THE FIGURES

FIG. 2A is a top perspective view of the hub module of the multicopter of FIG. 1A.

FIG. 7A is a top perspective view of one of the front landing gear modules of the multicopter of FIG. 1A.

FIG. 7B is a top perspective view of one of the rear landing gear modules of the multicopter of FIG. 1A.

FIG. 10E is a cross-sectional view of the breakaway device of FIG. 9C when the compression spring is fully extended taken substantially along a plane through the longitudinal axis of the breakaway device.

FIG. 10F is a cross-sectional view of the breakaway device of FIG. 9C when the compression spring is fully compressed and the finger beginning to rotate out of the breakaway sleeve taken substantially along a plane through the longitudinal axis of the breakaway device.

FIG. 10G is a cross-sectional view of the breakaway device of FIG. 9C when the compression spring is fully compressed and the finger has rotated out of the breakaway sleeve taken substantially along a plane through the longitudinal axis of the breakaway device.

DETAILED DESCRIPTION

Figure 1A:
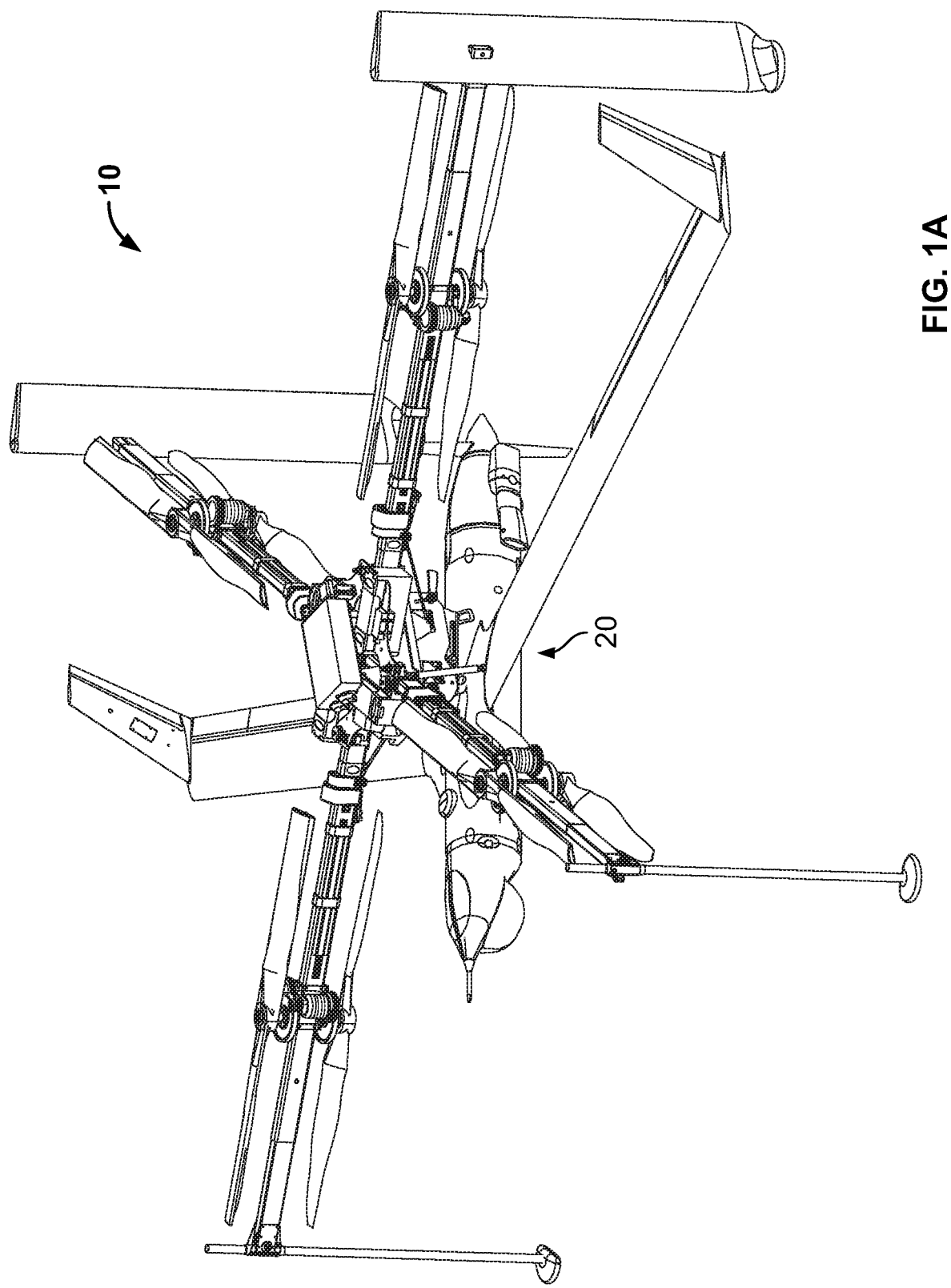
FIG. 1A is a top perspective view of one example embodiment of the multicopter of the present disclosure attached to a fixed-wing aircraft.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

Although various processes are described below with reference to various flowcharts, many other processes of performing the acts associated with the illustrated processes may be employed. For example, the order of certain of the illustrated blocks or diamonds may be changed, certain of the illustrated blocks or diamonds may be optional, or certain of the illustrated blocks or diamonds may not be employed.

The rotorcraft-assisted launch and retrieval system of various embodiments of the present disclosure generally includes: (1) an eight-rotor modular multicopter 10 attachable to (and detachable from) a fixed-wing aircraft 20 to facilitate launch of the fixed-wing aircraft 20 into wing-borne flight; (2) a storage and launch system 2000 usable to store the modular multicopter 10 and to facilitate launch of the fixed-wing aircraft 20 into wing-borne flight; and (3) an anchor system 3000 usable (along with the multicopter 10 and a flexible capture member 5000) to retrieve the fixed-wing aircraft 20 from wing-borne flight.

Generally, to launch the fixed-wing aircraft 20 into wing-borne flight, an operator (or operators): (1) removes the disassembled multicopter 10 from a container of the storage and launch system 2000; (2) assembles the multicopter 10; (3) mounts the fixed-wing aircraft 20 to a launch-assist assembly of the storage and launch system 2000; (4) attaches the fixed-wing aircraft 20 to the multicopter 10; (5) remotely controls the multicopter 10 to lift the fixed-wing aircraft 20 to a desired altitude and to accelerate the fixed-wing aircraft 20 to a desired speed; and (6) remotely causes the fixed-wing aircraft 20 to detach from the multicopter 10, thereby releasing the fixed-wing aircraft 20 into wing-borne flight.

Generally, to retrieve the fixed-wing aircraft 20 from wing-borne flight, the operator (or operators): (1) attaches one end of a flexible capture member 5000 to the multicopter 10 and the other end to the anchor system 3000; (2) remotely controls the multicopter 10 to fly above the anchor system 3000 until the flexible capture member 5000 is tensioned to a designated level; and (3) controls the fixed-wing aircraft 20 to capture the flexible capture member 5000.

The components of one example embodiment of the multicopter 10, the storage and launch system 2000, and the anchor system 3000 are described below in connection with FIGS. 1A to 9D, followed by a detailed description of example methods for launching and retrieving the fixed-wing aircraft 20 into and from wing-borne flight using the multicopter 10, the storage and launch system 2000, and the anchor system 3000 in connection with FIGS. 10A to 10I.

The example embodiment of the systems and methods of the present disclosure shown in the drawings and described below include a multicopter. In other embodiments, the rotorcraft may include any suitable quantity of rotors (e.g., be a helicopter or a quadcopter).

1. Multicopter Components

FIGS. 1A, 1B, 1C, 1D, 1E, 1F, and 1G show the multicopter 10. The multicopter 10 is modular in that it is assembled from (and can be disassembled into) a plurality of different modules or subassemblies. The multicopter is removably attachable to: (1) the fixed-wing aircraft 20 to facilitate launch of the fixed-wing aircraft 20 into wing-borne flight, and (2) the flexible capture member 5000 to facilitate retrieval of the fixed-wing aircraft 20 from wing-borne flight.

Figure 1B:
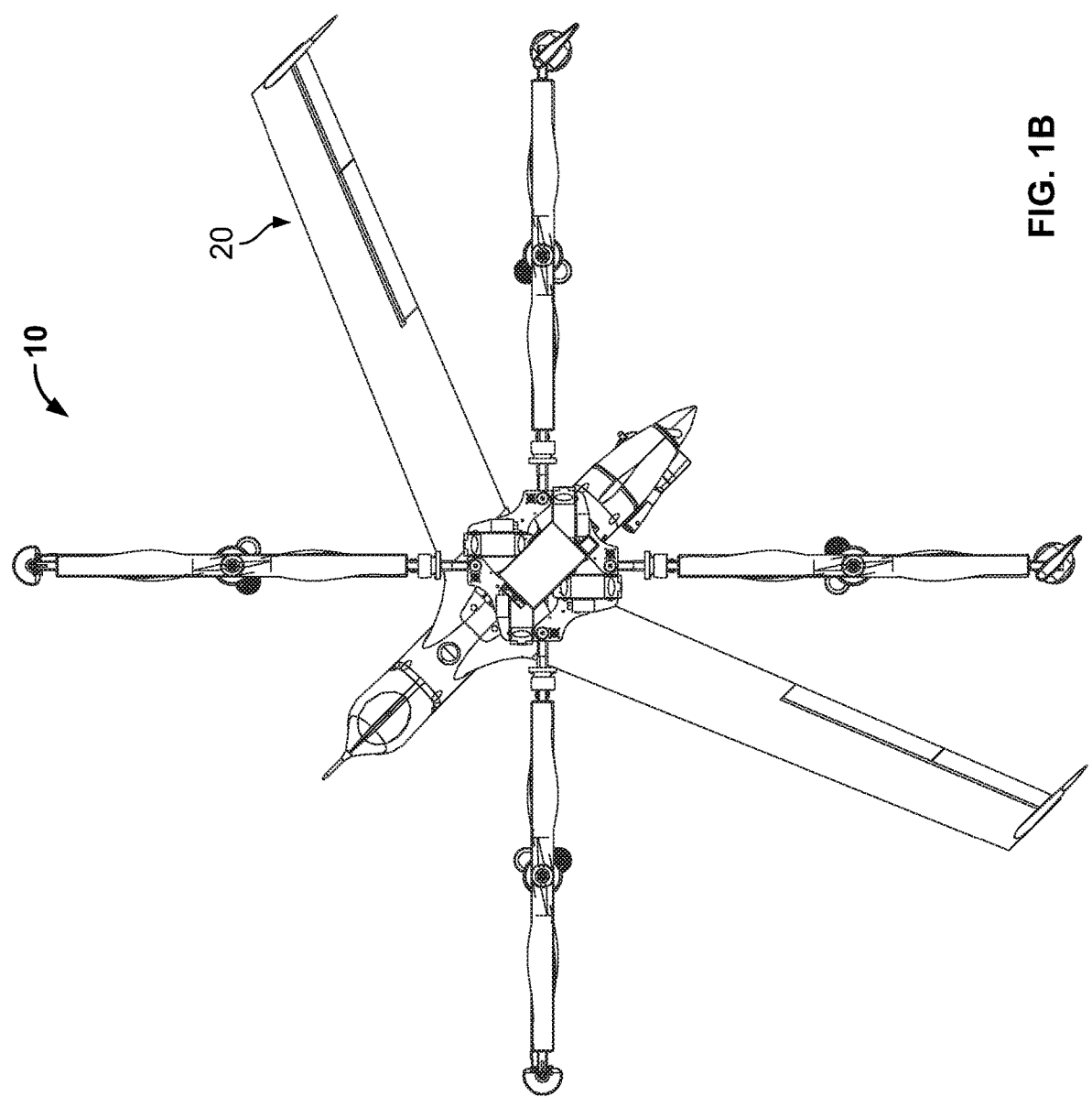
FIG. 1B is a top plan view of the multicopter and fixed-wing aircraft of FIG. 1A.
Figure 1C:
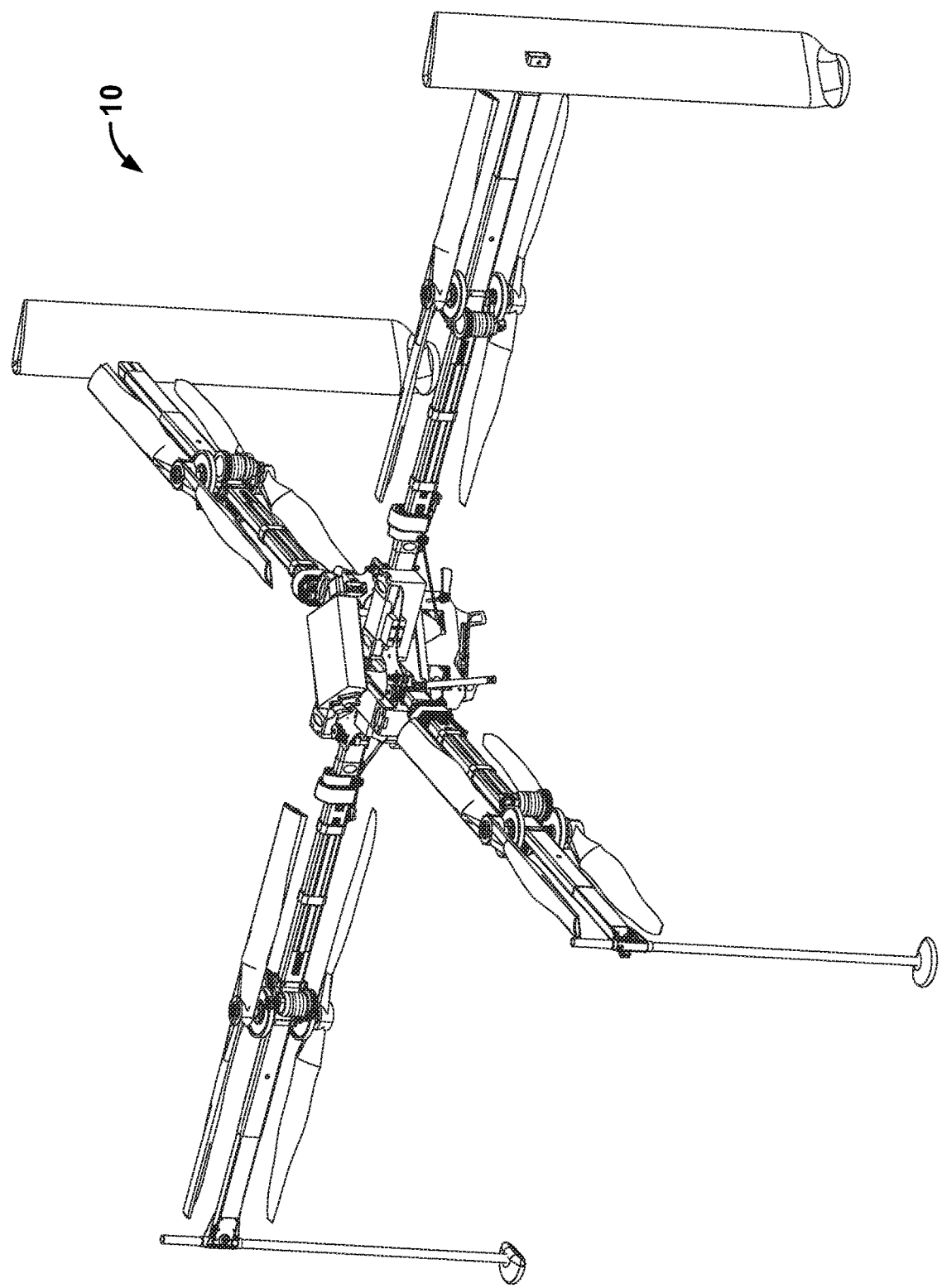
FIG. 1C is a top perspective view of the multicopter of FIG. 1A.
Figure 1D:
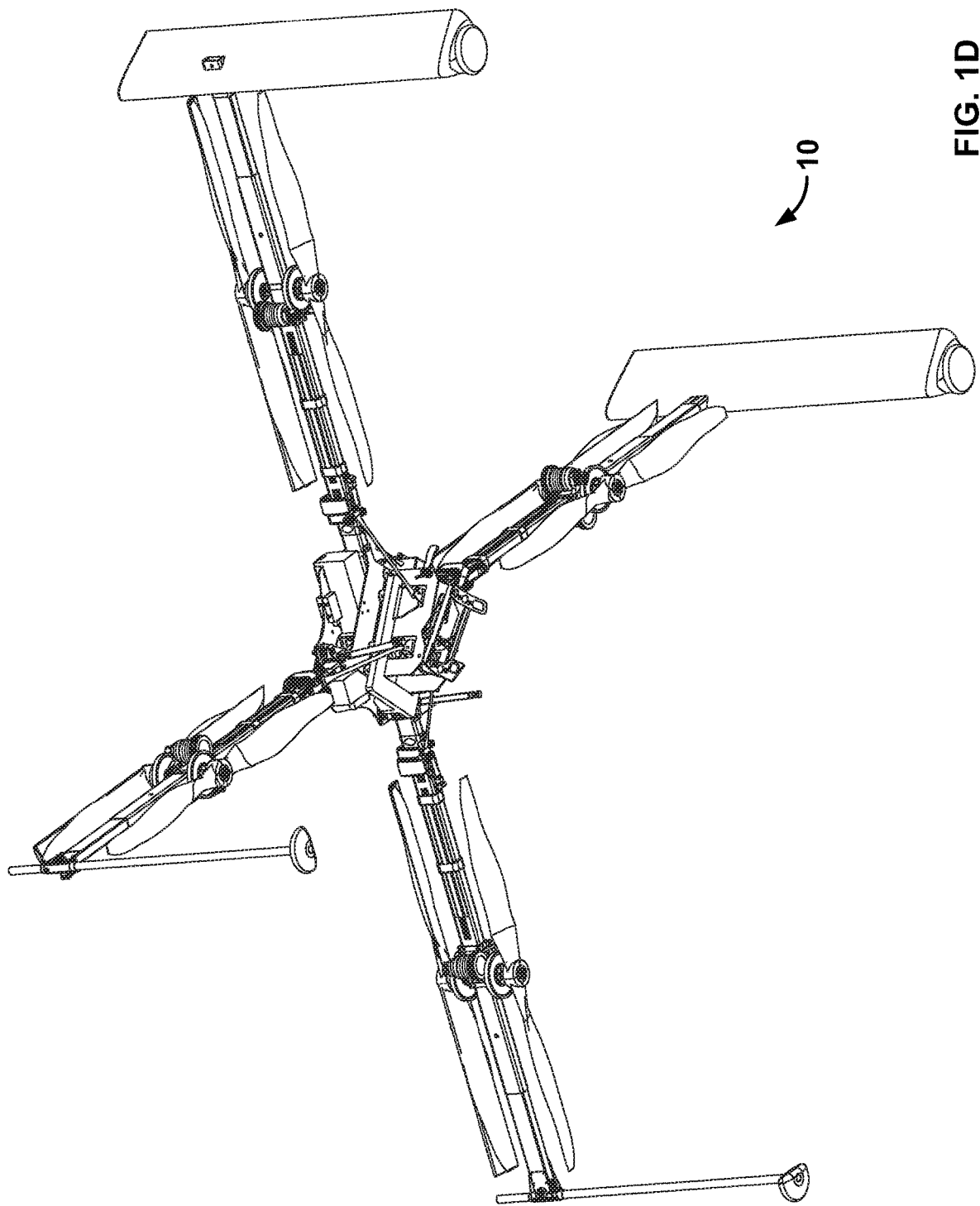
FIG. 1D is a bottom perspective view of the multicopter of FIG. 1A.
Figure 1E:
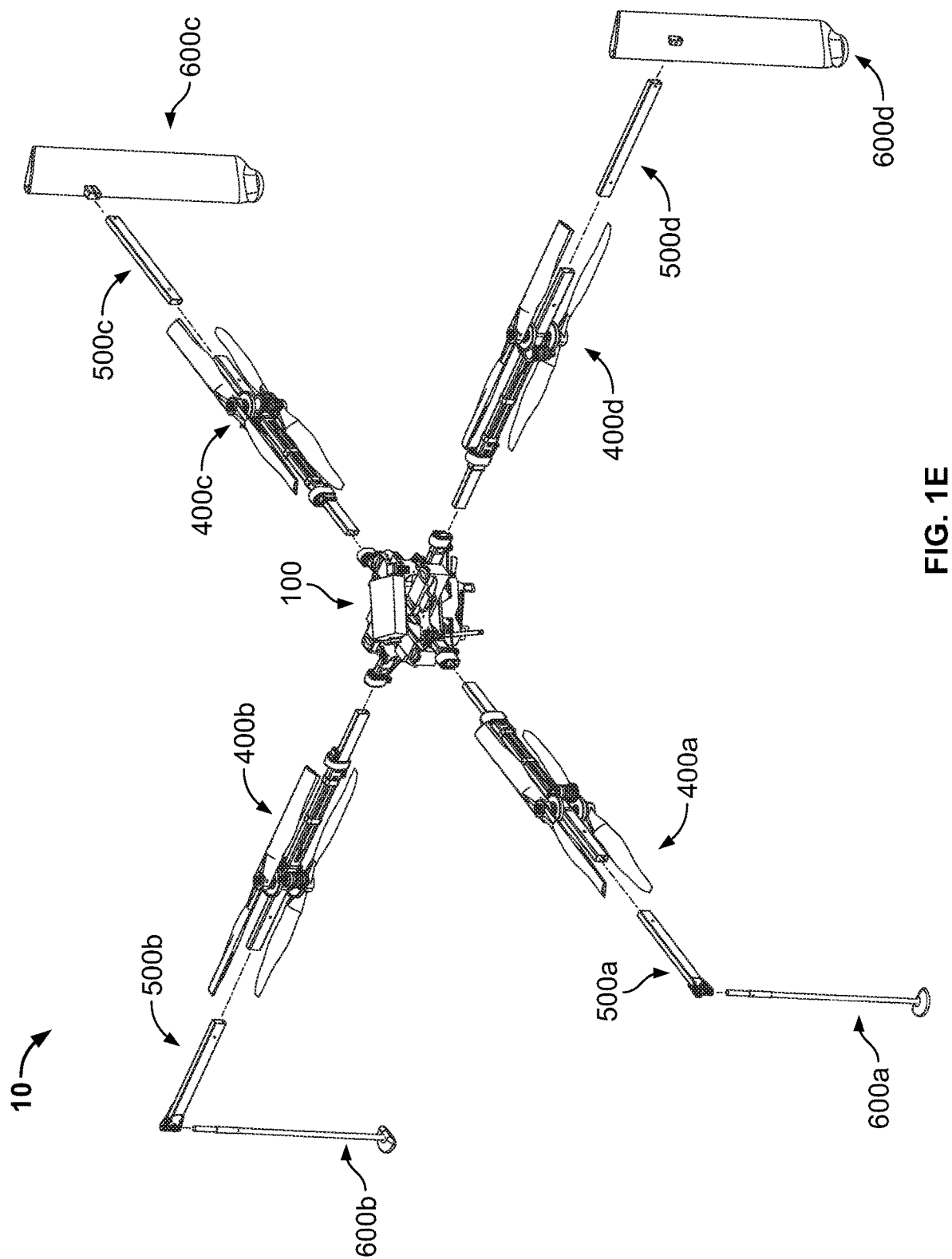
FIG. 1E is a partially-exploded top perspective view of the multicopter of FIG. 1A.
Figure 1F:
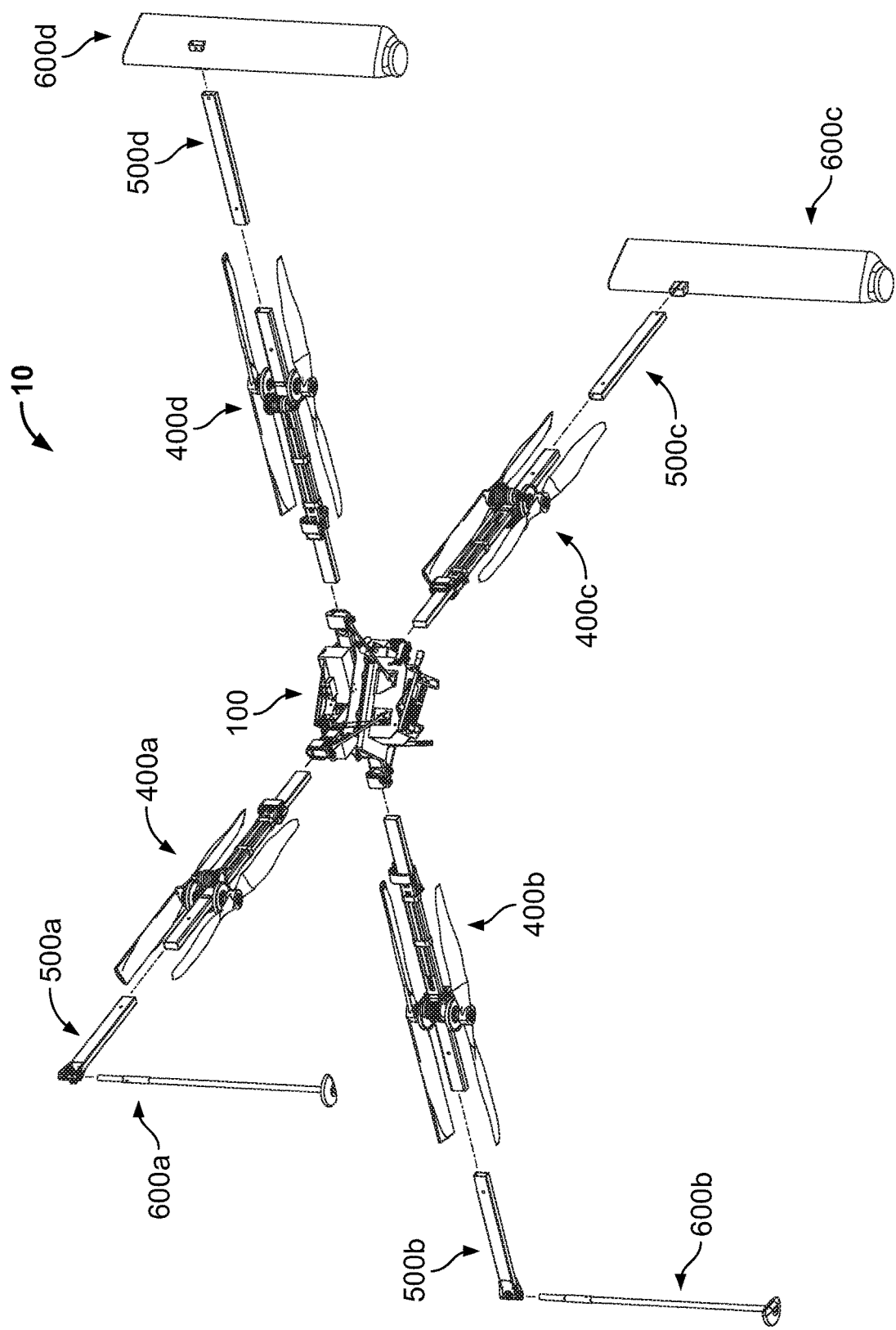
FIG. 1F is a partially-exploded bottom perspective view of the multicopter of FIG. 1A.

As best shown in FIGS. 1E and 1F, the multicopter 10 includes the following 13 modules or subassemblies: a hub module 100; first, second, third, and fourth rotor arm modules 400a, 400b, 400c, and 400d; first and second front landing gear extension modules 500a and 500b; first and second rear landing gear extension modules 500c and 500d; first and second front landing gear modules 600a and 600b; and first and second rear landing gear modules 600c and 600d.

As described in detail below, to assemble the multicopter 10 from these 13 modules or subassemblies, after removing the 13 modules from the container of the storage and launch system 2000, an operator: (1) attaches the first, second, third, and fourth rotor arm modules 400a, 400b, 400c, and 400d to the hub module 100; (2) attaches the first and second front landing gear extension modules 500a and 500b to the first and second rotor arm modules 400a and 400b, respectively; (3) attaches the first and second rear landing gear extension modules 500c and 500d to the third and fourth rotor arm modules 400c and 400d, respectively; (4) attaches the first and second front landing gear module 600a and 600b to the first and second front landing gear extension modules 500a and 500b, respectively; and (5) attaches the first and second rear landing gear module 600c and 600d to the first and second rear landing gear extension modules 500c and 500d, respectively.

The modularity of this multicopter is beneficial compared to non-modular or unitary multicopter construction. First, the modularity of this multicopter enables an operator to quickly and easily disassemble this relatively large multicopter into 13 smaller modules or subassemblies. The operator can compactly store these modules or subassemblies in a single container, which makes the disassembled multicopter easy to store and transport compared to the assembled multicopter. Second, if a part of this multicopter breaks, its modularity enables the operator to quickly and easily replace the module(s) or subassembly(ies) including the broken part with a properly-functioning replacement module(s) or subassembly(ies) rather than waste time repairing the broken component(s).

Figure 1G:
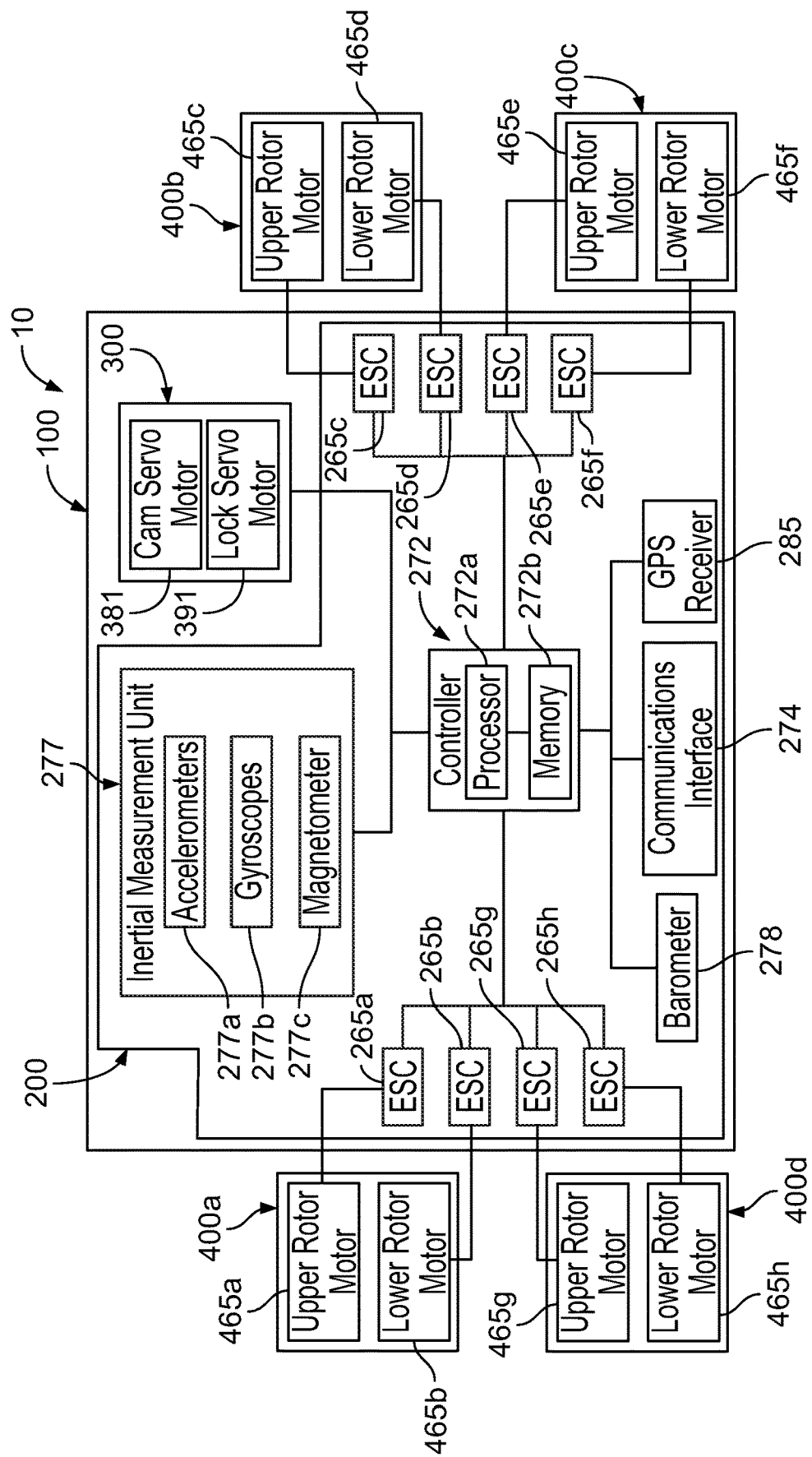
FIG. 1G is a block diagram showing certain electrically-controlled components of the multicopter of FIG. 1A.

FIG. 1G is a block diagram of certain electrically-controlled components of the multicopter 10. In this embodiment, although not shown in FIG. 1G, four (or any suitable quantity of) lithium-ion batteries (or any other suitable power source(s)) power these components (as described below). Specifically, for a given component, the power source may be directly electrically connected to that component to power that component or indirectly electrically connected to that component (e.g., via another component) to power that component.

The hub module 100 includes a hub base 200 and a saddle 300. The hub base 200 includes: (1) a controller 272; (2) a communications interface 274; (3) an inertial measurement unit (IMU) 277; (4) a barometer 278 (or other suitable pressure sensor); (5) a GPS receiver 285; and (6) eight electronic speed controllers (ESCs) 265a, 265b, 265c, 265d, 265e, 265f, 265g, and 265h. The saddle 300 includes: (1) a cam servo motor 381; and (2) a lock servo motor 391. This is merely one example configuration, and these components may be located on any suitable part of the multicopter in other embodiments. The first rotor arm module 400a includes an upper rotor motor 465a and a lower rotor motor 465b. The second rotor arm module 400b includes an upper rotor motor 465c and a lower rotor motor 465d. The third rotor arm module 400c includes an upper rotor motor 465e and a lower rotor motor 465f. The fourth rotor arm module 400d includes an upper rotor motor 465g and a lower rotor motor 465h.

The controller 272 is electrically and communicatively connected to the telemetry link 274, the R/C receiver 276, the IMU 277, the barometer 278, the GPS receiver 285, the ESCs 265a to 265h, the cam servo motor 381, and the lock servo motor 391.

The controller 272 includes a processor 272a and a memory 272b. The processor 272a is configured to execute program code or instructions stored in the memory 272b to control operation of the multicopter 10, as described herein. The processor 272a may be one or more of: (1) a general-purpose processor; (2) a content-addressable memory; (3) a digital-signal processor; (4) an application-specific integrated circuit; (5) a field-programmable gate array; (6) any suitable programmable logic device, discrete gate, or transistor logic; (7) discrete hardware components; and (8) any other suitable processing device.

The memory 272b is configured to store, maintain, and provide data as needed to support the functionality of the multicopter 10. For instance, in various embodiments, the memory 272b stores program code or instructions executable by the processor 272a to control the multicopter 10. The memory 272b may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The communications interface 274 is a suitable wireless communication interface, such as a transceiver like an MM2 900 MHz Embedded Radio by Freewave Technologies, configured to establish and facilitate communication between the controller 272 and: (1) a computing device (such as a laptop computer, a tablet computer, or a mobile phone, not shown); and (2) an R/C controller (not shown) that the operator of the multicopter 10 controls. In operation, once the communications interface 274 establishes communication with the computing device, the controller 272 can send data (via the communications interface 274) associated with the operation of the multicopter 10 (such as the operational status of the multicopter 10, GPS coordinates of the multicopter 10, rotor motor status, IMU or other sensor measurements, altitude, GPS reception health, magnetometer health, aircraft attitude, and the like) to the computing device. Once the communications interface 274 establishes communication with the R/C controller, the controller 272 can receive signals (via the communications interface 274) from the R/C controller. More specifically, upon receipt of these signals from the R/C controller, the communications interface 274 converts these signals into a format readable by the controller 272 and sends the converted signals to the controller 272 for processing.

The above-described communication may be bidirectional or unidirectional. In some embodiments, the communications interface 274 enables the controller 272 to send data to the computing device but not receive data from the computing device. In other embodiments, the communications interface 274 enables the controller 272 to send data to the computing device and to receive data from the computing device. In some embodiments, the communications interface 274 enables the controller 272 to receive signals from the R/C controller but not send signals to the R/C controller. In other embodiments, the communications interface 274 enables the controller 272 to receive signals from the R/C controller and send signals to the R/C controller.

In certain embodiments, the communications interface 274 includes separate components for communicating with the computing device (such as a telemetry link) and the R/C controller (such as an R/C receiver).

The IMU 277 includes: (1) multiple accelerometers 277a configured to sense the linear acceleration of the multicopter 10 with respect to three orthogonal reference axes (e.g., standard orthogonal x-, y-, and z-axes); (2) multiple gyroscopes 277b configured to sense the angular rotation of the multicopter 10 with respect to the pitch, yaw, and roll axes of the multicopter 10, as is known in the art; and (3) a magnetometer 277c configured to enable the controller 272 to determine the heading of the multicopter 10 (i.e., the direction in which the multicopter 10 is pointed relative to Earth), as is known in the art. More specifically, the magnetometer 277c is configured to sense the Earth's magnetic field and transmit a signal representing the direction of the Earth's magnetic North to the controller 272. The controller 272 is configured to use the GPS coordinates of the multicopter 10 and a global map of declination angle (the angle between the Earth's true North and the Earth's magnetic North) to determine a required correction angle. The controller 272 is configured to apply the required correction angle to the direction of the Earth's magnetic North to obtain the direction of the Earth's true North. The controller 272 then uses this information to determine the heading of the multicopter 10. In other embodiments, a pair of GPS receivers are used instead of the magnetometer to maintain more accurate heading. This practice is especially useful when the multicopter is operating in close proximity to large iron objects—such as ship hulls—or when the difference between the Earth's magnetic North and true North is large, such as near the Earth's poles.

The accelerometers 277a, the gyroscopes 277b, and the magnetometer 277c continuously or periodically obtain these sensor readings and continuously or periodically transmit corresponding signals to the controller 272, which uses these sensor readings in a variety of different ways described herein. This is merely one example IMU, and the IMU may include any suitable sensors.

The barometer 278 is configured to sense the atmospheric pressure and to transmit a signal representing the sensed atmospheric pressure to the controller 272. The controller 272 is configured to use the sensed atmospheric pressure to determine: (1) the height of the multicopter 10 above sea level, as is known in the art; and (2) the height of the multicopter 10 above the ground or any other suitable reference location, as is known in the art. For instance, to determine the height of the multicopter 10 above the ground, the controller 272 uses a reference atmospheric pressure sensed by the barometer 278 while the multicopter 10 is on the ground just before takeoff to determine the height of the ground above sea level. Once the multicopter 10 is airborne, at any given point in time the controller 272 is configured to determine the height of the multicopter 10 above the ground by: (1) using the atmospheric pressure sensed by the barometer 278 to determine the height of the multicopter 10 above sea level; and (2) determining the difference between the height of the multicopter 10 above sea level and the height of the ground above sea level. This is merely one example way of determining the height of the multicopter above a reference point. Any other suitable method may be employed.

The GPS receiver 285 is communicatively connectable with (such as via a suitable wireless protocol) GPS satellites (not shown), as is known in the art. The GPS receiver 285 is configured to receive signals from one or more of the GPS satellites, to determine the multicopter's location using those signals, and to transmit signals representing the multicopter's location to the controller 272.

The ESC 265a is electrically connected to and, along with the controller 272, controls the operation of the upper rotor motor 465a of the first rotor arm module 400a. The ESC 265b is electrically connected to and, along with the controller 272, controls the operation of the lower rotor motor 465b of the first rotor arm module 400a. The ESC 265c is electrically connected to and, along with the controller 272, controls the operation of the upper rotor motor 465c of the second rotor arm module 400b. The ESC 265d is electrically connected to and, along with the controller 272, controls the operation of the lower rotor motor 465d of the second rotor arm module 400b. The ESC 265e is electrically connected to and, along with the controller 272, controls the operation of the upper rotor motor 465e of the third rotor arm module 400c. The ESC 265f is electrically connected to and, along with the controller 272, controls the operation of the lower rotor motor 465f of the third rotor arm module 400c. The ESC 265g is electrically connected to and, along with the controller 272, controls the operation of the upper rotor motor 465g of the fourth rotor arm module 400d. The ESC 265h is electrically connected to and, along with the controller 272, controls the operation of the lower rotor motor 465h of the fourth rotor arm module 400d.

The controller 272 is configured to send rotor motor control signals to the ESCs 265a to 265h to control operation of the rotor motors 465a to 465h in accordance with received control signals and/or control signals the controller 272 generates via any of the software subroutines disclosed herein.

Each module or subassembly of the multicopter 10 is described in further detail below.

1.1 Hub Module

Figure 2B:
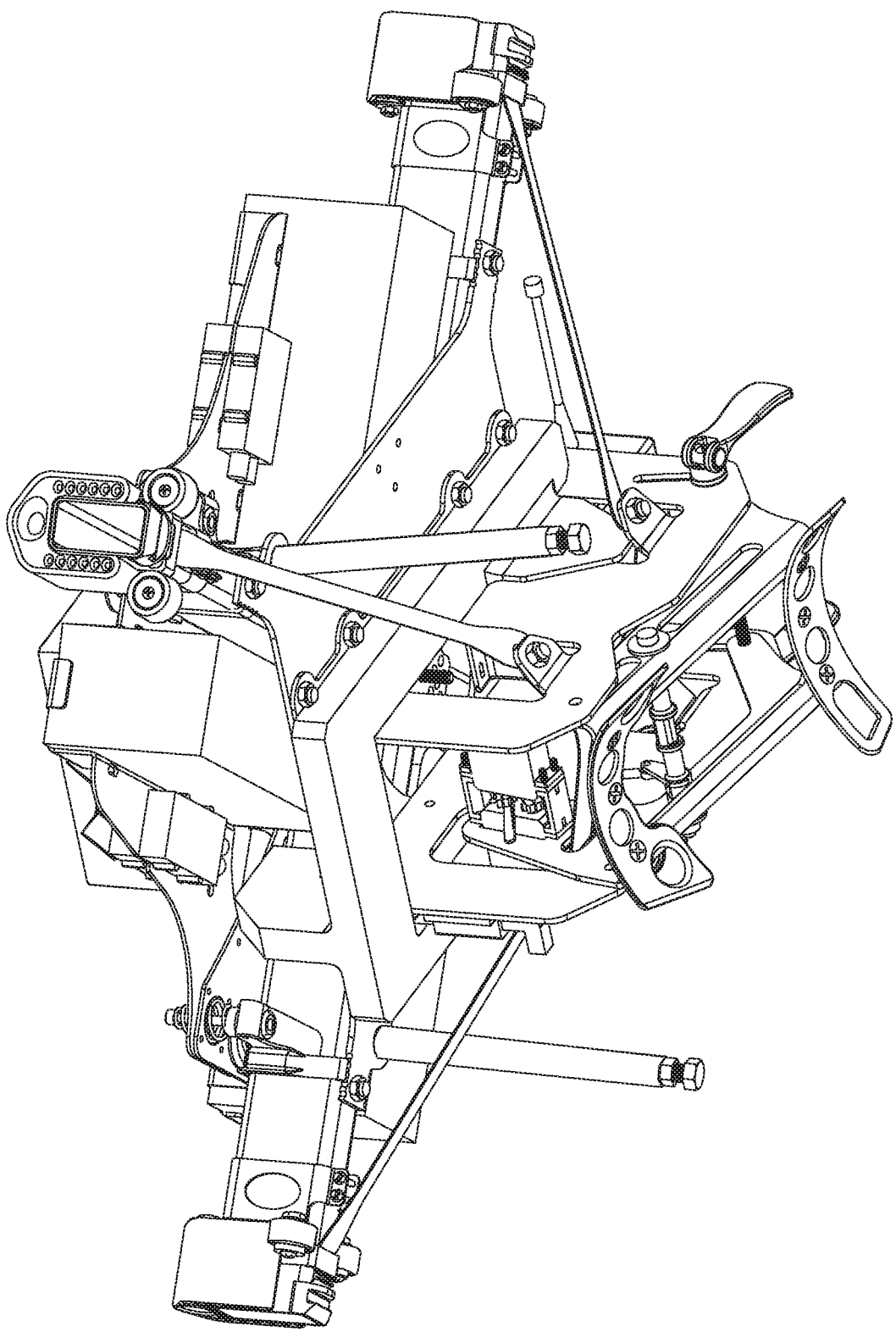
FIG. 2B is a bottom perspective view of the hub module of FIG. 2A.
Figure 2C:
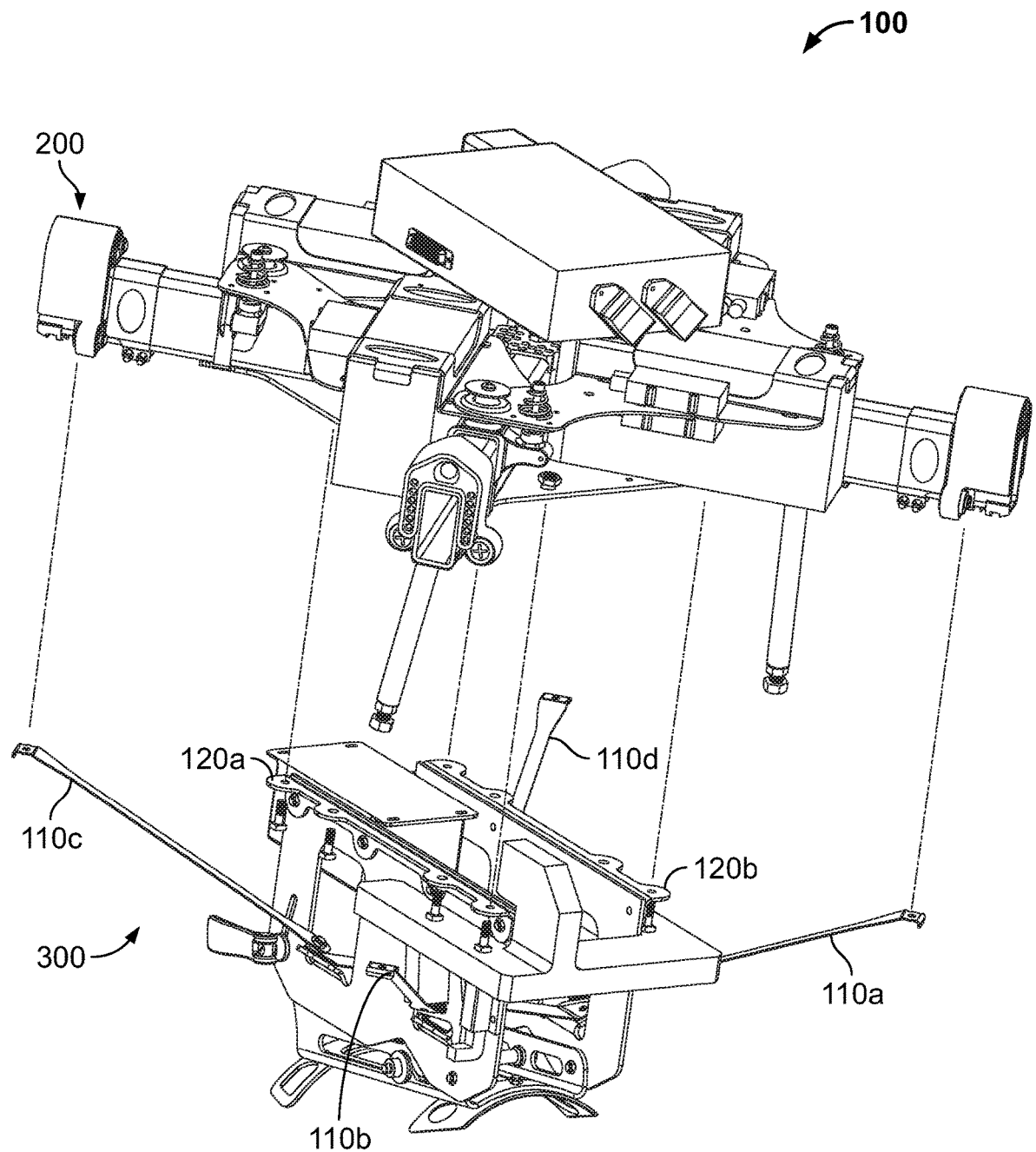
FIG. 2C is a partially exploded top perspective view of the hub module of FIG. 2A showing the hub base separated from the saddle.

FIGS. 2A, 2B, and 2C show the hub module 100. The hub module 100: (1) serves as the attachment point for the rotor arm modules 400a to 400d; (2) is the portion of the multicopter 10 to which the fixed-wing aircraft 20 is attached for launch; (3) is the portion of the multicopter 10 to which the flexible capture member 5000 is attached for retrieval of the fixed-wing aircraft 20; (4) includes the power source for the multicopter 10; and (5) includes certain components used to control operation of the multicopter 10.

As best shown in FIG. 2C, the hub module 100 includes a hub base 200 and a saddle 300. The saddle 300 is attached to the underside of the hub base 200 via two brackets 120a and 120b and four struts 110a, 110b, 110c, and 110d. Each strut 110 is attached at one end to the hub base 200 and at the other end to the saddle 300. This is merely one example of how the saddle can be attached to the hub base, and in other embodiments the saddle may be attached to the hub base in any suitable manner. For instance, in another embodiment, rather than being attached to the hub base, each strut is attached to a different rotor arm module, such as to one of the rotor motor assemblies of the rotor arm modules.

1.1.1 Hub Base

FIGS. 3A, 3B, 3C, 3D, 3E, 3F, 3G, and 3H show the hub base 200 or components thereof. The hub base 200 is the portion of the hub module 100 that: (1) serves as the attachment point for the rotor arm modules 400a to 400d; (2) includes the power source for the multicopter 10; and (3) includes certain components used to control operation of the multicopter 10.

Figure 3A:
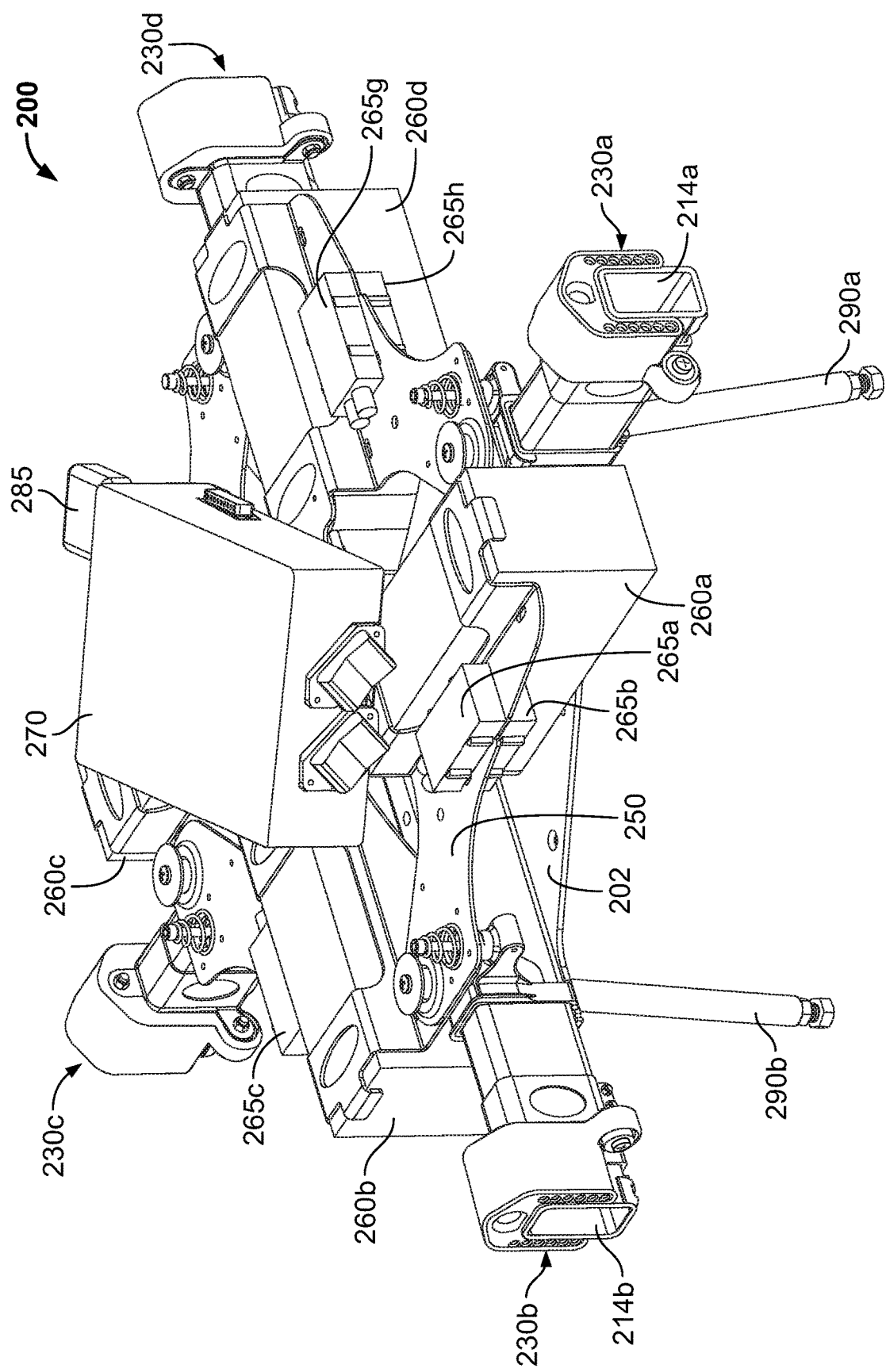
FIG. 3A is a top perspective view of the hub base of the hub module of FIG. 2A.
Figure 3B:
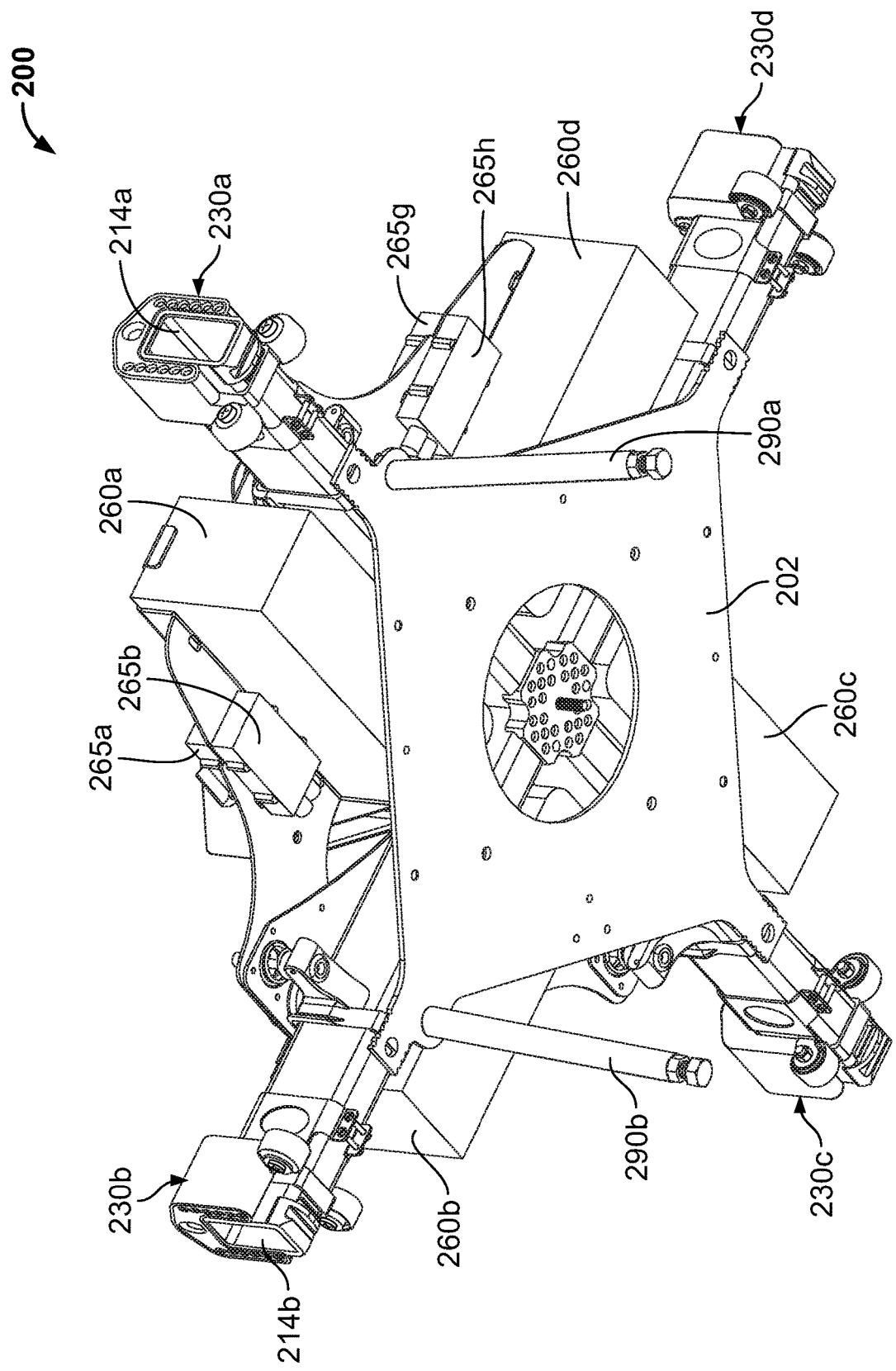
FIG. 3B is a bottom perspective view of the hub base of FIG. 3A.
Figure 3C:
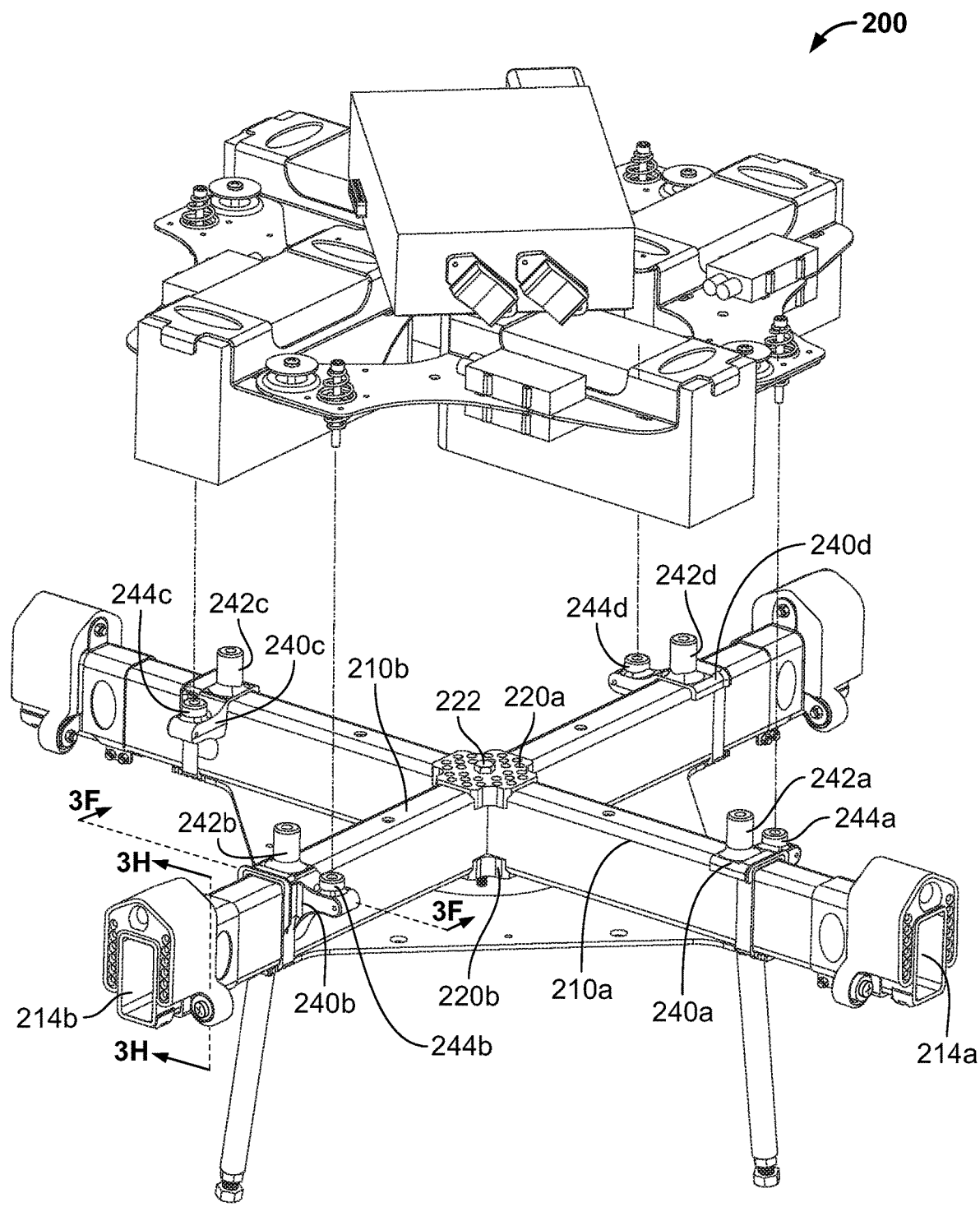
FIG. 3C is a partially exploded top perspective view of the hub base of FIG. 3A.
Figure 3D:
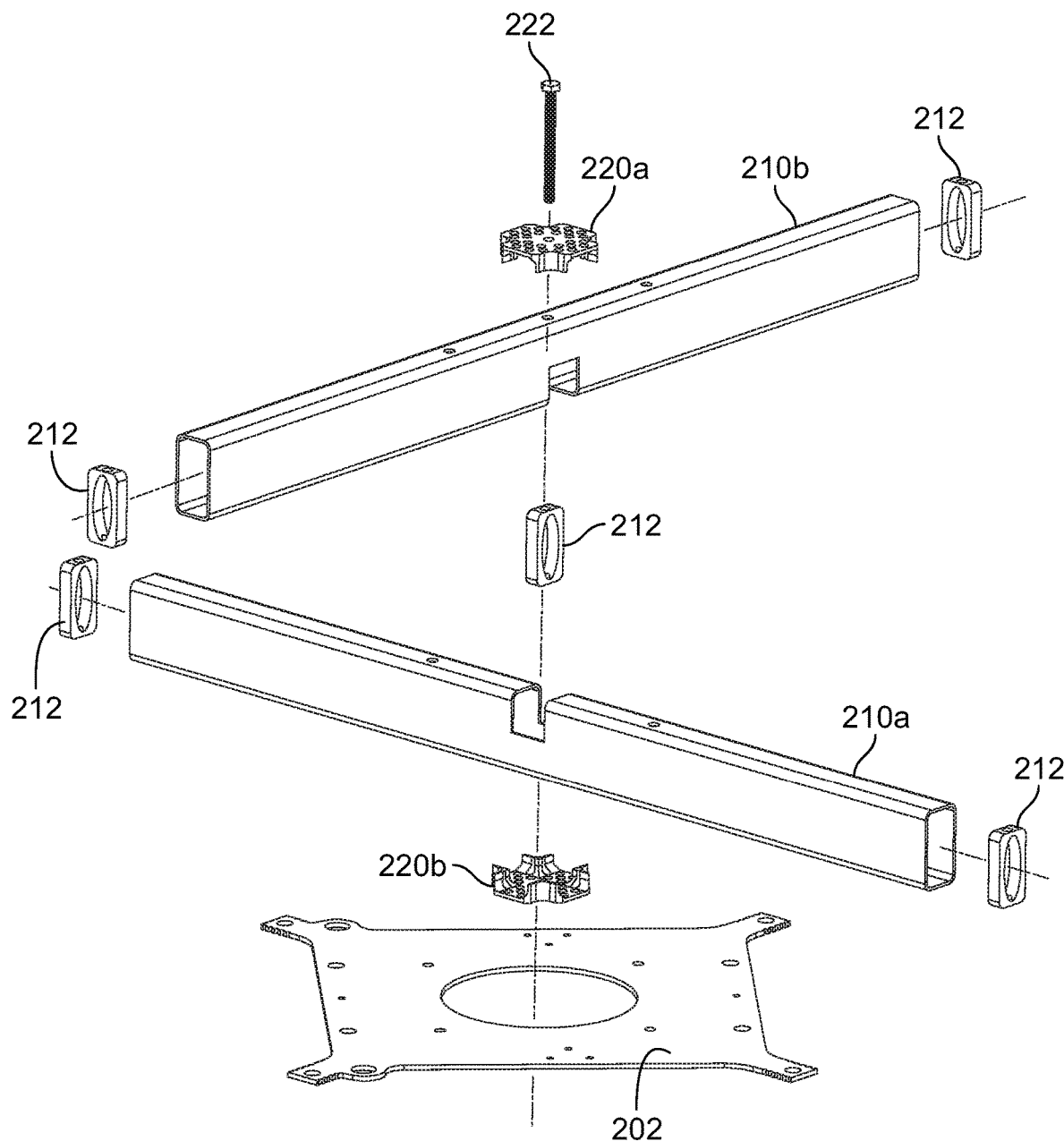
FIG. 3D is an exploded top perspective view of the supports and associated mounting hardware of the hub base of FIG. 3A.

As best shown in FIGS. 3C and 3D, the hub base 200 includes two hollow elongated rectangular supports 210a and 210b. The hollow supports 210a and 210b interlock with one another near their centers such that the hollow supports 210a and 210b are oriented transversely (such as generally perpendicularly) to one another and generally form a cross shape when viewed from above or below. Reinforcing plugs 212 are disposed within the hollow supports 210a and 210b such that fastener receiving openings (not labeled) of the reinforcing plugs 212 vertically align with fastener receiving openings (not labeled) of the hollow supports 210a and 210b. Upper and lower braces 220a and 220b sandwich the hollow supports 210a and 210b. A fastener 222 threaded through the upper brace 220a, the hollow support 210a, the reinforcing plug 212, the hollow support 210b, and the lower brace 220b holds the upper and lower braces 220a and 220b and the hollow supports 210a and 210b together. This ensures the hollow supports 210a and 210b remain interlocked and ensures their orientation with respect to one another does not substantially change.

The hollow supports 210a and 210b are attached to a hub base plate 202 via suitable fasteners (not labeled) threaded through the hollow supports 210a and 210b and the reinforcing plugs 212 disposed within the hollow supports 210a and 210b. As best shown in FIG. 2B, two stabilizers 290a and 290b are attached to and extend downward from either hollow support 210a and 210b. The free ends of the stabilizers 290a and 290b terminate in feet configured to contact the fixed-wing aircraft 20 to help prevent the fixed-wing aircraft 20 from rotating about its roll axis relative to the multicopter 10. The feet are adjustable in length (e.g., are threaded such that they can be shortened by threading further into the stabilizers or lengthened by unthreading further out of the stabilizers).

As best shown in FIG. 3C, first and third isolator plate mounts 240a and 240c are attached (such as via lashing) to the hollow support 210a and second and fourth isolator plate mounts 240b and 240d are attached (such as via lashing) to the hollow support 210b radially-inward of the ends of the hollow supports 210a and 210b. Each isolator plate mount 240a-d includes a respective first isolator plate mounting post 242a-d defining a threaded fastener receiving opening at least partially therethrough and a second isolator plate mounting post 244a-d defining a threaded fastener receiving opening at least partially therethrough.

Figure 3E:
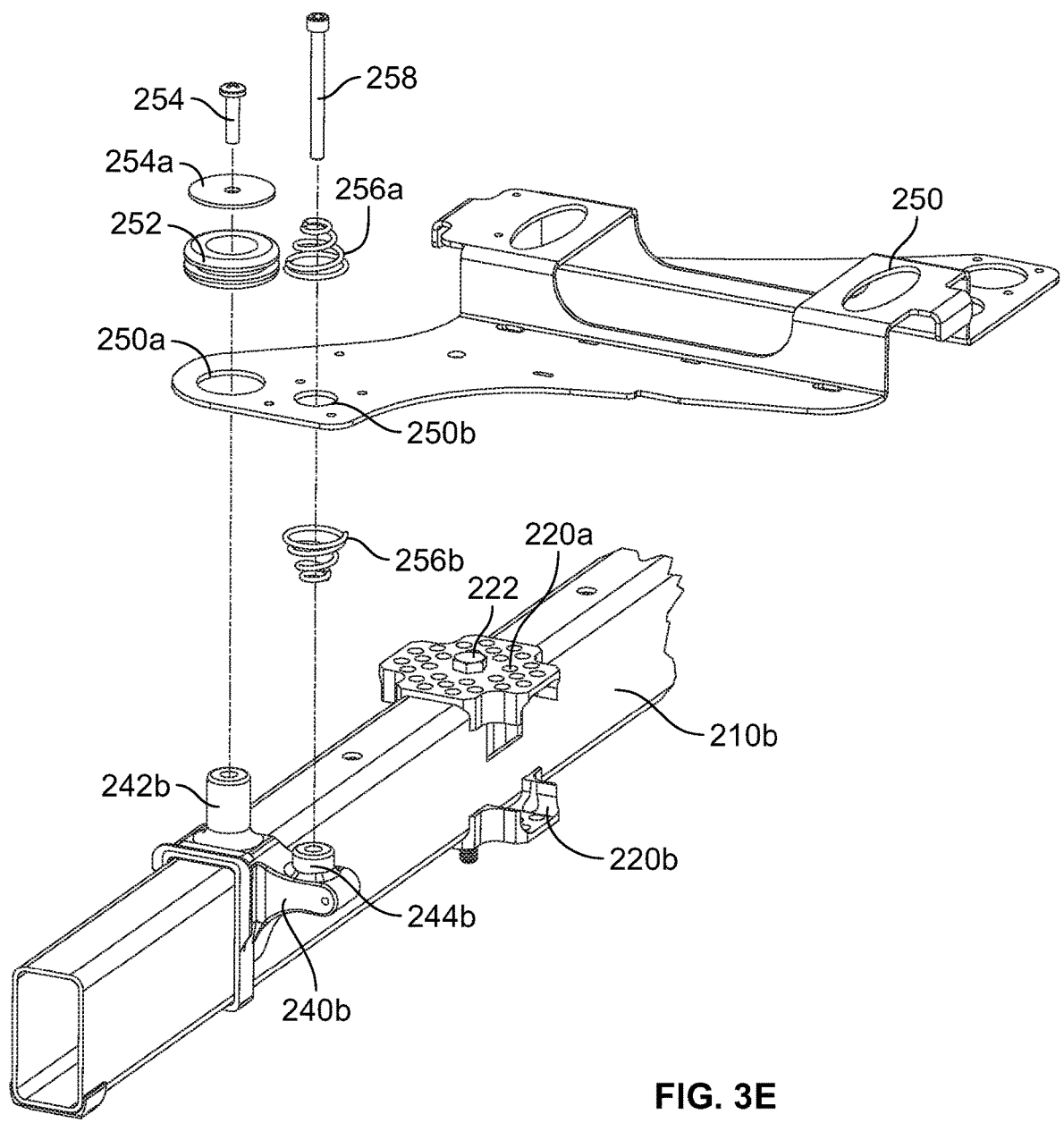
FIG. 3E is an exploded top perspective view of the isolator plate and associated mounting hardware of the hub base of FIG. 3A.
Figure 3F:
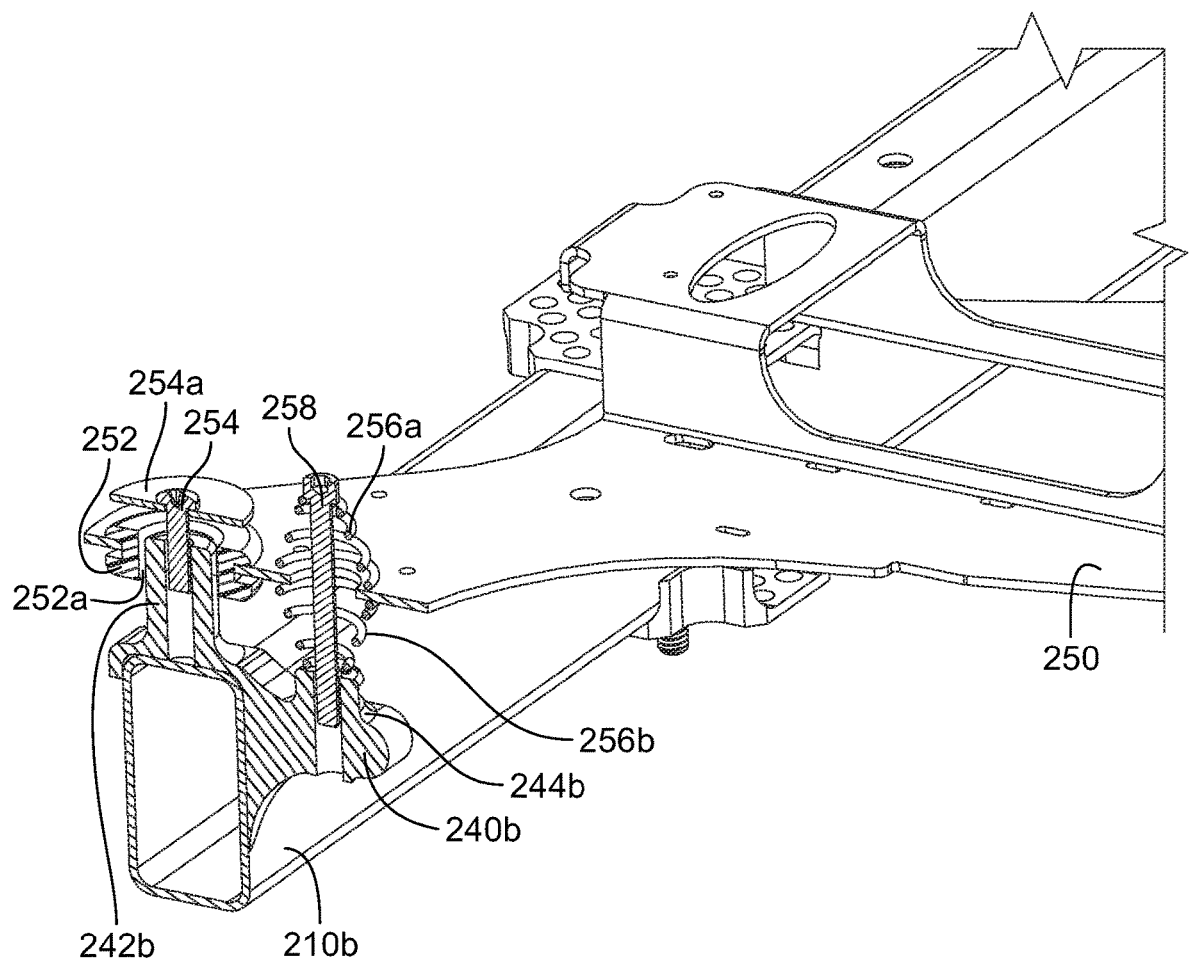
FIG. 3F is a partial cross-sectional view of one of the isolator plate mounts of the hub base of FIG. 3A taken substantially along line 3F-3F of FIG. 3C.

An isolator plate 250 is slidably mounted to the isolator plate mounts 240a, 240b, 240c, and 240d. FIGS. 3E and 3F show how the isolator plate 250 is mounted to the isolator plate mount 240b. For simplicity and brevity, illustrations of how the isolator plate 250 is mounted to the remaining three isolator plate mounts 240a, 240c, and 240d in a similar manner are not provided.

The isolator plate 250 defines first and second mounting openings 250a and 250b therethrough. An elastomeric grommet 252 is installed in the first mounting opening 250a of the isolator plate 250. The grommet 252 defines a first isolator plate mounting post receiving channel 252a therethrough, and the first isolator plate mounting post 242b is slidably received in the first isolator plate mounting post receiving channel 252a. A fastener 254 having a stop washer 254a beneath its head is partially threaded into the fastener receiving opening of the first isolator plate mounting post 242b. Upper and lower conical springs 256a and 256b—held in place by a fastener 258 partially threaded into the fastener receiving opening of the second isolator plate mounting post 244b—sandwich the isolator plate 250.

The hollow support 210b and the stop washer 254a constrain the vertical movement of the isolator plate 250. In other words, the isolator plate 250 can move vertically between a lower position in which the grommet 252 contacts the hollow support 210b and an upper position in which the grommet 252 contacts the stop washer 254a. The conical springs 256a and 256b act as a suspension that absorbs (or partially absorbs) vibrations of the hollow support 210b that would otherwise be directly transferred to the isolator plate 250, which could affect operation of certain components of the multicopter 10 (such as the controller 272).

The relatively high mass of the batteries 260a to 260d and the fact that they are mounted to the isolator plate 250 and close-coupled to the controller 272 and the IMU 277 to help prevent undesired vibration of the isolator plate 250 and therefore the controller 272 and the IMU 277. In certain embodiments, for the controller 272 to perform well, the IMU 277 must resolve accelerations on the order of 0.1 gee and rotations of 0.1 radians/second. In various embodiments, the controller 272 cannot do this reliably when (~10-gee) vibration, caused by rotor unbalance, for example, is transmitted from the airframe of the multicopter 10 to the IMU 277. When the mass of the batteries 260a to 260d is used to ballast the IMU 277 on the isolator plate 250, and the isolator plate 250 is anchored to the airframe structure through the suspension, the IMU 277 enjoys the vibration-free mounting location. By mounting the isolator plate 250 well-outboard at its corners, the IMU 277 remains sufficiently well-coupled to the airframe that pitch and roll movements are transmitted to the IMU 277, which is able to effectively resolve these motions.

As best shown in FIGS. 3A and 3B, The following components are mounted to the isolation plate 250: (1) the batteries 260a, 260b, 260c, and 260d (which are received in respective battery receivers (not labeled) configured to retain the batteries and to electrically connect the batteries (such as via suitable wiring electrically connectable to the batteries) to components of the multicopter to power those components); (2) the ESCs 265a to 265h; (3) an avionics enclosure 270 that houses a variety of components including the controller 272, the telemetry link 274, and the R/C receiver 276; (4) a GPS receiver mounting bracket 280 on which the GPS receiver 285 is mounted; (5) navigation lights (not shown); and (6) a Mode C transponder (not shown).

The four open ends of the hollow supports 210a and 210b form rotor arm module receiving sockets that can receive one of the rotor arm modules 400a to 400d. Specifically, the hollow support 210a forms a first rotor arm module receiving socket 214a and a third rotor arm module receiving socket (not shown) and the hollow support 210b forms a second rotor arm module receiving socket 214b and a fourth rotor arm module receiving socket (not shown).

As best shown in FIG. 3A, female blind mate assemblies 230 are attached to the ends of the hollow supports 210a and 210b. Specifically, a first female blind mate assembly 230a is attached to one end of the hollow support 210a near the first rotor arm module receiving socket 214a, a second female blind mate assembly 230b is attached to one end of the hollow support 210b near the second rotor arm module receiving socket 214b, a third female blind mate assembly 230c is attached to the other end of the hollow support 210a near the third rotor arm module receiving socket 214c, and a fourth female blind mate assembly 230d is attached to the other end of the hollow support 210b near the fourth rotor arm module receiving socket 214d.

The female blind mate assemblies 230 (along with the corresponding male blind mate connectors described below with respect to the rotor arm modules) facilitate: (1) mechanical attachment of the rotor arm modules 400a, 400b, 400c, and 400d to the hub module 100; (2) power flow from the battery(ies) 260a, 260b, 260c, and/or 260d to the rotor motors 465a to 465h of the rotor arm modules 400a, 400b, 400c, and 400d; and (3) communication between the ESCs 265a to 265h and the rotor motors 465a to 465h.

Figure 3G:
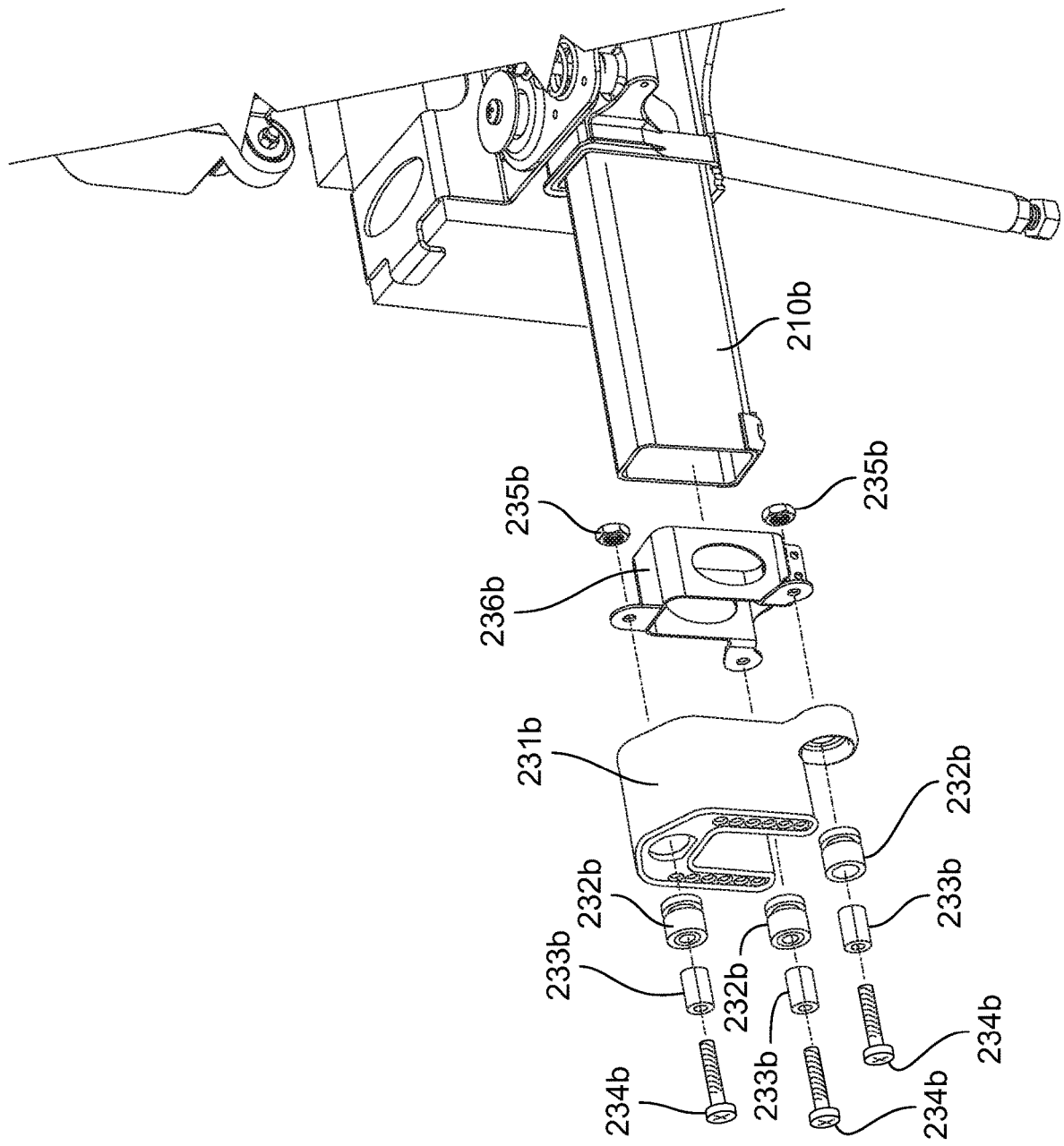
FIG. 3G is a partially exploded top perspective view of one of the female blind mate assemblies of the hub base of FIG. 3A.
Figure 3H:
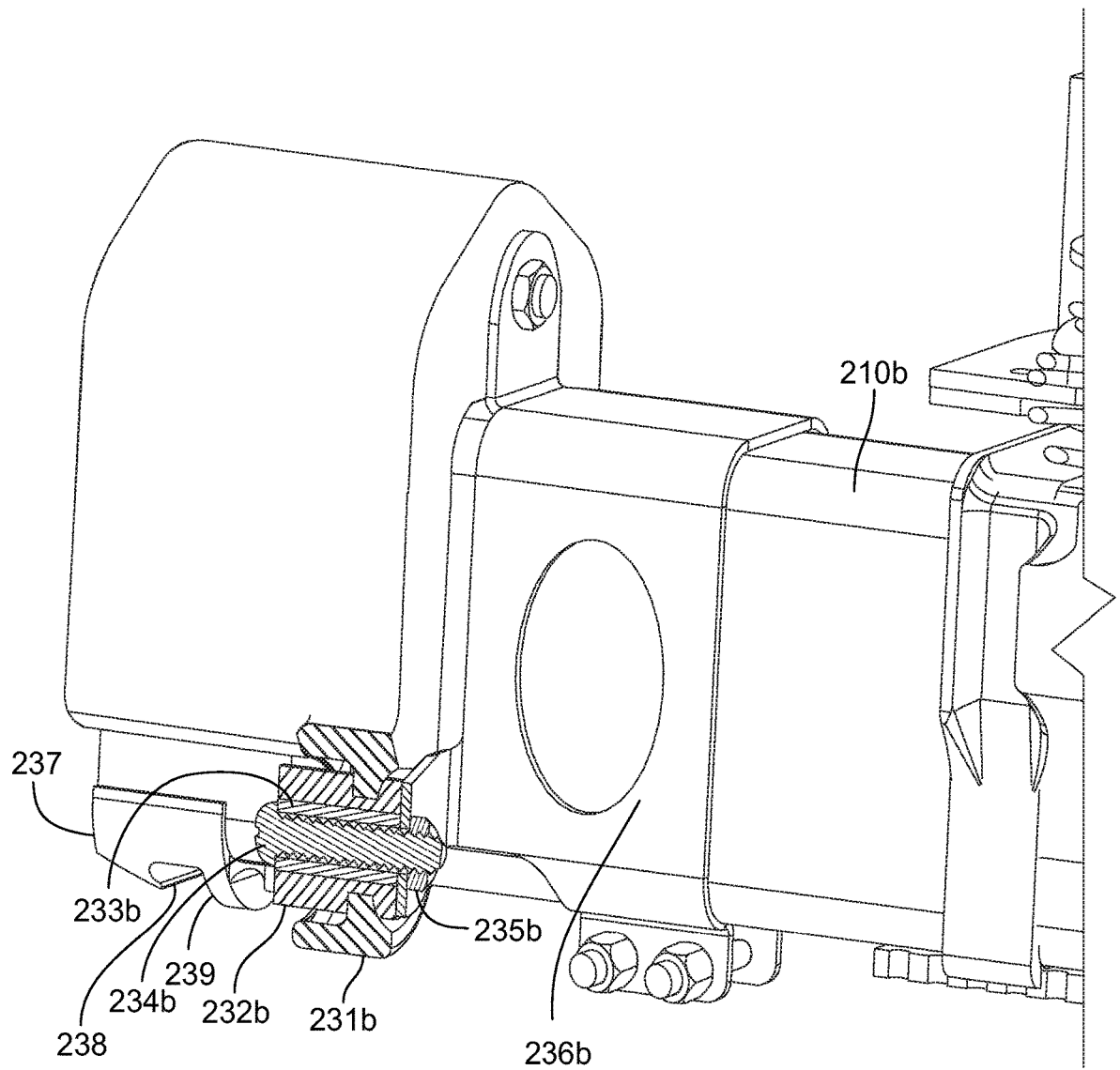
FIG. 3H is a partial cross-sectional view of one of the flexural mounts of the female blind mate assembly of FIG. 3G taken substantially along line 3H-3H of FIG. 3C.

FIGS. 3G and 3H show the second female blind mate assembly 230b. The female blind mate assemblies 230a, 230c, and 230d are similar to the second female blind mate assembly 230b and are not separately shown or described for brevity.

The second female blind mate assembly 230b includes: (1) a female blind mate connector 231b including a plurality of pin receptacles (not labeled); (2) three elastomeric grommets 232b; (3) three rigid, hollow cylindrical spacers 233b; (4) three fasteners 234b; (5) three nuts 235b; (6) a mounting bracket 236b; and (7) mounting bracket fasteners (not labeled).

Although not shown for clarity, the female blind mate connector 231b and, particularly, the pin receptacles, are electrically connected to the corresponding ESCs 265c and 265d via wiring. In this example embodiment, the female blind mate connector 231b includes 12 pin receptacles, six of which are connected to the ESC 265c via wiring and the other six of which are connected to the ESC 265d via wiring.

The mounting bracket 236b is positioned at a desired location along the hollow support 210b, and the mounting bracket fasteners are tightened to clamp the mounting bracket 236b in place relative to the hollow support 210b.

The female blind mate connector 231*b* is flexurally mounted to the mounting bracket 236*b* via the elastomeric grommets 232*b*, the spacers 233*b*, the fasteners 234*b*, and the nuts 235*b*. Specifically, the elastomeric grommets 232*b* are fitted into corresponding cavities in the female blind mate connector 231*b*. As best shown in FIG. 3H, each cavity includes an inwardly-projecting annular rib that fits into a corresponding annular cutout of the corresponding elastomeric grommet 232*b*. The spacers 233*b* are disposed within longitudinal bores defined through the elastomeric grommets 232*b*. The fasteners 234*b* extend through the hollow spacers 233*b* and through corresponding fastener receiving openings defined through the mounting bracket 236*b* into their corresponding nuts 235*b*. This secures the female blind mate connector 231*b* to the mounting bracket 236*b*.

This flexural mount of the female blind mate connector to the mounting bracket via the elastomeric grommets is beneficial compared to a rigid connection of the female blind mate connector to the mounting bracket. The flexural mount enables the female blind mate connector to move—via deformation of the elastomeric grommet—relative to the mounting bracket (and the rest of the hub module) when loads are applied to the female blind mate connector, such as loads imposed on the female blind mate connector by the attached rotor arm module during flight. Because the female blind mate connector is not rigidly attached to the corresponding mounting bracket, it is less likely that the pins of the male blind mate connector (described below) received by the pin receptacles of the female blind mate connector will lose electrical contact—causing the multicopter 10 to lose control of at least one of its rotor motors—when loads are applied to the female blind mate connector.

As best shown in FIG. 3H, a latch plate 237 is attached to the underside of each hollow support 210*a* and 210*b* below each female blind mate connector 231 attached thereto. The latch plate 237 includes a claw engager 238 and a backstop 239. The latch plate 237 is described below with respect to the locking assemblies 420 of the rotor arm modules 400*a* to 400*d*.

In some embodiments, the hub module (either the hub base, the saddle, or both) or other elements of the multicopter include ballast to obtain a desired weight distribution and/or provide stability during flight.

1.1.2 Saddle

FIGS. 4A, 4B, 4C, 4D, 4E, 4F, 4G, 4H, 4I, and 4J show the saddle 300 or components thereof. The saddle 300 is the portion of the hub module 100: (1) to which the fixed-wing aircraft 20 is attached for launch; (2) from which the fixed-wing aircraft 20 is detached for launch; and (3) to which the flexible capture member 5000 is attached for retrieval of the fixed-wing aircraft 20. The saddle 300 also enables the operator to vary the pitch angle of the fixed-wing aircraft 20 relative to the multicopter 10.

Figure 4A:
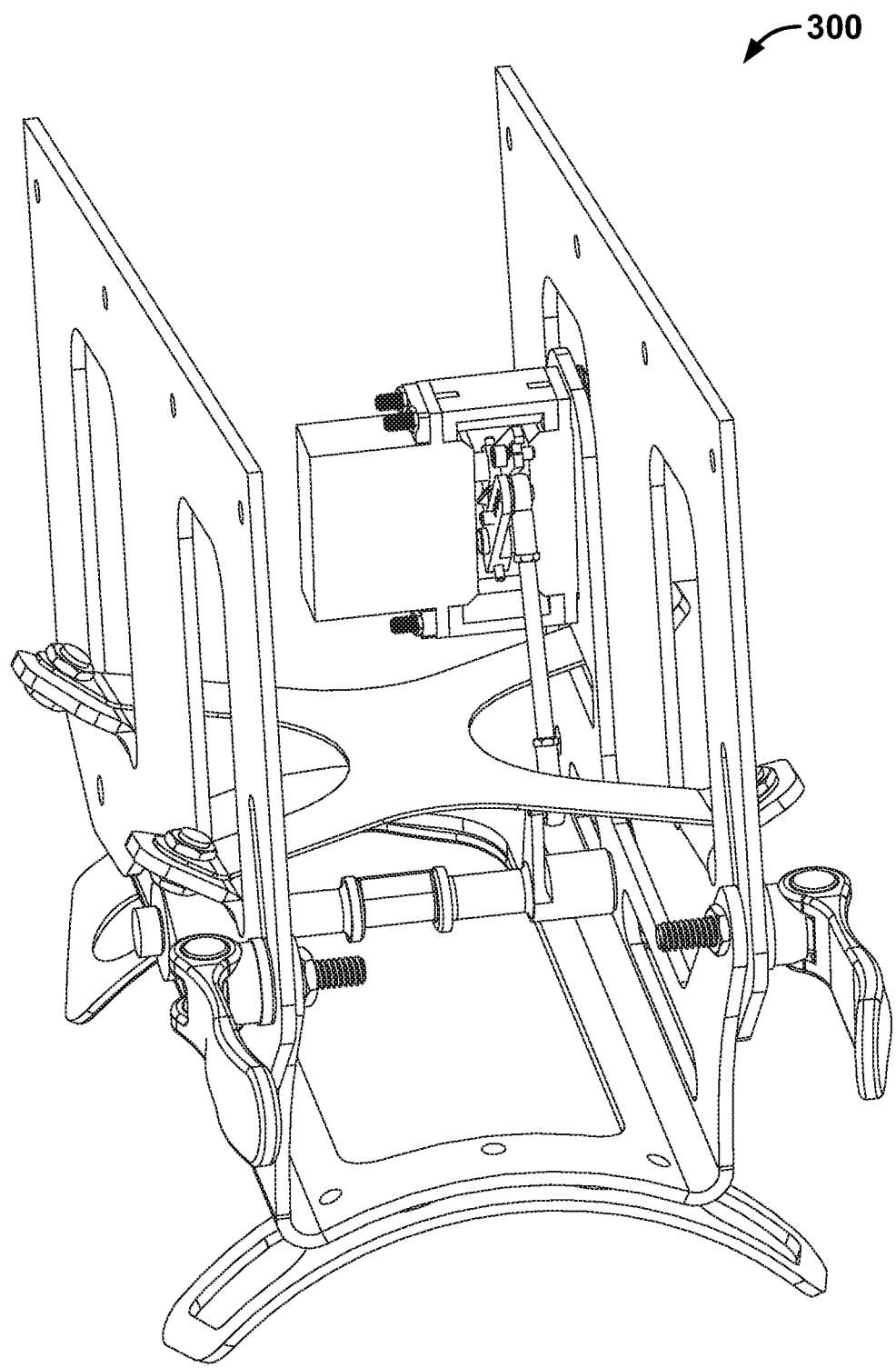
FIG. 4A is a top perspective view of the saddle of the hub module of FIG. 2A.
Figure 4B:
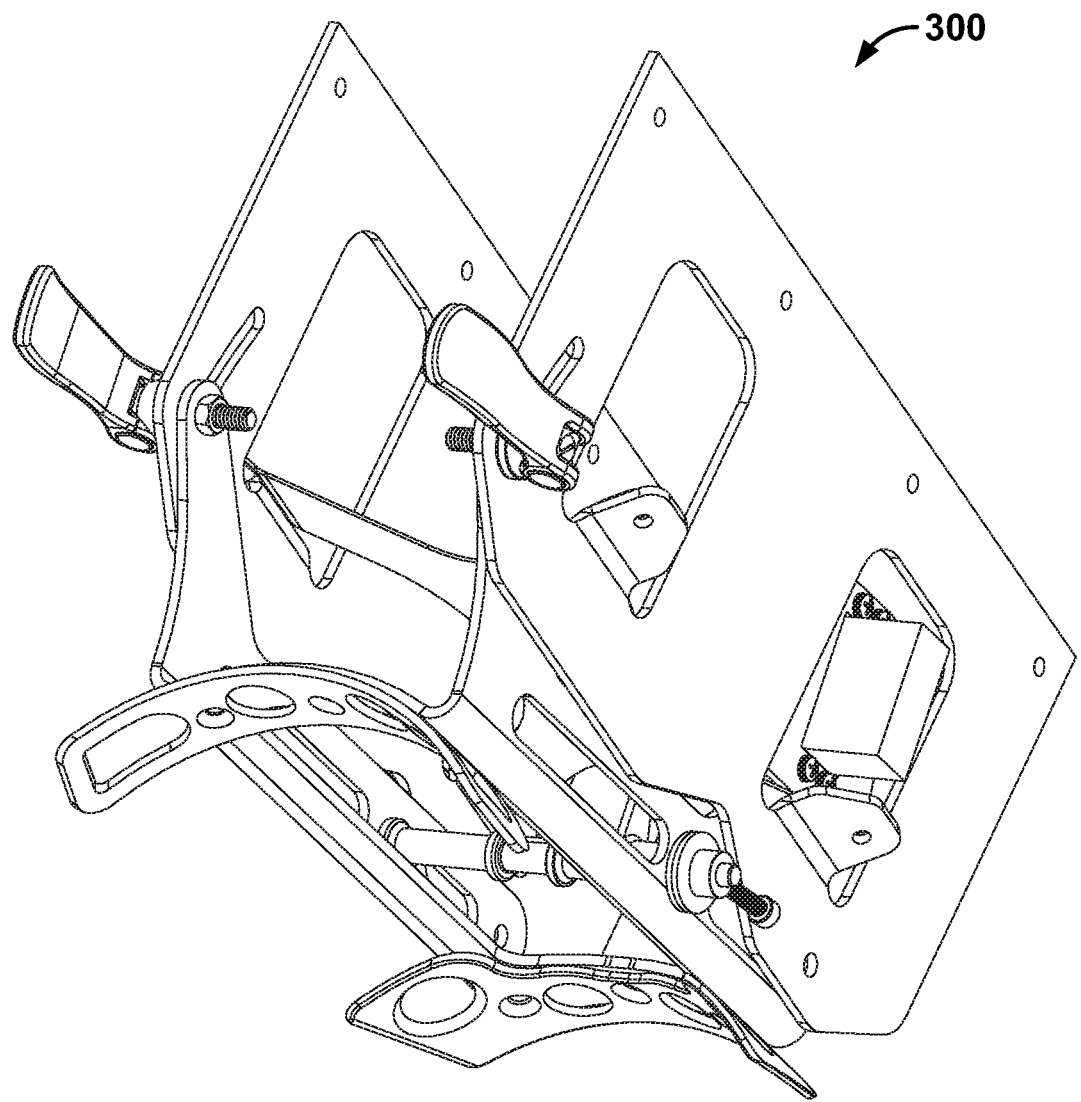
FIG. 4B is a bottom perspective view of the saddle of FIG. 4A.
Figure 4C:
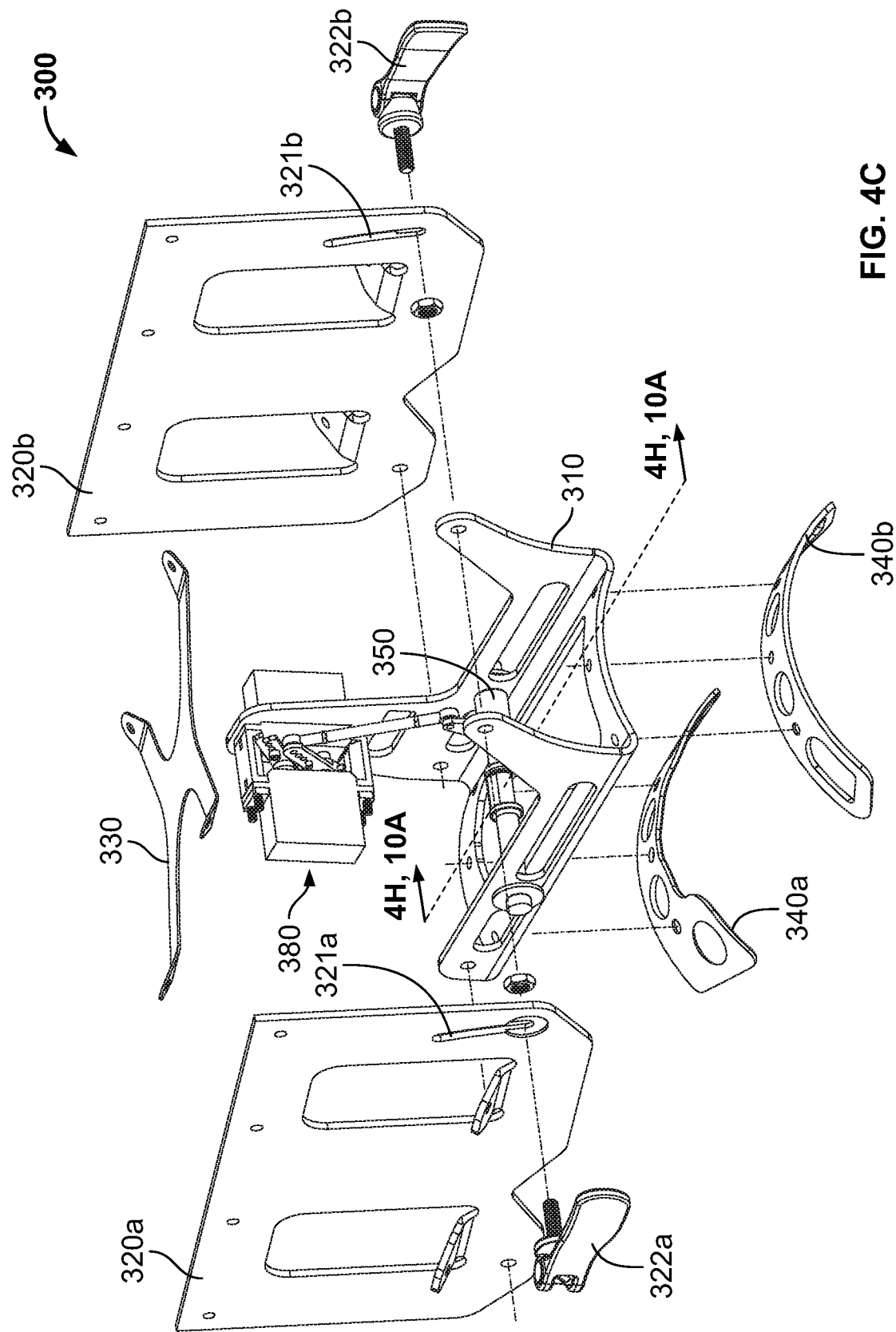
FIG. 4C is a partially exploded top perspective view of the saddle of FIG. 4A.

As best shown in FIG. 4C, the saddle 300 includes a saddle base bracket 310 and first and second saddle side plates 320*a* and 320*b*. The first and second saddle side plates 320*a* and 320*b* are pivotably connected to opposite sides of the saddle base bracket 310 near the front end of the saddle base bracket 310. The first and second saddle side plates 320*a* and 320*b* are also attached to opposite sides of the saddle base bracket 310 near the rear end of the saddle base bracket 310 via locking devices 322*a* and 322*b* (which are cam lever locks in this example embodiment but can be any suitable locking devices). The locking devices 322*a* and 322*b* extend through respective slots 321*a* and 322*b* defined through the respective first and second side plates 320*a* and 320*b*.

Figure 4D:
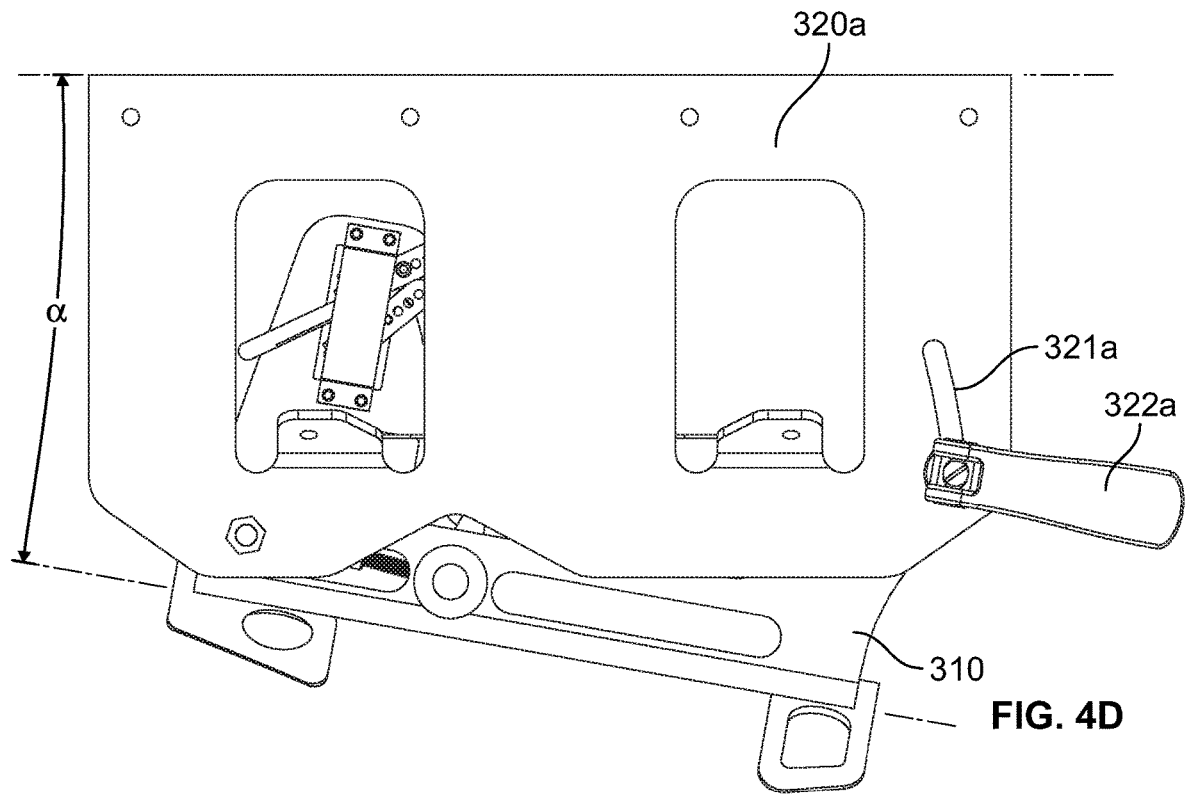
FIGS. 4D and 4E are side elevational views of the saddle of FIG. 4A showing different positions of the saddle.
Figure 4E:
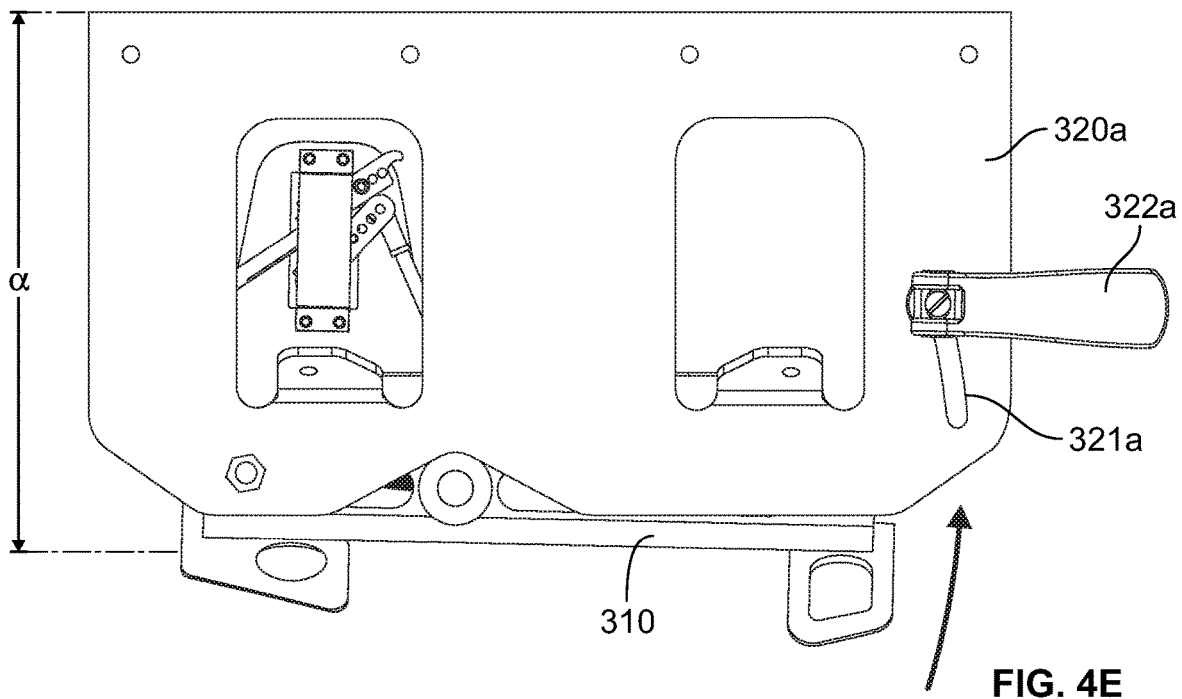

As shown in FIGS. 4D and 4E, the orientation of the slots 321*a* and 321*b* enables an operator to vary the angle α formed between a plane including the tops of the first and second saddle side plates 320*a* and 320*b*—to which the hub base 200 is attached—and a plane including the generally horizontally extending bottom portion of the saddle base plate 310. Plane as used herein can mean either a physical plane or a virtual reference plane. The angle α generally corresponds to the angle formed between the hub base plate 202 of the hub base 200 and the fuselage of the fixed-wing aircraft 20 when the fixed-wing aircraft 20 is attached to the saddle 300. To change the angle α, the operator unlocks the locking devices 322*a* and 322*b*, rotates the first and second side plates 320*a* and 320*b* relative to the saddle base bracket 310 around their pivotable attachments to the saddle base bracket 310 to the desired rotational position (or vice-versa), and re-locks the locking devices 322*a* and 322*b*. In this example embodiment, the angle α is variable from about 0 degrees to about 10 degrees, though in other embodiments the angle α is variable between any suitable angles.

In certain embodiments, an operator can cause the first and second side plates to rotate relative to the saddle while the multicopter 10 is flying. For instance, the operator may desire to release the fixed-wing aircraft nose-down from a hover. Conversely, the operator may desire to release the fixed-wing aircraft nose-up (such as nose-up about 10 degrees) to facilitate launch while the multicopter is dashing forward (this nose-up pitch reduces wind drag and better-aligns the thrust vector of the fixed-wing aircraft with the desired direction of travel). The multicopter may include any suitable combination of elements to facilitate this remote pivoting, such as various motors, actuators, and the like.

As best shown in FIGS. 4A, 4B, and 4C, a stabilizing bracket 330 is attached to the first and second saddle side plates 320*a* and 320*b* and extends across the space between the first and second saddle side plates 320*a* and 320*b*. A downwardly-curved front aircraft engaging bracket 340*a* is attached to the underside of the saddle base bracket 310 near the front of the saddle base bracket 310. A downwardly-curved rear aircraft engaging bracket 340*b* is attached to the underside of the saddle base bracket 310 near the rear of the saddle base bracket 310.

Figure 4F:
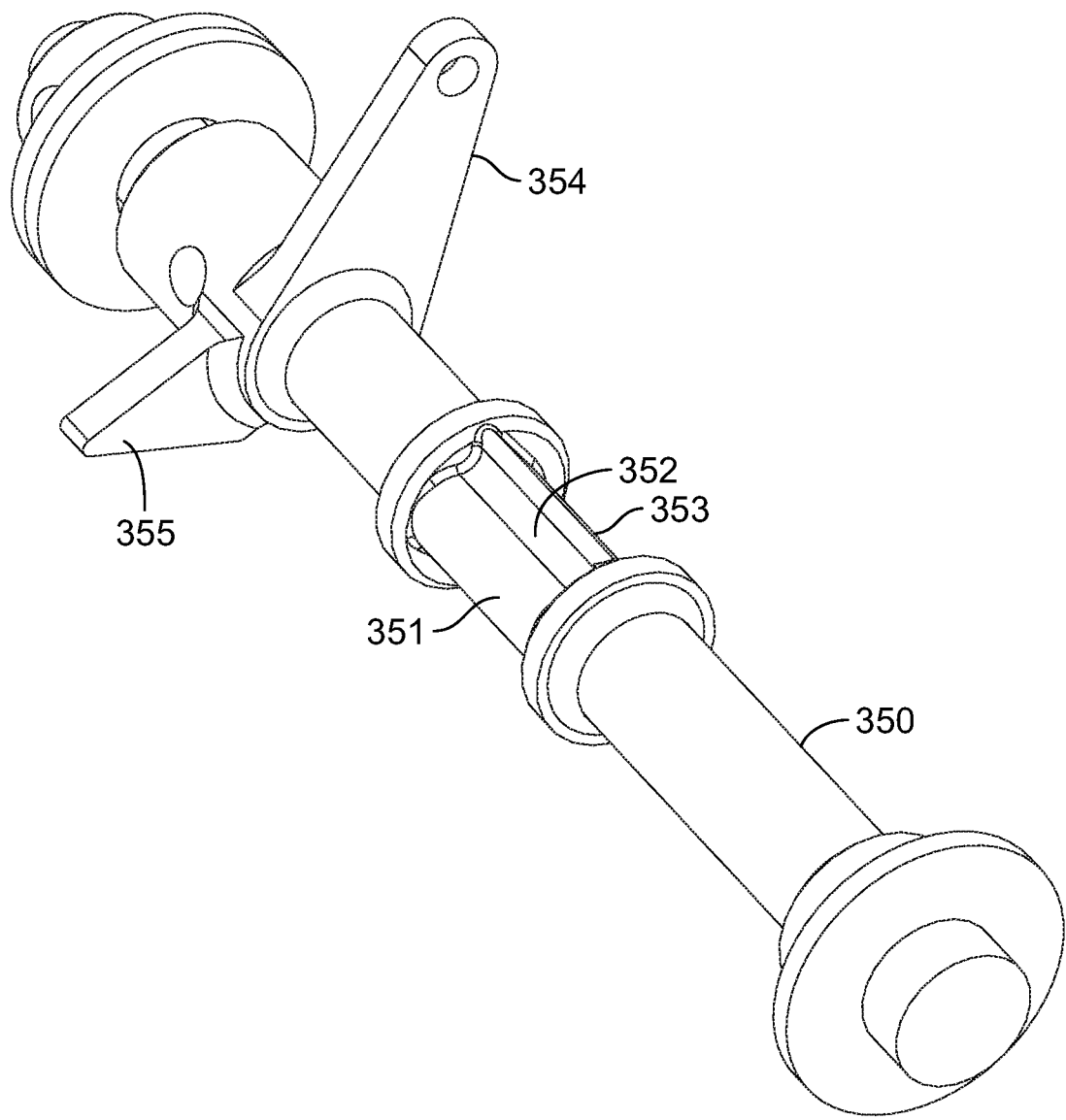
FIG. 4F is a top perspective view of the cam of the saddle of FIG. 4A.
Figure 4G:
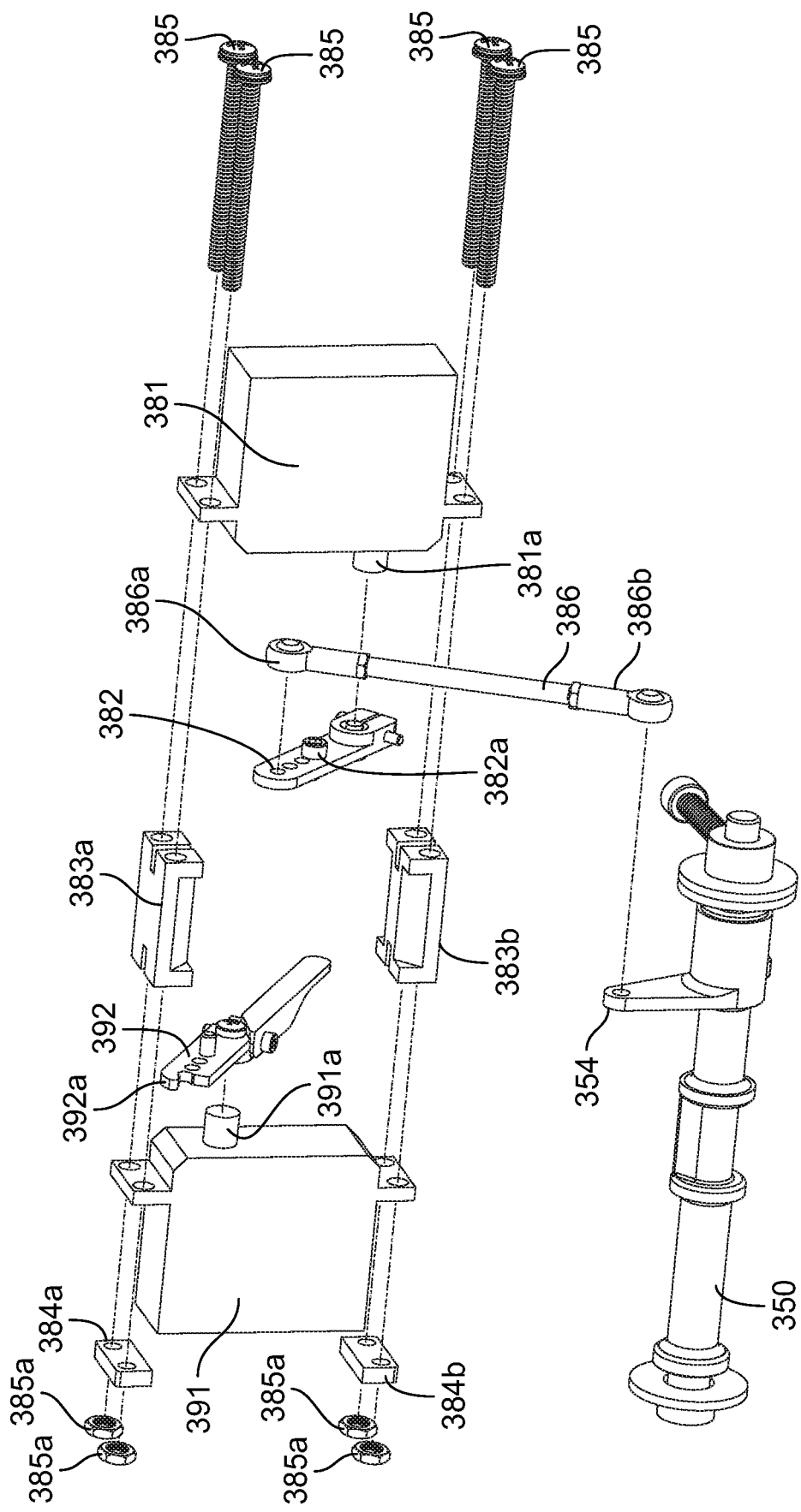
FIG. 4G is an exploded top perspective view of the aircraft attaching/detaching assembly and the cam of the saddle of FIG. 4A.
Figure 4H:
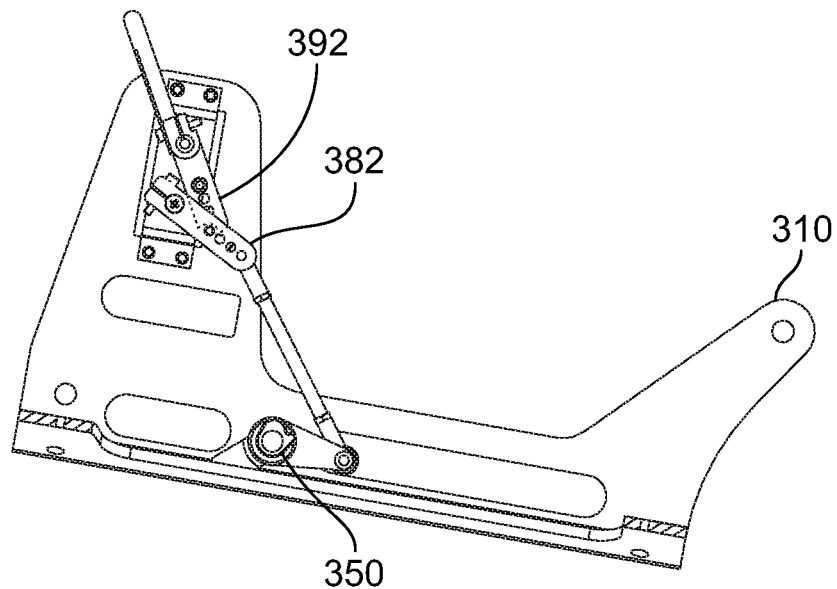
FIG. 4H is a partial cross-sectional view of the saddle of FIG. 4A taken substantially along line 4H-4H of FIG. 4C.
Figure 4I:
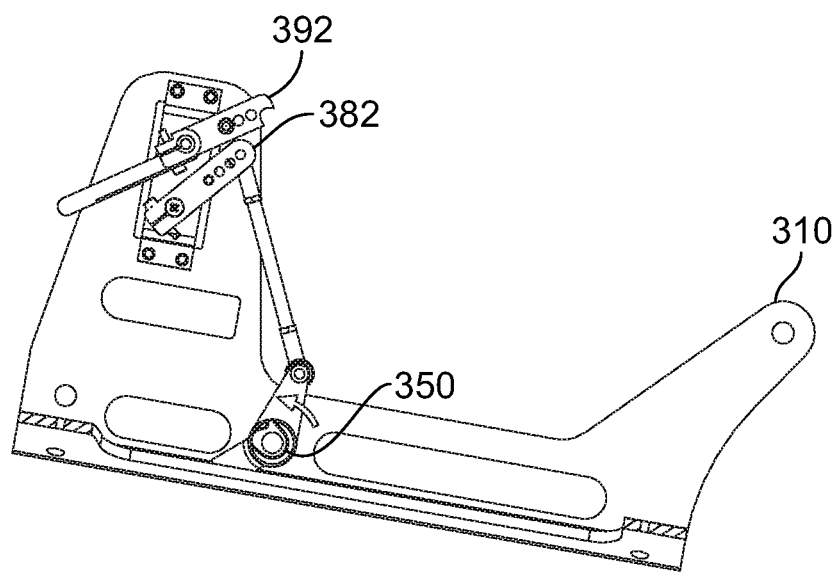
FIG. 4I is a partial cross-sectional view of the saddle of FIG. 4A showing the cam in a detached rotational position taken substantially along line 4H-4H of FIG. 4C.

As best shown in FIG. 4C, a cam 350 is rotatably attached to and extends across the width of the saddle base bracket 310 such that the cam 350 is transverse (such as generally perpendicular) to the first and second saddle side plates 320*a* and 320*b*. As best shown in FIGS. 4F, 4H, and 4I, the portion of the cam 350 near its longitudinal center has an irregularly-shaped profile including a first relatively wide ridge 351, a second relatively narrow ridge 353, and a valley 352 between the first and second ridges 351 and 353. This irregularly-shaped profile facilitates attaching the fixed-wing aircraft 20 to the cam 350 (and therefore to the multicopter 10) and detaching the fixed-wing aircraft 20 from the cam 350 (and therefore from the multicopter 10), as described below with respect to FIGS. 10A, 10B, and 10C. The cam 350 also includes a cam control arm 354 and a foot 355 extending transversely (such as generally perpendicularly) from the longitudinal axis of the cam 350.

An aircraft attaching/detaching assembly 380 attached to the saddle base bracket 310 controls rotation of the cam 350 relative to the saddle base bracket 310. As best shown in FIG. 4G, the aircraft attaching/detaching assembly 380 includes: (1) a cam servo motor 381 having a cam servo motor shaft 381*a*; (2) a cam servo motor arm 382; (3) a cam servo motor arm lock device 382*a*; (4) upper and lower servo spacers 383*a* and 383*b*; (5) upper and lower nut plates 384a and 384b; (6) fasteners 385 and nuts 385a; (7) a cam rotation control link 386 having connectors 386a and 386b at either end; (8) a lock servo motor 391 having a lock servo motor shaft 391a; and (9) a lock servo motor arm 392 terminating at one end in a lock servo motor locking extension 392a.

The cam servo motor 381 and the lock servo motor 391 are attached to one another and to the saddle base bracket 310 via the fasteners 385 and nuts 385a, the upper and lower servo spacers 383a and 383b, and the upper and lower nut plates 384a and 384b. The cam servo motor arm 382 is attached near one end to the cam servo motor shaft 381a and near the other end to the connector 386a. The connector 386b is attached to the cam control arm 354 of the cam 350, which links the cam servo motor shaft 381a to the cam 350. The cam servo motor arm lock device 382a is attached to the cam servo motor arm 382 between the connector 386a and the cam servo motor shaft 381a. The lock servo motor arm 392 is attached to the lock servo motor shaft 391a. The rearwardly-extending portion of the lock servo motor arm 392 terminates in the lock servo motor locking extension 392a, which is engageable to the cam servo motor arm lock device 382a in certain instances.

The cam servo motor 381 controls rotation of the cam 350 relative to the saddle base bracket 310. To rotate the cam 350, the cam servo motor 381 rotates the cam servo motor shaft 381a, which rotates the attached cam servo arm 382, which in turn rotates the cam 350 via the cam rotation control link 386. The cam servo motor 381 can rotate the cam 350 from an attached rotational position—shown in FIG. 4H—to a detached rotational position—shown in FIG. 4I (and vice-versa).

The lock servo motor 391 controls rotation of the lock servo motor arm 392 between a cam rotation-preventing rotational position—shown in FIG. 4H—and a cam rotation-enabling rotational position—shown in FIG. 4I (and vice-versa). When the cam 350 is in the attached rotational position and the lock servo motor arm 392 is in the cam rotation-preventing rotational position, the lock servo motor locking extension 392a engages the cam servo motor arm lock device 382a of the cam servo motor arm 382. This prevents the cam servo motor 381 from rotating the cam 350 from the attached rotational position to the detached rotational position.

FIGS. 4H and 4I show how the cam servo motor 381 and the lock servo motor 391 operate to rotate the cam 350 from the attached rotational position to the detached rotational position. Initially, the cam servo motor 381 is in the attached rotational position and the lock servo motor 391 is in the cam rotation-preventing rotational position. Here, the lock servo motor locking extension 392a on the end of the lock servo motor arm 392 engages the cam servo motor arm lock device 382a of the cam servo motor arm 382.

Since the lock servo motor locking extension 392a is engaged to the cam servo motor arm lock device 382a of the cam servo motor arm 382, the cam servo motor 381 cannot rotate the cam 350 from the attached rotational position to the detached rotational position (counter-clockwise from this viewpoint).

Rotating the cam 350 from the attached rotational position to the detached rotational position is a two-step process. The operator first operates the lock servo motor 391 to rotate the lock servo motor arm 392 into the cam rotation-enabling rotational position (counter-clockwise from this viewpoint). Second, the operator operates the cam servo motor 381 to rotate the cam 350 from the attached rotational position to the detached rotational position (counter-clockwise from this viewpoint).

Figure 10A:
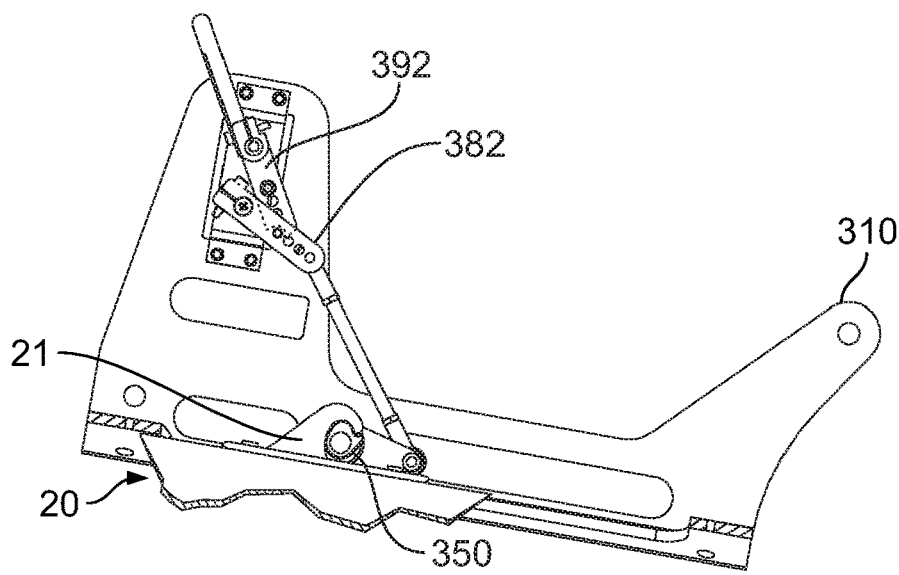
FIG. 10A is a partial cross-sectional view of the saddle of FIG. 4A showing the cam in an attached rotational position and a hook of the fixed-wing aircraft attached taken substantially along line 10A-10A of FIG. 4C.
Figure 10B:
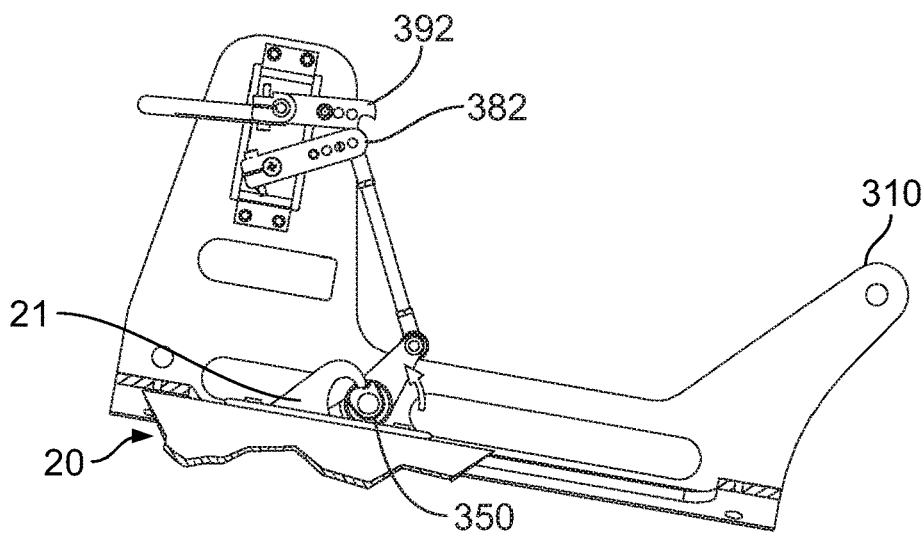
FIG. 10B is a partial cross-sectional view of the saddle of FIG. 4A showing the cam halfway between the attached rotational position and the detached rotational position and the hook of the fixed-wing aircraft being pushed off of the cam taken substantially along line 10A-10A of FIG. 4C.
Figure 10C:
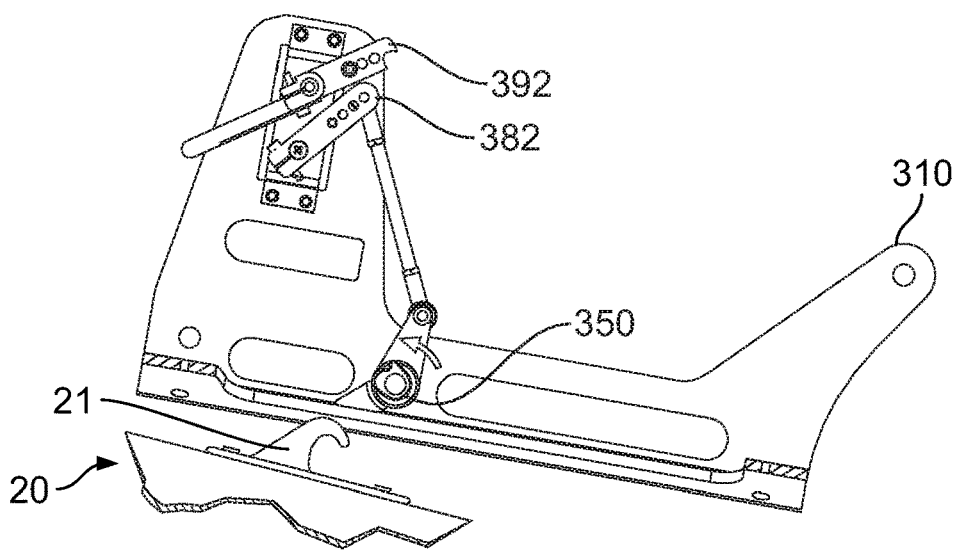
FIG. 10C is a partial cross-sectional view of the saddle of FIG. 4A showing the cam in the detached rotational position and the hook of the fixed-wing aircraft detached from the cam taken substantially along line 10A-10A of FIG. 4C.

FIGS. 10A to 10C, described below, show how rotation of the cam from the attached rotational position to the detached rotational position causes the fixed-wing aircraft to detach from the cam.

The foot 355 controls the extent to which the cam 350 can rotate. The foot 355 is oriented such that when the cam 350 rotates a certain amount in a first direction relative to the saddle base bracket 310, the foot 355 contacts the saddle base bracket 310 and prevents the cam 350 from rotating any further in that first direction. Similarly, when the cam 350 rotates a particular amount in a second opposite direction relative to the saddle base bracket 310, the foot 355 contacts the saddle base bracket 310 and prevents the cam 350 from rotating any further in that second direction. The foot 355 is angled to stop the cam 350 from rotating before it exerts an undue force on the cam rotation control link 386, and by extension the cam motor arm 382 and the cam motor shaft 381a.

1.2 Rotor Arm Modules

The rotor arm modules 400a to 400d are mechanically attachable to and mechanically lockable to the hub module 200 and include: (1) the eight rotors of the multicopter 10; (2) the eight rotor motors that drive these rotors; (3) gear reduction trains that couple the rotor motors to their corresponding rotors; and (4) locking assemblies that lock the rotor arm modules 400a to 400d to the hub module 100.

FIGS. 5A, 5B, 5C, 5D, 5E, 5F, 5G, 5H, 5I, and 5J show the first rotor arm module 400a or components thereof. The other rotor arm modules 400b, 400c, and 400d are similar to the first rotor arm module 400a and are not separately shown or described for brevity.

As best shown in FIGS. 5A, 5B, 5H, and 5J, the first rotor arm module 400a includes: (1) a generally rectangular hollow elongated rotor arm 410a; (2) a generally rectangular hollow rotor arm extension 410b; (3) a locking assembly 420; (4) a male blind mate connector 431; (5) upper and lower rotor motor assemblies 460a and 460b; and (6) a rotor assembly 470.

The rotor arm extension 410b is attached to the rotor arm 410a such that part of the rotor arm extension 410b is disposed within the rotor arm 410a and the remainder of the rotor arm extension 410b extends from the rotor arm 410a. The locking assembly 420 is attached to the underside of the rotor arm 410a near the end of the rotor arm 410a from which the rotor arm extension 410b extends. The male blind mate connector 431 is attached to the end of the rotor arm 410a from which the rotor arm extension 410b extends. The upper and lower rotor motor assemblies 460a and 460b and the rotor assembly 470 are attached to the rotor arm 410a in a manner described in detail below.

Although not shown, the open end of the rotor arm 410a opposite the end from which the rotor arm extension 410b extends forms a first front landing gear extension module receiving socket that can receive the first front landing gear extension module 500a, as described below.

As best shown in FIGS. 5A, 5B, 5C, 5D, 5E, and 5F, the male blind mate connector 431—along with its counterpart female blind mate connector 231a of the hub module 100—facilitate: (1) mechanical attachment of the first rotor arm module 400a to the hub module 100; (2) electrical power flow from the battery(ies) 260a, 260b, 260c, and/or 260d to the upper and lower rotor motors 465a and 465b of the first rotor arm module 400a; and (3) communication between the ESCs 265a and 265b their corresponding upper and lower rotor motors 465a and 465b.

The male blind mate connector 431 includes a plurality of pins 431a configured to mate with the pin receptacles of the female blind mate connector 231a. Although not shown for clarity, the male blind mate connector 431 and, particularly, the pins 431a, are electrically connected to the corresponding upper and lower rotor motors 465a and 465b via wiring. In this example embodiment, the male blind mate connector 431 includes 12 pins 431a, six of which are electrically connected to the upper rotor motor 465a via wiring and the other six of which are electrically connected to the lower rotor motor 465b via wiring. In this example embodiment, each motor only requires three motor leads to properly function, but the multicopter 10 includes two motor leads for each motor pole. By using two motor leads per motor pole, the multicopter 10 eliminates single-point failures (i.e., both leads would have to fail rather than just a single lead for the motor to fail).

To attach the rotor arm module 400a to the hub module 100, an operator inserts the rotor arm extension 410b into the first rotor arm module receiving socket 214 of the hub module 100 and slides the rotor arm module 400a toward the hub module 100 with enough force to mate the pins of the male blind mate connector 431 with the pin receptacles of the female blind mate connector 231a of the hub module 100.

In an alternative embodiment, rather than the hub module slidably receiving a portion of the rotor arm module to attach the rotor arm module to the hub module, the rotor arm module slidably receives a component (such as an arm) of the hub module to attach the rotor arm module to the hub module.

As best shown in FIGS. 5C, 5D, 5E, and 5F, the locking assembly 420 includes a drawcatch 420a and a drawcatch lock 420b that: (1) facilitate attaching the first rotor arm module 400a to the hub module 100; (2) lock the first rotor arm module 400a to the hub module 100; and (3) facilitate detachment of the first rotor arm module 400a from the hub module 100.

Figure 5A:
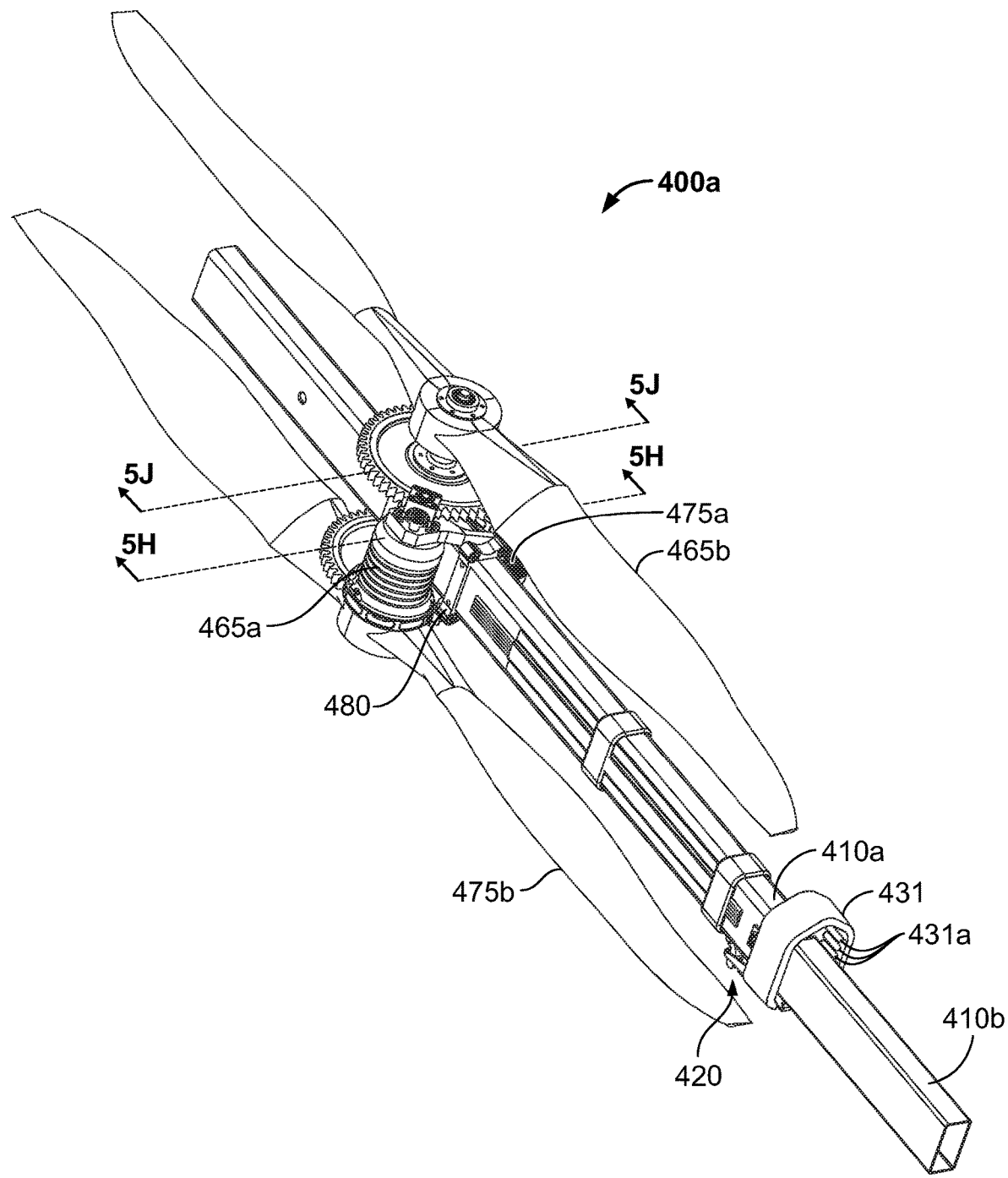
FIG. 5A is a top perspective view of one of the rotor arm modules of the multicopter of FIG. 1A.
Figure 5B:
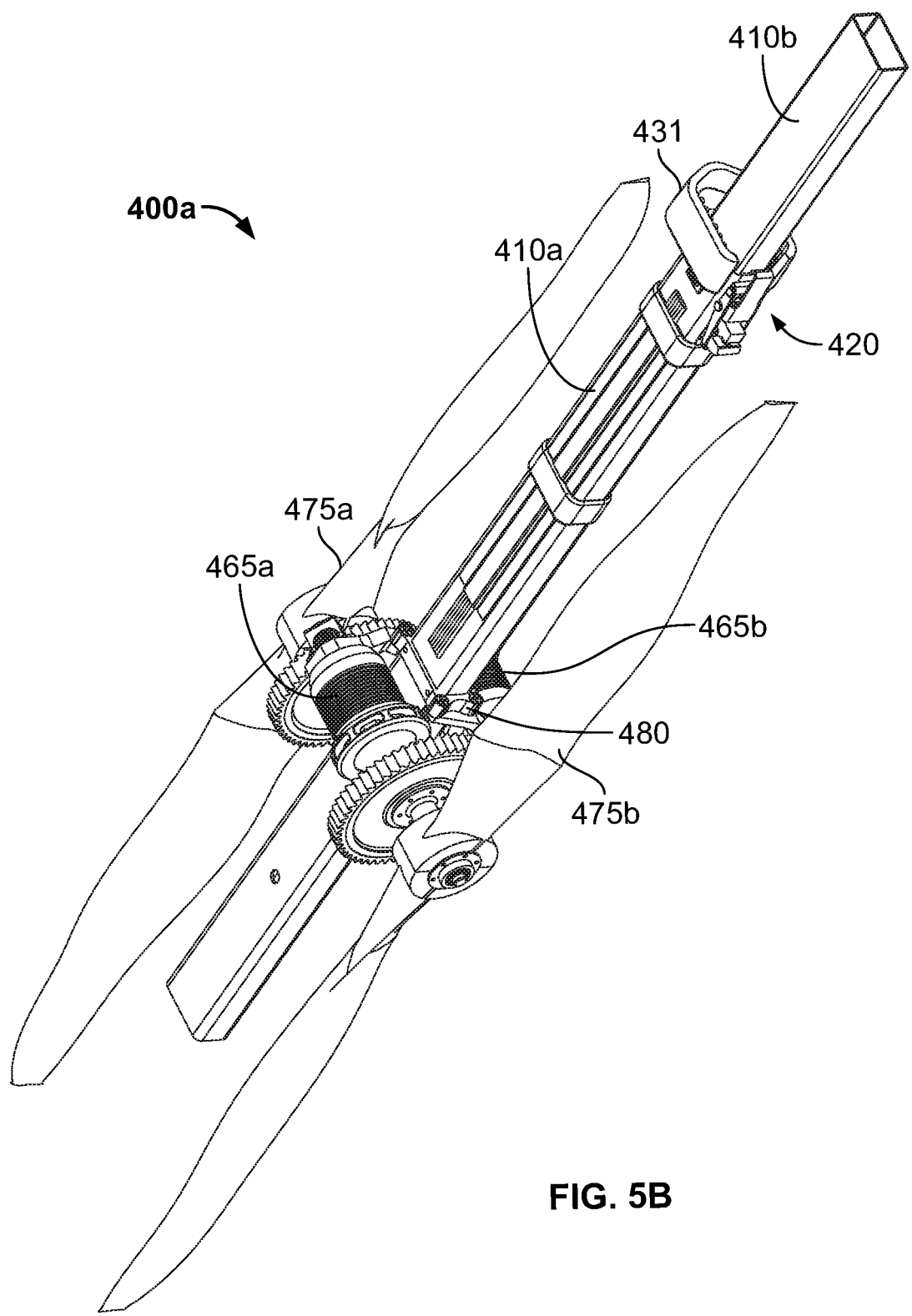
FIG. 5B is a bottom perspective view of the rotor arm module of FIG. 5A.
Figure 5C:
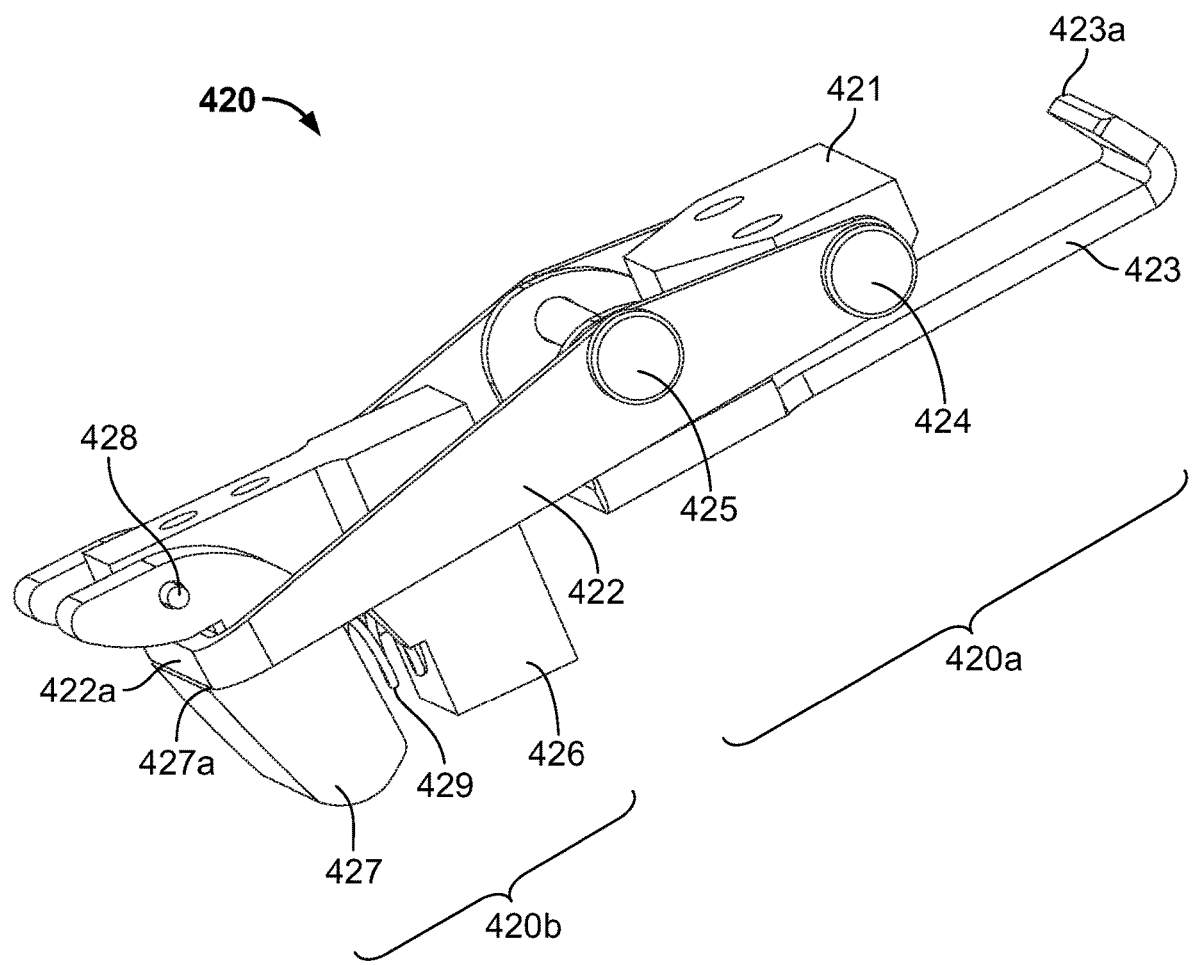
FIG. 5C is a top perspective view of the locking assembly of the rotor arm module of FIG. 5A.

As best shown in FIG. 5C, the drawcatch 420a includes: (1) a base 421; (2) a lever 422; (3) a claw 423; (4) a first fastener 424 (such as a clevis pin or other suitable fastener); and (5) a second fastener 425 (such as a clevis pin or other suitable fastener).

The drawcatch lock 420b includes: (1) a base 426; (2) a lock/release device 427 having a locking shelf 427a; (3) a pin 428 (or other suitable connector); and (4) a compression spring 429 (or other suitable biasing element).

The base 421 is attached to the underside of the rotor arm 410a. The lever 422 is pivotably connected at one end to the base 421 via the first fastener 424. The other end of the lever 422 includes a handle 422a. The claw 423 is pivotably connected at one end to the lever 422 via the second fastener 425. The other end of the claw includes a latch plate engager 423a.

The base 426 is attached to the underside of the rotor arm 410a. The lock/release device 427 is pivotably connected to the base 426 via the pin 428. The compression spring 429 is disposed between the base 426 and the lock/release device 427 and retained in place via cavities and/or projections defined in or extending from these components (not shown).

The lock/release device 427 is rotatable about the pin 428 from a lock rotational position to a release rotational position. The compression spring 429 biases the lock/release device 427 to the lock rotational position. To rotate the lock/release device 427 from the lock rotational position to the release rotational position, the operator pushes the lock/release device 427 inward with enough force to overcome the spring-biasing force and compress the compression spring 429.

The operator uses the locking assembly 420 to lock the male blind mate connector 431 with the female blind mate connector 231a as follows. The operator rotates the handle 422a of the lever 422 around the first fastener 424 toward the latch plate 237 on the hollow support 210a of the hub module 100 and engages the claw engager 238 of the latch plate 237 with the latch plate engager 423a of the claw 423. The operator then rotates the handle 422a around the first fastener 424 and toward the lock/release device 427 until the handle 422a contacts the lock/release device 427. Continued rotation of the lever 422 forces the lock/release device 427 inward, which overcomes the spring-biasing force and begins compressing the compression spring 429. This causes the lock/release device 427 to being rotating to the release rotational position. Once the handle 422 rotates past the locking shelf 427a, the spring-biasing force of the compression spring 429 causes the lock/release device 427 to rotate back to the lock rotational position. At this point, the locking shelf 427a prevents the handle 422 from rotating back toward the latch plate 237, and the first rotor arm module 400a and the hub module 100 are locked together.

In addition to using the locking assembly 420 to lock the first rotor arm module 400a to the hub module 100, the operator can use the locking assembly 420 to facilitate mating the male blind mate connector 431 with the female blind mate connector 231a. If the male blind mate connector 431 and the female blind mate connector 231a are only partially mated (or not mated at all) and the latch plate engager 423a of the claw 423 is engaged to the claw engager 238 of the latch plate 237, rotating the handle 422a of the lever 422 around the first fastener 424 toward the lock/release device 427 to lock the handle 422a will pull the first rotor arm module 400a and the hub module 100 toward one another and cause the male blind mate connector 431 to mate with the female blind mate connector 231a.

Figure 5D:
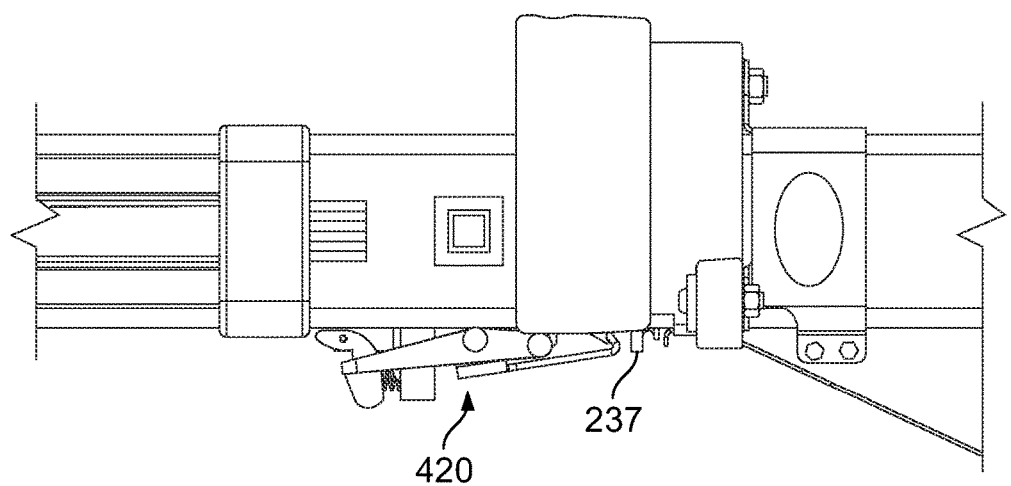
FIGS. 5D, 5E, and 5F are side elevational views of the rotor arm module of FIG. 5A detaching from the hub module of FIG. 2A via the locking assembly of FIG. 5C.
Figure 5E:
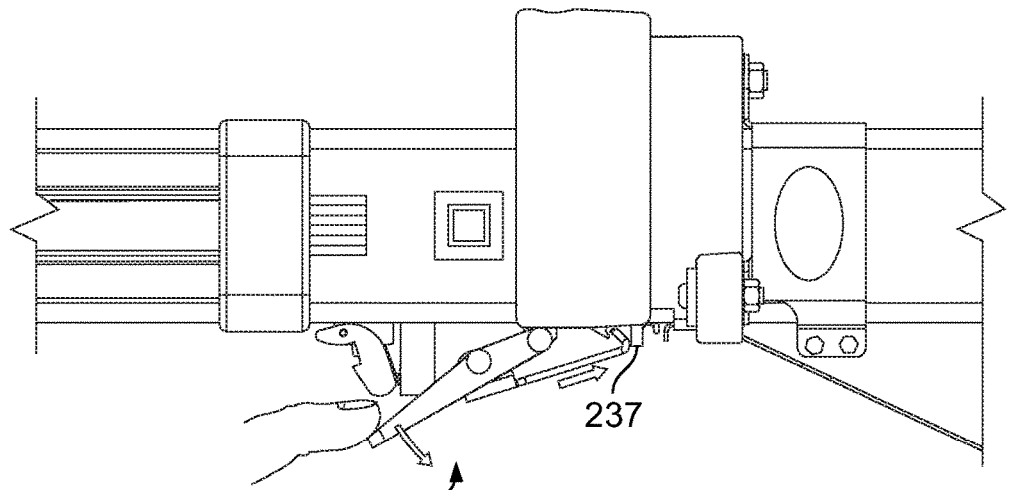
Figure 5F:
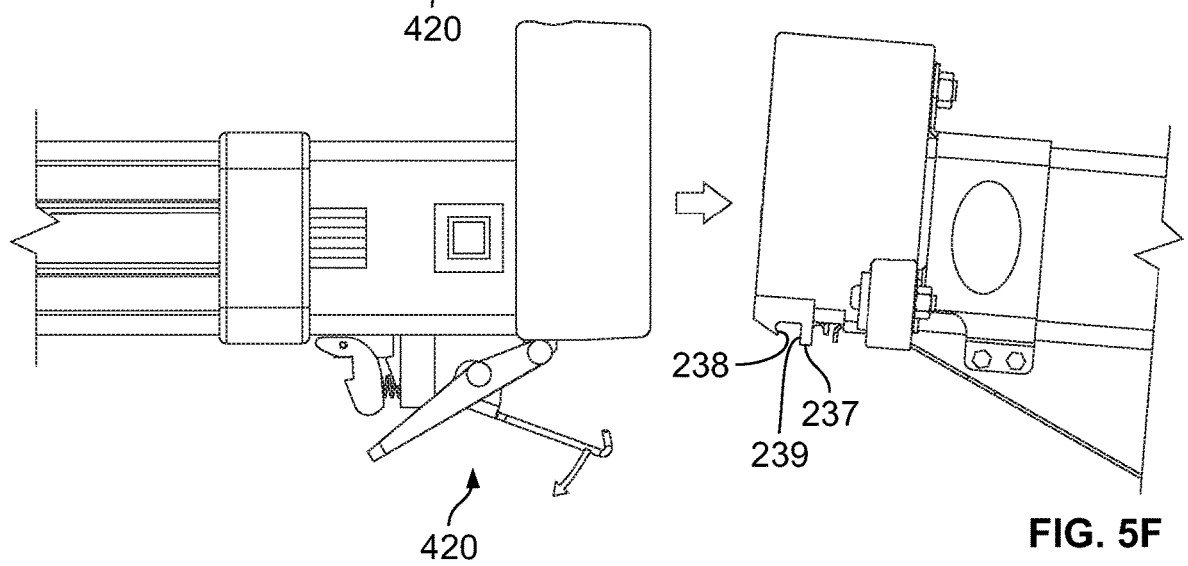

As shown in FIGS. 5D to 5F, the operator reverses this process to unlock the first rotor arm module 400a from the hub module 100. The operator pushes the lock/release device 427 inward with enough force to overcome the spring-biasing force and to compress the compression spring 429, which causes the lock/release device 427 to rotate to the release rotational position. This frees the handle 422a to rotate. Once the handle 422a rotates past the locking shelf 427a, the operator rotates the handle 422a of the lever 422 around the first fastener 424 toward the latch plate 237 and disengages the latch plate engager 423a of the claw 423 from the claw engager 238 of the latch plate 237.

At this point, the operator can either physically pull the first rotor arm module 400a and the hub module 100 apart to separate the male and female blind mate connectors 431 and 231a or use the locking assembly 420 to aid in detachment. When using the locking assembly 420 to aid in detachment, as shown in FIG. 5E, after disengaging the latch plate engager 423a from the claw engager 238, the operator continues rotating the handle 422a toward the latch plate 237 until the latch plate engager 423a contacts the backstop 239 of the latch plate 237. Afterward, continued rotation of the handle 422a toward the latch plate 237 causes the latch plate engager 423a to impose a pushing force against the backstop 239, which forces the first rotor arm module 400a and the hub module 100 apart, as shown in FIG. 5F.

Turning to the upper and lower rotor motor assemblies 460a and 460b and the rotor assembly 470a, the upper and lower rotor motors 465a and 465b of the upper and lower motor assemblies independently drive respective upper and lower rotors 475a and 475b via separate gear reduction trains.

Figure 5G:
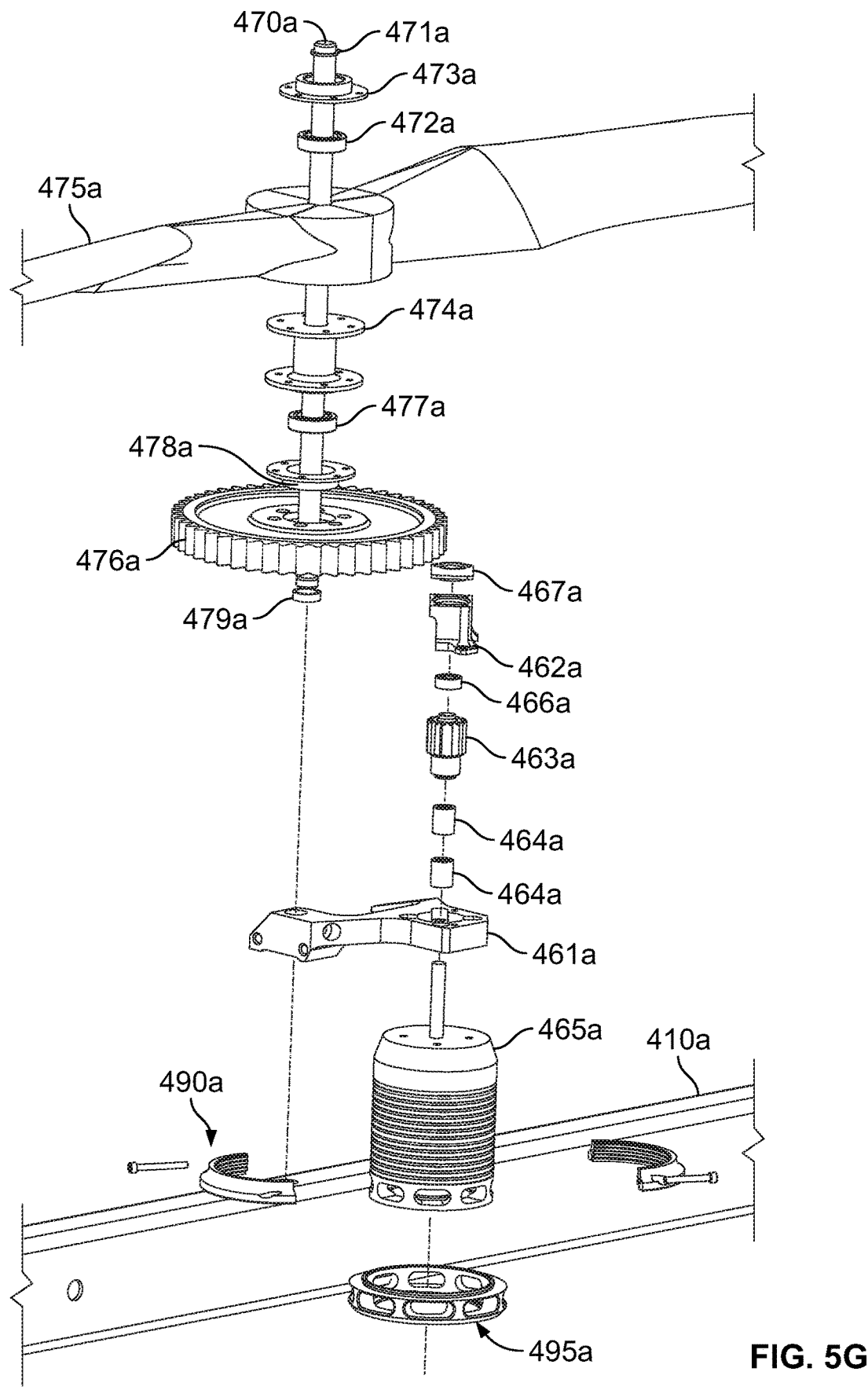
FIG. 5G is an exploded top perspective view of one of the rotor arm assemblies and part of the rotor assembly of the rotor arm module of FIG. 5A.
Figure 5H:
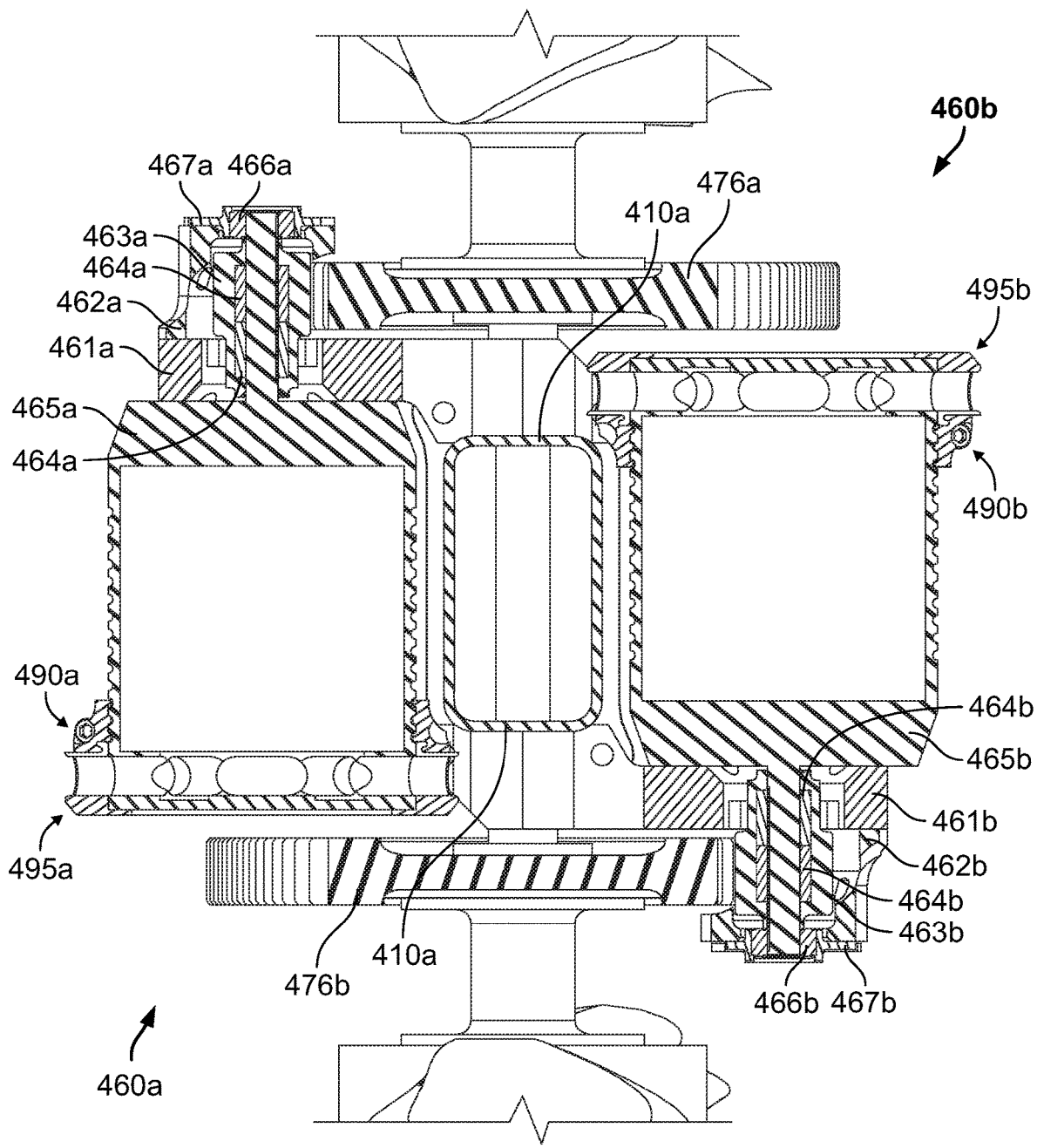
FIG. 5H is a cross-sectional view of the rotor motor assemblies of the rotor arm module of FIG. 5A taken substantially along line 5H-5H of FIG. 5A.

As best shown in FIGS. 5G and 5H, the upper rotor motor assembly 460a includes: (1) an upper rotor motor mount 461a, (2) an upper bearing spider 462a, (3) an upper pinion 463a, (4) upper bearings 464a, (5) the upper rotor motor 465a, (6) an upper bearing 466a, (7) an upper bearing cup 467a, (8) an upper two-piece cooling fan collar 490a, and (9) an upper rotor motor cooling fan 495a.

The upper rotor motor 465a is attached to the upper rotor motor mount 461a. The bearing spider 462a is attached to the upper rotor motor mount 461a. The upper bearings 464a are disposed on the motor shaft (not labeled) of the upper rotor motor 465a. The upper drive pinion 463a is disposed on the upper bearings 464a and on the motor shaft of the upper rotor motor 465a such that the upper drive gear 463a rotates with the motor shaft. The upper bearing 466a within the upper bearing cup 467a is disposed on the motor shaft of the upper rotor motor 465a. The upper bearing cup 467a is attached to the upper bearing spider 462a. The upper rotor motor cooling fan 495a is press-fit around the bottom of the upper rotor motor 465a and held in place via the upper two-piece cooling fan collar 490a.

The lower rotor motor assembly 460b includes: (1) a lower rotor motor mount 461b, (2) a lower bearing spider 462b, (3) a lower pinion 463b, (4) lower bearings 464b, (5) the lower rotor motor 465b, (6) a lower bearing 466b, (7) a lower bearing cup 467b, (8) a lower two-piece cooling fan collar 490b, and (9) a lower rotor motor cooling fan 495b.

The lower rotor motor 465b is attached to the lower rotor motor mount 461b. The lower bearing spider 462b is attached to the lower rotor mount 461b. The lower bearings 464b are disposed on the motor shaft (not labeled) of the lower rotor motor 465b. The lower pinion 463b is disposed on the lower bearings 464b and on the motor shaft of the lower rotor motor 465b such that the lower pinion 463b rotates with the motor shaft. The lower bearing 466b within the lower bearing cup 467b is disposed on the motor shaft of the lower rotor motor 465b. The lower bearing cup 467b is attached to the lower bearing spider 462b. The lower rotor motor cooling fan 495b is press-fit around the bottom of the lower rotor motor 465a and held in place via the lower two-piece cooling fan collar 490b.

Figure 5I:
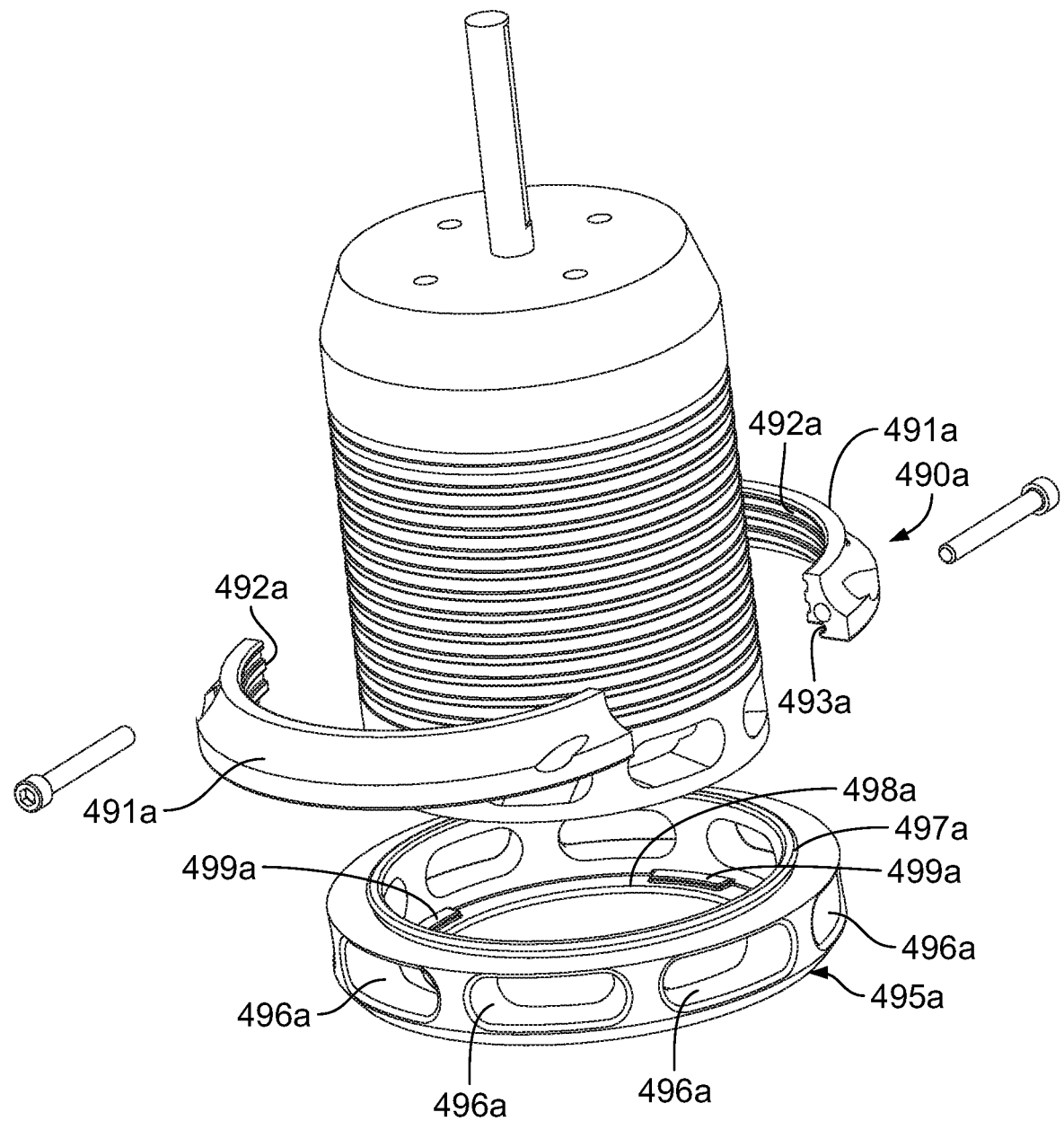
FIG. 5I is an exploded top perspective view of one of the rotor motor collars and one of the rotor motor fans of the rotor arm module of FIG. 5A.

The upper cooling fan collar 490a and the upper rotor motor cooling fan 495a are shown in detail in FIG. 5I. The lower cooling fan collar 490b and the lower rotor motor cooling fan 495b are similar to the upper cooling fan collar 490a and the upper rotor motor cooling fan 495b and are not separately shown or described for brevity.

The upper rotor motor cooling fan 495a includes a generally annular body that defines a plurality of cooling fan openings 496a through its side walls (not labeled). A collar connection lip 497a extends upward from body and radially-outward. A generally annular motor mounting shelf 498a extends radially-inward from the bottom of the body. Each of a plurality of motor seats 499a extends upward from the motor mounting shelf 498a.

The upper cooling fan collar 490a includes two identical collar halves 491a having generally half-annular bodies. An upper rotor motor mating surface 492a that extends around the (half) circumference of the collar half 491a is grooved to correspond with and mate with grooves on the exterior of the upper rotor motor 465a. A lip retaining chamber 493a that extends around the (half) circumference of the collar half 491a is shaped to receive and retain the lip 497a of the upper rotor motor cooling fan 495a.

The bottom of the upper rotor motor 465a is disposed within the space defined by the inner cylindrical surface of the cooling fan 495a such that the bottom of the upper rotor motor 465a contacts the motor seats 499a. The cooling fan openings 496a of the cooling fan 495a are generally aligned with corresponding cooling fan openings of the upper rotor motor 465. The collar halves 491 are fit onto the upper rotor motor 465a and the cooling fan 495a such that: (1) the lip retaining chambers 493a of the collar halves 491 receive the lip 497a of the upper rotor motor cooling fan 495a; and (2) the upper rotor motor mating surfaces 492a of the collar halves 491 mate with the grooves on the exterior of the upper rotor motor 465a. Two fasteners (not labeled) attach the collar halves 491a to each other to prevent separation.

The cooling fans solve two problems: (1) limited motor power output due to overheating; and (2) motors falling apart. First, the power output of the rotor motors depends to a certain extent on cooling—power output generally decreases the hotter the rotor motors get. The cooling fans enlarge the radius of the cooling fan openings of the rotor motors. The increased radius drives cooling air at a greater flow rate, which improves cooling and allows motors to be used safely at increased loads without fear of failure.

Second, the flux rings of the rotor motors are typically glued onto the end caps of the rotor motors. This attachment is not secure due to the temperatures the rotor motors reach and the vibrations that occur during flight. The cooling fan collars double as redundant load paths for the motor flux rings since they mechanically engage the grooves on the exterior of the upper rotor motor, which eliminates the chance of the flux ring working its way off of the end cap.

Figure 5J:
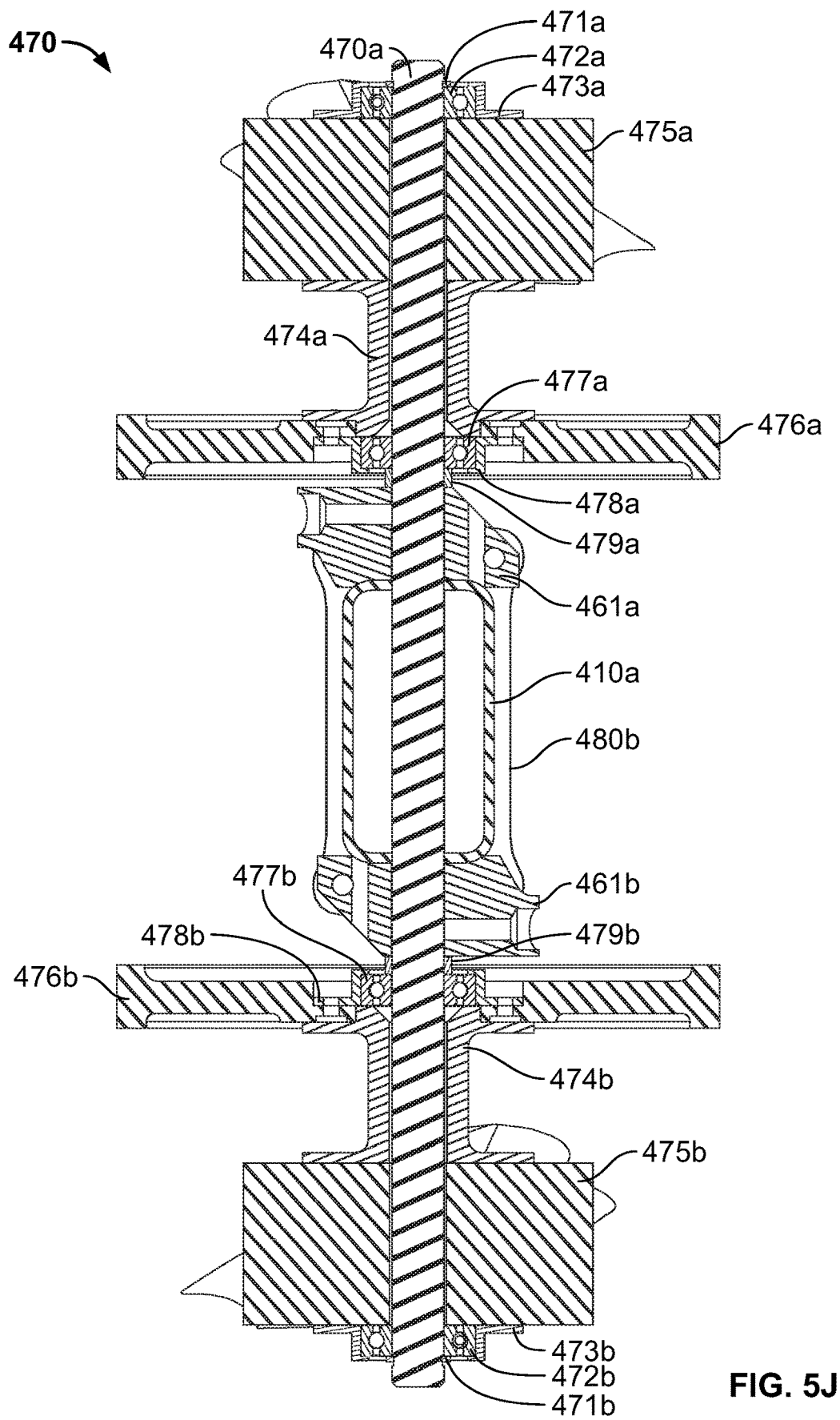
FIG. 5J is a cross-sectional view of the rotor assembly of the rotor arm module of FIG. 5A taken substantially along line 5J-5J of FIG. 5A.

As best shown in FIG. 5J, the rotor assembly 470 includes a spindle 470a and the following components rotatably mounted to the spindle 470a: (1) an upper retaining ring 471a, (2) a lower retaining ring 471b, (3) upper bearings 472a and 477a, (4) lower bearings 472b and 477b, (5) upper bearing cups 473a and 478a, (6) lower bearing cups 473b and 478b, (7) an upper torque tube 474a, (8) a lower torque tube 474b, (9) an upper rotor 475a, (10) a lower rotor 475b, (11) an upper driven gear 476a, (12) a lower driven gear 476b, (13) an upper spacer 479a, and (14) a lower spacer 479b.

Turning to the upper portion of the rotor assembly 470, the bearing 472a is disposed within the bearing cup 473a, which is fixedly attached to the top of the rotor 475a. The torque tube 474a is fixedly attached at one end to the underside of the rotor 475a and at the other end to top of the driven gear 476a. The bearing 477a is disposed within the bearing cup 478a, which is fixedly attached to the underside of the driven gear 476a. The spacer 479a is disposed between the bearing 477a and the upper rotor motor mount 461a. The upper retaining ring 471a is seated in a groove defined around the spindle 470a and prevents these components from sliding off of the spindle 470a.

Turning to the lower portion of the rotor assembly 470, the bearing 472b is disposed within the bearing cup 473b, which is fixedly attached to the bottom of the rotor 475b. The torque tube 474b is fixedly attached at one end to the top of the rotor 475b and at the other end to underside of the driven gear 476b. The bearing 477b is disposed within the bearing cup 478b, which is fixedly attached to the top of the driven gear 476b. The spacer 479b is disposed between the bearing 477b and the lower rotor motor mount 461b. The lower retaining ring 471b is seated in a groove defined around the spindle 470a and prevents these components from sliding off of the spindle 470a.

The spindle 470a extends through two vertically-aligned spindle receiving openings (not labeled) defined through the rotor arm 410a. This prevents the spindle 470a from substantially translating relative to the rotor arm 410a. And since all of the components of the upper and lower motor assemblies 460a and 460b and the rotor assembly 470 are attached to the spindle 470a (directly or indirectly), the fact that the spindle 470a extends through the spindle receiving openings defined through the rotor arm 410a prevents any of the components of the upper and lower motor assemblies 460a and 460b and the rotor assembly 470 from substantially translating relative to the rotor arm 410a.

To prevent the upper and lower rotor motors 465a and 465b (and certain components attached thereto) from rotating relative to the rotor arm 410a, the upper and lower rotor motor mounts 461a and 461b are attached to both an inner bracket 480a and an outer bracket 480b. The brackets 480a and 480b are disposed around the rotor arm 410a, as best shown in FIGS. 5A, 5B, and 5J.

In operation, the controller 272 and the ESC 265a control the rate and direction of rotation of the motor shaft of the upper rotor motor 465a, which drives the upper pinion 463a, which in turn drives the upper driven gear 476a. Since the upper driven gear 476a is fixedly attached to the upper rotor 475a without any further gear reduction, the upper rotor 475a rotates at the same rate as and in the same rotational direction as the upper driven gear 476a. Similarly, the controller 272 and the ESC 265b control the rate and direction of rotation of the motor shaft of the lower rotor motor 465b, which drives the lower pinion 463b, which in turn drives the lower driven gear 476b. Since the lower driven gear 476b is fixedly attached to the lower rotor 475b without any further gear reduction, the lower rotor 475b rotates at the same rate as and in the same rotational direction as the lower driven gear 476b.

In this embodiment, the upper and lower rotors are generally the same size and shape. In another embodiment, the lower rotors are larger than (such as about 7% larger than) the upper rotors to compensate for the fact that the lower rotors operate in the upper rotors' downwash. Running larger lower rotors is one way to improve load sharing of upper and lower motors of a multicopter with counter-rotating blades. Another way to improve load sharing is to select a lower gear-reduction for the lower rotors. Yet another way is to select motors with higher KV (rpm/volt) values. Yet another way is to select lower rotors with coarser pitch than the upper rotors.

1.3 Front Landing Gear Extension Modules and Landing Gear Modules

Figure 6A:
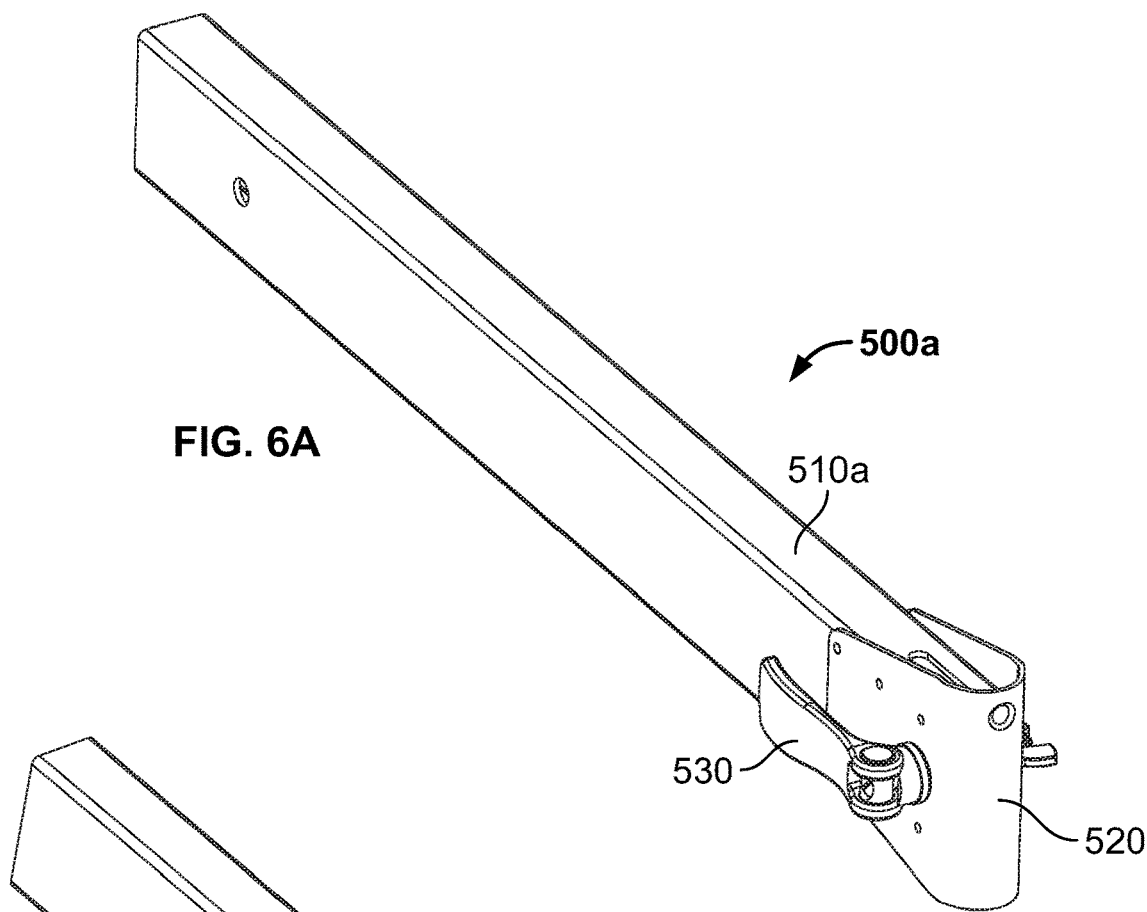
FIG. 6A is a top perspective view of one of the front landing gear extension modules of the multicopter of FIG. 1A.

FIGS. 6A and 7A show the first front landing gear extension module 500a and the first front landing gear module 600a, respectively. The front landing gear modules (along with the rear landing gear modules, described below) support the multicopter 10 when assembled but not flying, and facilitate launch and landing of the multicopter 10 without damaging the multicopter 10. The front landing gear extensions are used to attach the front landing gear to the respective rotor arm modules, and also enable the front landing gear to move relative to the rotor arm modules to prevent rotor rotation in certain instances.

The second front landing gear extension module 500b and the second front landing gear module 600b are similar to the first front landing gear extension module 500a and the first front landing gear module 600a and are not separately shown or described for brevity.

The first front landing gear extension module 500a includes a generally rectangular hollow support 510a, a landing gear module securing device 520 attached at one end of the support 510a, and a front landing gear locking device 530 (which is a cam lever lock in this embodiment but can be any suitable locking device) attached to the landing gear module securing device 520.

The first front landing gear module 600a includes a generally cylindrical leg 610, a generally semicircular foot 620 attached to a bottom end of the leg 610, and a collar 630 attached near the top end of the leg 610 via a fastener 632 (such as a set screw).

The front landing gear locking device 530 enables an operator to attach the first front landing gear module 600a to the first front landing gear extension module 500a. To do so, the operator unlocks the front landing gear locking device 530, inserts the first front landing gear module 600a into the landing gear module securing device 520 until the collar 630 is disposed within the landing gear module securing device 520, and re-locks the front landing gear locking device 530. The operator reverses this process to detach the first front landing gear module 600a from the first front landing gear extension module 500a.

The operator attaches the first front landing gear extension module 500a to the first rotor arm module 400a by inserting the end of the support 510a opposite the end to which the landing gear module securing device 520 is attached into the front landing gear extension module receiving socket of the first rotor arm module 400a. The operator then locks the first front landing gear extension module 500a into place, such as using suitable fasteners.

Although not shown, the operator can move the front landing gear module further radially-inward or further radially-outward by sliding the support of the front landing gear extension module further into or further out of the rotor arm of the corresponding rotor arm module. This enables the operator to move the front landing gear module from a first position in which the front landing gear module is clear of the rotors radially-inward to a second position in which the rotors contact the front landing gear module. When in the second position, the front landing gear module prevents the rotors from rotating.

1.4 Rear Landing Gear Extension Modules and Landing Gear Module

Figure 6B:
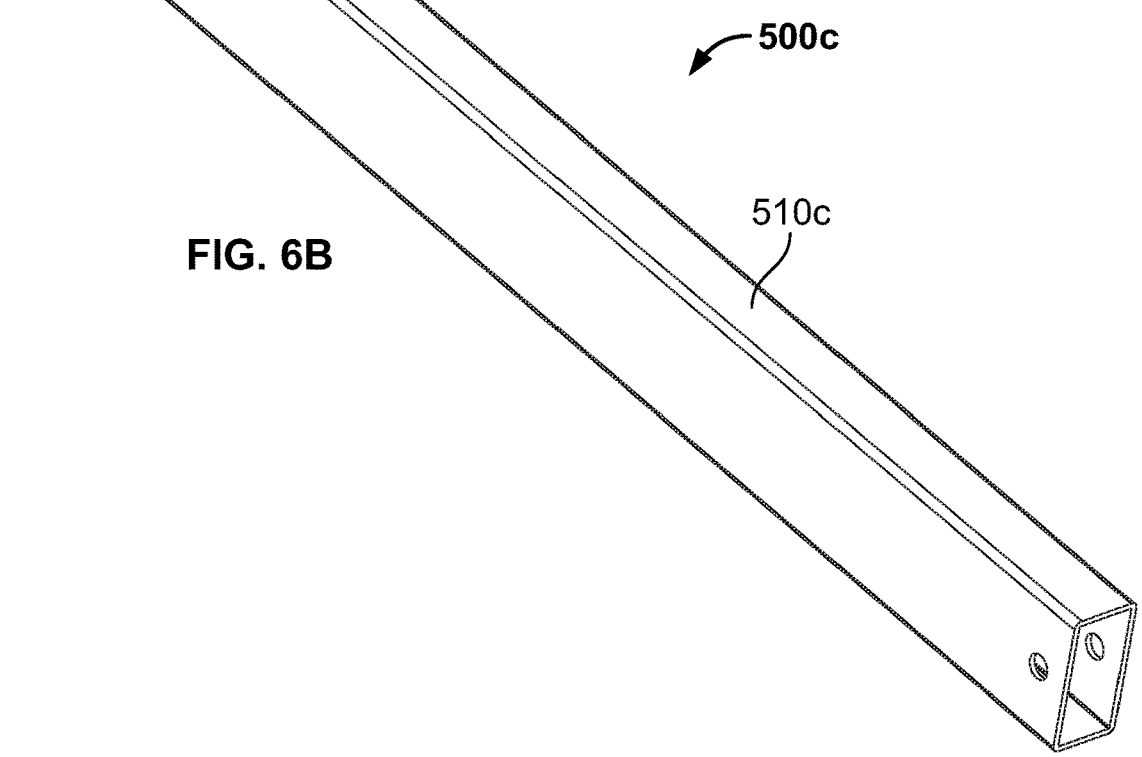
FIG. 6B is a top perspective view of one of the rear landing gear extension modules of the multicopter of FIG. 1A.

FIGS. 6B and 7B show the first rear landing gear extension module 500c and the first rear landing gear module 600c, respectively. The rear landing gear modules (along with the front landing gear modules, described above) support the multicopter 10 when assembled but not flying, and facilitate launch and landing of the multicopter 10 without damaging the multicopter 10. The rear landing gear modules are shaped such that they act as vertical stabilizers (or fins) during flight, ensuring that the front of the multicopter 10 (and the nose of the fixed-wing aircraft 20, if attached thereto) points generally into the airflow. The rear landing gear extensions are used to attach the rear landing gear to the respective rotor arm modules, and also enable the rear landing gear to move relative to the rotor arm modules to prevent rotor rotation in certain instances.

The second rear landing gear extension module 500d and the second rear landing gear module 600d are similar to the first rear landing gear extension module 500c and the first rear landing gear module 600c and are therefore not separately shown or described.

The first rear landing gear extension module 500c is an elongated rectangular hollow support 510c.

The first rear landing gear module 600c includes a body having a generally triangular cross-section that tapers from front to back. The body includes two side surfaces 650a and 650b and a front surface 650c joining the side surfaces 650a and 650b. The side surfaces 650a and 650b are substantially longer than the front surface 650c is wide. The body tapers at its bottom into a generally circular foot 670. A rear landing gear extension module receiving socket is defined by a hollow rectangular support 680 extending through the body.

The operator attaches the first rear landing gear extension module 500c to the third landing gear module 600c by inserting one end of the support 510c of the first rear landing gear extension module 500c into the rear landing gear extension module receiving socket of the support 680. The operator then locks the first rear landing gear extension module 500c into place, such as using suitable fasteners.

The operator attaches the first rear landing gear extension module 500c to the third rotor arm module 400c by inserting the end of the support 510c of the first rear landing gear extension module 500c opposite the end to which the first rear landing gear module 600c is attached into the rear landing gear extension module receiving socket of the third rotor arm module 400c. The operator then locks the first rear landing gear extension module 500c into place, such as using suitable fasteners.

Once attached, the rear landing gear modules are oriented such that the side surfaces of the rear landing gear modules are substantially aligned with the saddle side brackets 320a and 320b of the saddle 300, as best shown in FIG. 1B. When the fixed-wing aircraft 20 is attached to the multicopter 10, these side surfaces of the rear landing gear modules are substantially parallel to a generally vertical plane containing the roll axis of the fuselage of the fixed-wing aircraft 20. The relatively long length of these side surfaces of the rear landing gear modules and their placement well-aft of the center-of-lift of the multicopter 10 cause the rear landing gear modules to act as fins. This weathervane effect ensures that the nose of the fixed-wing aircraft 20 is oriented into the airflow when airborne. Good flow alignment is critically important for spin avoidance at the moment the multicopter 10 releases the fixed-wing aircraft 20, when the fixed-wing aircraft 20 may be operating well-below stall speed.

In certain embodiments, one or more of the landing gear modules includes a shock absorber.

1.5 Separately Powered Upper and Lower Rotor Motors

As noted above, four batteries 260a to 260d power the multicopter 10, though in other embodiments a different quantity of batteries and/or different type(s) of batteries power the multicopter. In other embodiments, any suitable power source(s), such as a fuel-based power source or a solar-based power source, may be used instead of or along with batteries.

In this embodiment, a first pair of batteries 260a and 260b are connected in series and a second pair of batteries 260c and 260d are connected in series. Here, the first pair of batteries 260a and 260b power the upper rotor motors and do not power the lower rotor motors, while the second pair of batteries 260c and 260d power the lower rotor motors and do not power the upper rotor motors. This configuration ensures that, if one pair of batteries fails, the multicopter 10 is operable in a quadcopter mode with either all four upper rotor motors (if the second pair of batteries 260c and 260d fails) or all four lower rotor motors (if the first pair of batteries 260a and 260b fails).

The multicopter 10 also includes a gang circuit that connects the two pairs of batteries in parallel to enable a single charger connected to one of the pairs of batteries to also charge the other pair of batteries. The gang circuit is overload-protected and includes an automatically resetting circuit breaker. The gang circuit is beneficial because it reduces charging time, allowing an operator to recharge both batteries in parallel when only one charger is available.

1.6 Multicopter Operating Modes

The multicopter 10 is operable in one of two throttle modes: NORMAL throttle mode and TENSION throttle mode. The multicopter 10 is operable in three different flight modes: ALTHOLD flight mode, LOITER flight mode, and RTL flight mode. The multicopter 10 is operable in a partial-power mode to, in certain situations, improve response and save power. The basic functionality of each operating mode is described below. The operator can toggle between these operating modes using suitable switches, a touch screen, or any other suitable device on the R/C controller.

On a typical R/C controller including left and right joysticks, the left joystick is typically used for throttle, while the right joystick is typically used for left/right and fore/aft station-keeping of the multicopter.

1.6.1 SIMPLE Control Mode

SIMPLE control mode simplifies horizontal control by tying the R/C controller's right stick commands to geo-referenced coordinates. In various embodiments, the multicopter 10 always operates in SIMPLE control mode, regardless of which of the three flight modes the multicopter 10 employs. Under SIMPLE control mode, forward right stick deflection drives the multicopter 10 in the direction in which the multicopter 10 was pointed at the instant it was armed, regardless of its yaw orientation during flight. Put differently, if the multicopter 10 was pointed North when armed but, while hovering for instance, the multicopter 10 rotated about its yaw axis such that its nose is pointed East, forward right stick deflection still drives the multicopter 10 North. While the operator may use the left stick to rotate the multicopter 10 about the yaw axis, this (rudder) input is rarely needed for launch or retrieval of the fixed-wing aircraft 20. The rear landing gear modules ensure the multicopter 10 is pointed into the relative wind (like a weathervane), so the operator need not worry about aligning the fuselage with airflow.

1.6.2 TENSION Throttle Mode

When the multicopter 10 operates in TENSION throttle mode, the human operator has direct control over the throttle. In various embodiments, the multicopter 10 can only be operated in TENSION throttle mode when it is operated in either ALTHOLD or LOITER flight modes. That is, the multicopter 10 cannot be operated in TENSION throttle mode when operated in RTL flight mode. TENSION throttle mode converts throttle stick inputs to direct throttle commands, which is primarily useful for tensioning the flexible capture tether 5000 during retrieval. An astute operator will climb at a controlled rate by feathering the throttle in TENSION throttle mode, he will slow high ascent as the tether pulls tight (described below), and then he maintains light tether tension, keeping the line straight as the fixed-wing aircraft approaches. The straight line allows human observers to confirm that the line will be swept by the fixed-wing leading edge and the capture is on-target. At impact, the operator increases throttle to arrest the fixed-wing aircraft's horizontal motion and minimize altitude loss. Then he feathers the throttle back to lower the aircraft to the ground.

1.6.3 NORMAL Throttle Mode

In NORMAL throttle mode, the autopilot interprets joystick commands as desired rate commands and applies whatever throttle is needed to achieve that climb or descent rate. When tethered to the ground the altitude controller very abruptly increases throttle to maximum (when its desired altitude is above current altitude) or it plummets to minimum throttle (when desired altitude is below current altitude) without regard for joystick position. This behavior makes it difficult or impossible for the human operator to regulate tether tension directly. Direct throttle control, offered by TENSION throttle mode, disables the altitude controller. In this mode, altitude is controlled strictly by tether length. In Tension Mode, the human operator controls tether tension directly, with throttle inputs, and the autopilot responds with lift-producing motor commands that are roughly proportional to commanded throttle position. By this technique, the retrieval process enjoys improved finesse and precise control without overworking the multicopter motors and batteries.

1.6.4 ALTHOLD Flight Mode

ALTHOLD flight mode converts throttle commands (left stick, vertical axis) to vertical rate commands. When operating in the ALTHOLD flight mode, the multicopter 10 will attempt to maintain current altitude when the left stick is in the middle position. The multicopter 10 will attempt to climb at up to 5 meters per second (or any other suitable rate) when the left stick is pushed up to max. The multicopter 10 will descend at up to 5 meters per second (or any other suitable rate) when the left stick is pulled to min. ALTHOLD flight mode converts right stick commands to lean angle, with maximum right stick deflection corresponding to 30 degrees (or any other suitable angle). When operating in ALTHOLD flight mode, the multicopter 10 will maintain zero lean when the right stick is in the middle position and will be blown downwind. If the fixed-wing aircraft 20 is mated to the multicopter 10 and producing thrust, this thrust will drive the multicopter 10 forward unopposed by lean angle. ALTHOLD flight mode does not depend on GPS for control, and works equally well indoors and in all locations where GPS reception is spotty or denied. ALTHOLD flight mode uses a compass for navigation, which means "SIMPLE MODE" works equally well without the use of GPS. Consequently, the operator simply pushes the right joystick gently into the wind for station keeping, fully into the wind to execute a "dash" maneuver (for launch/release), and he will relax the right stick to allow the aircraft to drift downwind to return home after a dash. Finally, the operator will deflect the right stick opposite the aircraft's ground track to minimize ground speed just before touch-down.

1.6.5 LOITER Flight Mode

LOITER flight mode behaves like ALTHOLD flight mode in the vertical direction (i.e., converts throttle commands to vertical rate commands). Similarly, LOITER flight mode converts right stick inputs to horizontal rate commands. When operating in LOITER flight mode, the multicopter 10 attempts to maintain its current horizontal position over the Earth when the right stick is in the middle position. Maximum right stick deflection drives the multicopter 10 in the corresponding direction at up to 20 meters per second ground speed (or any suitable rate) or the maximum achievable speed against true wind, whichever is less. LOITER flight mode depends on GPS to close feedback loops around latitude and longitude positions. The controller 272 will automatically switch itself from LOITER flight mode to ALTHOLD flight mode when GPS reception is unacceptable, and will not allow a human operator to arm in LOITER flight mode when GPS reception is unacceptable.

1.6.6 RTL Flight Mode

Activating Return to Launch (RTL) flight mode causes the multicopter 10 to autonomously return to its home position, which in some embodiments is the place on Earth where the controller 272 was last armed (described below). When the controller 272 is armed, it stores its launch location (obtained via the GPS receiver 285) in the memory 272b. Responsive to receipt of an RTL signal from the R/C controller, the controller 272 takes over operation of the multicopter 10 and controls the multicopter 10 to fly to a pre-landing location located a particular height above the launch location. The controller 272 then automatically (or the operator manually) controls the multicopter 10 to descend and land, as described in detail below.

To save battery life and to minimize flight time, the controller 272 controls the rotor motors so the multicopter 10 takes a direct (i.e., generally straight line) route from the location where the controller 272 received the RTL signal to the pre-landing location. If the multicopter 10 is above and laterally offset from the pre-landing location, the controller 272 controls the one or more rotor motors to descend while laterally moving toward the pre-landing location to take this direct route to the pre-landing location. This is an improvement over certain known multicopters that, instead of taking a direct route, travel laterally until above the pre-landing location and then descend to the pre-landing location.

Figure 12A:
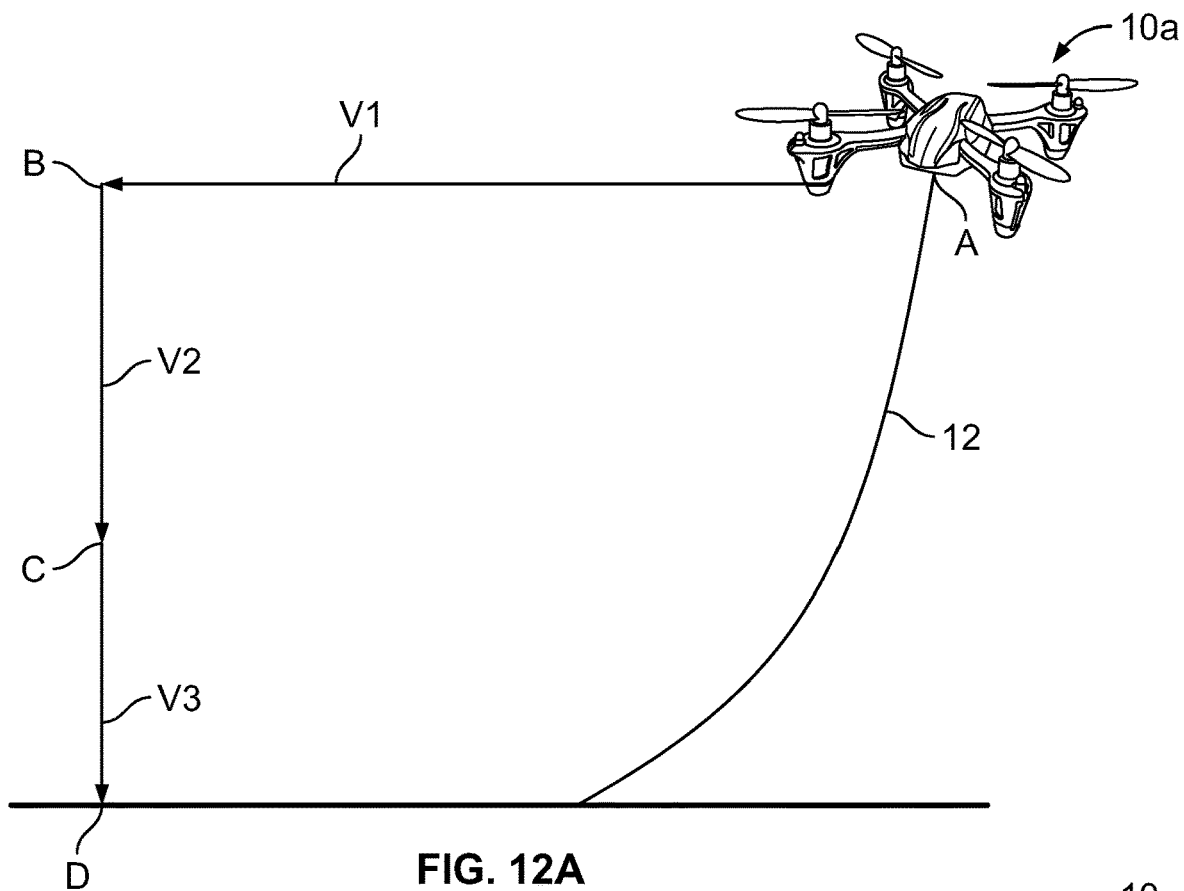
FIG. 12A is a diagrammatic view of one route a prior art multicopter takes responsive to receiving an RTL signal.
Figure 12B:
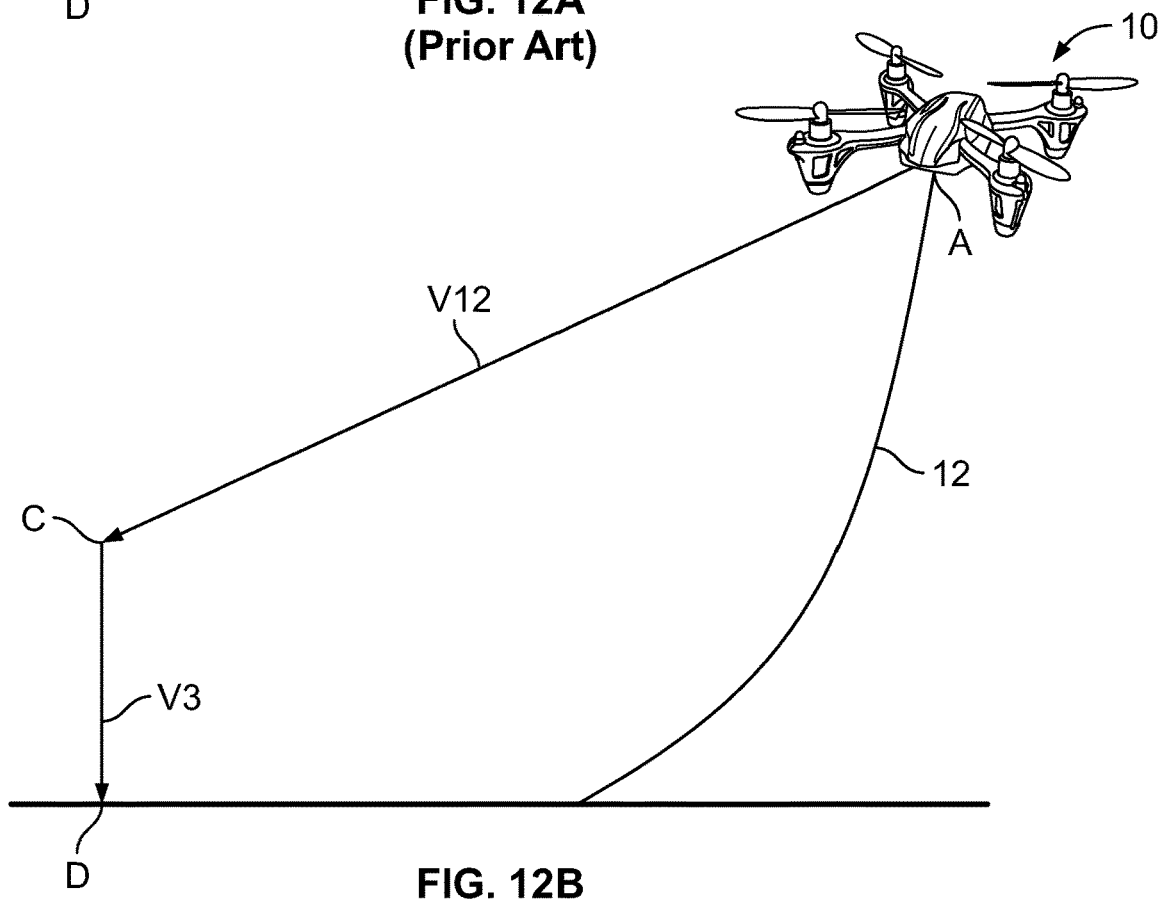
FIG. 12B is a diagrammatic view of one route the multicopter of the present disclosure takes responsive to receiving an RTL signal.

FIGS. 12A and 12B illustrate the improvement over the prior art. FIG. 12A is a diagrammatic view of a prior art route a known multicopter 10a takes responsive to receiving an RTL signal. This known multicopter 10a is tethered to a ground anchor via a flexible member 12 and receives the RTL signal when at initial location A in this example. In response, the multicopter 10a attempts to: (1) travel laterally to location B directly above the landing location D along vector V1; then (2) descend to pre-landing location C along vector V2; then (3) descend to landing location D along vector V3. This route causes two problems. First, it is inefficient. Second, if the flexible member 12 is too short, the multicopter 10a will never reach location B, and absent operator intervention the multicopter 10a will continuously attempt to reach location B even though it will never get there, draining its battery and, if not recognized and stopped, resulting in damage to the multicopter and potential destruction.

FIG. 12B is a diagrammatic view of one route the multicopter 10 of the present disclosure takes responsive to receiving the RTL signal. The illustration of the multicopter 10 is highly simplified here for clarity. The illustrated multicopter 10 could be replaced with the other embodiments of the multicopter shown and described herein. The multicopter 10 is tethered to a ground anchor via the flexible member 12 and receives the RTL signal when at initial location A in this example. In response, the multicopter 10: (1) travels laterally while descending to pre-landing location C along vector V12; then (2) descends to landing location D along vector V3. This route is more efficient than the prior art route and reduces the potential for problems caused by a short flexible member (or enables use of a shorter flexible member).

In other embodiments, rather than returning to the place on Earth where the controller 272 was last armed when the RTL signal is received from the R/C controller, the multicopter returns to any suitable designated location, such as a landing location that the operator has indicated. In some instances the landing location may be moving, such as when the landing location is on a ship at sea.

When operating in RTL mode, the controller 272 ignores left stick inputs except when executing a SHUT DOWN command, and responds to right stick inputs only during the final (vertical) descent phase. For example, the operator may use the right stick to "nudge" the multicopter 10 away from the storage and launch system 2000 to avoid interference at touchdown. Multicopter response to these nudge maneuvers will be similar to right stick inputs in LOITER flight mode, and the operator should execute them before the aircraft descends below 5 meters (or any other suitable distance) above ground level. To avoid human operator-induced oscillations and to minimize ground speed, the human operator's fingers should be kept off the control sticks during final descent and touchdown in RTL mode.

1.6.7 Partial-Power Mode

Certain known multicopters that are configured to withstand heavy lift load conditions—such as to transport relatively heavy payloads across relatively long distances—include relatively large rotors and rotor motors that are responsive enough to keep the multicopters under control when carrying these heavy payloads. But when these known multicopters are used to transport relatively light loads (or no loads), the large rotors render the multicopters unstable. Specifically, since the rotors provide so much power and lift, they must operate at a low rotational speed to avoid undesired multicopter climb, but operation at a low rotational speed induces sluggish response to operator commands. This loss of control and maneuverability is especially problematic when flying the multicopter in an area full of obstructions—like trees, rock formations, and buildings—that the multicopter must deftly avoid. In some instances, operators swap out the large rotors for smaller rotors before these known multicopters are used to transport relatively light loads (or no loads), but that increases down time (to account for rotor swapping), requires operators to purchase and maintain a second set of rotors and have them on hand, and isn't feasible in certain instances (such as when the multicopter drops its payload while airborne).

To solve this problem, the multicopter 10 of the present disclosure is operable in a partial-power mode in which the controller 272 controls either all of the upper rotor motors or all of the lower rotor motors to operate at their minimum output (or in another embodiment, shut down) so the multicopter 10 operates using the other four rotor motors that the controller 272 controls normally (i.e., all four upper rotor motors or all four lower rotor motors). This renders the multicopter 10 robust enough to carry heavy loads (like the fixed-wing aircraft 20) over long distances yet nimble enough (in the partial-power mode) to fly unloaded without losing maneuverability. Operators also don't have to purchase or maintain multiple sets of rotors or waste time swapping them out.

Figure 11A:
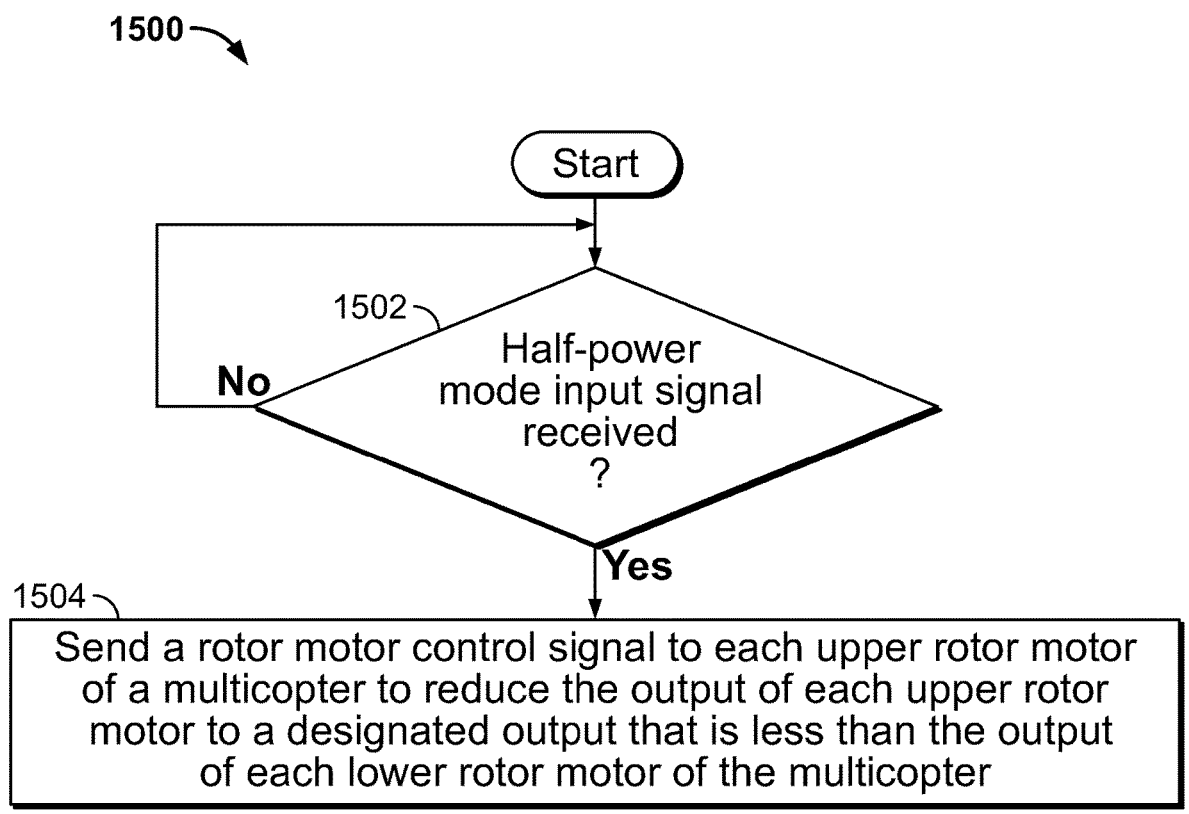
FIG. 11A is a flowchart of an example process for operating the multicopter in partial-power mode.

FIG. 11A is a flowchart of an example process 1500 for operating the multicopter 10 in the partial-power mode. In various embodiments, instructions stored in the memory 272b and executed by the processor 272a of the controller 272 represent the process 1500.

In the process 1500, the controller monitors for receipt of a partial-power mode signal from the R/C receiver or other suitable source, as diamond 1502 indicates. Once the controller receives the partial-power mode signal, the controller automatically sends a rotor motor control signal to each of the upper rotor motors of the multicopter to reduce the output of each of the upper rotor motors to a designated output, as block 1504 indicates. The designated output is less than the output of each lower rotor motor of the multicopter. In one embodiment, for each upper rotor motor, the designated output is the minimum output of that rotor motor (i.e., the controller signals the upper rotor motors to operate at their minimum rotational speed). In another embodiment, for each upper rotor motor, the designated output is zero (i.e., the controller signals the upper rotor motors to shut down). In other embodiments, the controller sends the above-described rotor motor control signal to each of the lower rotor motors rather than the upper rotor motors.

The designated output may be any suitable measure of rotor motor output, such as rotational speed or torque.

2. Storage and Launch System

The storage and launch system 2000 is shown in FIGS. 8A, 8B, 8C, 8D, 8E, 8F, 8G, 8H, and 8I. The storage and launch system 2000 is usable to compactly store the modular multicopter 10 in a single container after disassembly into the 13 modules and to facilitate launch of the fixed-wing aircraft 20 into wing-borne flight by acting as a launch mount for the fixed-wing aircraft 20.

To facilitate storage of the multicopter 10 in a single container (including a container top 2000a and a container bottom 2000b), the storage and launch system 2000 includes: (1) a launch-assist assembly 2100 to which the front landing gear modules 600a and 600b are attachable; (2) a rotor arm module and rear landing gear module storage device 2200 to which the rotor arm modules 400a to 400d and the rear landing gear modules 600c and 600d are attachable; and (3) a hub module storage tray 2300 to which the hub module 100 is attachable.

To facilitate launch of the fixed-wing aircraft 20, the launch-assist assembly 2100 is movable from a storage position into a launch position and includes certain elements on which the fixed-wing aircraft can be mounted and other elements that retain the fixed-wing aircraft 20 in a launch orientation before launch. Example embodiments of each of these elements are described below, followed by a description of an example method of storing the multicopter 10 using these example embodiments of the elements.

2.1 Launch-Assist Assembly

The launch-assist assembly 2100 is attached to the container bottom 2000b and is one element of the storage and launch system 2000 that facilitates launch of the fixed-wing aircraft 20. The launch-assist assembly 2100 is movable from a position in which is lies substantially flat along the floor of the container bottom 2000a to enable storage of the multicopter 10 to a launch position in which it is generally spaced-apart from and upwardly-angled relative to the floor of the container bottom 2000a to facilitate launch of the fixed-wing aircraft 20.

Figure 8A:
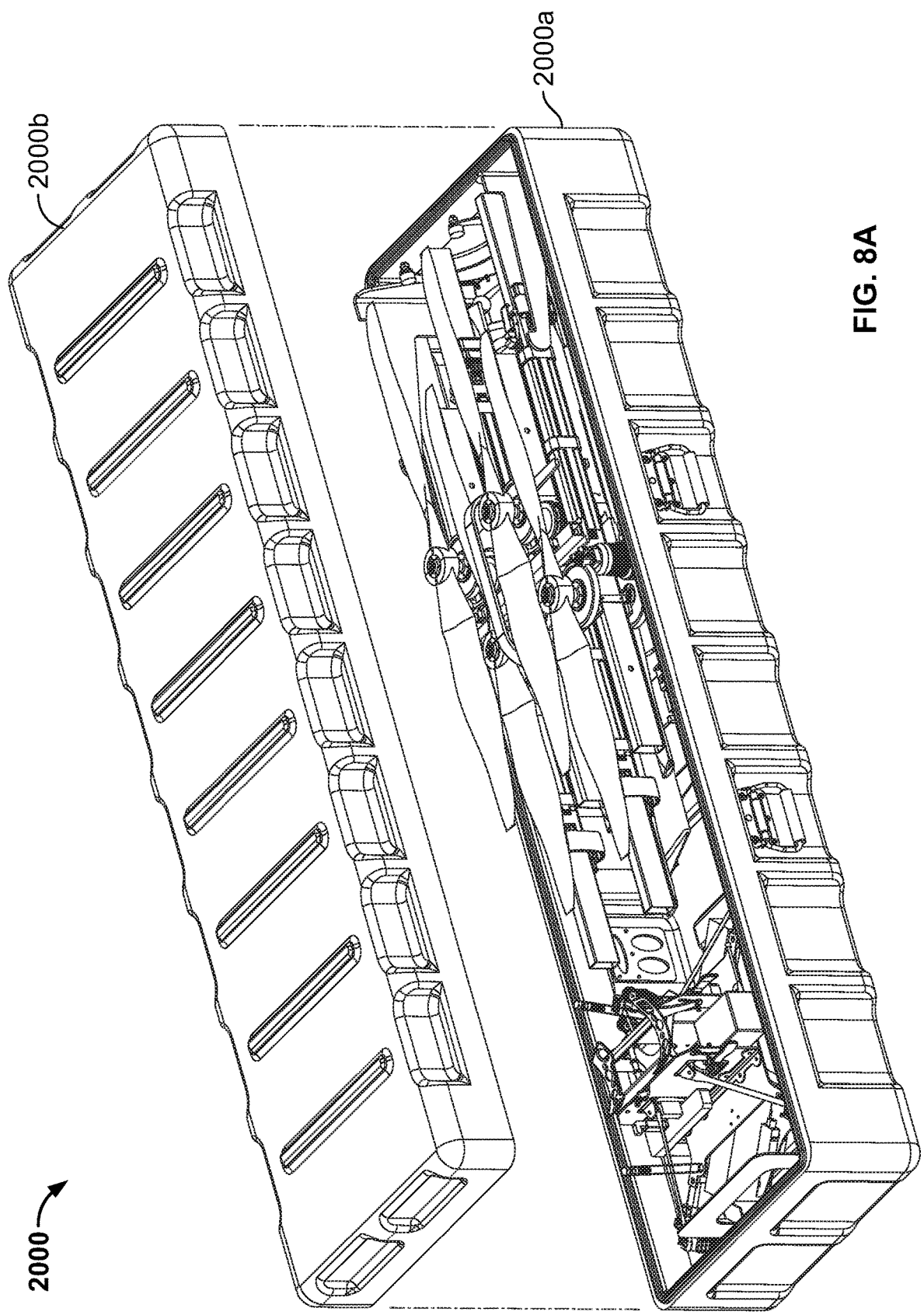
FIG. 8A is a partially exploded top perspective view of the multicopter of FIG. 1A stored in one example embodiment of the storage and launch system of the present disclosure.
Figure 8B:
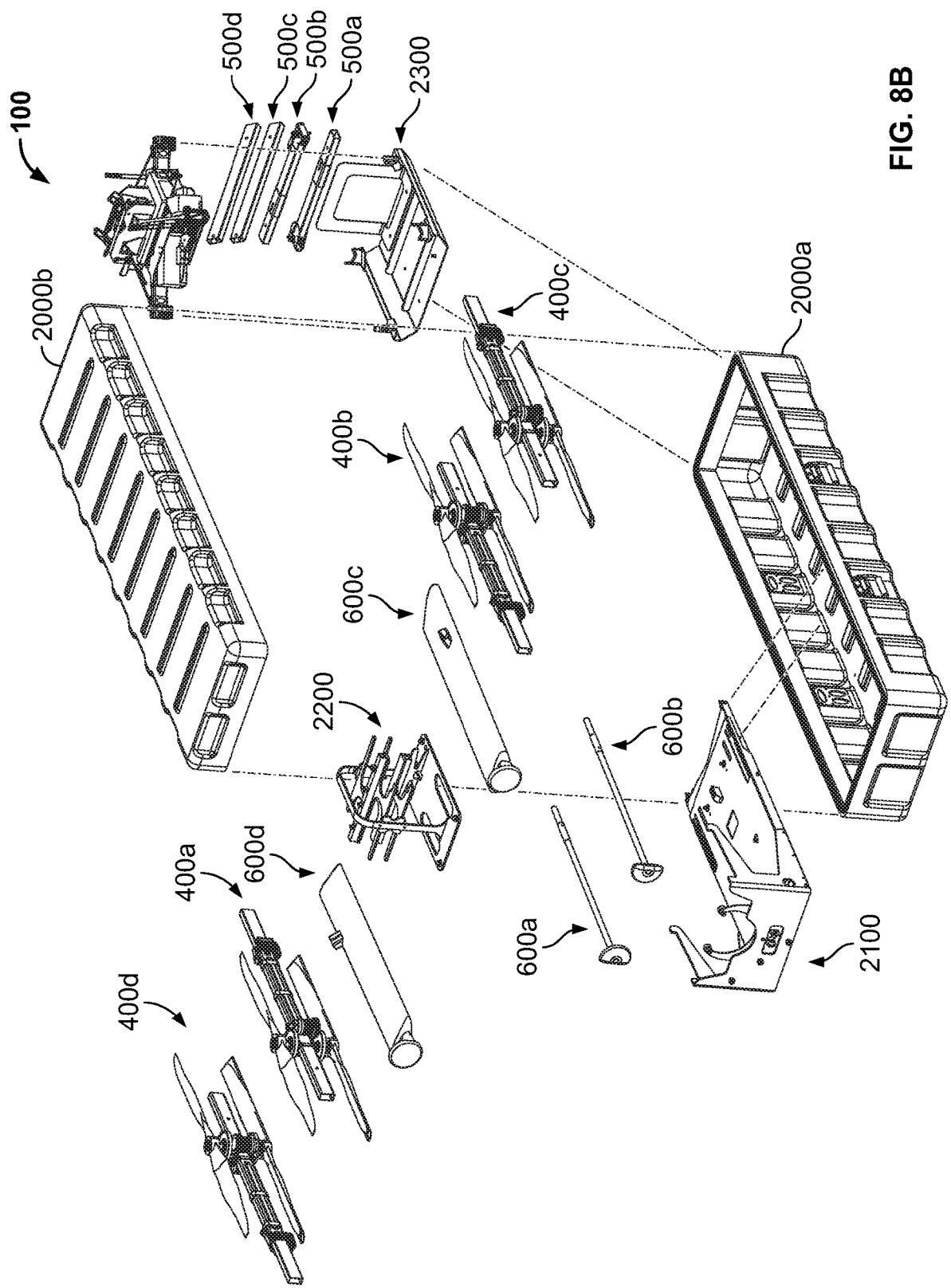
FIG. 8B is an exploded top perspective view of the storage and launch system of FIG. 8A, the 13 modules of the multicopter of FIG. 1A, and elements used to store the multicopter.
Figure 8C:
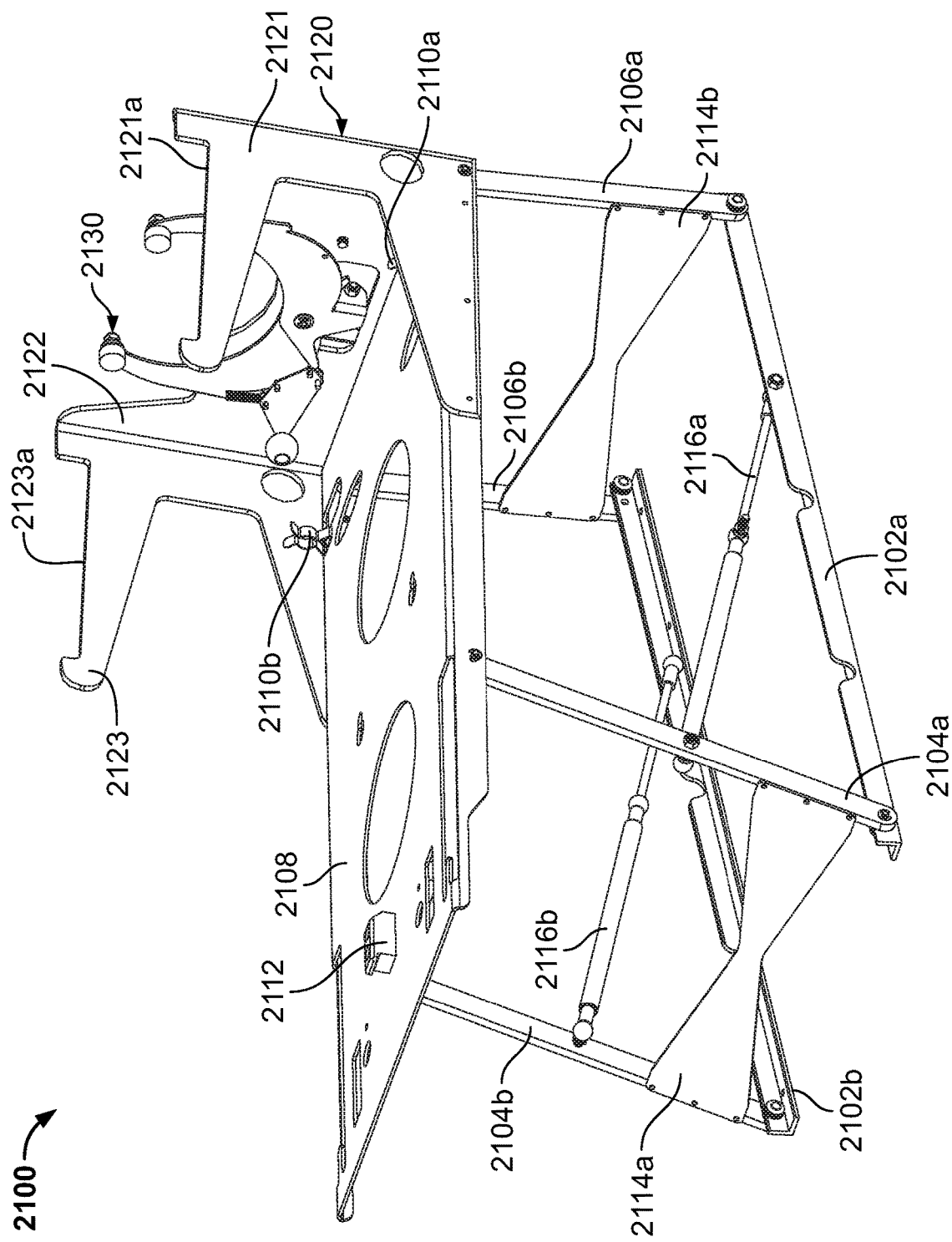
FIG. 8C is a top perspective view of the launch-assist assembly of the storage and launch system of FIG. 8A in the launch position.

As best shown in FIG. 8C, the launch-assist assembly 2100 includes: (1) first and second base brackets 2102a and 2102b; (2) first and second front legs 2104a and 2104b; (3) first and second rear legs 2106a and 2106b; (4) a tray 2108; (5) first and second front landing gear module retainers 2110a and 2110b; (6) a storage device lock engager 2112; (7) front and rear stabilizing brackets 2114a and 2114b; (8) first and second lockable gas springs 2116a and 2116b; and (9) an aircraft-engaging bracket 2120.

The first and second base brackets 2102a and 2102b are attached to the floor of the container bottom 2000a near one end. The first front leg 2104a is pivotably attached at one end to the front end of the first base bracket 2102a and pivotably attached at the other end to the tray 2108. Similarly, the second front leg 2104b is pivotably attached at one end to the front end of the second base bracket 2102b and pivotably attached at the other end to the tray 2108. The first rear leg 2106a is pivotably attached at one end to the rear end of the first base bracket 2102a and pivotably attached at the other end to the tray 2108. Similarly, the second rear leg 2106b is pivotably attached at one end to the rear end of the second base bracket 2102b and pivotably attached at the other end to the tray 2108. The front stabilizing bracket 2114a is attached to and extends between the first and second front legs 2104a and 2104b, and the rear stabilizing bracket 2114b is attached to and extends between the first and second rear legs 2106a and 2106b. The first lockable gas spring 2116a is pivotably attached at one end to the first base bracket 2102a between the first front leg 2104a and the first rear leg 2106a and pivotably attached at the other end to the first front leg 2104a between the first base bracket 2102a and the tray 2108. Similarly, the second lockable gas spring 2116b is pivotably attached at one end to the second base bracket 2102b between the second front leg 2104b and the second rear leg 2106b and pivotably attached at the other end to the second front leg 2104b between the second base bracket 2102b and the tray 2108. The storage device lock engager 2112, the first and second front landing gear module retainers 2110a and 2110b, and the aircraft engaging bracket 2120 are attached to the tray 2108.

The aircraft engaging bracket 2120 includes two spaced-apart generally parallel sides 2121 and 2123 having wing engaging surfaces 2121a and 2123a, respectively, and a back 2122 transverse (such as generally perpendicular) to, extending between, and connecting the sides 2121 and 2123. A fuselage-retaining assembly 2130 is rotatably mounted to the back plate 2122.

Figure 8D:
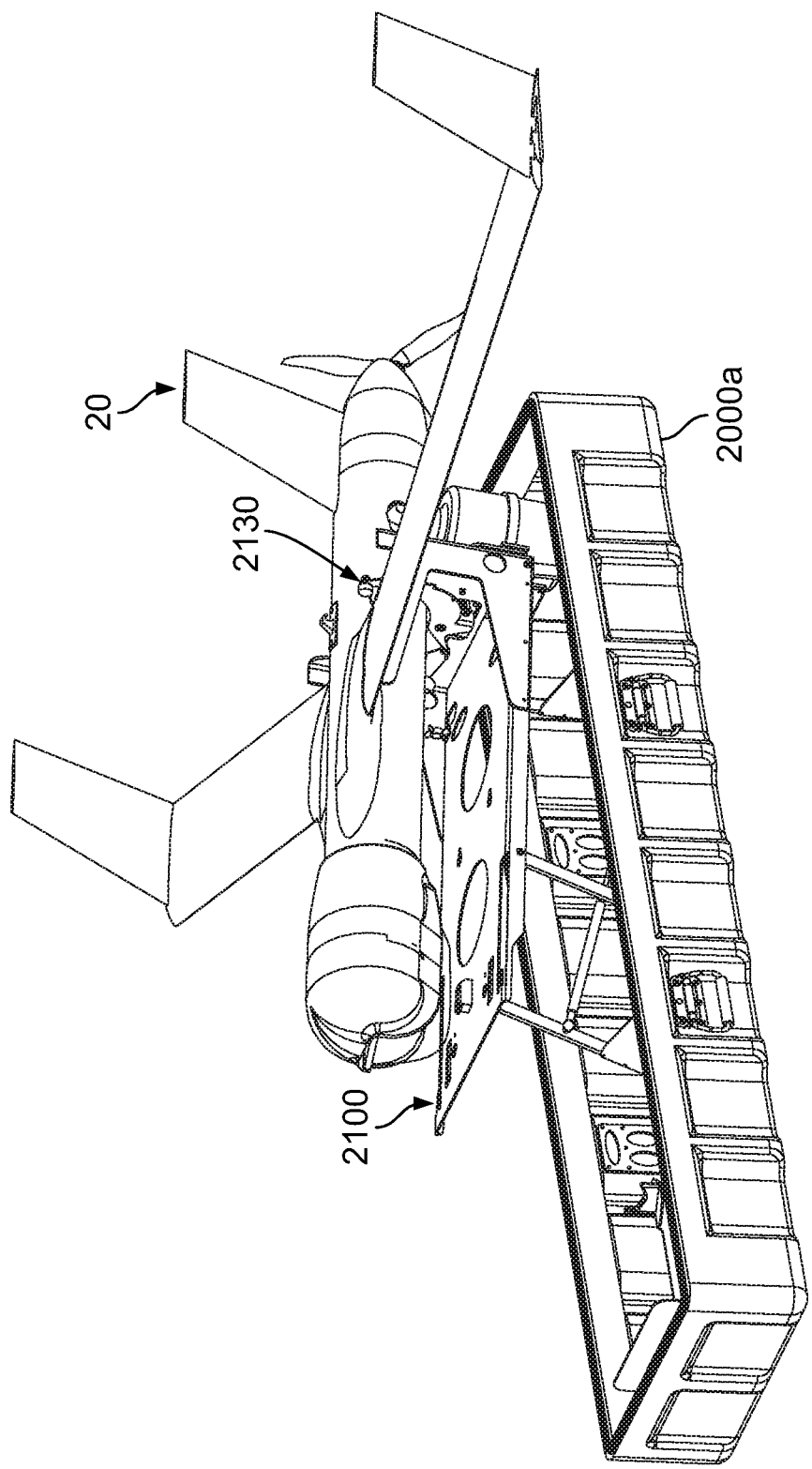
FIG. 8D is a top perspective view of the storage and launch system of FIG. 8A with the fixed-wing aircraft mounted thereto.

The above-described pivotable attachments enable the launch assist assembly 2100 to move from: (1) a storage position in which the first and second front legs 2104a and 2104b, the first and second back legs 2106a and 2106b, and the tray 2108 lay substantially flat along the floor of the container bottom 2000a (as best shown in FIGS. 8A and 8B); to (2) a launch position in which the first and second front legs 2104a and 2104b and the first and second back legs 2106a and 2106b extend upward from the floor of the container bottom 2000a such that the tray 2108 is spaced-apart from and upwardly-angled relative to the floor of the container bottom 2000a (as best shown in FIGS. 8C and 8D) (and vice-versa). The operator can lock the launch assist assembly 2100 in the launch position by locking the first and second lockable gas springs 2116a and 2116b.

When in the launch position, the launch assist assembly 2100 facilitates launch of the fixed-wing aircraft 20 by orienting the fixed-wing aircraft 20 in a desired launch orientation and retaining the fixed-wing aircraft 20 in that orientation until the operator desires to launch the fixed-wing aircraft 20. As best shown in FIG. 8D, in preparation for launch, the operator inserts the fuselage of the fixed-wing aircraft 20 into the fuselage-retaining assembly 2130 of the aircraft engaging bracket 2120 and lays the wings of the fixed-wing aircraft 20 atop the first and second wing engaging surfaces 2123a and 2123b of the aircraft engaging bracket 2120.

The fuselage-retaining assembly 2130 is sized to receive the fuselage of the fixed-wing aircraft 20. The fuselage-retaining assembly 2130 is configured such that, after it receives the fuselage, the fuselage-retaining assembly 2130 does not release the fuselage until: (1) the operator disengages a safety mechanism; and (2) a force biasing the fuselage-retaining assembly 2130 against releasing the fuselage is overcome. This prevents undesired launch of the fixed-wing aircraft 20.

Figure 8E:
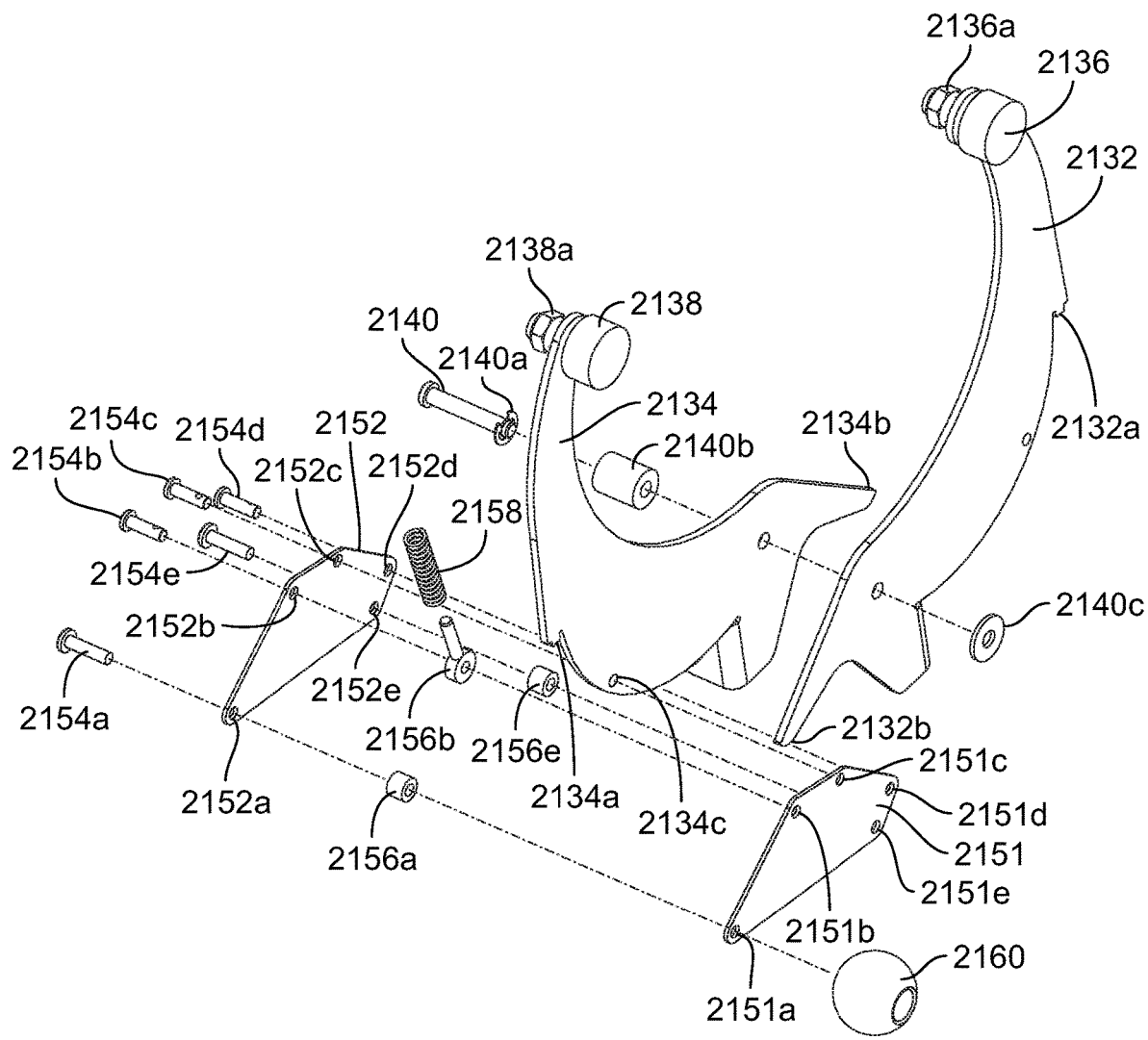
FIG. 8E is an exploded top perspective view of the fuselage-retaining assembly of the launch-assist assembly of FIG. 8C.
Figure 8F:
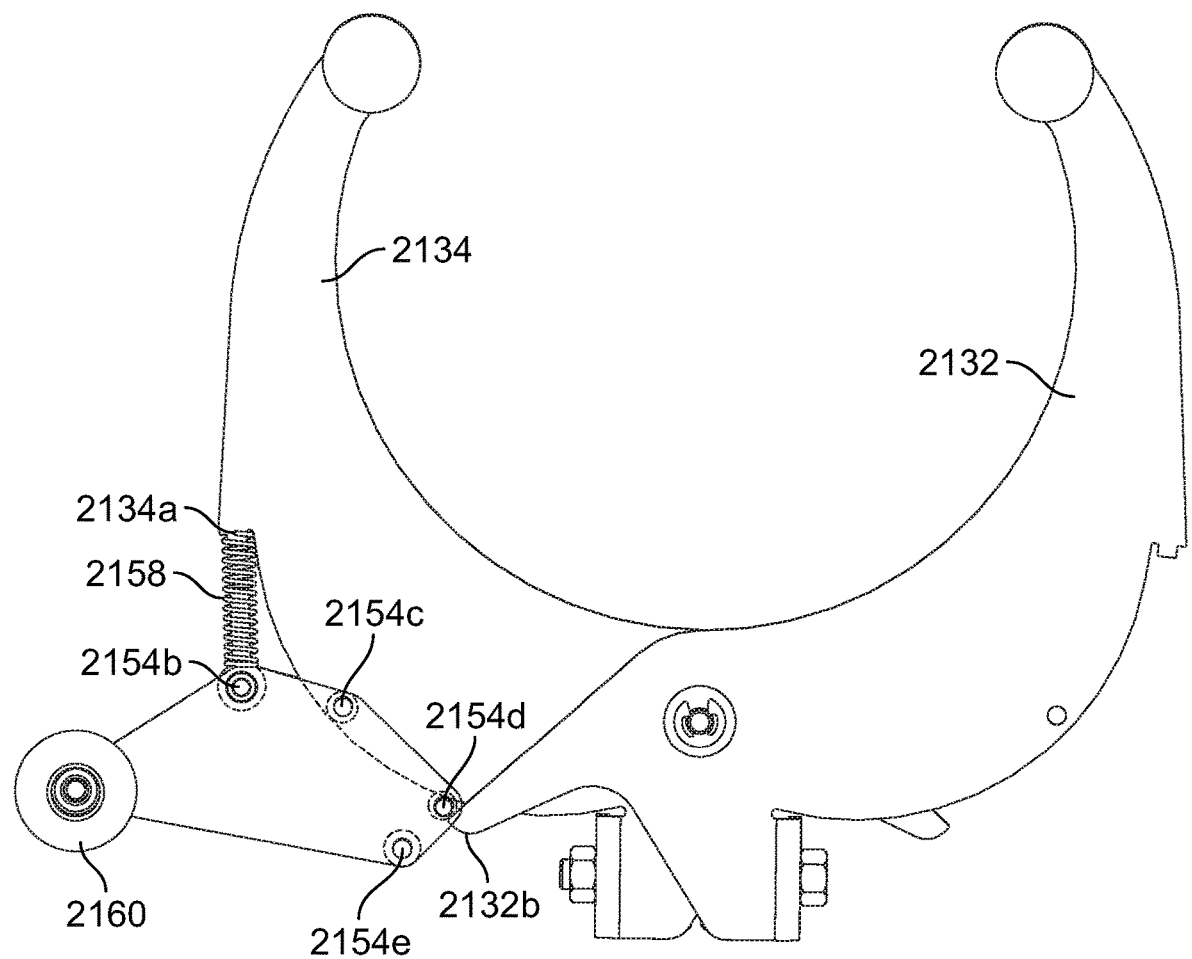
FIG. 8F is a front elevational view of the fuselage-retaining assembly of FIG. 8E.
Figure 8G:
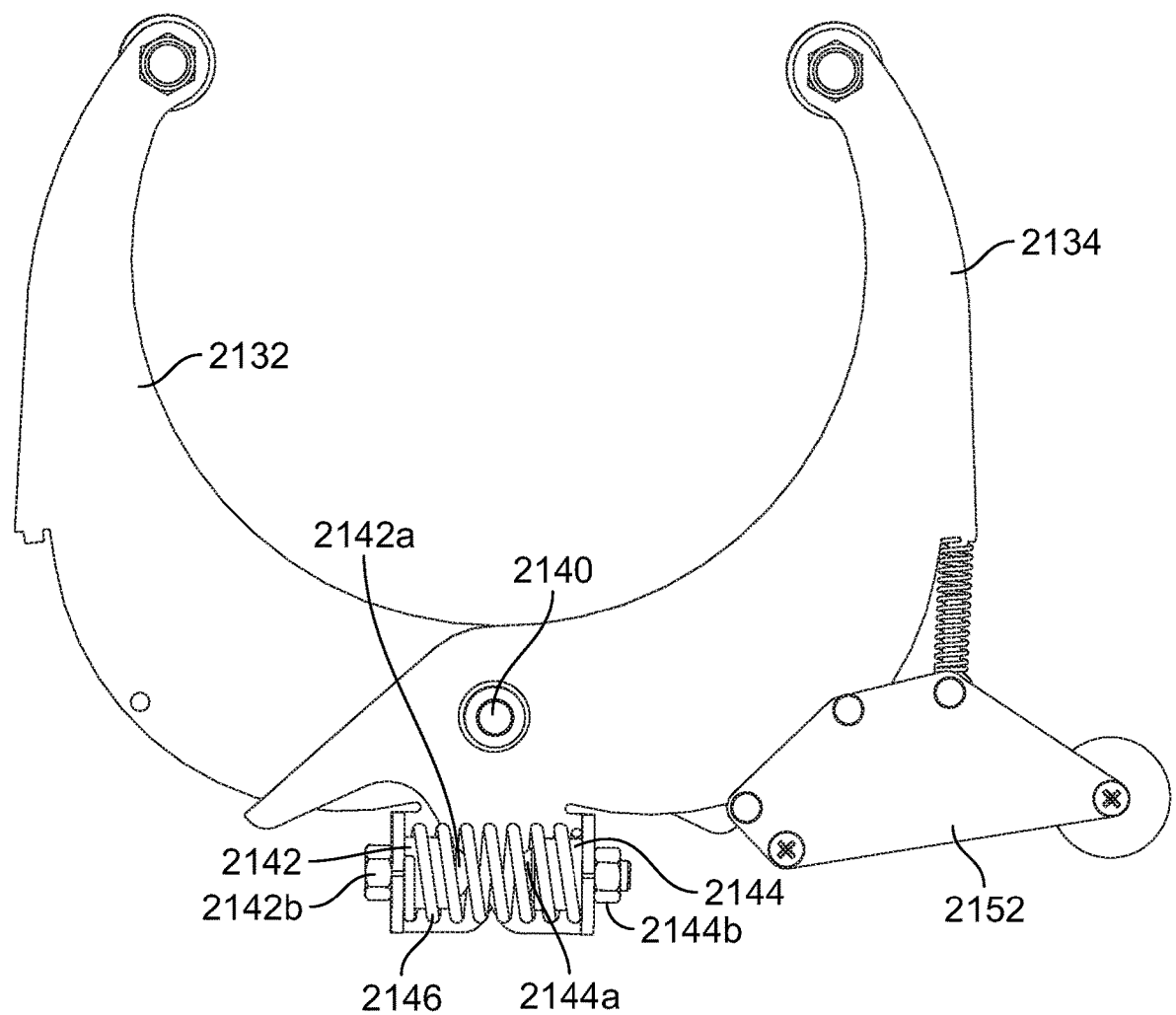
FIG. 8G is a back elevational view of the fuselage-retaining assembly of FIG. 8E.

As best shown in FIGS. 8E, 8F, and 8G, the fuselage-retaining assembly 2130 includes: (1) first and second pincers 2132 and 2134; (2) first and second rollers 2136 and 2138 and corresponding nuts 2136a and 2138a; (3) a grooved clevis pin 2140 and corresponding retaining ring 2140a, spacer 2140b, and washer 2140c; (4) first and second spring mounting spacers 2142 and 2144 and their corresponding fasteners 2142a and 2144a and nuts 2142b and 2144b; (5) a compression spring 2146; and (6) a safety mechanism 2150.

The safety mechanism 2150 includes: (1) front and rear plates 2151 and 2152; (2) fasteners 2154a and 2154e; (3) clevis pins 2154b, 2154c, and 2154d; (4) spacers 2156a and 2156e; (5) a rod end 2156b; (6) a compression spring 2158; and (7) a handle 2160.

The first and second pincers 2132 and 2134 are interchangeable, and have generally curved bodies that define rod end engagers 2132a and 2134a, respectively, along their outer edges and terminate at their lower ends in safety mechanism engagers 2132b and 2134b. The roller 2136 is attached via the nut 2136a to the upper end of the first pincer 2132, and the roller 2138 is attached via the nut 2138a to the upper end of the second pincer 2134. The rollers are rotatable with respect to their respective pincers. The first and second pincers 2132 and 2134 are pivotably connected to one another via the grooved clevis pin 2140, the spacer 2140b, the washer 2140c, and the retaining ring 2140a. Although not shown, the fuselage-retaining assembly 2130 is attached to the aircraft engaging bracket 2120 via this grooved clevis pin 2140.

In this embodiment, the first pincer is mounted on the grooved clevis pin in front of the second pincer (with respect to the view shown in FIG. 8E), though in other embodiments the second pincer may be mounted in front of the first pincer without changing how the fuselage-retaining assembly operates.

As best shown in FIG. 8G, the spring mounting spacer 2142 is mounted to a backwardly-extending portion of the first pincer 2132 via the fastener 2142a and the nut 2142b. Similarly, the spring mounting spacer 2144 is mounted to a backwardly-extending portion of the second pincer 2134 via the fastener 2144a and the nut 2144b. The compression spring 2146 is mounted on and extends between the spring mounting spacers 2142 and 2144.

The first and second pincers 2132 and 2134 are movable relative to one another from: (1) a fuselage-retaining orientation in which their upper ends are separated a first distance that is smaller than the diameter of the fuselage of the fixed-wing aircraft 20 (shown in FIGS. 8E and 8F); to (2) a fuselage-release orientation in which their upper ends are separated a second distance that is larger than the diameter of the fuselage of the fixed-wing aircraft 20 (not shown) (and vice-versa). Thus, when the first and second pincers 2132 and 2134 are in the fuselage-retaining orientation, the fuselage of the fixed-wing aircraft cannot escape the first and second pincers 2132 and 2134 (absent further separation of the pincers), while the fuselage can escape when the first and second pincers 2132 and 2134 are in the fuselage-release orientation.

The compression spring 2146 opposes separation of the first and second pincers 2132 and 2134 and therefore biases the first and second pincers 2132 and 2134 toward the fuselage-retaining orientation. Separating the first and second pincers 2132 and 2134 causes the backwardly-extending portions of the first and second pincers 2132 and 2134 to compress the compression spring 2146, which causes the compression spring 2146 to exert forces on the backwardly-extending portions of the first and second pincers 2132 and 2134 opposing that separation. Thus, to release the fuselage, this biasing force must be overcome.

Turning to the safety mechanism 2150, as best shown in FIG. 8E, the front plate 2151, the rear plate 2152, and the handle 2160 are attached to one another via: (1) the fastener 2154a extending through an opening 2152a in the rear plate 2152, through the spacer 2156a, through an opening 2151a in the front plate 2151, and into the handle 2160; (2) the clevis pin 2154b extending through an opening 2152b in the rear plate 2152, through an opening in the rod end 2156b, and through an opening 2151b in the front plate 2151; (3) the clevis pin 2154d extending through an opening 2152d in the second plate and an opening 2151d in the front plate 2151; and (4) the fastener 2154e extending through an opening 2152e in the rear plate 2152, through the spacer 2156e, and through an opening 2151e in the front plate 2151.

As best shown in FIGS. 8E and 8F, the safety mechanism 2150 is pivotably connected to the second pincer 2134 via the clevis pin 2154c extending through an opening 2152c in the rear plate 2152, an opening 2134c in the second pincer 2134, and an opening 2151c in the front plate 2151. One end of the safety compression spring 2158 is disposed around the rod end 2156b and the other end of the safety compression spring 2158 is disposed around the rod end engager 2134a of the second pincer 2134.

The safety mechanism 2150 is rotatable about the clevis pin 2134c from an engaged rotational position in which the safety mechanism 2150 prevents separation of the first and second pincers 2132 and 2134 from the fuselage-retaining orientation to the fuselage-release orientation (shown in FIGS. 8F and 8G) to a disengaged rotational position (not shown) in which the first and second pincers 2132 and 2134 are free to separate from the fuselage-retaining orientation to the fuselage-release orientation. The safety compression spring 2158 biases the safety mechanism 2150 into the engaged rotational position.

When in the engaged rotational position, the safety mechanism 2150 prevents separation of the first and second pincers 2132 and 2134 from the fuselage-retaining orientation to the fuselage-release orientation. Separating the first and second pincers 2132 and 2134 when the safety mechanism 2150 is in the engaged rotational position results in: (1) the safety mechanism engager 2132b of the first pincer 2132 engaging the clevis pin 2154d (since the clevis pin 2154d is in the path of rotation of the safety mechanism engager 2132b of the first pincer 2132); and (2) the rod end engager 2134a of the second pincer 2134 engaging the rod end 2136b. This prevents the first and second pincers 2132 and 2134 from rotation relative to one another and therefore prevents further separation of the first and second pincers 2132 and 2134 to the fuselage-release orientation.

To enable the first and second pincers 2132 and 2134 to separate from the fuselage-retaining orientation to the fuselage-release orientation, the operator disengages the safety mechanism by rotating the safety mechanism 2150 from the engaged rotational position to the disengaged rotational position. To do so, the operator pulls the handle 2160 upward with enough force to overcome the spring-biasing force of the compression spring 2158 and compress the compression spring 2158 until the clevis pin 2154d is no longer in the path of rotation of the safety mechanism engager 2132b of the first pincer 2132. At this point, the safety mechanism 2150 is in the disengaged rotational position, and the first and second pincers 2132 and 2134 can separate to the fuselage-release orientation.

In certain embodiments, a safety rope, tether, wire, cable, or other flexible member is attached to the handle (or any other suitable component) of the safety mechanism to facilitate disengaging the safety mechanism. When the flexible safety member is tensioned (such as via an operator pulling on the flexible safety member), the safety mechanism rotates from the engaged rotational position to the disengaged rotational position, thereby disengaging the safety mechanism. The flexible safety member may be relatively long, which enables the operator to stand a safe distance away from the fixed-wing aircraft during the launch process and still be able to disengage the safety mechanism.

By intentionally commanding full multicopter thrust without releasing the safety mechanism, an operator may execute a "refuse takeoff" test, which is particularly useful for confirming full-power performance of the complete electromechanical system without fear of flight-related mishap in the event that one or more components of the system should fail during the test.

2.2 Rotor Arm Module and Rear Landing Gear Module Storage Device

Figure 8H:
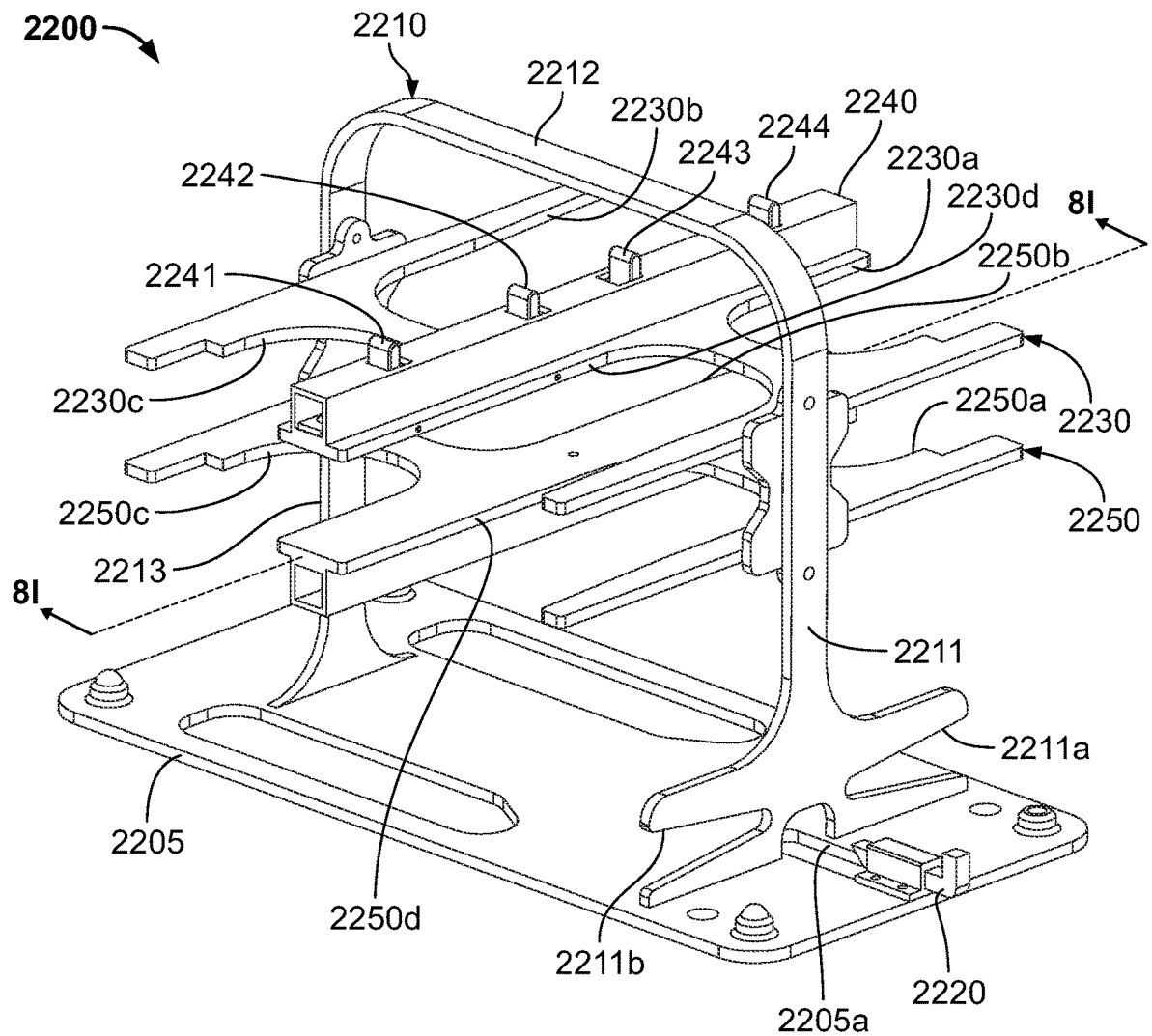
FIG. 8H is a top perspective view of the rotor arm module and rear landing gear module storage device of the present disclosure.
Figure 8I:
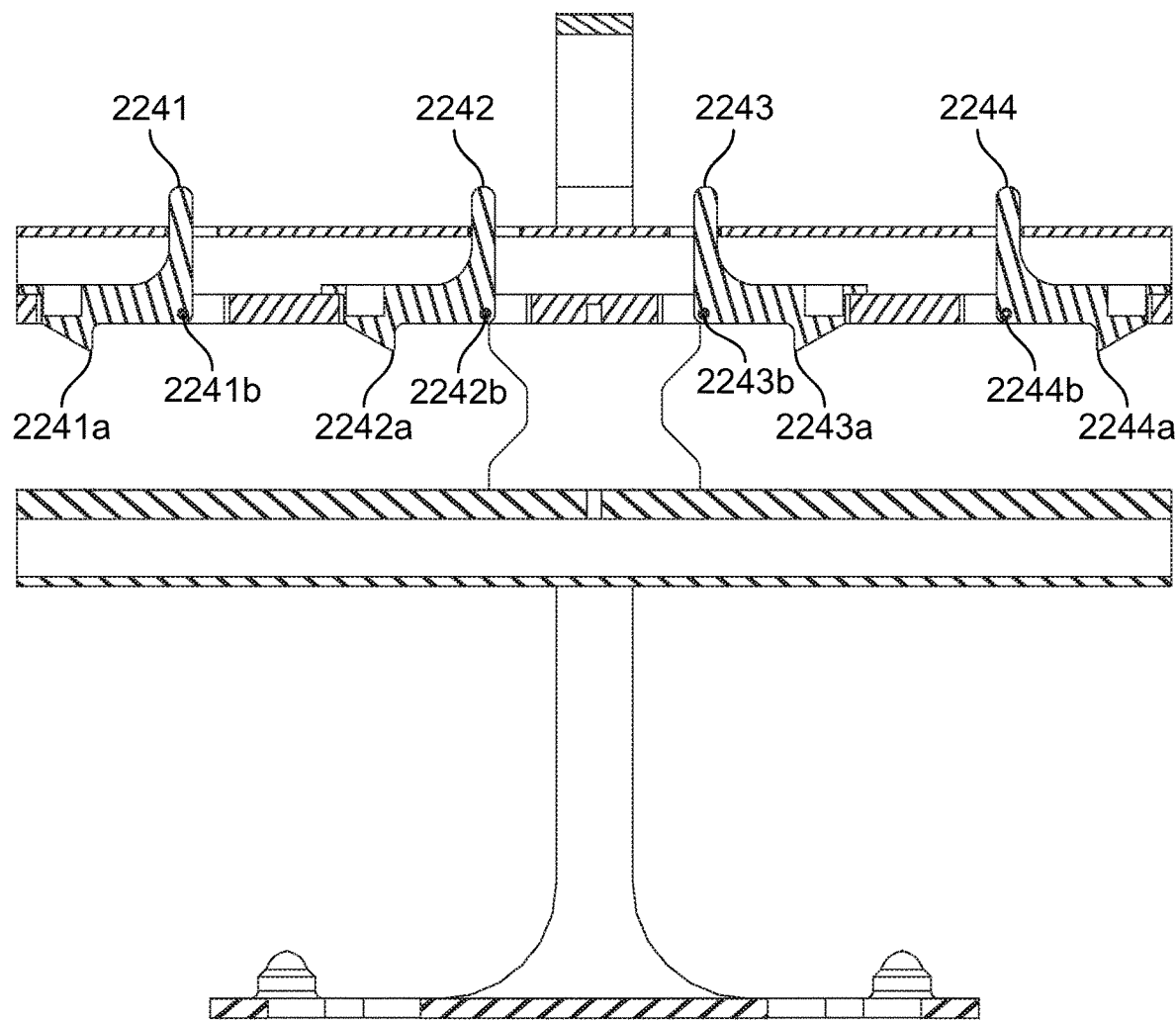
FIG. 8I is a cross-sectional view of the rotor arm module and rear landing gear module storage device of FIG. 8H taken substantially along line 8I-8I of FIG. 8H.

The rotor arm module and rear landing gear module storage device 2200 is shown in FIGS. 8H and 8I. The rotor arm module and rear landing gear module storage device 2200 is the element of the storage and launch system 2000 to which the rotor arm modules 400a to 400d and the rear landing gear modules 600c and 600d can be mounted and compactly stored. The rotor arm module and rear landing gear module storage device 2200 includes: (1) a base 2205; (2) a handle 2210; (3) an upper rotor arm module constraining plate 2230; (4) a lower rotor arm module constraining plate 2250; and (5) a lock 2220 (which is a slide bolt in this embodiment but can be any suitable device).

The base 2205 defines a storage device lock engager receiving cavity 2205a therethrough sized to receive the storage device lock engager 2112 of the launch-assist assembly 2100. The lock 2220 is fixedly attached to the base 2205 near the storage device lock engager receiving cavity such that the lock 2220 can engage the storage device lock engager 2112 when the storage device lock engager 2112 is received in the storage device lock engager receiving cavity 2205a to lock the rotor arm module and rear landing gear module storage device 2200 to the launch assist assembly 2100.

The handle 2210 includes two opposing, spaced-apart sides 2211 and 2213 and a top 2212 extending between the sides 2211 and 2213. The sides 2211 and 2213 are attached to the base 2205. The side 2211 includes two surfaces 2211a and 2211b each defining a rear landing gear module receiving cavity sized and shaped to receive a portion of one of the rear landing gear modules 600c and 600d.

The upper rotor arm module constraining plate 2230 is attached to the handle 2210. The upper rotor arm module constraining plate 2230 includes a plurality of surfaces 2230a, 2230b, 2230c, and 2230d each defining a rotor motor receiving cavity sized and shaped to receive a rotor motor of one of the rotor arm modules.

The upper rotor arm module constraining plate 2230 also includes a plurality of rotor arm module retainers 2241, 2242, 2243, and 2244 disposed within an enclosing bracket 2240. The rotor arm module retainer 2241 includes a locking tab 2241a extending below the upper rotor arm module constraining plate 2230 and is pivotably connected to the upper rotor arm module constraining plate 2230 via a pin 2241b. The rotor arm module retainer 2242 includes a locking tab 2242a extending below the upper rotor arm module constraining plate 2230 and is pivotably connected to the upper rotor arm module constraining plate 2230 via a pin 2242b. The rotor arm module retainer 2243 includes a locking tab 2243a extending below the upper rotor arm module constraining plate 2230 and is pivotably connected to the upper rotor arm module constraining plate 2230 via a pin 2243b. The rotor arm module retainer 2244 includes a locking tab 2244a extending below the upper rotor arm module constraining plate 2230 and is pivotably connected to the upper rotor arm module constraining plate 2230 via a pin 2244b.

The rotor arm module retainers are pivotable from a lock rotational position (shown in FIG. 8I) to a release rotational position (not shown). Suitable biasing elements (such as compression spring, not shown) bias the rotor arm module retainers to the lock rotational position.

The lower rotor arm module constraining plate 2250 is attached to the handle 2210 below the upper rotor arm module constraining plate 2230. The lower rotor arm module constraining plate 2250 includes a plurality of surfaces 2250a, 2250b, 2250c, and 2250d each defining a rotor motor receiving cavity sized and shaped to receive a rotor motor of one of the rotor arm modules.

2.3 Hub Module Storage Tray

Figure 8J:
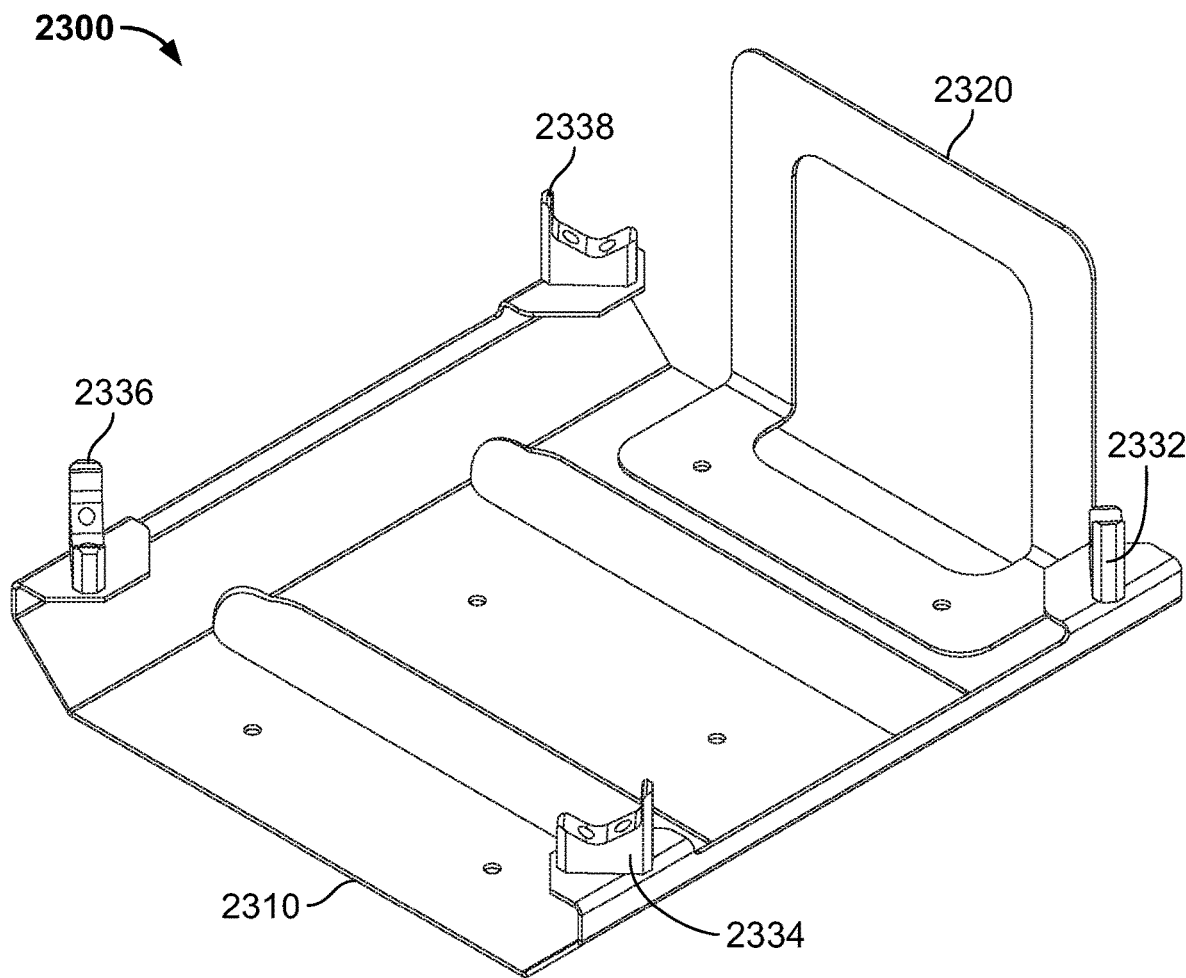
FIG. 8J is a top perspective view of the hub module storage tray of the present disclosure.

The hub module storage tray 2300 is shown in FIG. 8J. The hub module storage tray 2300 is the element of the storage and launch system 2000 to which the hub module 200 is mounted for storage. The hub module storage tray 2300 includes a generally rectangular base 2310, a handle 2320 fixedly attached to the base 2310, and four female blind mate connector engagers 2332, 2334, 2336, and 2338 fixedly attached to the base 2310. The female blind mate connector engagers are sized and shaped to engage the top surfaces of the female blind mate connectors 231 of the hub module 100.

2.4 Storing the Multicopter in the Multicopter Storage Container

To store the multicopter 10 in the container of the storage and launch system 2000, the operator first disassembles the multicopter 10 into the 13 modules or subassemblies, as described above. The operator moves the launch-assist assembly 2100 into its launch position.

The operator positions the rotor arm module and rear landing gear module storage device 2200 atop the launch-assist assembly 2100 such that the storage device lock engager 2112 of the launch-assist assembly 2100 is received in the storage device lock engager receiving cavity 2205a. The operator engages the storage device lock engager 2112 with the lock 2220 to lock the rotor arm module and rear landing gear module storage device 2200 to the launch assist assembly 2100.

The operator slides the rotor arm module 400a into the space between the upper and lower rotor arm module constraining plates 2230 and 2250 of the rotor arm module and rear landing gear module storage device 2200 until: (1) the lower rotor motor is disposed within the rotor motor receiving cavities defined by the surfaces 2230b and 2250b; and (2) the rotor arm module retainer 2243 locks the rotor arm module 400a into place.

The operator slides the rotor arm module 400b into the space between the upper and lower rotor arm module constraining plates 2230 and 2250 of the rotor arm module and rear landing gear module storage device 2200 until: (1) the lower rotor motor is disposed within the rotor motor receiving cavities defined by the surfaces 2230d and 2250d; and (2) the rotor arm module retainer 2242 locks the rotor arm module 400b into place.

The operator slides the rotor arm module 400c into the space between the upper and lower rotor arm module constraining plates 2230 and 2250 of the rotor arm module and rear landing gear module storage device 2200 until: (1) the upper rotor motor is disposed within the rotor motor receiving cavities defined by the surfaces 2230c and 2250c; and (2) the rotor arm module retainer 2241 locks the rotor arm module 400c into place.

The operator slides the rotor arm module 400d into the space between the upper and lower rotor arm module constraining plates 2230 and 2250 of the rotor arm module and rear landing gear module storage device 2200 until: (1) the upper rotor motor is disposed within the rotor motor receiving cavities defined by the surfaces 2230a and 2250a; and (2) the rotor arm module retainer 2244 locks the rotor arm module 400d into place.

The operator inserts the front landing gear modules 600a and 600b into the first and second front landing gear module retainers 2110a and 2110b on the tray 2108 of the launch-assist assembly 2100.

The operator inserts the rear landing gear module 600c into the rear landing gear module receiving cavity defined by the surface 2211b and the rear landing gear module 600d into the rear landing gear module receiving cavity defined by the surface 2211a.

The operator places the landing gear extensions 500a to 500d in the container bottom 2000a behind the handle 2320 of the hub module storage tray 2300. The operator attaches the container top 2000b to the container bottom 2000a to complete storage.

The operator inverts the hub module 100 and engages the female blind mate connector engagers 2332, 2334, 2336, and 2338 of the hub module storage tray 2300 with the female blind mate connectors 231 of the hub module 100.

The operator moves the launch-assist assembly 2100 to the storage position.

In certain embodiments, the container top or the container bottom includes one or more handles (such as an extendable handle) or one or more wheels to facilitate moving the container. In certain embodiments, the container top or the container bottom includes one or more locks configured to lock the container top to the container bottom.

3. Anchor System

The anchor system 3000 is shown in FIGS. 9A to 9D. The anchor system 3000 is usable along with the multicopter 10 and the flexible capture member 5000 to retrieve the fixed-wing aircraft 20 from wing-borne flight. In this example embodiment, the anchor system 3000 is stored separately from the storage and launch system 2000. That is, the storage and launch system 2000 is stored in one container (along with the multicopter 10) and the anchor system 3000 is stored in another container. These containers may be to identical or different from one another.

Figure 9A:
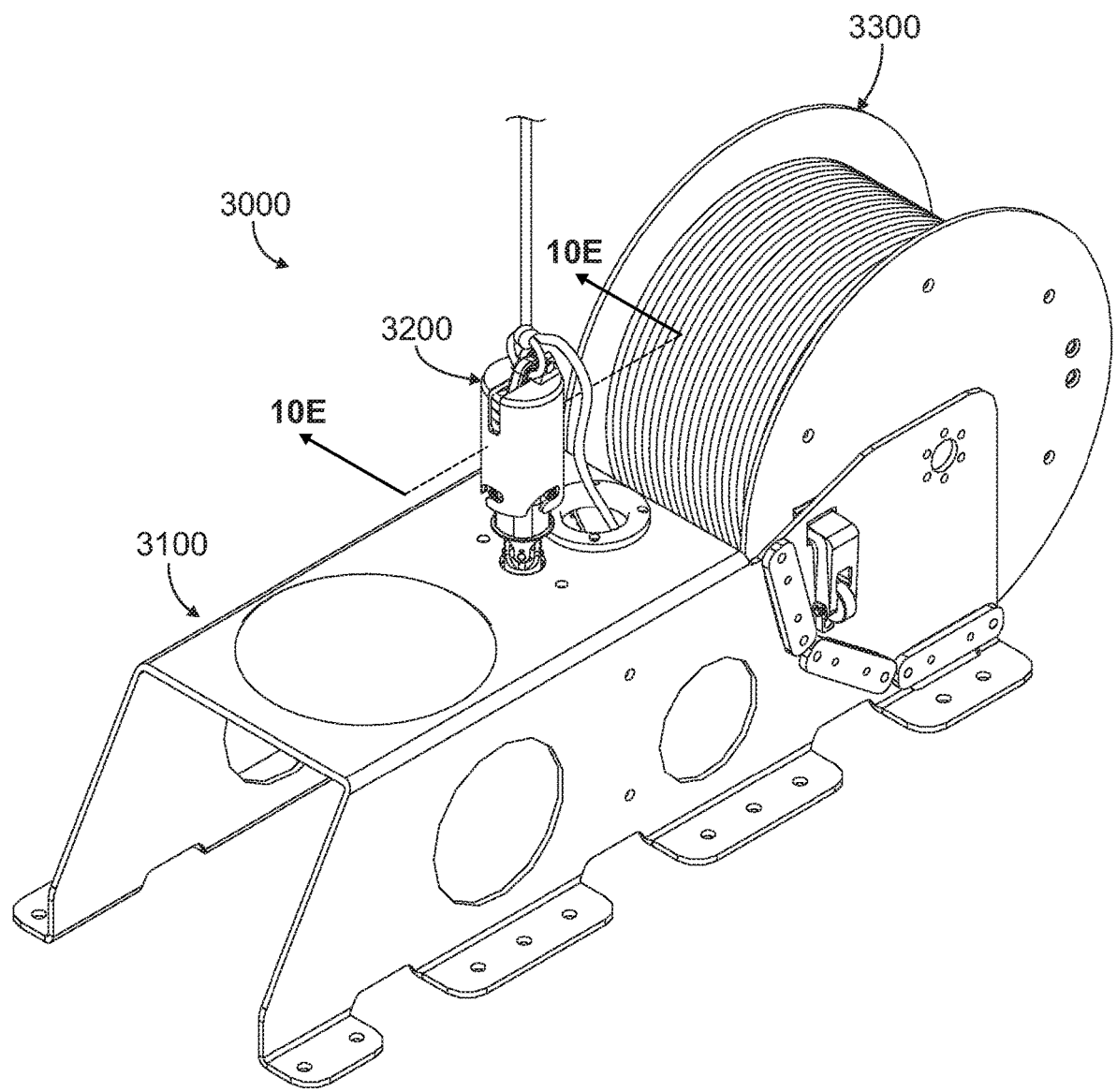
FIG. 9A is a top perspective view of one example embodiment of the anchor system of the present disclosure.
Figure 9B:
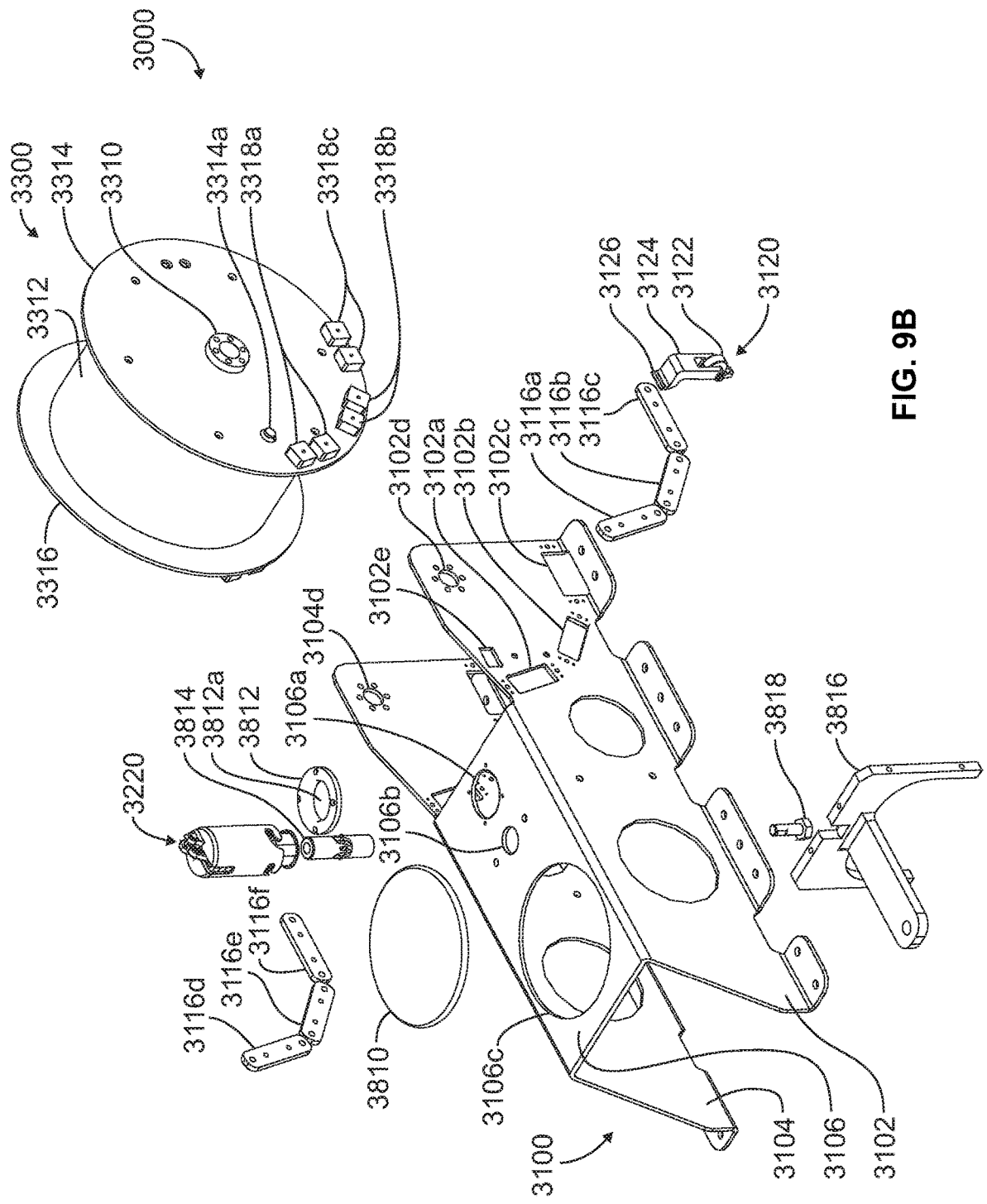
FIG. 9B is a partially-exploded top perspective view of the anchor system of FIG. 9A.

As best shown in FIGS. 9A and 9B, the anchor system includes: (1) an anchor system base 3100; (2) a breakaway device 3200 attached to the anchor system base 3100; and (3) a flexible capture member payout and retract device 3300 attached to the anchor system base 3100. Example embodiments of each of these elements are described below.

3.1 Anchor System Base

As best shown in FIGS. 9A and 9B, the anchor system base 3100 is the element of the anchor assembly 3000 that serves as a mount for the remaining elements of the anchor system 3000. The anchor system base 3100 includes two spaced-apart generally parallel sides 3102 and 3104 and a top 3106 transverse (such as generally perpendicular) to, extending between, and connecting the sides 3102 and 3104.

The side 3102 defines: (1) first, second, and third braking openings 3102a, 3102b, and 3102c therethrough; (2) a stator mounting opening 3102d therethrough; and (3) a locking element engager receiving opening 3102e therethrough. The side 3104 defines similar openings therethrough, some of which are not shown or labeled.

The top 3106 defines: (1) a fairlead mounting opening 3106*a* therethrough; (2) a U-joint mounting opening 3106*b* therethrough; and (3) a GPS receiver mounting opening 3106*c* therethrough.

A GPS receiver and U-joint mount 3816 is attached to the underside of the top 3106 of the anchor system base 3100 such that it is positioned within the cavity formed by the sides 3102 and 3104 and the top 3106. A GPS receiver 3810 is attached to the GPS receiver and U-joint mount 3816 such that the GPS receiver 3810 extends through the GPS receiver mounting opening 3106*c* of the top 3106. A U-joint 3814 is attached to the GPS receiver and U-joint mount 3816 via bolt 3818 such that the U-joint 3814 extends through the U-joint mounting opening 3106*b* of the top 3106.

A fairlead 3812 is attached to the upper surface of the top 3106 such that a flexible capture member receiving opening 3812*a* defined through the fairlead 3812 is generally aligned with the fairlead mounting opening 3106*a* of the top 3106.

Backing plates 3116*a*, 3116*b*, and 3116*c* are attached to the exterior surface of the side 3102 such that they generally cover the braking openings 3102*a*, 3102*b*, and 3102*c*, respectively. Backing plates 3116*d*, 3116*e*, and 3116*f* are attached to the exterior surface of the side 3104 such that they generally cover respective braking openings (not shown). The backing plates 3116*a* to 3116*f* are made of iron in this embodiment. Magnets 3318*a* are attached to the backing plate 3116*a* such that the magnets 3318*a* extend through the braking opening 3102*a*, magnets 3318*b* are attached to the backing plate 3116*b* such that the magnets 3318*b* extend through the braking opening 3102*b*, and magnets 3318*c* are attached to the backing plate 3116*c* such that the magnets 3318*c* extend through the braking opening 3102*c*. Similar magnets are attached to the backing plates 3316*d*, 3316*e*, and 3316*f*. FIG. 9B shows the magnets' position relative to the first flange of the flexible capture member and payout device (described below).

A rotation prevention device 3120 is also attached to the exterior surface of the side 3102 near the locking element engager receiving opening 2102*e* of the side 3012. The rotation prevention device 3120 includes a mount 3122 (such as a pillow block bearing), a retract spring (not shown), and a pawl 3124 pivotably attached to the mount 3122. A locking element engager 3126 extends from the free end of the pawl 3124. The rotation prevention device 3120 is attached to the side 3102 such that the locking element engager 3126 extends through the locking element engager receiving opening 3102*e*. The pawl 3124 is rotatable about its pivotable attachment to the mount 3122 from a locked position in which the locking element engager 3126 contacts the end cap 3314 and can engage the locking element 3314*a* and an unlocked position in which the locking element engager does not contact the end cap 3314 and cannot engage the locking element 3314*a*. The rotation-prevention device 3120 automatically retracts in the payout direction, and it remains clear as the flexible capture member payout and retract device (described below) retracts the flexible capture member post-capture. This automatically-retracting rotation prevention device 3120 enables an operator to preload the flexible capture member payout and retract device during preflight and, upon impact during capture, the flexible capture member payout and retract device can retract more flexible capture member length than it paid out. This feature is particularly useful for minimizing pendula swing of the fixed wing aircraft 20 as it is lowered to the ground post-capture.

3.2 Breakaway Device

Figure 9C:
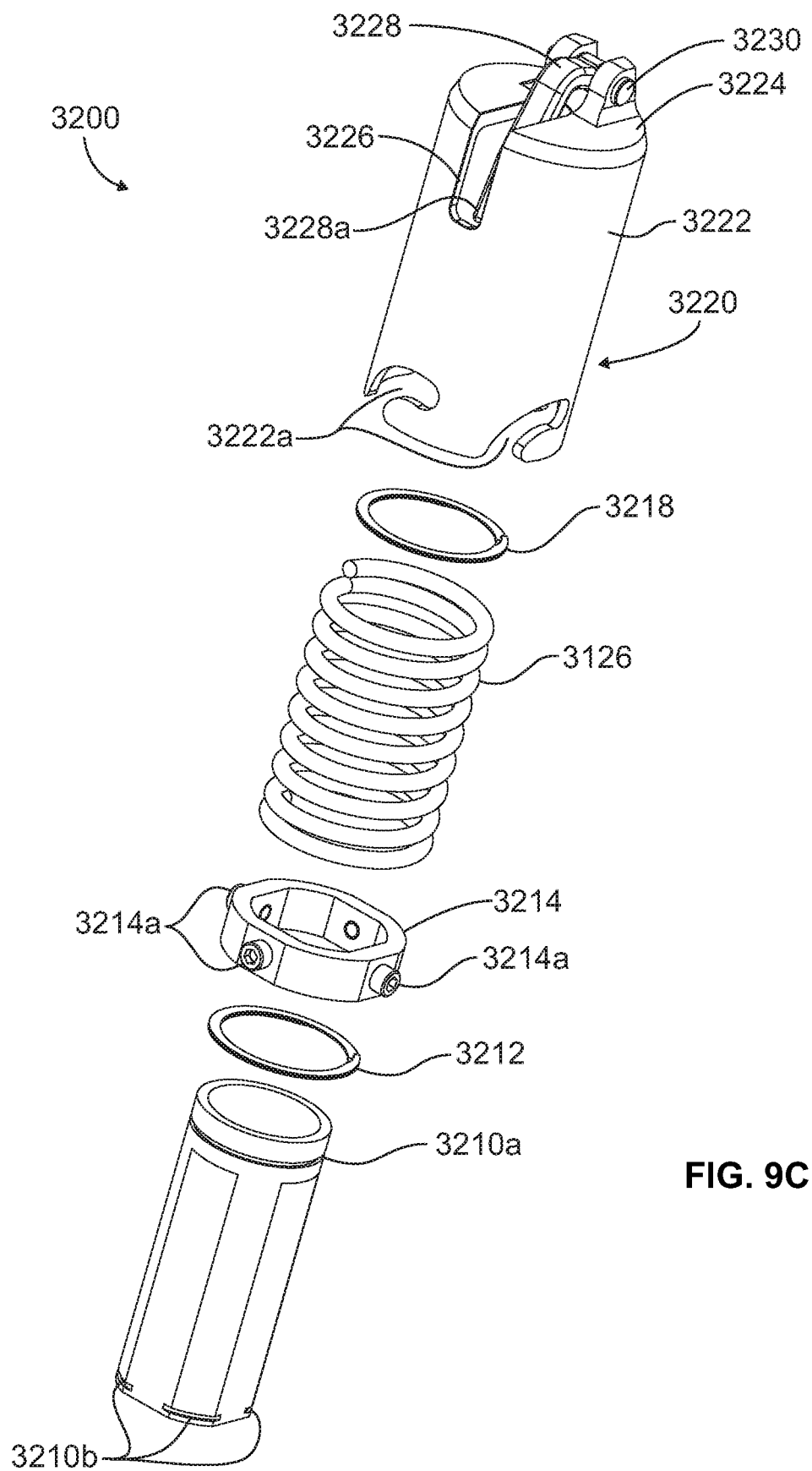
FIG. 9C is an exploded top perspective view of the breakaway device of the anchor system of FIG. 9A.

As best shown in FIG. 9C, the breakaway device 3200 enables the multicopter 10 to maintain a desired tension in the flexible capture member 5000 before the fixed-wing aircraft 20 captures the flexible capture member 5000 during retrieval. The breakaway device 3200 prevents the flexible capture member payout and retract device 3300 from paying out or retracting the flexible capture member 5000 until a tension in the flexible capture member 5000 reaches a certain threshold during retrieval. The breakaway device 3200 includes: (1) a generally cylindrical hollow shaft 3210; (2) a lower retaining ring 3212; (3) a generally annular collar 3214; (4) a compression spring 3216; (5) an upper retaining ring 3218; and (6) a breakaway sleeve 3220.

The shaft 3210 defines an upper retaining ring seat 3210*a* near its upper end in which the upper retaining ring 3218 is seated such that the upper retaining ring 3218 cannot slide along the shaft 3210 and a plurality of grooves forming a lower retaining ring seat 3210*b* in which the lower retaining ring 3212 is seated such that the lower retaining ring 3212 cannot slide along the shaft 3210.

The collar 3214 is slidably mounted around the shaft 3210 between the upper retaining ring 3218 and the lower retaining ring 3212. The collar includes a plurality of breakaway sleeve retainers 3214*a* that extend radially-outward from the outer surface of the collar 3214.

The compression spring 3216 is slidably mounted around the shaft 3210 between the upper retaining ring 3218 and the collar 3214.

The breakaway sleeve 3220 includes a generally cylindrical hollow body 3222 and a cap 3224 at its upper end. The lower end of the body 3222 defines a plurality of breakaway sleeve retainer receiving slots 3222*a* therethrough. The breakaway sleeve retainer receiving slots 3222*a* are open at one end, extend generally upward and circumferentially around the body 3222, and dip slightly downward before terminating. A finger 3228 is pivotably attached to the cap 3224 via a suitable fastener 3230 (such as a grooved clevis pin and retaining ring). The body 3222 and the cap 3224 define a finger escape slot 3226 therethrough. The finger 3228 is rotatable from a rotational position in which the free end 3228*a* of the finger 3228 is located within the interior of the breakaway sleeve 3220 to a rotational position in which the free end 3228*a* is outside of the interior of the breakaway sleeve 3220 (after passing through the finger escape slot 3226).

The breakaway sleeve 3220 is removably attachable to the collar 3214 via the breakaway sleeve retainers 3214*a* and the breakaway sleeve retainer receiving slots 3222*a*. To attach the breakaway sleeve 3220 to the collar 3214, the operator: (1) aligns the openings of the breakaway sleeve retainer receiving slots 3222*a* of the breakaway sleeve 3220 with the breakaway sleeve retainers 3214*a* of the collar 3214; (2) pushes downward on the breakaway sleeve 3220 to slightly compress the compression spring 3216 until the openings of the breakaway sleeve retainer receiving slots 3222*a* receive the breakaway sleeve retainers 3214*a*; (3) rotates the breakaway sleeve 3220 with respect to the collar 3214 such that the breakaway sleeve retainers travel through and to the end of their respective breakaway sleeve retainer receiving slots 3222*a* (clockwise with respect to the view shown in FIG. 9C); and (4) releases the breakaway sleeve 3220, which enables the compression spring 3216 to extend and lock the breakaway sleeve retainers 3214*a* within their respective breakaway sleeve retainer receiving slots 3222*a*. To detach the breakaway sleeve 3220 form the collar 3214, the operator reverses the process.

The breakaway device 3220 is fixedly attached to the U-joint 3814 of the anchor system base 3100.

3.3 Flexible Capture Member Payout and Retract Device

As best shown in FIG. 9B, the flexible capture member payout and retract device 3300 absorbs a portion of the kinetic energy of the fixed-wing aircraft 20 after the fixed-wing aircraft 20 captures the flexible capture member 5000 by paying out part of the flexible capture member 5000 after capture from a spool while simultaneously applying various braking forces to the spool to slow the aircraft. As the aircraft slows and comes to a stop, flexible capture member payout and retract device 3300 retracts at least part of the paid-out flexible capture member 5000 to generally prevent the now-dangling fixed-wing aircraft 20 from swinging around below the multicopter 10.

The flexible capture member payout and retract device 3300 includes: (1) a stator 3310; (2) a drum 3312 rotatably mounted to the stator 3310; (3) a first electrically conductive flange 3314 having a locking element 3314a extending therefrom and fixedly attached to one end of the drum 3312; and (4) a second electrically conductive flange 3316 fixedly attached to the opposite end of the drum 3312.

The flexible capture member payout and retract device 3300 is attached to the anchor system base 3100 via the stator 3310. Specifically, the flexible capture member payout and retract device 3300 is attached to the anchor system base 3100 such that the stator 3310 extends between the first and second stator mounting openings 3102d and 3104d of the first and second sides 3102 and 3104 of the anchor system base 3100.

Although not shown, the flexible capture member payout and retract device 3300 also includes a suitable biasing element—such as a power spring—disposed within the interior of the drum 3312. Inside the drum 3312, the arbor end of the power spring is anchored to the stator 3310. Upon impact, during retrieval, the power spring is forced to wrap around the stator 3310, transferring wraps from the drum 3312 to the stator 3310 inside the flexible capture member payout and retract device 3300. After the kinetic energy of the fixed-wing aircraft 20 has been absorbed, the power spring works to retract (i.e., reverse payout) of the flexible capture member. This payout reversal helps in two ways: (1) it attenuates the backswing tendency of the captured fixed-wing aircraft 20, and (2) it allows the operator to begin a controlled descent of the fixed-wing aircraft 20 to the ground.

3.4 Flexible Capture Member

Figure 10D:
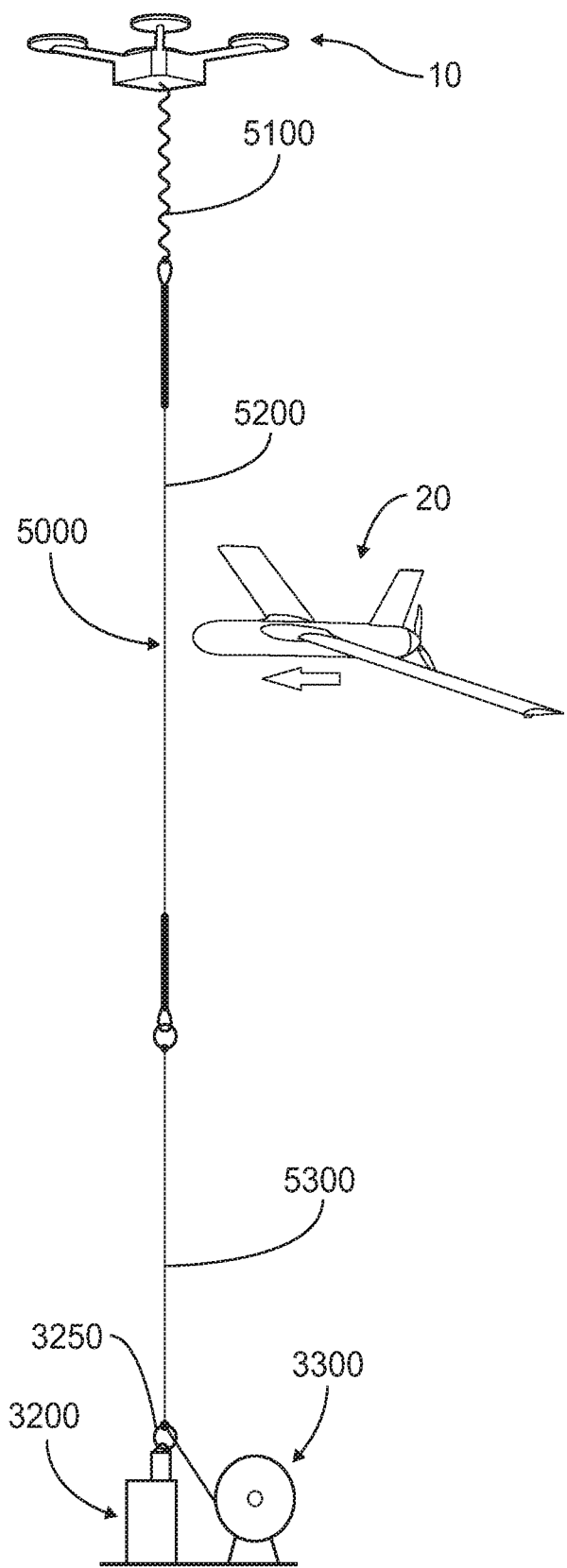
FIG. 10D is a diagrammatic view of the multicopter of FIG. 1A, the fixed-wing aircraft, the flexible capture member of the present disclosure, the breakaway device of FIG. 9C, and the flexible capture member payout and retract device of the anchor system of FIG. 9A just before capture.

As best shown in FIG. 10D, a flexible capture member 5000 is attachable to the multicopter 10 and the anchor system 3000 to facilitate retrieval of the fixed-wing aircraft 20 from wing-borne flight. The flexible capture member 5000 includes: (1) an elastic portion 5100; (2) a capture portion 5200; and (3) a retractable portion 5300.

The elastic portion 5100 is a bungee or similar element, and is attachable at one end to the cam 350 of the hub module 100 and at the other end to the capture portion 5200. The elastic portion may be rigged such that a portion of the strain energy is directed into a damping element such as a metal ring or a one-way pulley. By rigging the elastic portion as a compliant damper (as opposed to a spring), more energy is absorbed during capture, and undesirable ricochet is minimized.

The capture portion 5200 is a rope or similar element (such as Spectra rope) attachable at one end to the elastic portion 5100 and at the other end to the retractable portion 5300. The capture portion 5200 is the portion of the flexible capture member 5000 that the fixed-wing aircraft 20 captures during retrieval. Here, the capture portion 5200 is thicker near its ends (such as within 12 feet of each end) that it is in its center. In one embodiment, both ends of the capture portion terminate in a Brummel eye splice in which the buried tails constitute the thicker portion of the capture portion 5200.

The retractable portion 5300 is a rope or similar element attachable at one end to the capture portion 5200, partially wound around the drum 3312 of the flexible capture member payout and retract device 3300, and attached to the flexible capture member payout and retract device 3300. The retractable portion may be further improved by inserting an elastic member inside the core of the rope. The elastic member shortens the rope as it slackens and is wound onto the drum. During payout, the elastic member allows the rope to lengthen as it leaves the drum, and a lossy payout device is formed. This detail is especially helpful during a dynamic braking event, in which spool inertia and limited power spring stroke can impart undesirable acceleration spikes on the aircraft.

3.5 Accessories Container and Other Components

Figure 9D:
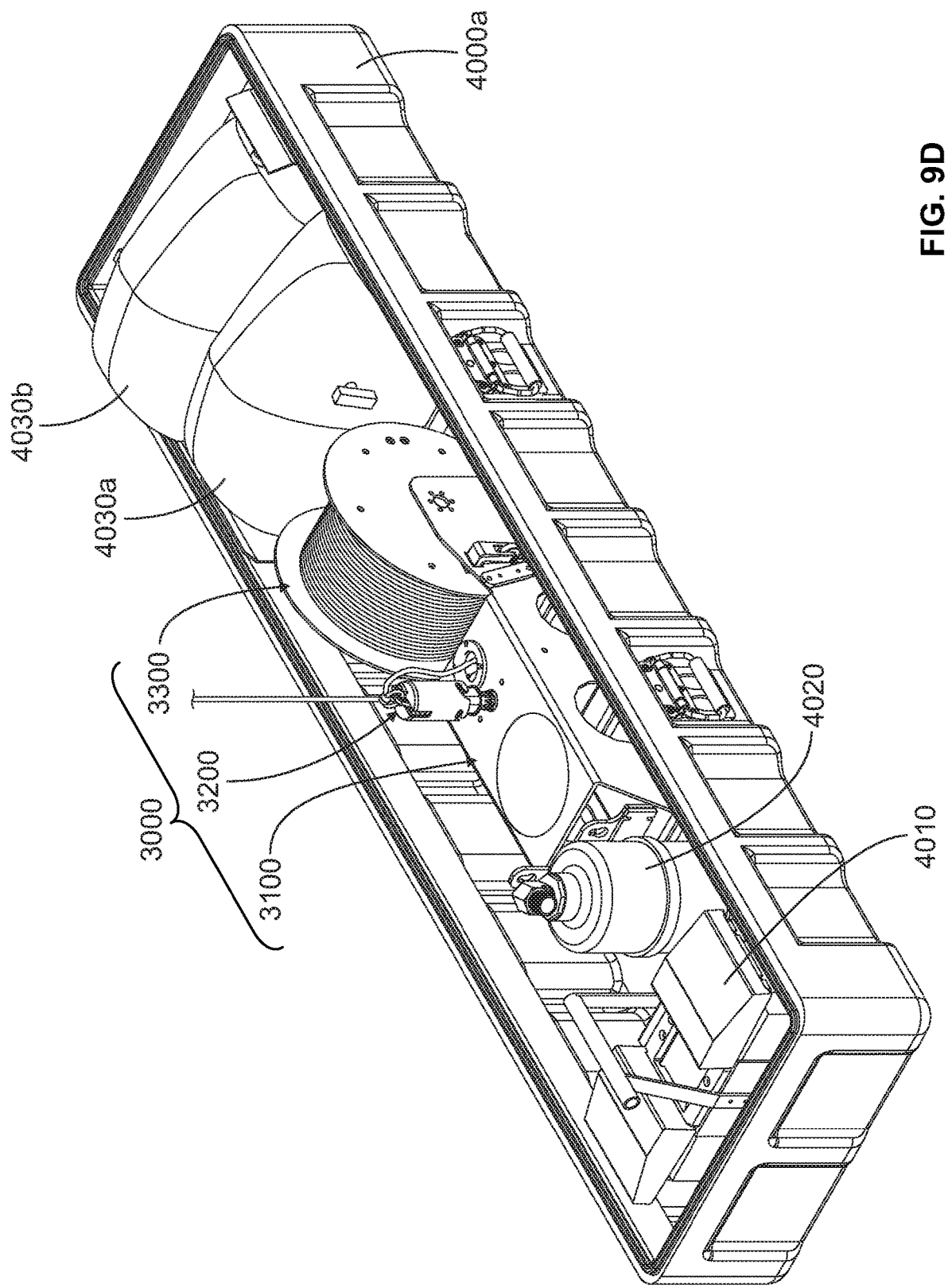
FIG. 9D is a top perspective view of the anchor system of FIG. 9A stored within a storage container along with other accessories.

As best shown in FIG. 9D, the anchor system 3000 is attached to the container bottom 4000a of an anchor system and accessory storage container to enable easy and compact storage of the anchor system 3000 and various accessories, such as (but not limited to): (1) a battery charger 4010 usable to recharge the batteries 260a to 260d of the multicopter 10; (2) an engine cooling system 4020 usable during pre-launch of the fixed-wing aircraft 20 to cool the engine of the fixed-wing aircraft 20; (3) two generators 4030a and 4030b; (4) the flexible capture member 5000; (5) an R/C transmitter stand that helps enforce geo-referenced joystick commands of the R/C controller; (6) extra nozzles for the engine cooling system; (7) a fire extinguisher; (8) shovels; (9) hard hats; (10) a parallel cable usable to enable the generators 4030a and 4030b to load-share; (11) an extra fuel tank; (12) spare hooks for the fixed-wing aircraft 20; (13) a laptop computer; and (14) weights for ballast.

4. Methods of Operation

As described in detail below: (1) the multicopter 10 and the storage and launch system 2000 are usable to facilitate launch of the fixed-wing aircraft 20 into wing-borne flight; and (2) the multicopter 10, the anchor system 3000, and the flexible capture member 5000 are usable to facilitate retrieval of the fixed-wing aircraft 20 from wing-borne flight.

4.1 Multicopter-Assisted Fixed-Wing Aircraft Launch Method

The multicopter-assisted fixed-wing aircraft launch method begins with the multicopter 10 disassembled and stored in the storage and launch system 2000, as best shown in FIGS. 8A and 8B. The operator unpacks the 13 modules and moves the launch-assist assembly 2100 of the storage and launch system 2000 to its launch position, as best shown in FIG. 8C.

The operator mounts the fixed-wing aircraft 20 to the launch-assist assembly 2100 by: (1) disengaging the safety mechanism 2150 of the fuselage-retaining assembly 2130, which enables the pincers 2132 and 2134 to separate from the fuselage-retaining orientation to the fuselage-release orientation; (2) lowering the fuselage of the fixed-wing aircraft 20 between the pincers 2132 and 2134 (the fact that the safety mechanism 2150 is disengaged enables weight of the fixed-wing aircraft to force the pincers 2132 and 2134 to separate to receive the fuselage); (3) positioning the wings of the fixed-wing aircraft 20 on the wing engaging surfaces 2121a and 2123a of the aircraft engaging bracket 2120 of the launch-assist assembly 2100; and (4) engaging the safety mechanism 2150, which prevents the pincers 2132 and 2134 from separating to the fuselage-release position and retains the fuselage of the fixed-wing aircraft 20 between the pincers 2132 and 2134. FIG. 8D shows the fixed-wing aircraft 20 mounted to the launch-assist assembly 2100 in this manner.

The operator selects the appropriate cooling nozzle for the engine cooling system 4020 based on the type of fixed-wing aircraft 20 used. The operator attaches that cooling nozzle to the engine cooling system 4020 and hangs the engine cooling system 4020 on the back of the aircraft engaging bracket 2120 of the launch-assist assembly 2100 such that the engine of the fixed-wing aircraft 20 is in the cooling nozzle's path.

The operator switches an idle power circuit of the multicopter 10 to a closed state (from an open state) to power certain components of the multicopter 10—such as the GPS receiver 285, the controller 272, the IMU 277, the telemetry link 274, the R/C receiver 276, the barometer 278, the cam servo motor 381, and the lock servo motor 391—to enable various preflight checks (e.g., as operating mode status checks, throttle response checks, attitude indicator response checks, heading accuracy checks, and R/C range checks) to be performed. Switching the idle power circuit to the closed state does not power the rotor motors. The idle power circuit thus (when closed) enables the operator to conduct most preflight checks without having to worry about accidentally switching on one or more of the rotor motors.

As shown in FIG. 10A, the operator then attaches the hub module 100 to the fixed-wing aircraft 20 by: (1) operating the cam servo motor 381 (either manually or remotely via the R/C controller) to rotate the cam 350 to the attached rotational position (clockwise from this viewpoint); (2) operating the lock servo motor 391 (either manually or remotely via the R/C controller) to rotate the lock servo motor arm 392 into the cam rotation-preventing rotational position (clockwise from this viewpoint) such that the lock servo motor locking extension 392a on the end of the lock servo motor arm 392 engages the cam servo motor arm lock device 382a of the cam servo motor arm 382; and (3) seating a rearwardly-curved hook 21 attached to the fuselage of the fixed-wing aircraft 20 on the cam 350 such that hook generally rests on the ridge 351 of the cam 350 and the tip of the hook is disposed in the valley 353 of the cam 350.

At this point the fixed-wing aircraft 20 is attached to the cam 350 (and the hub base 100), the fuselage of the fixed-wing aircraft 20 contacts the front and rear aircraft engaging brackets 340a and 340b (to prevent rotation about the pitch and yaw axes of the fixed-wing aircraft 20), and the stabilizers 290a and 290b contact the wings of the fixed-wing aircraft 20 (to prevent rotation about the roll axis of the fixed-wing aircraft 20).

Since the lock servo motor locking extension 392a is engaged to the cam servo motor arm lock device 382a of the cam servo motor arm 382, the cam servo motor 381 cannot rotate the cam 350 from the attached rotational position to the detached rotational position (counter-clockwise from this viewpoint). This prevents undesired detachment of the fixed-wing aircraft 20 from the cam 350 (and the multicopter 10).

After the hub module 100 is attached to the fixed-wing aircraft 20, the operator: (1) attaches the front and rear landing gear modules 600a to 600d to their respective front and rear landing gear extension modules 500a to 500d; (2) attaches the front and rear landing gear extension modules 500a to 500d to their respective rotor arm modules 400a to 400d; and (3) attaches and locks the rotor arm modules 400a to 400d to the hub module 100 to complete assembly of the multicopter 10.

The operator ensures the front and rear landing gear modules 600a to 600d are not in the path of rotation of the rotors of their corresponding rotor arm modules 400a to 400b, and connects the main power line of the multicopter 10 to switch a main power circuit to a closed state (from an open state). Unlike the idle power circuit, the main power circuit (when closed) is capable of delivering current sufficient to drive the rotor motors and cause the multicopter 10 to fly.

At this point, the operator uses the R/C controller to arm the controller 272. This causes the controller 272 to, as described below, send rotor motor control signals to all of the rotor motors to cause those rotor motors to operate and the rotors to spin, regardless of the flight mode in which the controller 272 was armed. The arming process enables the operator to ensure that the rotor motors are all operational before the multicopter 10 takes flight. Also, in this example embodiment, the controller 272 prevents the multicopter 10 from taking off until the controller 272 has been armed, which provides a failsafe against undesired take off.

To arm the controllers of certain known multicopters, an operator must provide an input to the R/C controller that causes the R/C controller to send a mixed throttle and yaw signal to the R/C receiver of the multicopter (e.g., move the left joystick down and to the right). In response, the controller arms and forces the multicopter to rotate about its yaw axis in accordance with the yaw component of the mixed throttle and yaw signal. This is problematic in that it induces unwanted yaw movement in the multicopter, and becomes even more problematic as the multicopter's size increases.

To solve this problem, the multicopter 10 of the present disclosure divorces the arming process from multicopter yaw control so the mere act of arming the multicopter 10 does not intentionally induce unwanted yaw movement. That is, the multicopter 10 does not actively attempt to induce yaw movement while arming (since it doesn't receive a signal to command it to do so), though minimal yaw movement may occur in certain scenarios due to environmental conditions and/or characteristics of the multicopter 10. For instance, if the multicopter 10 is on a ship at sea, the ship may move to unintentionally the multicopter 10 to rotate in yaw after arming.

Figure 11B:
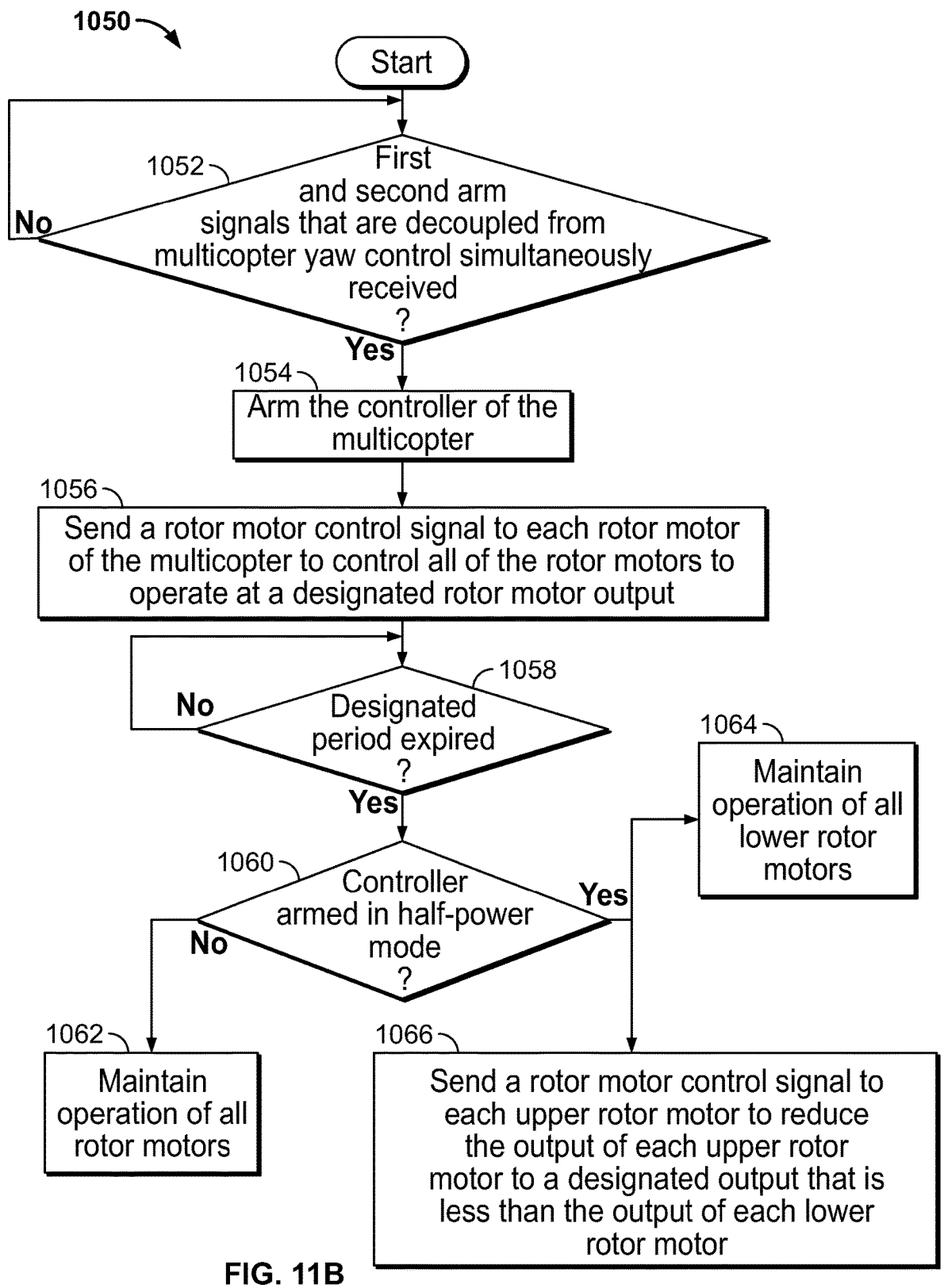
FIG. 11B is a flowchart of an example process for arming the controller of the multicopter independent from multicopter yaw control.

FIG. 11B is a flowchart of an example process 1050 for arming the controller of the multicopter independent from multicopter yaw control. In various embodiments, instructions stored in the memory 272b and executed by the processor 272a of the controller 272 represent the process 1050.

The process 1050 begins after the main power circuit of the multicopter has been closed to power the rotor motors. The controller monitors for simultaneous receipt of a first arm signal and a second arm signal from the R/C controller or other suitable source, as diamond 1052 indicates. The first and second arm signals are both decoupled from (i.e., independent from) multicopter yaw control. Responsive to simultaneously receiving the first arm input signal and the second arm signal the controller automatically arms, as block 1054 indicates.

In this example embodiment, the R/C controller sends the first arm signal responsive to the operator moving a designated joystick (the throttle joystick) to a particular position and sends the second arm signal responsive to the operator actuating a designated pushbutton. So, for instance, the controller arms responsive to the signals the R/C controller sends the R/C receiver when the operator holds the designated joystick in the particular position and then actuates the designated pushbutton. These are merely examples, and any suitable action (decoupled from yaw control) may cause the R/C controller to send either of the first and second arm signals.

In an alternative embodiment, the controller is configured to arm responsive to receiving a single arm signal from the R/C controller. In this embodiment, the R/C controller is configured to send that single arm signal to the controller responsive to actuation of an input device (such as a pushbutton) while a designated joystick is held in a particular position. In this embodiment, the R/C controller is not configured to send the single arm signal responsive to actuation of the input device while the joystick is not held in the particular position.

Returning to the process 1050, after the controller is armed, the controller sends a rotor motor control signal to each rotor motor of the multicopter to control the rotor motors to operate at a designated rotor motor output, as block 1056 indicates. In this example embodiment, the designated rotor motor output is greater than the minimum rotor motor output, though in other embodiments the designated rotor motor output may be the minimum rotor motor output. The controller monitors for the expiration of a designated period, as diamond 1058 indicates.

Once the designated period expires, the controller determines whether it was armed in partial-power mode (described above), as diamond 1060 indicates. If the controller was not armed in partial-power mode, the controller maintains operation of all of the rotor motors, as block 1062 indicates. But if the controller was armed in partial-power mode, the controller: (1) maintains operation of all of the lower rotor motors, as block 1064 indicates; and (2) sends a rotor motor control signal to each upper rotor motor to reduce the output of each upper rotor motor to a designated output that is less than the output of each lower rotor motor (such as the minimum output), as block 1066 indicates.

Certain known multicopters do not monitor for rotor motor stalls after their controllers command non-operating rotor motors to begin operating (e.g., immediately after arming the controller). This is problematic because undetected rotor motor stalls can lead to destruction of the rotor motor or other components of the multicopter. For instance, assume a rotor of known multicopter is stuck on an obstacle and can't rotate. If the controller of this known multicopter commands the corresponding rotor motor to operate, the rotor motor stalls since the stuck rotor prevents the rotor motor from operating. If not detected, power continues to flow to the rotor motor and could cause it to burst into flames or otherwise damage itself.

To solve this problem, the controller 272 of the multicopter 10 performs a rotor motor stall detection process after commanding a non-operating rotor motor to operate. This enables the controller 272 to detect when a rotor motor stalls and shut it down to prevent damage to the rotor motor or any other components of the multicopter 10.

Figure 11C:
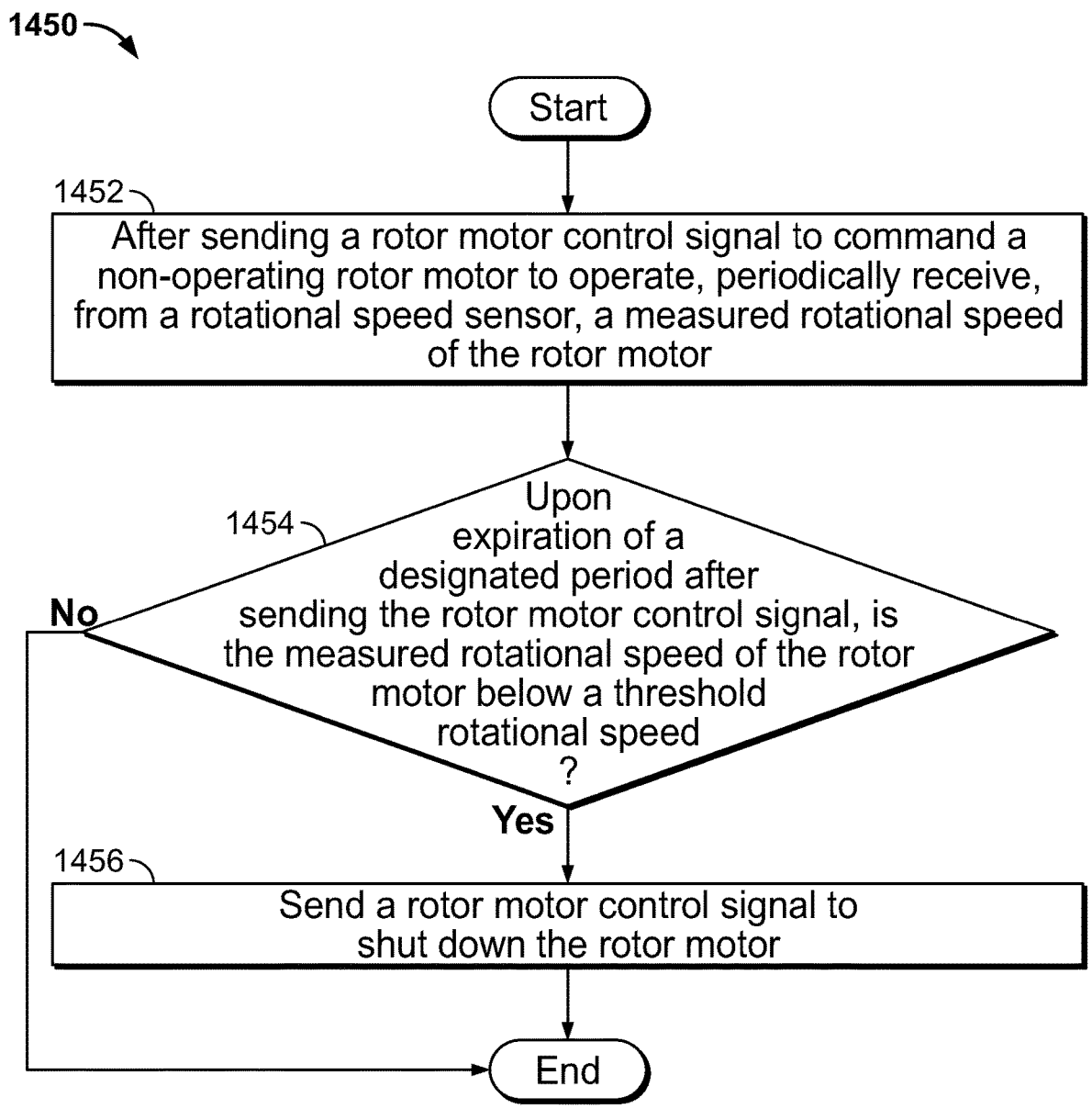
FIG. 11C is a flowchart of an example rotor motor stall detection process.

FIG. 11C is a flowchart of an example rotor motor stall detection process 1450. In various embodiments, instructions stored in the memory 272b and executed by the processor 272a of the controller 272 represent the process 1450.

The process 1450 begins after the controller sends a rotor motor control signal to command a non-operating rotor motor (or in other embodiments, a motor operating below a designated rotational speed) to operate. After doing so, the controller periodically receives, from a rotational speed sensor (such as an RPM sensor) configured to detect the rotational speed of the rotor motor output shaft, a measured rotational speed of the rotor motor, as block 1452 indicates. Upon expiration of a designated period after sending the rotor motor control signal, the controller determines whether the measured rotational speed of the rotor motor is below a threshold rotational speed, as diamond 1454 indicates. If not, the controller determines that the rotor motor is operating properly and the process 1450 ends. But if the controller determines at diamond 1454 that the measured rotational speed of the rotor motor is below the threshold rotational speed, the controller determines that the rotor motor has stalled and automatically sends a rotor motor control signal to shut down the rotor motor, as block 1456 indicates. In this embodiment, the threshold rotational speed is about equal to the rotational speed a properly operating rotor motor would have following expiration of the designated period after receiving the rotor motor control signal, though in other embodiments the rotational speed is lower than this ideal rotational speed to account for non-ideal conditions.

In other embodiments, the controller is configured to monitor the back electromotive force of the rotor motors, which is the voltage that occurs in electric motors where there is relative motion between the armature of the motor and the magnetic field from the motor's windings. The magnitude of back electromotive force correlates to the rotational speed of the motor, which enables the controller to use the back electromotive force to determine whether a rotor motor has stalled. In these embodiments, for a given rotor motor, after the controller sends a rotor motor control signal to command a non-operating motor to operate, the controller is configured to monitor the back electromotive force of that rotor motor. If the back electromotive force is below a certain threshold back electromotive force upon expiration of a designated period after the controller sends the rotor motor control signal, the controller determines that the rotor motor has stalled and sends a rotor motor control signal to shut down the rotor motor. The threshold back electromotive force generally correlates with the threshold rotational speed.

In certain embodiments, if the measured rotational speed (or measured back electromotive force) is below the threshold rotational speed (or threshold back electromotive force) for any one of the rotor motors, the controller is configured to send rotor motor control signals to all of the rotor motors to shut down the rotor motors. This prevents the multicopter from operating when one (or more) rotor motors are stalled.

Certain known multicopters are operable at a variety of different heights above sea level and, therefore, in a variety of different atmospheric pressures. To operate in a variety of different atmospheric pressures, and particularly in the relatively thin atmosphere relatively high above sea level, these known multicopters have relatively powerful rotor motors and relatively large rotors to enable the multicopters to generate lift in the thin air. But these powerful rotor motors and large rotors can be problematic when operating in the thicker air relatively close to sea level. Specifically, the rotor motors must work harder to drive the large rotors in the more dense air, which causes the rotor motors to generate more heat (relative to the heat generated in lower atmospheric pressures) and therefore have a higher risk of overheating and failing.

To solve this problem, the controller 272 of the multicopter 10 varies the maximum rotor motor output based on barometric pressure, which corresponds to the height of the multicopter 10 above sea level. Specifically, the controller 272 limits the maximum rotor motor outputs when the multicopter 10 is operating in an area with a high barometric pressure, e.g., relatively close to sea level. Conversely, the controller 272 enables relatively high maximum rotor motor outputs when the multicopter 10 is operating in an area with a relatively low barometric pressure, e.g., relatively high above sea level. Since the air near sea level is relatively thick, capping the maximum rotor motor outputs near sea level still enables the multicopter to generate the lift required to operate without overheating.

Figure 11D:
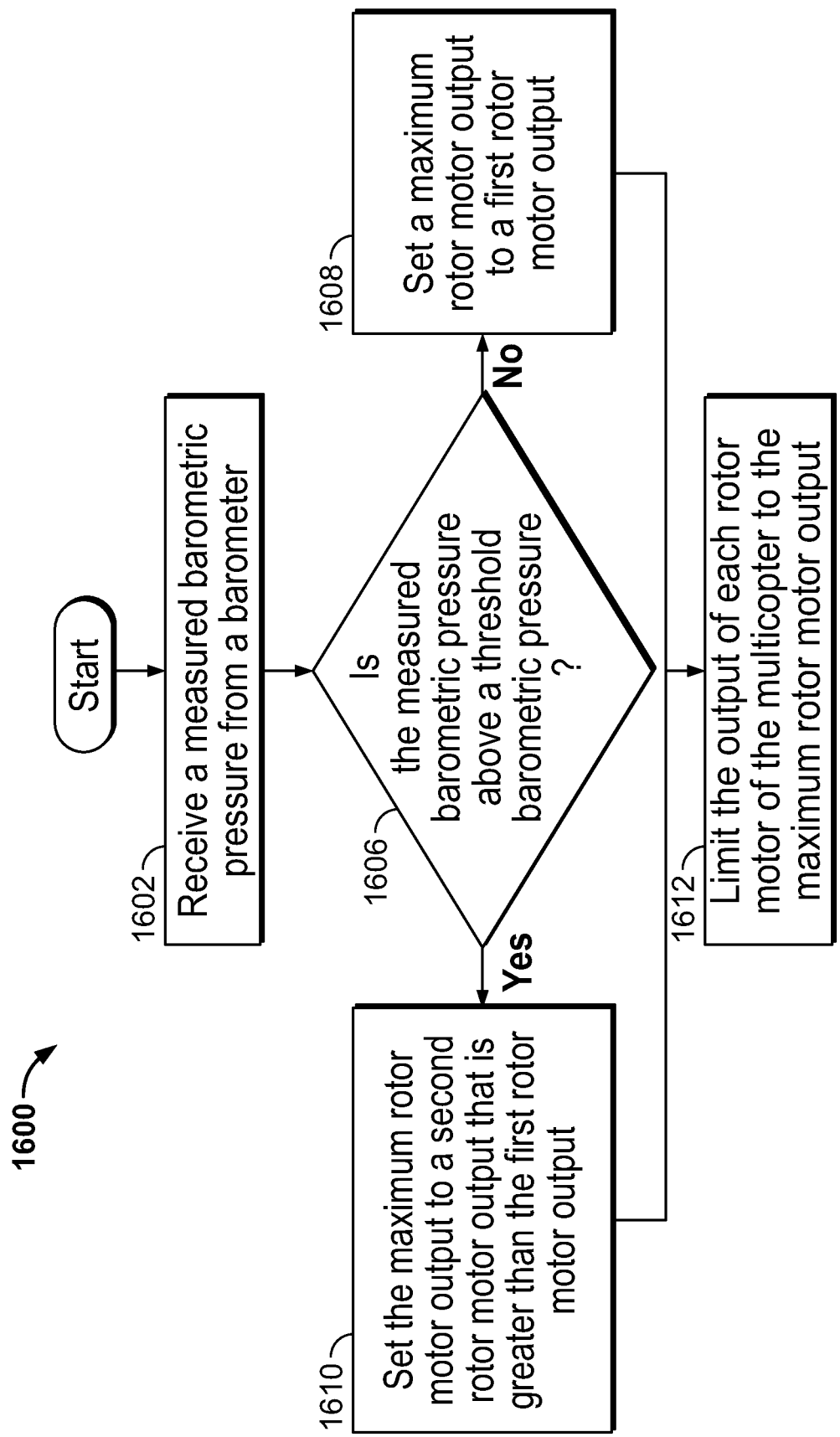
FIG. 11D is a flowchart of an example process for setting the maximum rotor motor output of the rotor motors of the multicopter.

FIG. 11D is a flowchart of an example process 1600 for setting the maximum rotor motor output of the rotor motors of the multicopter 10. In various embodiments, instructions stored in the memory 272b and executed by the processor 272a of the controller 272 represent the process 1600.

In this example embodiment, the process 1600 begins when the controller is armed (described above). The controller receives a measured barometric pressure from the barometer, as block 1602 indicates. The controller determines whether the measured barometric pressure is above a threshold barometric pressure, as diamond 1606 indicates. In this example embodiment, the threshold barometric pressure corresponds to the barometric pressure at about 5,000 feet above sea level, though the threshold barometric pressure may be any suitable pressure.

If the controller determines at diamond 1606 that the measured barometric pressure is below the threshold barometric pressure, the controller sets a maximum rotor motor output to a first rotor motor output, as block 1608 indicates. But if the controller determines at diamond 1606 that the measured barometric pressure is above the threshold barometric pressure, the controller sets the maximum rotor motor output to a second rotor motor output, as block 1610 indicates. The second rotor motor output is greater than the first rotor motor output. After setting the maximum rotor motor output to the first or second rotor motor output, the controller automatically limits the output of each rotor motor of the multicopter to the maximum rotor motor output as block 1612 indicates (i.e., the first or second rotor motor output). In this embodiment, the second rotor motor output is 100% of the rotor motors' maximum available output, while the first rotor motor output is 85% of the rotor motors' maximum available output, though these values may differ in other embodiments.

In this example embodiment, the controller sets the maximum rotor motor output for the rotor motors when the controller is armed. The controller does not change that maximum rotor motor output until it is armed again. In other embodiments, the controller periodically repeats the process 1600 to enable it to dynamically change the maximum rotor motor output for the rotor motors while operating. This may be beneficial in areas in which the multicopter may be used both below and above the designated height above sea level. While the process 1600 is described with respect to two rotor motor outputs, three or more different rotor motor outputs may be available in other embodiments, with each rotor motor output being associated with a different range of heights above sea level.

In other embodiments, the controller makes the above determinations based on whether the height of the multicopter above sea level, which is determined based on the measured barometric pressure, is above a threshold height.

The maximum rotor motor output may be any suitable measure of rotor motor output, such as rotational speed or torque.

After the controller 272 has armed and determined that the rotor motors are operating properly, the operator begins the engine start-up procedure for the fixed-wing aircraft 20. At this point, as described in more detail below, the multicopter 10 is manually or autonomously controlled (or a combination of both) to release the fixed-wing aircraft 20 into free flight according to the following general steps: (1) flying the multicopter 10 to a pre-dash location a particular distance above the ground; (2) dashing the multicopter 10 laterally until achieving a particular airspeed suitable for release; (3) releasing the fixed-wing aircraft 20; (4) stopping the multicopter's dash; (5) flying the multicopter 10 to a pre-landing location a particular distance above a landing location; and (6) descending to the landing location.

In one example, the operator selects the ALTHOLD flight mode for the multicopter 10. The operator (or an assistant) disengages the safety mechanism 2150 of the fuselage-retaining assembly 2130, which enables the pincers 2132 and 2134 to separate from the fuselage-retaining orientation to the fuselage-release orientation. The operator advances the throttle to begin vertically climbing and lift the fixed-wing aircraft 20 from between the pincers 2132 and 2134 (which are free to separate and release the fuselage of the fixed-wing aircraft 20 since the safety mechanism 2150 is disengaged). Once the multicopter 10 and attached fixed-wing aircraft 20 have reached a designated pre-dash height above ground, the operator controls the multicopter 10 to begin dashing forward to generate enough airspeed to release the fixed-wing aircraft 20 into free flight.

Certain known multicopters employ feedback control when in flight to ensure that their pitch, roll, and yaw angles approach or equal target pitch, roll, and yaw angles (set by their controllers in response to operator and/or software commends) and ensure the multicopter is operating as desired. Whenever the controller of one of these multicopters determines that the multicopter's pitch, roll, and/or yaw angle has deviated from the desired pitch, roll, and/or yaw angle, the controller controls one or more rotor motors of the multicopter to move the multicopter to correct the error, such as by changing the speed at which the rotor motor drives its corresponding rotor and/or the direction in which the rotor motor rotates the rotor.

Use of yaw angle feedback control could be problematic for the multicopter 10 because it could rotate the multicopter 10 in yaw so the fixed-wing aircraft 20 is pointed in an undesirable direction—such as transverse to the wind—when released. This could make it more difficult for the fixed-wing aircraft 20 to successfully enter free-flight, and introduces the potential for destruction of the fixed-wing aircraft 20.

The multicopter 10 of the present disclosure solves this problem by not controlling the yaw angle of the multicopter 10 while dashing, instead enabling the multicopter 10 to self-align itself relative to the wind. More specifically, while the multicopter 10 is dashing, the controller 272 is configured to monitor the actual pitch and roll angles of the multicopter 10 and to use feedback control to ensure those actual pitch and roll angles approach or equal the desired pitch and roll angles of the multicopter 10 during flight (as determined by the controller 272 based on operator and/or software commands). While the controller 272 is also configured to monitor the actual yaw angle of the multicopter 10, the controller 272 is configured so it does not intentionally control the yaw angle of the multicopter 10. That is, the controller 272 does not actively attempt to perform yaw angle control via rotor motor operation, though minimal yaw movement may occur in certain scenarios due to environmental conditions and/or characteristics of the multicopter 10.

Rather, the controller 272 enables the multicopter 10 to freely rotate about its yaw axis to self orient. As described above, the multicopter 10 includes rear landing gear 600c and 600d that has large vertical surfaces and that function as fins in flight. The aerodynamic forces acting on the rear landing gear 600c and 600d (and in particular the large vertical surfaces) orient the multicopter 10 about its yaw axis so the fuselage of the fixed-wing aircraft 20 (when attached to the multicopter 10) is generally aligned with the slipstream. This lack of yaw control ensures that the fixed-wing aircraft 20 is properly oriented with respect to the wind upon its release from the multicopter 10.

Figure 11E:
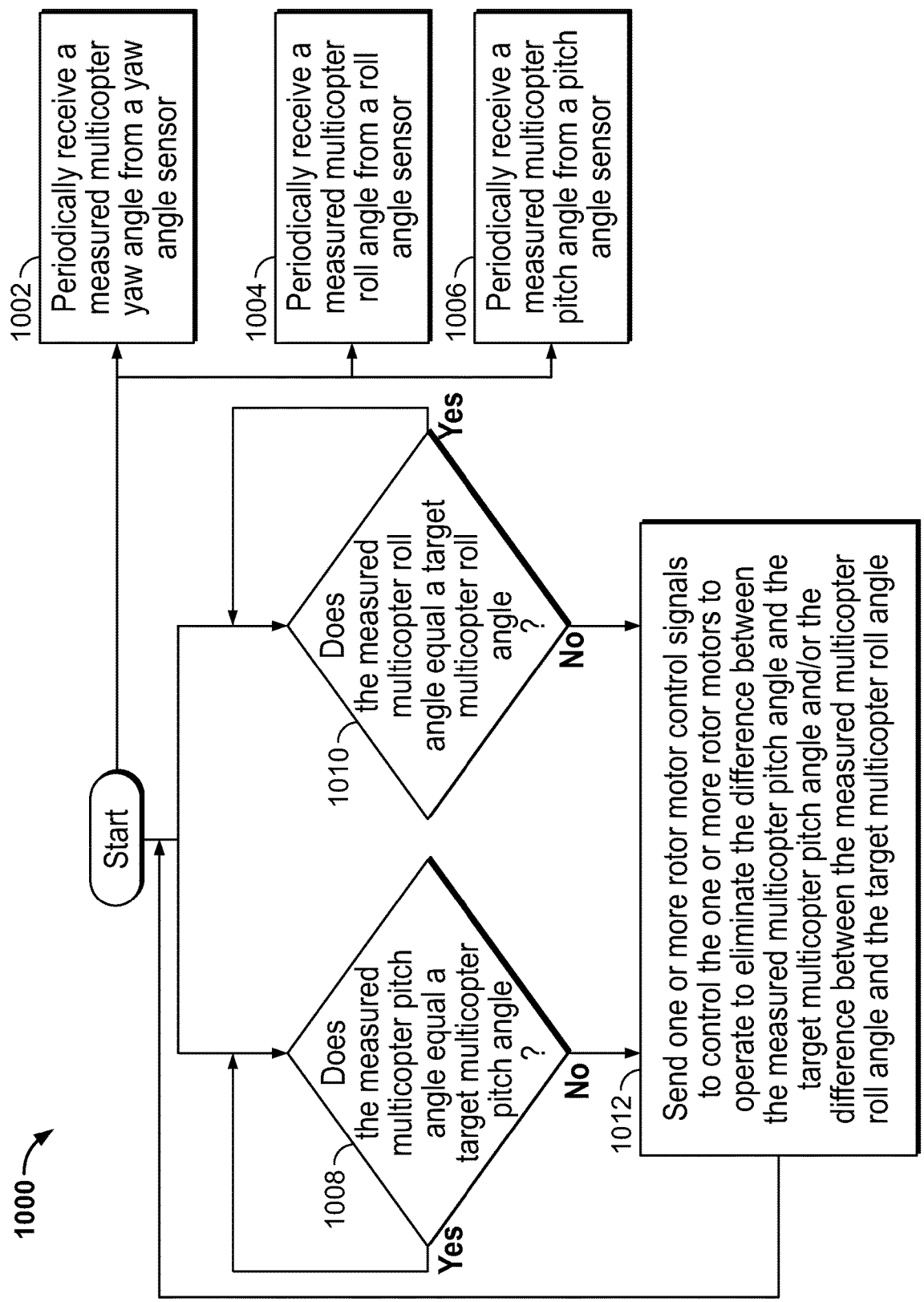
FIG. 11E is a flowchart of an example process for controlling multicopter pitch and roll angles without controlling multicopter yaw angle while dashing before releasing the fixed-wing aircraft.

FIG. 11E is a flowchart of an example process 1000 for controlling multicopter pitch and roll angles without controlling multicopter yaw angle while dashing before releasing the fixed-wing aircraft. In various embodiments, instructions stored in the memory 272b and executed by the processor 272a of the controller 272 represent the process 1000.

The process 1000 begins once the multicopter has reached a desired pre-dash height above ground and has begun dashing to achieve the airspeed required to release the fixed-wing aircraft into free flight. The controller periodically receives: (1) a measured multicopter yaw angle (relative to a yaw angle reference plane) from a yaw angle sensor, as block 1002 indicates; (2) a measured multicopter roll angle (relative to a roll angle reference plane) from a roll angle sensor, as block 1004 indicates; and (3) a measured multicopter pitch angle (relative to a pitch angle reference plane) from a pitch angle sensor, as block 1006 indicates. In this example embodiment, the IMU operates as the yaw, pitch, and roll angle sensors, though in other embodiments the multicopter may include any suitable sensors.

The controller periodically monitors: (1) for the measured multicopter pitch angle to deviate from a target multicopter pitch angle (in this embodiment, 20 degrees nose down, though any other suitable angle may be used), as diamond 1008 indicates; and (2) for the measured multicopter roll angle to deviate from a target multicopter roll angle (in this embodiment, a 0 degrees, though any other suitable angle may be used), as diamond 1010 indicates. The controller does so without monitoring for the measured multicopter yaw angle to deviate from any target multicopter yaw angle.

Responsive to the measured multicopter pitch angle deviating from (i.e., not being equivalent to) the target multicopter pitch angle (or in other embodiments deviating from the target multicopter pitch angle by at least a first designated amount, such as more than one percent), the controller automatically sends one or more rotor motor control signals to control the one or more rotor motors of the multicopter to operate to eliminate the difference between the measured multicopter pitch angle and the target multicopter pitch angle, as block 1012 indicates. Responsive to the measured multicopter roll angle deviating from (i.e., not being equivalent to) the target multicopter roll angle (or in other embodiments deviating from the target multicopter roll angle by at least a second designated amount, such as more than one percent), the controller automatically sends one or more rotor motor control signals to control the one or more rotor motors of the multicopter to operate to eliminate the difference between the measured multicopter roll angle and the target multicopter roll angle, as block 1012 indicates. The controller does so without controlling the one or more rotor motors of the multicopter to actively change the multicopter yaw angle, instead enabling the multicopter to self-orient in yaw using its rear landing gear.

In this example embodiment, the controller 272 performs the process 1000 when the multicopter 10 is in the ALTHOLD flight mode, regardless of whether the fixed-wing aircraft 20 is attached to the multicopter 10. This simplifies piloting the multicopter 10 by eliminating the need for the operator to precisely control the pitch angle of the multicopter 10.

In various embodiments, the multicopter 10 only enables release of the fixed-wing aircraft 20 when certain conditions (or a single condition) are met. This ensures that the fixed-wing aircraft 20 is released only when conditions for a successful release exist, which reduces the potential for damage to the fixed-wing aircraft 20 and the multicopter 10.

Figure 11F:
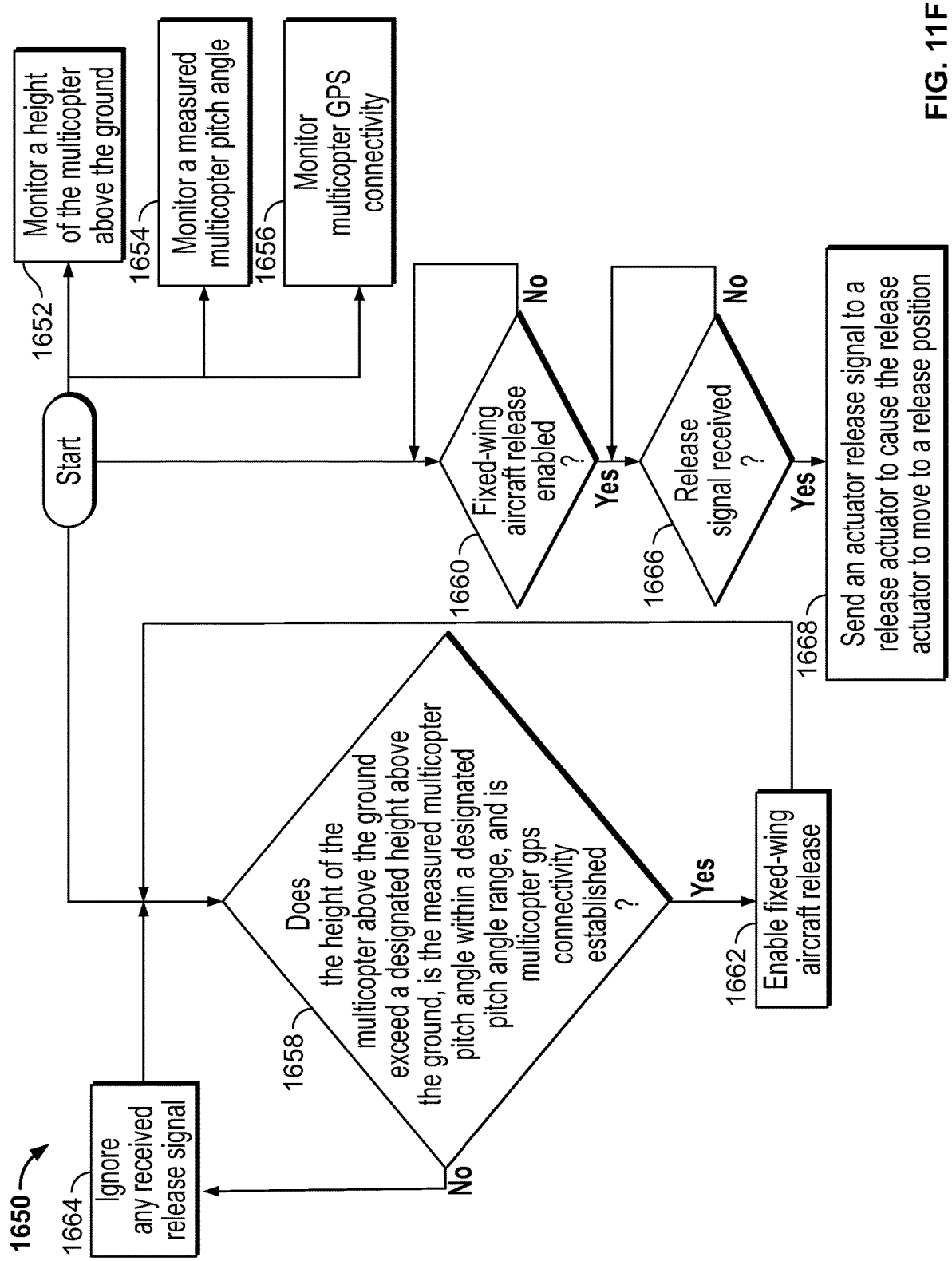
FIG. 11F is a flowchart of an example process for selectively enabling fixed-wing aircraft release.

FIG. 11F is a flowchart of an example process 1650 for enabling fixed-wing aircraft release. In various embodiments, instructions stored in the memory 272b and executed by the processor 272a of the controller 272 represent the process 1650.

The controller 272 monitors: (1) a height of the multicopter above the ground (such as by using barometric pressure measured by the barometer, as described above), as block 1652 indicates; (2) a measured multicopter pitch angle (such as by using a pitch angle sensor like the IMU, as described above), as block 1654 indicates; and (3) whether GPS connectivity is established for the multicopter (such as based on feedback from the GPS receiver), as block 1656 indicates.

The controller monitors whether: (1) the height of the multicopter above the ground exceeds a designated height above the ground; (2) the measured multicopter pitch angle is within a designated pitch angle range; and (3) GPS connectivity is established for the multicopter, as diamond 1658 indicates. If all three conditions are met, the controller enables fixed-wing aircraft release, as block 1662 indicates. If all three conditions are not met, the controller ignores any received release signal (i.e., does not enable fixed-wing aircraft release), as block 1664 indicates.

The controller also monitors whether fixed-wing aircraft release is enabled, as diamond 1660 indicates. While fixed-wing aircraft release is enabled, the controller monitors for receipt of a release signal from the R/C controller or other suitable source, as diamond 1666 indicates. Responsive to receiving the release signal while fixed-wing aircraft release is enabled, the controller automatically sends an actuator release signal to a release actuator, in this example embodiment the cam servo motor, to cause the release actuator to move to a release position, as block 1668 indicates, to release the fixed-wing aircraft into free flight.

These are merely three example conditions, and any quantity of suitable conditions (such as a subset of at least one of the above three conditions or conditions different from the above three conditions) may be employed. In some embodiments, the controller monitors whether the barometric pressure measured by the barometer exceeds a designated barometric pressure (instead or in addition to monitoring the height of the multicopter above the ground). In other embodiments, the controller measures the GPS connectivity of the fixed-wing aircraft, and doesn't enable release unless the fixed-wing aircraft has GPS connectivity.

In this example embodiment, the lock servo motor arm must also be moved into the cam rotation-enabling rotational position before the fixed-wing aircraft can be released into free flight. The multicopter therefore includes software-based and hardware-based failsafes to ensure the fixed-wing aircraft is released only when conditions for a successful release exist and the operator desires release. In certain embodiments, the controller doesn't enable the lock servo motor arm to move to the cam rotation-enabling rotational position until one or more of the above conditions are met. These conditions may be the same as or different from the condition(s) that must be met to enable fixed-wing aircraft release.

More specifically, detaching the fixed-wing aircraft 20 from the cam 350 (and the multicopter 10) is a two-step process, as shown in FIGS. 10A to 10C. To detach the fixed-wing aircraft 20 from the cam 350 (and the multicopter 10), the operator first remotely controls the lock servo motor 391 (via the R/C controller) to rotate the lock servo motor arm 392 into the cam rotation-enabling rotational position (counter-clockwise from this viewpoint). Second, the operator remotely controls the cam servo motor 381 (via the R/C controller) to rotate the cam 350 from the attached rotational position to the detached rotational position (counter-clockwise from this viewpoint). As shown in the progression from FIGS. 10B to 10C, as the cam servo motor 381 rotates the cam 350 from the attached rotational position to the detached rotational position, the valley 352 and the ascending edge of the ridge 353 forces the hook 21 off of the cam 350, thereby detaching the fixed-wing aircraft 20 from the cam 350 (and the multicopter 10).

After the fixed-wing aircraft 20 detaches from the multicopter 10, the multicopter 10 reduces its pitch angle (such as from 20 degrees nose down to 0 degrees) to stop dashing and reduce its airspeed before traveling to a desired landing area, described below.

Certain known multicopters enable abrupt step changes in multicopter pitch angle. That is, the controllers of these known multicopters enable an infinite pitch angle rate of change. This is problematic when one of these multicopters that is dashing with a pitch angle of, for instance, 20 degrees nose down receives a control signal to reduce its pitch angle to 0 degrees to stop dashing. Since this known multicopter enables a step change in the pitch angle, the multicopter controls its front rotor motors to rapidly accelerate (and/or its back rotor motors to rapidly decelerate) to attempt to instantly change the pitch angle to 0 degrees. This rapid acceleration of the front rotor motors (or rapid deceleration of the back rotor motors) coupled with the fast forward airspeed acting on the fast-spinning front rotors leads to significant pitch-up overshoot, which may cause the multicopter to back flip and tumble to the ground.

The abrupt pitch up problem is exacerbated when these known multicopters dash beyond radio range. When communication with these multicopters is lost, these multicopters automatically transition to RTL flight mode, which causes the desired pitch angle to instantly change from the nose down (dashing) angle to zero or even nose up in a single time step.

Figure 13A:
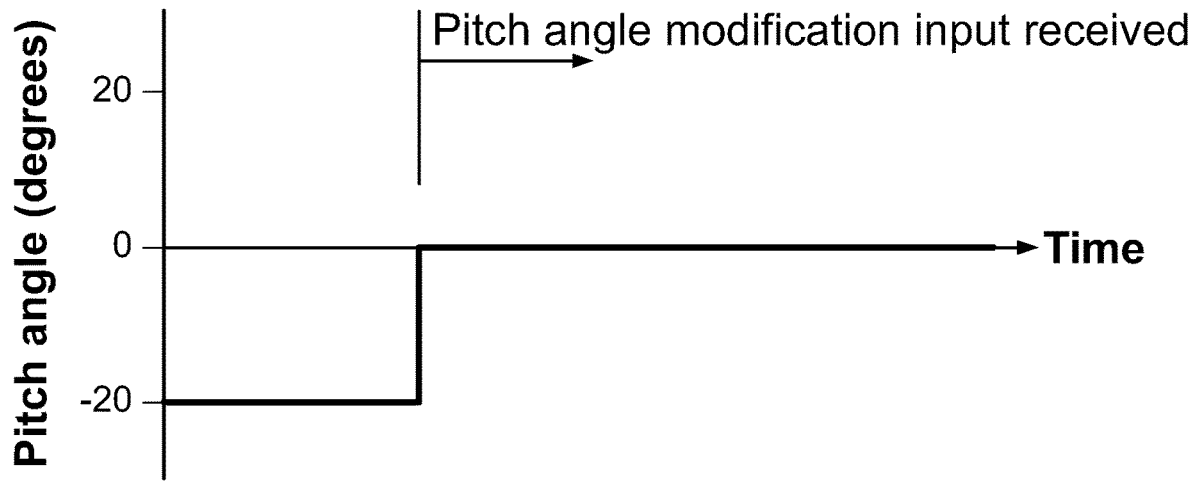
FIG. 13A is a graph showing the desired multicopter pitch angle over time for an example situation for a prior art multicopter.

FIG. 13A is a graph showing the desired multicopter pitch angle over time for an example situation for a prior art multicopter. Here, the desired multicopter pitch angle is the multicopter pitch angle that the prior art multicopter controller attempts to achieve by controlling the rotor motors. In this example, the prior art multicopter is dashing with a pitch angle of 20 degrees nose down when it receives an instruction to stop dashing and achieve a pitch angle of 0 degrees. Since this prior art multicopter enables a step change in the pitch angle, the prior art multicopter controls its front rotor motors to rapidly accelerate (and/or its back rotor motors to rapidly decelerate) to attempt to instantly change the pitch angle to 0 degrees, as shown by the infinite slope in the graph upon receipt of the pitch angle modification input.

Figure 11G:
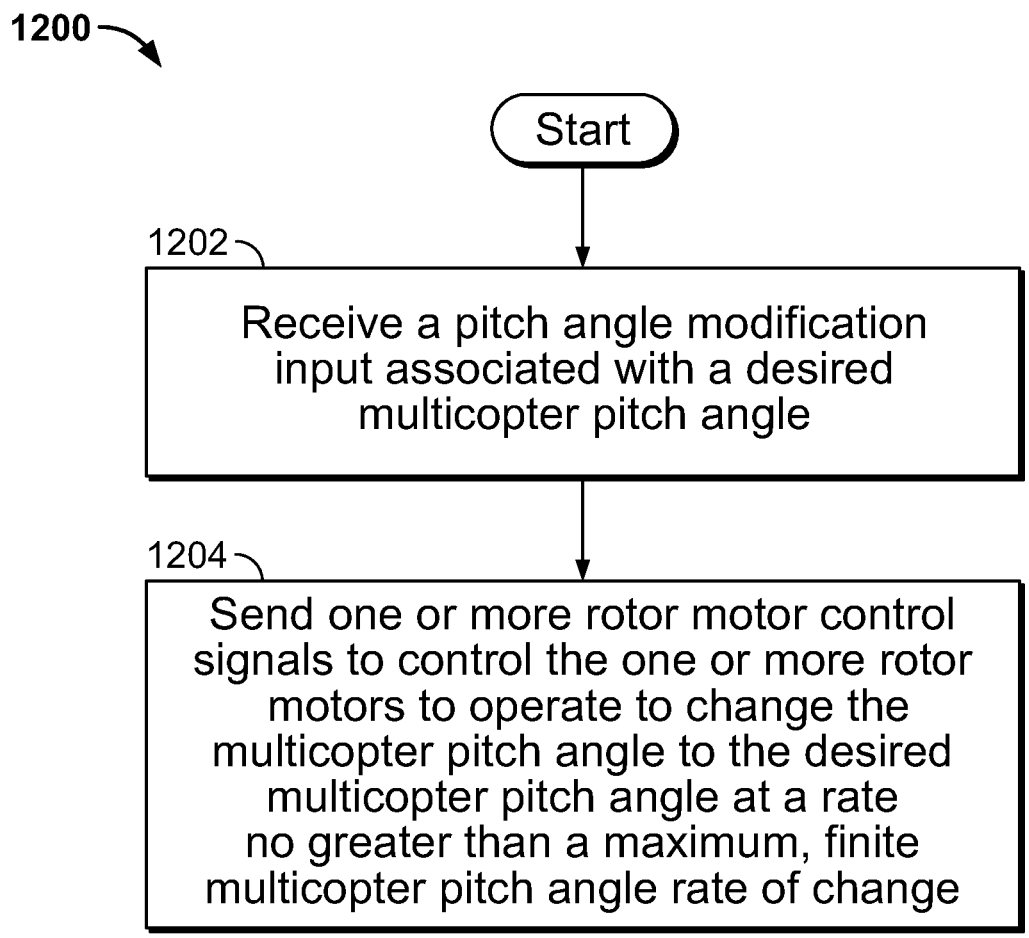
FIG. 11G is a flowchart of an example process for limiting multicopter pitch angle rate of change.

The multicopter 10 of the present disclosure solves this problem by limiting the multicopter pitch angle rate of change to ensure a smooth pitch angle transition over a particular period of time. FIG. 11G is a flowchart of an example process 1200 for limiting multicopter pitch angle rate of change.

The process 1200 begins once the rotor motors of the multicopter begin driving the rotors. The controller receives a pitch angle modification input associated with a desired multicopter pitch angle, as block 1202 indicates. In response, the controller sends one or more rotor motor control signals to control the one or more rotor motors to operate to change the multicopter pitch angle to the desired multicopter pitch angle at a rate no greater than a maximum, finite multicopter pitch angle rate of change, as block 1204 indicates. That is, while the multicopter is flying, the controller automatically prevents operation of the rotor motors in such as way as to change the multicopter pitch angle at a rate greater than the maximum pitch angle rate of change.

Figure 13B:
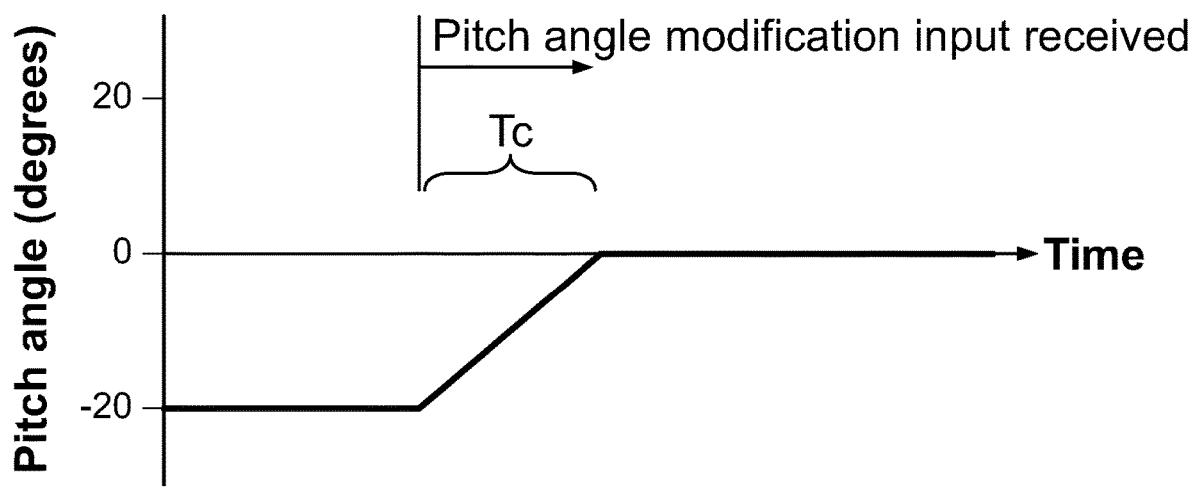
FIG. 13B is a graph showing the desired multicopter pitch angle over time for an example situation for one example of the multicopter of the present disclosure.

FIG. 13B is a graph showing the desired multicopter pitch angle over time for an example situation for one example of the multicopter of the present disclosure. In this example, the prior art multicopter is dashing with a pitch angle of 20 degrees nose down when it receives an instruction to stop dashing and achieve a pitch angle of 0 degrees. Since the multicopter limits the pitch angle rate of change, the multicopter controls its front rotor motors to accelerate (and/or its back rotor motors to decelerate) to change the pitch angle to 0 degrees over a period $T_C$ (such as but not limited to 1 to 3 seconds) to ensure the pitch angel rate of change is no greater than a finite pitch angle rate of change, as shown by the finite slope in the graph following receipt of the pitch angle modification input.

In addition to limiting the rate of change of the multicopter pitch angle, the controller is configured to limit the multicopter pitch angle based on the flight mode in which the multicopter 10 is operating. In flight modes in which the multicopter 10 is typically loaded (i.e., in which the fixed-wing aircraft 20 is attached to the multicopter 10), the controller limits the pitch angle to a relatively shallow pitch angle (such as 20 degrees nose down), since the multicopter 10 travels relatively fast through the air when loaded. But in flight modes in which the multicopter 10 is typically unloaded (i.e., in which the fixed-wing aircraft 20 is not attached to the multicopter 10), the controller limits the pitch angle to a relatively larger pitch angle (such as 30 degrees nose down), since the multicopter 10 travels relatively slowly through the air when unloaded. The steeper pitch angle enables the unloaded multicopter 10 to fly in strong winds without adversely affecting multicopter performance.

Figure 11H:
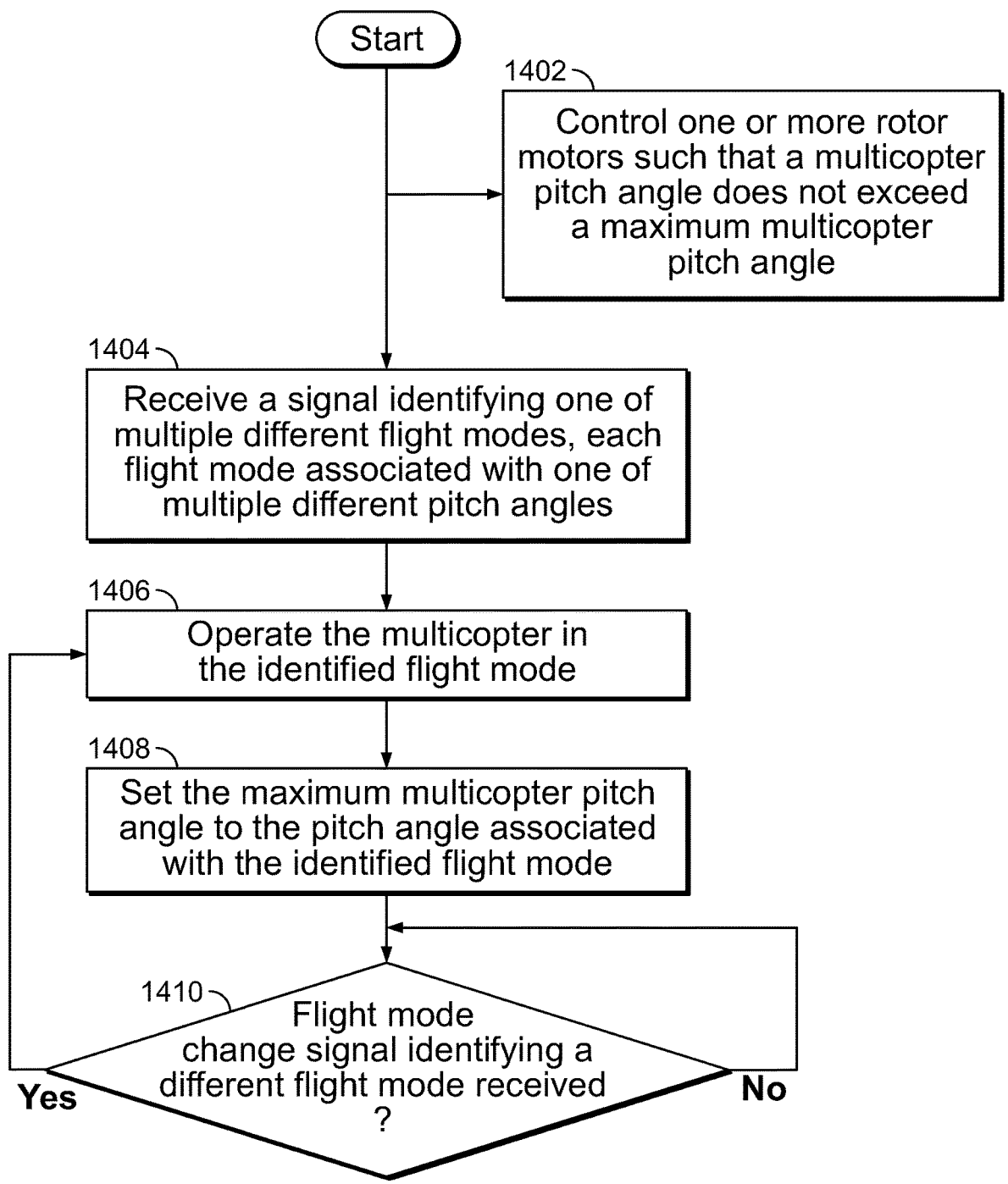
FIG. 11H is a flowchart of an example process for setting the maximum multicopter pitch angle for the multicopter.

FIG. 11H is a flowchart of an example process 1400 for setting the maximum multicopter pitch angle for the multicopter. In various embodiments, instructions stored in the memory 272b and executed by the processor 272a of the controller 272 represent the process 1400.

The process 1400 begins upon arming the controller 272, and the controller automatically controls the one or more rotor motors during multicopter operation such that a multicopter pitch angle does not exceed a maximum multicopter pitch angle (which may be stored in the memory), as block 1402 indicates. The controller looks to the selected flight mode to determine the maximum multicopter pitch angle.

More specifically, the controller receives a signal identifying one of multiple different flight modes, such as upon arming, as block 1404 indicates. Each flight mode is associated with one of multiple different pitch angles. The controller operates the multicopter in the identified flight mode, as block 1406 indicates, and sets the maximum multicopter pitch angle to the pitch angle associated with the identified flight mode, as block 1408 indicates. The controller then monitors for receipt of a flight mode change signal identifying a different flight mode, as diamond 1410 indicates. Responsive to receipt of the flight mode change signal, the process 1400 returns to block 1406.

In other embodiments, the multicopter includes a sensor (such as a weight sensor or a position sensor) configured to sense whether the fixed-wing aircraft is attached to the multicopter. In these embodiments, the controller determines the maximum multicopter pitch angle based on whether the fixed-wing aircraft is attached to the multicopter (based on sensor feedback). The maximum multicopter pitch angle is larger when the fixed-wing aircraft is not attached to the multicopter than it is when the fixed-wing aircraft is attached to the multicopter.

After detachment, the operator may switch the multicopter 10 to partial-power mode and recover the multicopter 10 to a pre-landing location above a desired landing location either manually via ALTHOLD and/or LOITER flight modes or semi-autonomously via RTL flight mode.

While a manually controlled launch sequence is described above, the controller 272 is also configured to autonomously launch the fixed-wing aircraft with limited operator input. This feature reduces the potential for operator error that may result in failed launches or damage to the multicopter and/or the fixed-wing aircraft.

Figure 11I:
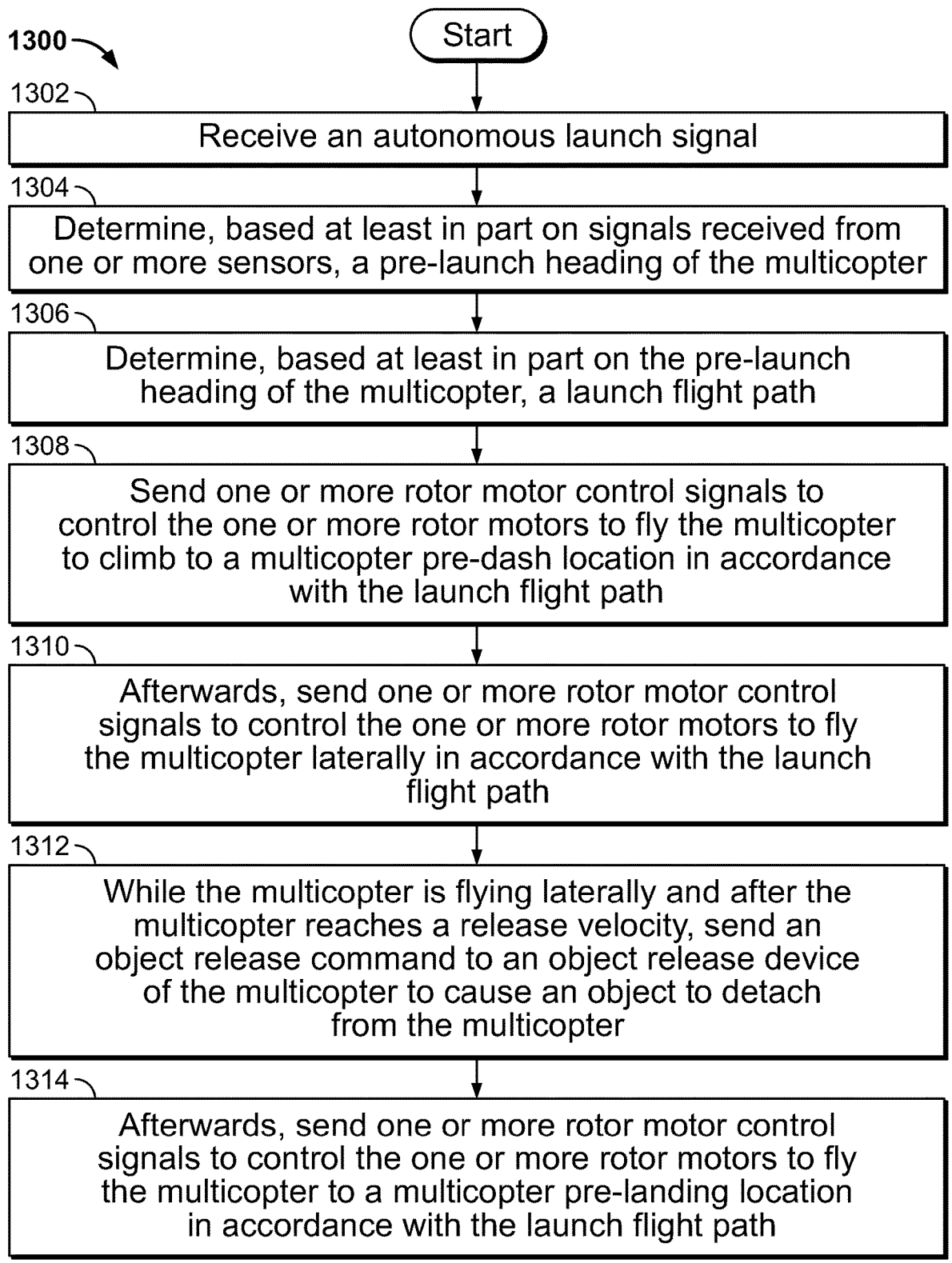
FIG. 11I is a flowchart of an example process for autonomously launching the fixed-wing aircraft using the multicopter.

FIG. 11I is a flowchart of an example process 1300 for autonomously launching the fixed-wing aircraft 20 using the multicopter 10. In various embodiments, instructions stored in the memory 272b and executed by the processor 272a of the controller 272 represent the process 1300.

The process 1300 begins when the controller receives an autonomous launch signal from the R/C controller or other suitable source, as block 1302 indicates. The controller determines, based at least in part on signals received from one or more sensors (such as the magnetometer or a GPS equivalent), a pre-launch heading of the multicopter, as block 1304 indicates. The controller determines, based at least in part on the pre-launch heading of the multicopter, a launch flight path, as block 1306 indicates. In this example embodiment, the launch flight path shape is predetermined, and the controller orients the launch flight path based on the pre-launch heading of the multicopter. That is, the controller assigns precise GPS coordinates to a general launch flight path shape in accordance with the heading of the multicopter.

The controller automatically sends one or more rotor motor control signals to control the one or more rotor motors to fly the multicopter to climb to a pre-dash location in accordance with the launch flight path, as block 1308 indicates. Afterwards, the controller automatically sends one or more rotor motor control signals to control the one or more rotor motors to fly the multicopter laterally in accordance with the launch flight path, as block 1310 indicates.

While the multicopter is flying laterally and after the multicopter reaches a release velocity (or in other embodiments a release position), the controller automatically sends an object release command to an object release device of the multicopter to cause an object to detach from the multicopter, as block 1312 indicates. For instance, the multicopter sends an unlock command to the lock servo motor followed by a release command to the cam servo motor to cause the fixed-wing aircraft to detach from the multicopter into free flight. Afterwards, the controller automatically sends one or more rotor motor control signals to control the one or more rotor motors to fly the multicopter to a pre-landing location in accordance with the launch flight path, as block 1314 indicates. Afterwards, the controller either automatically lands the multicopter or cedes control to the operator, who manually controls the multicopter to land.

Figure 14:
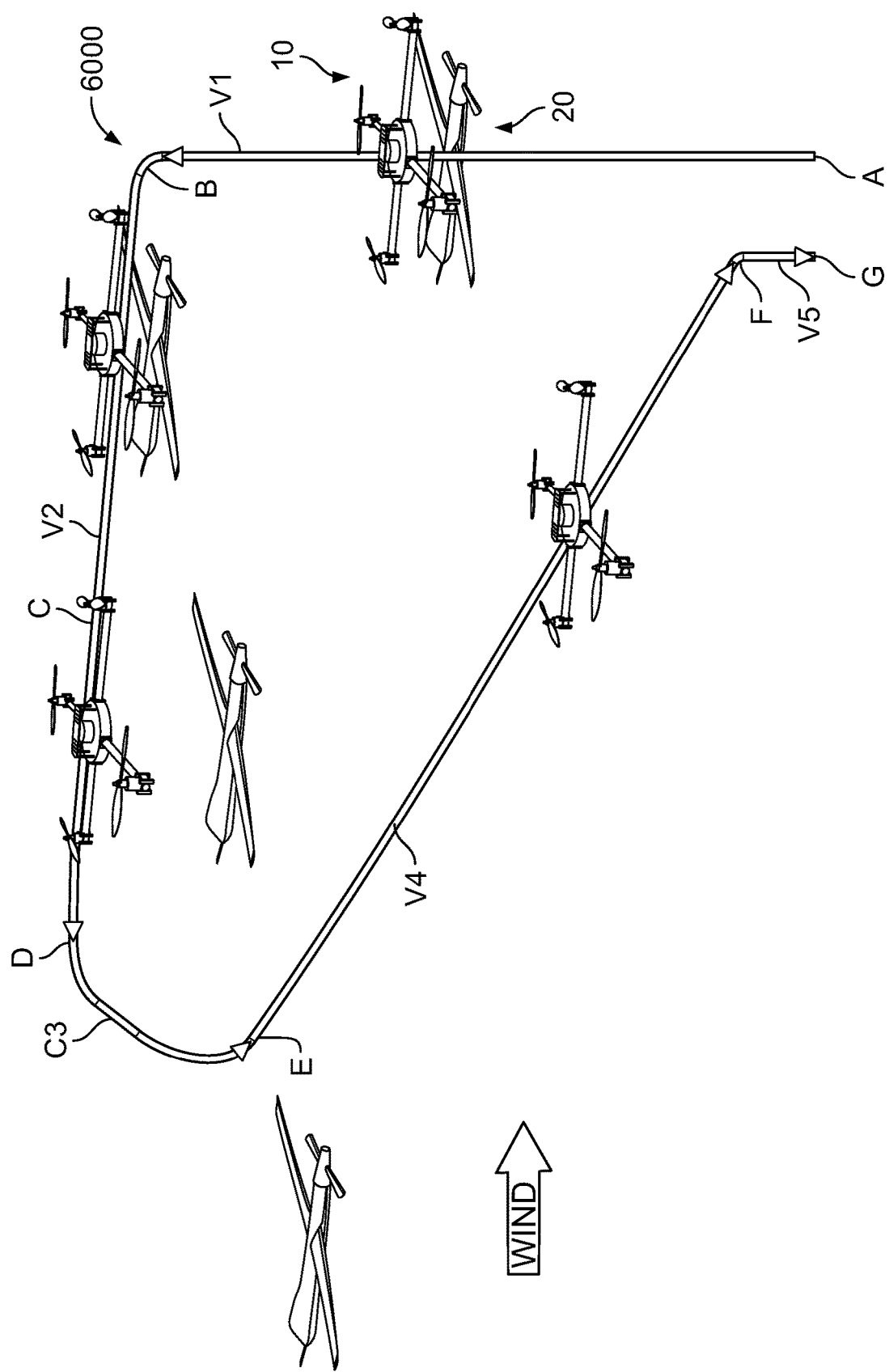
FIG. 14 shows one example launch flight path for the multicopter of the present disclosure.

FIG. 14 shows one example launch flight path 6000. In this example, the multicopter 10 and attached fixed-wing aircraft 20 ascend from launch location A to pre-dash location B along vector V1. In this example, this is a 200 meter ascent at 5 meters/second. The illustrations of the multicopter 10 and the fixed-wing aircraft 20 are highly simplified here for clarity. The illustrated multicopter 10 and fixed-wing aircraft 20 could be replaced with the other embodiments of the multicopter and fixed-wing aircraft shown and described herein. After reaching the pre-dash location B, the multicopter 10 and attached fixed-wing aircraft 20 fly laterally (sometimes called "dash") to release location C along vector V2. In this example, the dash is conducted at 20 meters per second and the release point C is about 400 meters from the pre-dash location B. In this example, the multicopter 10 unlocks the locking mechanism that prevents release of the fixed-wing aircraft 20 at 350 meters from pre-dash location B. The multicopter 10 releases the fixed-wing aircraft 20 at release location C and stops dashing upon reaching post-dash location D. In this example, post-dash location D is 500 meters from pre-dash location B. The multicopter 10 conducts a turn from post-dash location D to location E along curve C3. In this example, the turn is a 100 meter turn. The multicopter 10 travels laterally while descending to pre-landing location F above landing location G along vector V4. In this example, pre-landing location F is 7 meters above landing position G. The multicopter 10 descends to landing location G along vector V5. In this example, landing location G is 5 meters from launch location A.

Regardless of whether the multicopter 10 is manually or autonomously controlled, once the multicopter 10 reaches the pre-landing location, certain conditions must be met before the controller 272 enables the rotor motors to shut down and the multicopter 10 to land on the landing surface.

Certain known multicopters are configured to shut down their rotor motors only after the multicopters have touched down onto a landing surface. More specifically, these known multicopters are configured to, after receiving a command to land: (1) begin descending; (2) monitor the multicopter's rate of descent; and (3) after the multicopter's rate of descent is below a preset threshold for a designated time period (e.g., after the multicopter has stopped descending for that designated time period), enable the rotor motors to be shut down.

This type of "has-landed" logic for enabling rotor motor shut down is problematic, especially in windy conditions, because the rotor motors are still driving their corresponding rotors after the multicopter has landed but before the designated time period has expired. Rotor motors operating at even their minimum output generates lift that, while not large enough to cause the multicopter to climb, makes it much easier for wind sweeping across the landing surface to cause the multicopter to begin skating along the landing surface. Strong wind may even cause the multicopter to tumble.

Figure 11J:
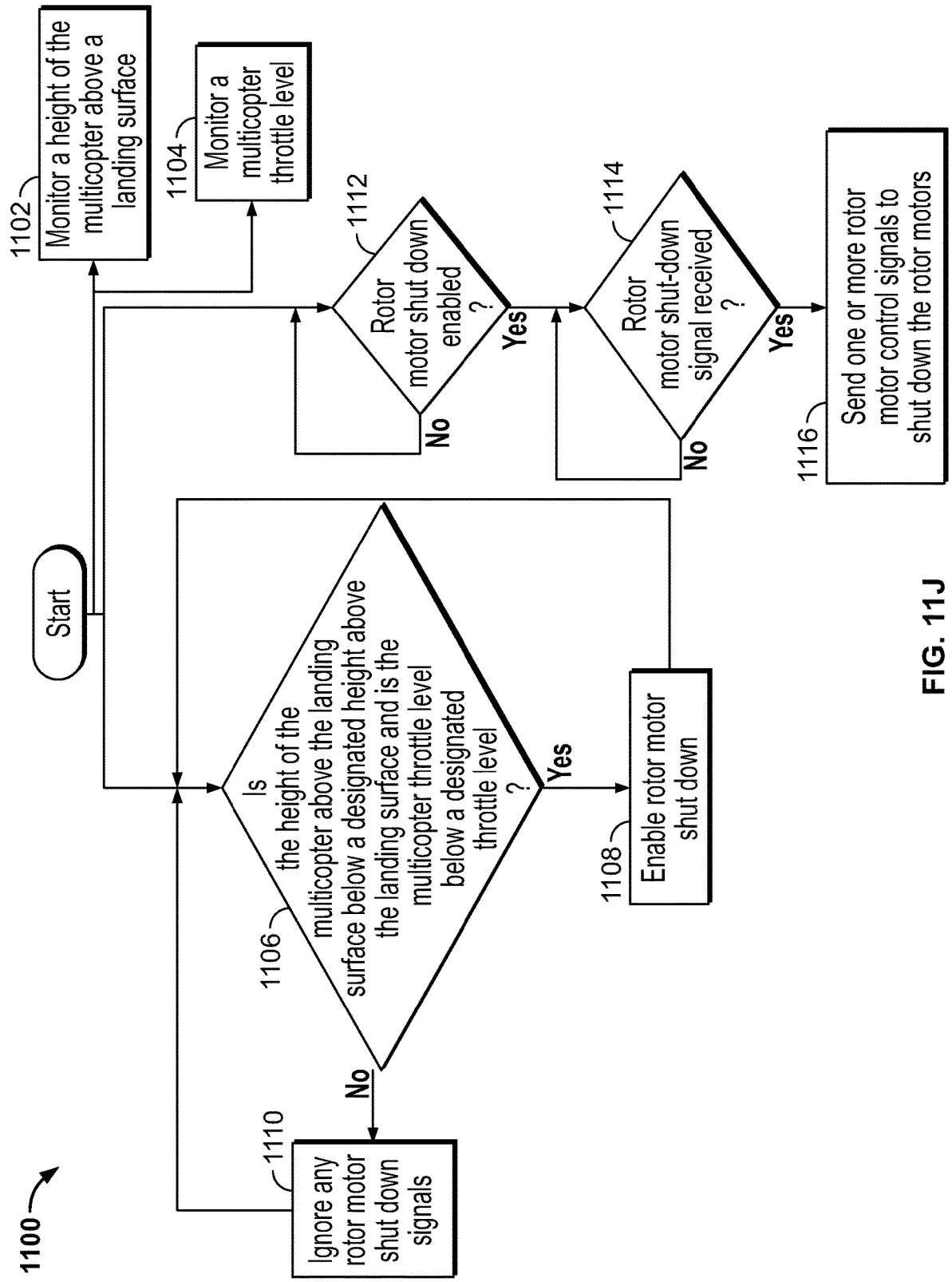
FIG. 11J is a flowchart of an example process for shutting down the rotor motors of a multicopter at touchdown.

The multicopter 10 of the present disclosure solves this problem by enabling rotor motor shut down while the multicopter is airborne (when certain conditions are satisfied) rather than waiting for auto-land logic to disarm the multicopter. Since the rotor motors are shut down before touchdown, the rotor motors stop spinning before, during, or shortly after touchdown. The rotors therefore do not generate lift after touchdown, meaning that the multicopter is stable at touchdown and less likely to be affected by wind sweeping along the landing surface FIG. 11J is a flowchart of an example process 1100 for shutting down the rotor motors of a multicopter at touchdown. In various embodiments, instructions stored in the memory 272*b* and executed by the processor 272*a* of the controller 272 represent the process 1100.

The process 1100 begins once the rotor motors of the multicopter begin driving the rotors. The controller monitors: (1) a height of the multicopter above a landing surface such as the ground (such as by using barometric pressure measured by the barometer, as described above), as block 1102 indicates; and (2) monitors a throttle level of the multicopter, as block 1104 indicates.

The controller monitors whether: (1) the height of the multicopter above the landing surface is below a designated height above the landing surface; and (2) the multicopter throttle level is below a designated throttle level, as diamond 1106 indicates. If both conditions are met, the controller enables rotor motor shut down, as block 1108 indicates. If both conditions are not met, the controller ignores any received rotor motor shut down signals, as block 1110 indicates. In one embodiment, the controller determines the height of the multicopter above the landing surface by using the barometric pressure obtained by the barometer, as described above. In another embodiment, the controller monitors whether the barometric pressure measured by the barometer is below a designated barometric pressure, which generally correlates to the designated height above the landing surface. The designated height above the landing surface is selected such that the multicopter will not be damaged via a free fall from that height. The height may be, for instance, 1 to 5 meters or any other suitable height.

The controller also monitors whether rotor motor shut down is enabled, as diamond 1112 indicates. While rotor motor shut down is enabled, the controller monitors for receipt of a rotor motor shut down signal from the R/C controller or other suitable source, as diamond 1114 indicates. Responsive to receiving the rotor motor shut down signal while rotor motor shut down is enabled, the controller sends one or more rotor motor control signals to shut down the rotor motors, as block 1116 indicates, thereby enabling the multicopter to free fall onto the landing surface as the rotors stop spinning.

In other embodiments, additional criteria, such as ground speed below a certain threshold, may be added.

In certain embodiments, the operator may desire to launch the fixed-wing aircraft 20 from a location in which GPS is unavailable (e.g., from the ground in a heavily-wooded or mountainous region). In one such embodiment, the operator may use a GPS repeater to acquire a GPS fix for the fixed-wing aircraft and/or the multicopter during preflight. In this case, the GPS repeater might have a GPS receiving antennae on the roof of a building, on a hilltop, or flying in an aircraft, while pre-flight is happening in the GPS-denied location. The GPS-denied location may be a lower floor in the same building as the one that has the GPS receiver on the roof. In this case, the operator may decide to seal-off the preflight area (i.e., close the garage door) to avoid multipath GPS jamming. After preflight is completed, the repeater may be switched off and the seal breached to allow the aircraft to exit the preflight area and begin attempts to acquire GPS directly. Once launched, the fixed-wing aircraft 20 will acquire that GPS satellite constellation once able to do so (such as when the multicopter 10 and attached fixed-wing aircraft 20 climb high enough to acquire GPS). This process is shortened, as the GPS receiver enjoys familiarity with the prevailing satellite constellation.

In other embodiments in which the operator desires to launch the fixed-wing aircraft 20 from a location in which GPS is unavailable, rather than using a GPS repeater to acquire and pre-load a desired GPS satellite constellation to the fixed-wing aircraft 20, the operator simply climbs the multicopter 10 and attached fixed-wing aircraft 20 high enough to acquire GPS. At that point, the fixed-wing aircraft 20 acquires the desired GPS satellite constellation, and launch proceeds as described above. The operator can abort launch should the fixed-wing aircraft 20 not be able to acquire GPS. This offers a unique advantage over traditional (ground-based) launch systems that cannot operate from GPS-denied locations, as the fixed-wing aircraft owner would not accept the risk that GPS would be acquired (on faith) during the first few moments of flight.

In certain embodiments, the R/C controller operates as a state machine to ensure that the flight mode status is not lost or changed when communication between the R/C controller and the communications interface 274 of the multicopter 10 is interrupted. Certain known multicopters are configured to wirelessly communicate with R/C controllers (or any other type of controller), which send control signals input by an operator to the autopilot of the multicopter, which in turn controls operation of the multicopter (and specifically, the rotor motors) based on the control signals. Known R/C controllers include a mechanical flight mode selection switch that is movable between multiple positions. Each position is associated with a different one of multiple different flight modes. The position of the flight mode selection switch determines the desired flight mode, and the R/C controller signals the multicopter to operate in that desired flight mode.

One problem with this mechanical flight mode selection switch is that an operator can accidentally jostle the switch (e.g., by dropping the R/C controller or hitting it against something) and move it to a different position, which causes the R/C controller to signal the multicopter to switch to an undesired flight mode. Another problem is that certain remote control hardware assemblies are not available with multi-position maintain switches, only pushbuttons.

The R/C controller of the present disclosure solves this problem by eliminating the mechanical flight mode selection switch in favor of multiple distinct pushbuttons, each of which is associated with a different one of multiple flight modes. The R/C controller also operates as a state machine to "remember" the selected flight mode when the R/C controller loses communication with the multicopter 10, which enables the R/C controller to automatically resume that same flight mode when it reestablishes communication with the multicopter 10.

Figure 11K:
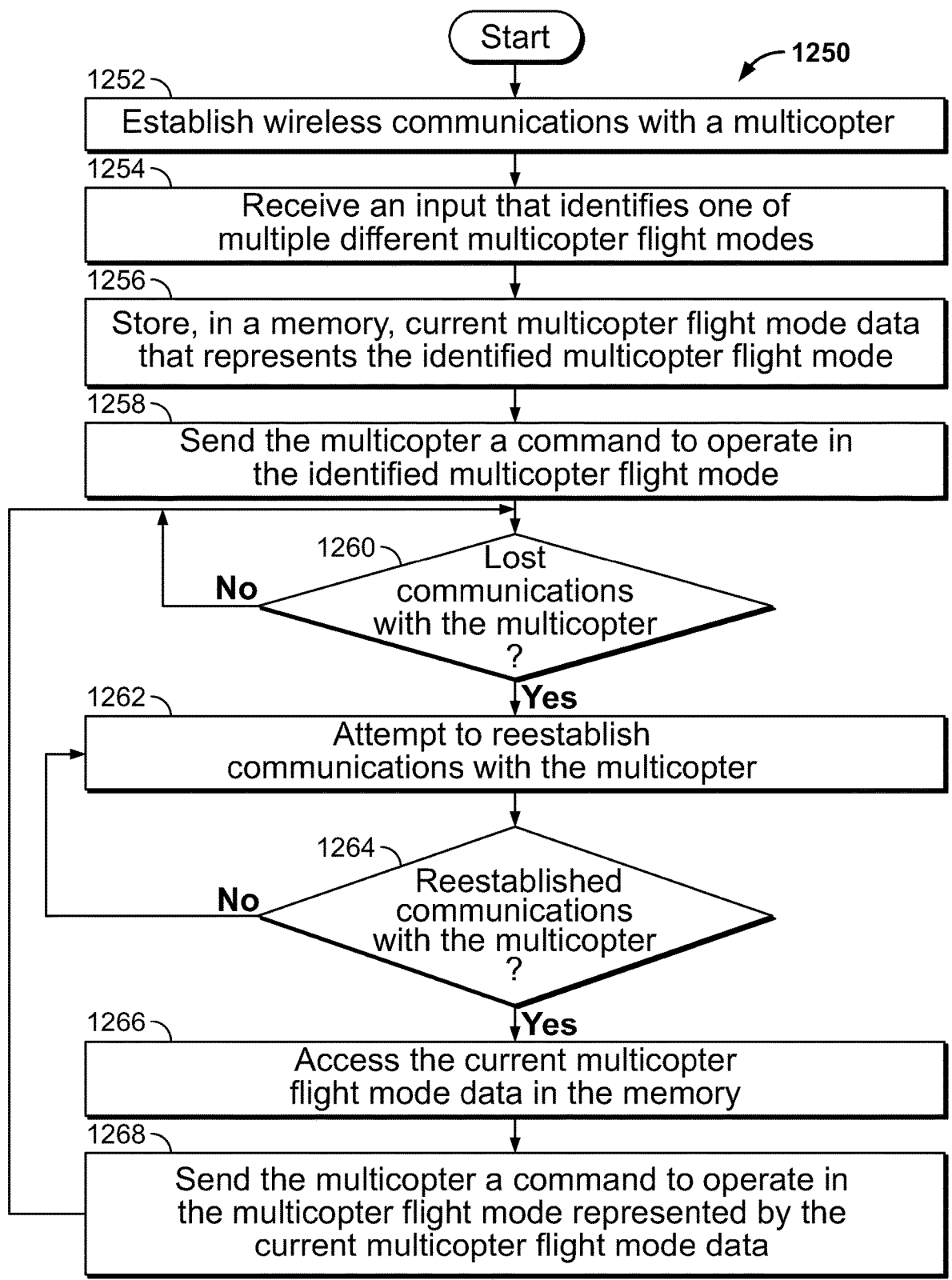
FIG. 11K is a flowchart of an example process for establishing communication between an R/C controller and a multicopter.

FIG. 11K is a flowchart of an example process 1250 for establishing communication between an R/C controller and a multicopter. In various embodiments, instructions stored in an R/C controller memory and executed by an R/C controller processor represent the process 1250.

The process 1250 begins and the R/C controller establishes wireless communications with the multicopter, as block 1252 indicates. The R/C controller receives an input—such as actuation of a pushbutton—that identifies one of multiple different multicopter flight modes, as block 1254 indicates. The R/C controller stores, in an R/C controller memory, current multicopter flight mode data that represents the identified multicopter flight mode, as block 1256 indicates. The R/C controller sends the multicopter a command to operate in the identified multicopter flight mode, as block 1258 indicates.

The R/C controller then monitors to determine whether it has lost communications with the multicopter, as diamond 1260 indicates. Responsive to determining that it has lost communications with the multicopter, the R/C controller automatically attempts to reestablish communications with the multicopter, as block 1262 indicates. The R/C controller determines whether it has successfully reestablished communications with the multicopter, as diamond 1264 indicates. If not, the process 1250 returns to block 1262.

Once the R/C controller has reestablished communications with the multicopter, the R/C controller automatically accesses the current multicopter flight mode data in the memory, as block 1266 indicates. The R/C controller then automatically sends the multicopter a command to operate in the multicopter flight mode represented by the current multicopter flight mode data, as block 1268 indicates.

The R/C controller of the present disclosure solves the problems with prior art mechanical flight mode selection switches by providing dedicated pushbutton flight mode selectors that reduce the potential to accidentally switch the flight mode. The fact that the R/C controller is a state machine enables quick and easy automatic flight mode resumption following a loss and reestablishment of communications with the multicopter.

4.2 Multicopter-Assisted Fixed-Wing Aircraft Retrieval Method

To retrieve the fixed-wing aircraft 20 from wing-borne flight, the operator positions the anchor system 3000 at a desired retrieval location. The operator attaches the free end of the flexible capture member 5000 (which is the free end of the elastic portion 5100 in this embodiment) to the cam 350 of the multicopter 10. The other end of the flexible capture member 5000 is attached to the flexible capture member payout and retract device 3300. A length of the flexible capture member 5000 (particularly, the retractable portion 5300) is fed through the fairlead 3812 and wound around the drum 3312.

As best shown in FIGS. 10D, 10E, 10F, and 10G, the operator fixedly attaches (e.g., by knotting) a breakaway ring 3250 to the flexible capture member 5000 at a particular point (such as 200 feet or any other suitable distance from upper end of the flexible capture member 5000). The operator attaches the breakaway ring 3250 to the breakaway device 3200 as follows: (1) the operator removes the breakaway sleeve 3220 from the collar 3214; (2) the operator rotates the finger 3228 outside of the interior of the breakaway sleeve 3220; (3) the operator slides the breakaway ring 3250 onto the finger 3228; (4) the operator rotates the finger 3228 back inside the interior of the breakaway sleeve 3220; and (5) the operator attaches the breakaway sleeve 3220 to the collar 3214 to trap the finger 3228 within, thereby retaining the breakaway ring 3250 on the finger 3228.

The operator closes the idle power circuit of the multicopter 10 to perform various preflight checks, as described above, and then closes the main power circuit to power the rotor motors. The operator then arms the controller 272, as described above. At this point, as described in more detail below, the multicopter 10 is manually or autonomously controlled (or a combination of both) to capture the fixed-wing aircraft 20 from free flight and land the fixed-wing aircraft and the multicopter 10 according to the following general steps: (1) flying the multicopter 10 to a retrieval location a particular distance above the anchor system 3300; (2) station keeping the multicopter 10 relative to the anchor system 3300 until the fixed-wing aircraft 20 captures the flexible capture member 5000; (3) descending the multicopter 10 until the fixed-wing aircraft 20 contacts a fixed-wing aircraft landing surface; (4) flying the multicopter 10 to a multicopter pre-landing location a particular distance above a landing location; and (5) descending the multicopter 10 to the landing location.

In one example, the operator selects the LOITER or ALTHOLD flight mode and TENSION throttle mode for the multicopter 10. The operator ensures the GPS receiver 3810 of the anchor system 3300 has acquired sufficient GPS satellites to enable the fixed-wing aircraft 20 to locate the anchor system 3300 with an acceptable level of uncertainty.

As the fixed-wing aircraft approaches the anchor system 3300, the operator remotely controls the multicopter 10 to climb to a designated altitude above the anchor system 300 and maintain a particular tension (such as 20 pounds) in the portion of the flexible capture member 5000 extending between the multicopter 10 and the breakaway ring 3250. This tension is less than the force required to compress the compression spring 3216 of the breakaway device 3200 (about 100 to 150 pounds in this example embodiment). The multicopter 10 station keeps relative to the anchor system 3300 while above the anchor system 3300. Above in this context, unless described otherwise, means vertically spaced apart from.

Figure 10I:
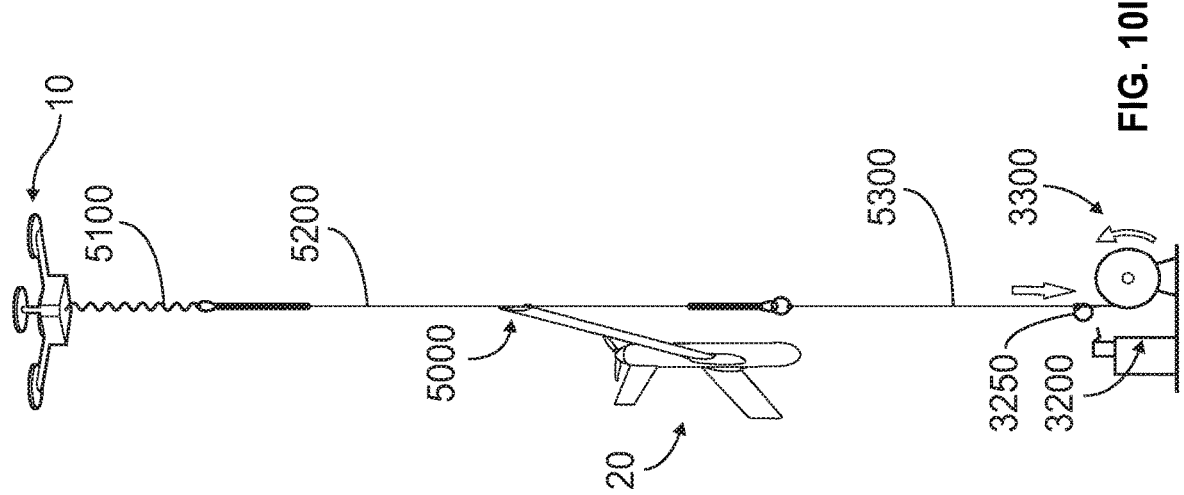
FIG. 10I is a diagrammatic view of the multicopter of FIG. 1A, the fixed-wing aircraft, the flexible capture member of the present disclosure, the breakaway device of FIG. 9C, and the flexible capture member payout and retract device of the anchor system of FIG. 9A after the fixed-wing aircraft has stopped moving and the anchor system has retracted the paid-out portion of the flexible capture member.
Figure 10H:
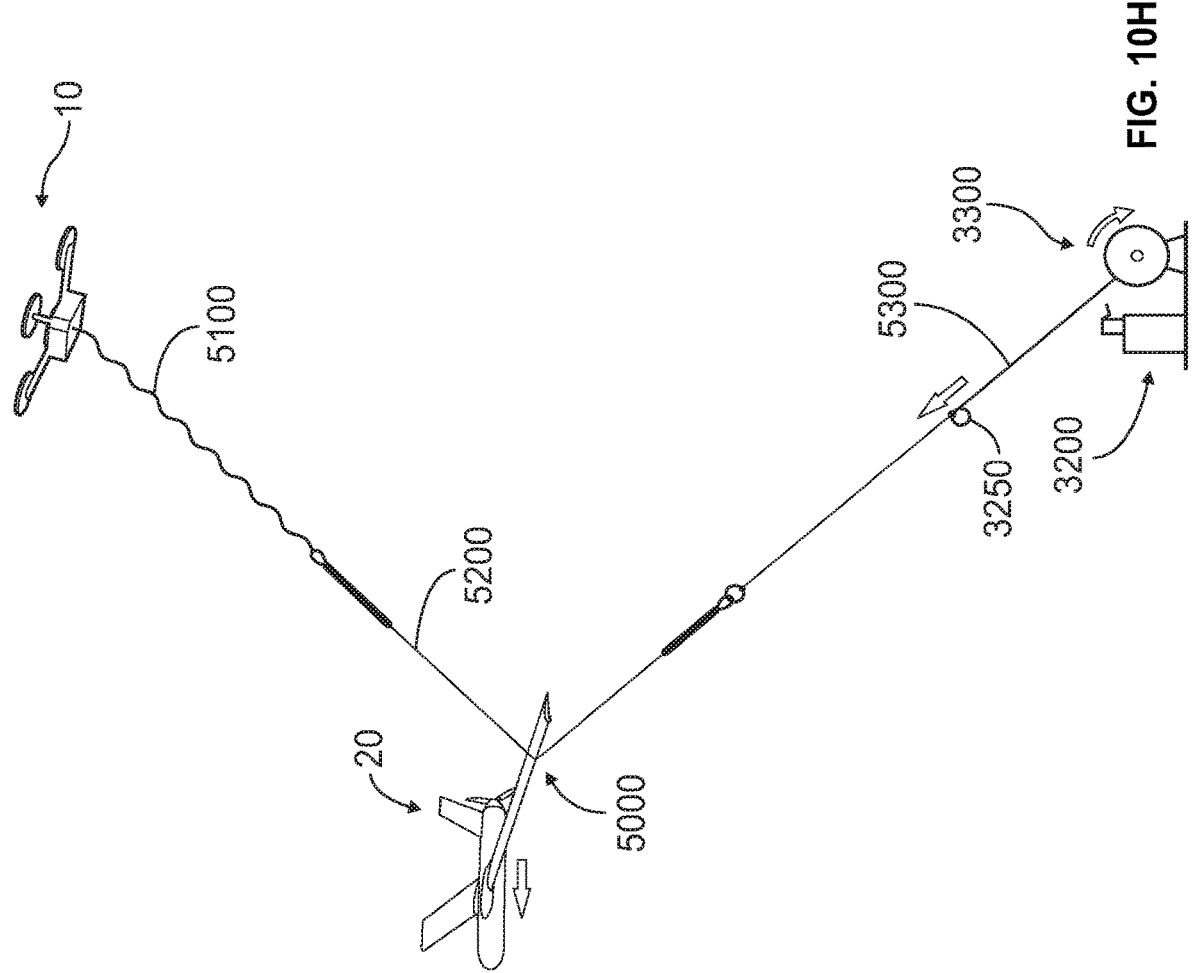
FIG. 10H is a diagrammatic view of the multicopter of FIG. 1A, the fixed-wing aircraft, the flexible capture member of the present disclosure, the breakaway device of FIG. 9C, and the flexible capture member payout and retract device of the anchor system of FIG. 9A just after capture when the anchor system is paying out flexible capture member.

As shown in FIG. 10H, the fixed-wing aircraft 20 is flown toward, contacts, and captures part of the capture portion 5000b of the flexible capture member 5000 in a manner similar to that described in U.S. Pat. No. 6,264,140, the entire contents of which are incorporated herein by reference. Specifically, the fixed-wing aircraft 20 is flown toward the capture portion 5200 of the flexible capture member 5000 such that the leading edge of one of the wings of the fixed-wing aircraft 20 contacts the capture portion 5200. After the leading edge of the wing contacts the capture portion 5200, continued movement of the fixed-wing aircraft 20 relative to the capture portion 5200 causes the capture portion 5200 to slide away from the fuselage of the fixed-wing aircraft 20 along the leading edge of the wing toward the end of the wing until a tether capture device (not shown) near the end of the wing captures part of the capture portion 5200.

When the fixed-wing aircraft 20 contacts the flexible capture member 5000, the operator advances the throttle of the multicopter 10 to maximum for a predetermined period of time (such as 3 seconds), then slowly reduces the throttle to arrest motion and allow the fixed-wing aircraft to controllably descend.

FIGS. 10E, 10F, and 10G show the breakaway device 3300 releasing the breakaway ring 3250 during capture, thereby enabling the anchor system 3000 to begin paying out the retractable portion 5300 of the flexible capture member 5000 wound around the drum 312 of the flexible capture member payout and retract device 3300 to absorb the kinetic energy of and slow the fixed-wing aircraft 20.

FIG. 10E shows the breakaway device 3300 before capture. The fixed-wing aircraft 20 contacting the flexible capture member 5000 tensions the flexible capture member 5000. Since the flexible capture member 5000 is attached to the breakaway sleeve 3220 via the breakaway ring 3250 this tension imposes a lifting force on the breakaway sleeve 3220 and the collar 3214 to which the breakaway sleeve 3220 is attached. As best shown in FIG. 10F, if this lifting force is large enough to overcome the biasing force of the compression spring 3216, this lifting force causes the collar 3214 to slide upward relative to the shaft 3210 and compress the compression spring 3216. As best shown in FIGS. 10F and 10G, once the compression spring 3216 is compressed a designated amount, the finger 3228 is free to escape the breakaway sleeve 3220 through the finger escape slot 3226. At this point, the tension in the flexible capture member 5000 causes the finger 3228 to rotate out of the breakaway sleeve 3220, thereby releasing the breakaway ring 3250.

Once the breakaway device 3200 releases the breakaway ring 3250, continued motion of the fixed-wing aircraft 20 causes the flexible capture member payout and retract device 3300 to begin paying out the retractable portion 5300 of the flexible capture member 5000, initially wound around the drum 3312. As the flexible capture member payout and retract device 3300 pays out the retractable portion 5300 of the flexible capture member 5000, the flexible capture member payout and retract device 3300 dampens this payout—and absorbs the kinetic energy of the fixed-wing aircraft 20—in two ways: (1) the biasing element within the drum 3312 biasing the drum 3312 to its initial rotational position and against the rotation that results in payout of the flexible capture member (described above); and (2) eddy current braking (described below).

As indicated above, the electrically-conductive flanges 3314 and 3316 of the flexible capture member payout and retract device 3300 enable eddy currents to flow as the flanges move in the vicinity of the magnets attracted to the backing plates attached to the anchor system base 3100 to which the flexible capture member payout and retract device 3300 is attached. As the flanges 3314 and 3316 rotate with the drum 3312 relative to the anchor system base 3100—such as while the flexible capture member payout and retract device 3300 pays out the flexible capture member 5000 during retrieval of the fixed-wing aircraft 20—the flanges 3314 and 3316 move past the stationary magnets. This induces eddy currents to flow, and the resulting drag force tends to oppose rotation of the drum 3312. The eddy current drag force increases with increasing speed and therefore the payout speed is limited.

The fixed-wing aircraft 20 eventually stops moving and dangles below the multicopter 10, as best shown in FIG. 10I. At this point, the biasing element within the drum 3312 biases the drum 3312 to reverse spin direction, which retracts the retractable portion 5300 of the flexible capture member back into the anchor system 3300. Specifically, this causes the retractable portion 5300 of the flexible capture member to wind back onto the drum 3312. In some embodiments, the flexible capture member payout and retract device is configured to retract only part of the flexible capture member—such as the retractable portion—while in other embodiments the flexible capture member payout and retract device is configured to retract all or substantially all of the flexible capture member. The flexible capture member payout and retract device in certain embodiments includes a motor-driven payout spool (such as a spool used for fishing or parasailing), a capstan winch (such as those used for anchoring a yacht) a clothes wringer, or a stuff sack, such as those used in sport climbing.

Once the tether capture device of the fixed-wing aircraft 20 captures the part of the capture portion 5200, the tether capture device holds that part of the capture portion 5200 such that the fixed-wing aircraft 20 does not slide down the flexible capture member 5000. If, however, the tether capture device does not initially prevent the fixed-wing aircraft from sliding down the flexible capture member 5000 and the fixed-wing aircraft 20 begins sliding, the increasing thickness of the capture portion 5200 will eventually arrest this sliding. In other embodiments, rather than (or in addition to) being thicker at its ends than in its middle, the capture portion 5200 is knotted along its length (such as every few feet) to prevent the fixed-wing aircraft 20 from sliding down the capture portion 5200 after capture.

After capture, the operator may engage NORMAL throttle mode to improve control of his descent rate as the flexible capture member 5000 slackens and the fixed-wing aircraft 20 is lowered to the landing surface. Thereafter, the operator may engage the partial-power mode and control the multicopter 10 to descend until it reaches ground, at which point the operator shuts down the rotor motors.

While a manually controlled retrieval sequence is described above, the controller 272 may also be configured to autonomously retrieve the fixed-wing aircraft with limited operator input. This feature reduces the potential for operator error that may result in failed retrieval or damage to the multicopter and/or the fixed-wing aircraft.

Figure 11L:
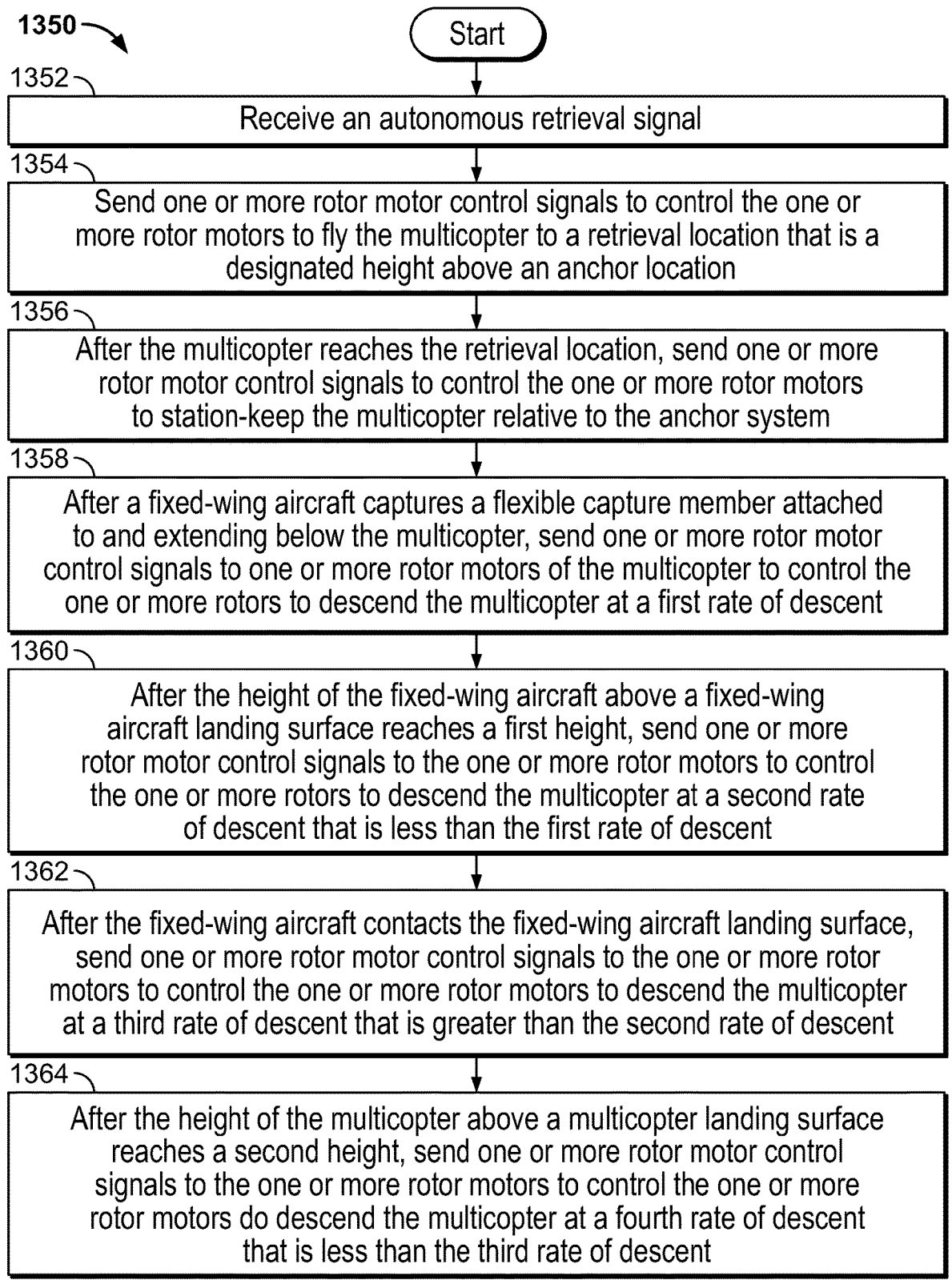
FIG. 11L is a flowchart of an example process for autonomously retrieving the fixed-wing aircraft using the multicopter.

FIG. 11L is a flowchart of an example process 1350 for autonomously retrieving the fixed-wing aircraft 20 using the multicopter 10. In various embodiments, instructions stored in the memory 272b and executed by the processor 272a of the controller 272 represent the process 1350.

The process 1300 begins when the controller receives an autonomous retrieval signal from the R/C controller, as block 1352 indicates. The controller determines, based on GPS coordinates of the anchor assembly (described above), a retrieval location that is a designated height above the anchor assembly, and automatically sends one or more rotor motor control signals to control the one or more rotor motors to fly the multicopter to the retrieval location, as block 1354 indicates. After the multicopter reaches the retrieval location, the controller automatically sends one or more rotor motor control signals to control the one or more rotor motors to station-keep the multicopter relative to the anchor system, as block 1356 indicates. For fixed base operations, this station keeping coincides with a fixed set of GPS coordinates. But for moving base operations (e.g., when the anchor assembly is on a ship at sea), station keeping over the anchor assembly is achieved by tracking the movement of the anchor assembly and maintaining a position over it.

After the fixed-wing aircraft captures the flexible capture member attached to and extending below the multicopter, the controller (either automatically or in response to operator input) sends one or more rotor motor control signals to one or more of the rotor motors of the multicopter to control the one or more rotors to descend the multicopter at a first rate of descent, as block 1358 indicates. After the height of the fixed-wing aircraft relative to a fixed-wing aircraft landing surface reaches a first height, the controller automatically sends one or more rotor motor control signals to the one or more rotor motors to control the one or more rotors to descend the multicopter at a second rate of descent that is less than the first rate of descent, as block 1360 indicates. In other words, the controller decreases the multicopter's rate of descent as the fixed-wing aircraft approaches its landing surface. The first height may be determined based on a target capture height of the fixed-wing aircraft. For instance, if the multicopter station keeps at 200 feet above the landing surface and the fixed-wing aircraft is controlled to capture the flexible capture member 100 feet above the landing surface, the controller determines the first height based on the fact that the flexible capture fixed wing aircraft must descend 100 feet before contacting the landing surface.

After the fixed-wing aircraft contacts the fixed-wing aircraft landing surface, the controller (automatically or in response to operator input) sends one or more rotor motor control signals to the one or more rotor motors to control the one or more rotor motors to descend the multicopter at a third rate of descent that is greater than the second rate of descent, as block 1362 indicates. That is, the controller increases the multicopter's rate of descent after the fixed-wing aircraft has safely landed. After the height of the multicopter above a multicopter landing surface reaches a second height, the controller automatically sends one or more rotor motor control signals to the one or more rotor motors to control the one or more rotor motors to descent the multicopter at a fourth rate of descent that is less than the third rate of descent, as block 1364 indicates. That is, the controller decreases the multicopter's rate of descent as the multicopter approaches its landing surface. In certain embodiments, the first and third rates are the same and the second and fourth rates are the same.

In other embodiments, rather than make the above determinations based on the multicopter's height, the controller does so indirectly based on the barometric pressure sensed by the barometer, as described above.

In certain embodiments, the operator desires to retrieve the fixed-wing aircraft 20 from a location in which GPS is unavailable. In these embodiments, the operator attaches the GPS receiver 3810—normally attached to the anchor system 3000—to the multicopter 10. This enables the GPS receiver 3810 to acquire GPS once the multicopter 10 climbs to the desired altitude for retrieval.

5. Methods of Operation and Apparatus Summarization 5.1 Partial-Power Mode Method of Operation and Apparatus It should be appreciated from the above that various embodiments of the present disclosure includes a method for operating a multicopter in a partial-power mode, the method comprising: receiving a partial-power mode signal; and responsive to receipt of the partial-power mode signal, for each rotor motor of a first set of rotor motors of the multicopter, controlling, by a controller, that rotor motor to operate at no more than a designated rotor motor output, wherein the designated rotor motor output is less than an output of each rotor motor of a second set of rotor motors of the multicopter. In various such embodiments, the multicopter includes multiple upper rotor motors and multiple lower rotor motors, and wherein the first set of rotor motors includes each upper rotor motor of the multicopter and the second set of rotor motors includes each lower rotor motor of the multicopter. In various such embodiments, the multicopter includes multiple arms and each arm includes one of the upper rotor motors and one of the lower rotor motors. In various such embodiments, the designated output is a minimum rotor motor output. In various such embodiments, the designated output is zero output. In various such embodiments, the multicopter includes multiple upper rotor motors and multiple lower rotor motors, and wherein the first set of rotor motors includes each upper rotor motor of the multicopter and the second set of rotor motors includes each lower rotor motor of the multicopter. In various such embodiments, the method includes receiving the partial-power mode signal via a communications interface. In various such embodiments, the designated rotor motor output includes a designated rotor motor rotational speed. In various such embodiments, the designated rotor motor rotational speed is a minimum rotor motor rotational speed. In various such embodiments, the method includes, responsive to receipt of the partial-power mode signal, not modifying, by the controller, output of the rotor motors of the second set of rotor motors.

It should be appreciated from the above that various embodiments of the present disclosure include a multicopter comprising: multiple arms; a first set of multiple rotor motors, each rotor motor of the first set of rotor motors attached to a different one of the arms; a second set of multiple rotor motors, each rotor motor of the second set of rotor motors attached to a different one of the arms; and a controller configured to, responsive to receipt of a partial-power mode signal, for each rotor motor of the first set of rotor motors, control that rotor motor to operate at no more than a designated rotor motor output, wherein the designated rotor motor output is less than an output of each rotor motor of the second set of rotor motors. In various such embodiments, the multicopter includes multiple upper rotor motors and multiple lower rotor motors, and wherein the first set of rotor motors includes each upper rotor motor of the multicopter and the second set of rotor motors includes each lower rotor motor of the multicopter. In various such embodiments, the designated output is a minimum rotor motor output. In various such embodiments, the designated output is zero output. In various such embodiments, the multicopter includes multiple upper rotor motors and multiple lower rotor motors, and wherein the first set of rotor motors includes each upper rotor motor of the multicopter and the second set of rotor motors includes each lower rotor motor of the multicopter. In various such embodiments, the multicopter includes a communications interface communicatively connectable to a device to receive the partial-power mode signal. In various such embodiments, the designated rotor motor output includes a designated rotor motor rotational speed. In various such embodiments, the designated rotor motor rotational speed is a minimum rotor motor rotational speed. In various such embodiments, the controller is configured, responsive to receipt of the partial-power mode signal, not modify output of the rotor motors of the second set of rotor motors.

5.2 Arming Without Yaw Input Method of Operation and Apparatus

It should be appreciated from the above that various embodiments of the present disclosure includes a method for arming a controller of a rotorcraft, the method comprising: receiving, by a communications interface, an arm signal that is decoupled from any rotorcraft yaw control signal; and responsive to receipt of the arm signal, arming, by the controller, itself without intentionally inducing rotorcraft yaw movement. In various such embodiments, the rotorcraft includes multiple rotor motors, and which includes, after arming the controller, controlling, by the controller, the rotor motors to operate at a designated rotor motor output. In various such embodiments, the method includes controlling, by the controller, the rotor motors to operate at the designated rotor motor output for a designated period. In various such embodiments, the rotorcraft includes a first set of rotor motors and a second set of rotor motors, and the method includes, if the controller was armed in a partial-power mode, after expiration of the designated period, for each rotor motor of the first set of rotor motors, controlling, by the controller, that rotor motor to operate at no more than a designated rotor motor output, wherein the designated rotor motor output is less than an output of each rotor motor of the second set of rotor motors. In various such embodiments, the rotorcraft includes multiple upper rotor motors and multiple lower rotor motors, and wherein the first set of rotor motors includes each upper rotor motor of the rotorcraft and the second set of rotor motors includes each lower rotor motor of the rotorcraft. In various such embodiments, the rotorcraft includes multiple arms and each arm includes one of the upper rotor motors and one of the lower rotor motors. In various such embodiments, the designated output is a minimum rotor motor output. In various such embodiments, the rotorcraft includes multiple upper rotor motors and multiple lower rotor motors, and wherein the first set of rotor motors includes each upper rotor motor of the rotorcraft and the second set of rotor motors includes each lower rotor motor of the rotorcraft.

It should be appreciated from the above that various embodiments of the present disclosure include a rotorcraft comprising: a communications interface configured to receive to receive an arm signal from a remote device, wherein the arm signal is decoupled from any rotorcraft yaw control signal; and a controller configured to arm responsive to receipt of the arm signal without intentionally inducing rotorcraft yaw movement. In various such embodiments, the rotorcraft includes multiple rotor motors, and wherein the controller is configured to, after arming, control the rotor motors to operate at a designated rotor motor output. In various such embodiments, the controller is configured to control the rotor motors to operate at the designated rotor motor output for a designated period. In various such embodiments, the rotorcraft includes a first set of rotor motors and a second set of rotor motors, and wherein the controller is configured to, if armed in a partial-power mode, after expiration of the designated period, for each rotor motor of the first set of rotor motors, control that rotor motor to operate at no more than a designated rotor motor output, wherein the designated rotor motor output is less than an output of each rotor motor of the second set of rotor motors. In various such embodiments, the rotorcraft includes multiple upper rotor motors and multiple lower rotor motors, and wherein the first set of rotor motors includes each upper rotor motor of the rotorcraft and the second set of rotor motors includes each lower rotor motor of the rotorcraft. In various such embodiments, the rotorcraft includes multiple arms and each arm includes one of the upper rotor motors and one of the lower rotor motors. In various such embodiments, the designated output is a minimum rotor motor output. In various such embodiments, the rotorcraft includes multiple upper rotor motors and multiple lower rotor motors, and wherein the first set of rotor motors includes each upper rotor motor of the rotorcraft and the second set of rotor motors includes each lower rotor motor of the rotorcraft.

5.3 Rotor Motor Stall Detection Method of Operation and Apparatus

It should be appreciated from the above that various embodiments of the present disclosure include method for detecting a rotor motor stall before rotorcraft launch, the method comprising: (1) for a designated period after sending a signal commanding a rotor motor to operate, receiving, by a controller and from a rotational speed sensor, a measured rotational speed of the rotor motor; and (2) if the measured rotational speed of the rotor motor is below a threshold rotational speed upon expiration of the designated period, controlling, by the controller, the rotor motor to shut down. In various such embodiments, the rotorcraft includes multiple rotor motors, and which includes performing (1) and (2) for each of the rotor motors. In various such embodiments, the method includes, if the measured rotational speed of any one of the rotor motors is below the threshold rotational speed upon expiration of the designated period, controlling, by the controller, all of the rotor motors to shut down. In various such embodiments, the method includes periodically receiving, by the controller and from the rotational speed sensor, the measured rotational speed of the rotor motor. In various such embodiments, the designated period includes a period of time.

It should be appreciated from the above that various embodiments of the present disclosure include a rotorcraft comprising: a rotor motor; a rotational speed sensor operatively connected to the rotor motor to measure a rotational speed of the rotor motor; and a controller configured to: (1) for a designated period after sending a signal commanding the rotor motor to operate, receive, from the rotational speed sensor, the measured rotational speed of the rotor motor; and (2) if the measured rotational speed of the rotor motor is below a threshold rotational speed upon expiration of the designated period, control the rotor motor to shut down. In various such embodiments, the rotorcraft includes multiple rotor motors, and wherein the controller is configured to perform (1) and (2) for each of the rotor motors. In various such embodiments, if the measured rotational speed of any one of the rotor motors is below the threshold rotational speed upon expiration of the designated period, the controller is configured to control all of the rotor motors to shut down. In various such embodiments, the rotational speed sensor is configured to periodically send the measured rotational speed of the rotor motor to the controller. In various such embodiments, the designated period includes a period of time.

It should be appreciated from the above that various embodiments of the present disclosure includes a method for detecting a rotor motor stall before rotorcraft launch, the method comprising: (1) for a designated period after sending a signal commanding a rotor motor to operate, monitoring, by a controller, a back electromotive force generated by the rotor motor; and (2) if the back electromotive force generated by the rotor motor is below a threshold back electromotive force rotational speed upon expiration of the designated period, controlling, by the controller, the rotor motor to shut down. In various such embodiments, the rotorcraft includes multiple rotor motors, and the method includes performing (1) and (2) for each of the rotor motors. In various such embodiments, the method includes, if the back electromotive force of any one of the rotor motors is below the threshold back electromotive force upon expiration of the designated period, controlling, by the controller, all of the rotor motors to shut down. In various such embodiments, the method includes periodically monitoring, by the controller, the back electromotive force generated by the rotor motor. In various such embodiments, the designated period includes a period of time.

It should be appreciated from the above that various embodiments of the present disclosure include a rotorcraft comprising: a rotor motor; and a controller configured to: (1) for a designated period after sending a signal commanding the rotor motor to operate, monitor a back electromotive force generated by the rotor motor; and (2) if the back electromotive force generated by the rotor motor is below a threshold back electromotive force upon expiration of the designated period, control the rotor motor to shut down. In various such embodiments, the rotorcraft includes multiple rotor motors, and wherein the controller is configured to perform (1) and (2) for each of the rotor motors. In various such embodiments, if the back electromotive force of any one of the rotor motors is below the threshold back electromotive force upon expiration of the designated period, the controller is configured to control all of the rotor motors to shut down. In various such embodiments, the controller is configured to periodically monitor the back electromotive force generated by the rotor motor. In various such embodiments, the designated period includes a period of time.

5.4 Setting Maximum Rotor Motor Output Method of Operation and Apparatus

It should be appreciated from the above that various embodiments of the present disclosure includes a method for setting a maximum output of a rotor motor of a rotorcraft, the method comprising: (1) measuring, by a barometer, a barometric pressure; (2) determining, by a controller, whether the measured barometric pressure is above a threshold barometric pressure; (3) setting, by the controller, the maximum output based on whether the measured barometric pressure is above the threshold barometric pressure; and (4) limiting, by the controller, an output of the rotor motor to the maximum output. In various such embodiments, the method includes: if the measured barometric pressure is below the threshold barometric pressure, setting, by the controller, the maximum output to a first rotor motor output; and if the measured barometric pressure is above the threshold barometric pressure, setting, by the controller, the maximum output to a second rotor output that is different from the first rotor motor output. In various such embodiments, the second rotor motor output is greater than the first rotor motor output. In various such embodiments, the method includes, if the measured barometric pressure is equal to the threshold barometric pressure, setting, by the controller, the maximum output to the second rotor output. In various such embodiments, the method includes setting, by the controller, the maximum output based on whether the measured barometric pressure is above the threshold barometric pressure responsive to the controller arming itself. In various such embodiments, the method includes repeating (2) to (3) at least once. In various such embodiments, the method includes setting the maximum output includes storing, in a memory, data representing the maximum output.

It should be appreciated from the above that various embodiments of the present disclosure include a rotorcraft comprising: a barometer configured to measure barometric pressure; a rotor motor; and a controller configured to: (1) determine whether the measured barometric pressure is above a threshold barometric pressure; (2) set a maximum output of the rotor motor based on whether the measured barometric pressure is above the threshold barometric pressure; and (3) limit an output of the rotor motor to the maximum output. In various such embodiments, the controller is configured to: if the measured barometric pressure is below the threshold barometric pressure, set the maximum output to a first rotor motor output; and if the measured barometric pressure is above the threshold barometric pressure, set the maximum output to a second rotor output that is different from the first rotor motor output. In various such embodiments, the second rotor motor output is greater than the first rotor motor output. In various such embodiments, the controller is configured to, if the measured barometric pressure is equal to the threshold barometric pressure, set the maximum output to the second rotor output. In various such embodiments, the controller is configured to set the maximum output based on whether the measured barometric pressure is above the threshold barometric pressure responsive to the controller arming itself. In various such embodiments, the controller is configured to repeat (1) to (2) at least once. In various such embodiments, the rotorcraft includes a memory, and wherein the controller is configured to set the maximum output by storing data representing the maximum output in the memory.

5.5 No Yaw Control Method of Operation and Apparatus

It should be appreciated from the above that various embodiments of the present disclosure includes a method for controlling an airborne rotorcraft, the method comprising: controlling by a controller a first feedback loop about a longitudinal roll axis of the airborne rotorcraft and controlling by the controller a second feedback loop about a horizontal pitch axis of the airborne rotorcraft, without controlling a vertical yaw axis of the airborne rotorcraft. In various such embodiments, the yaw control of the airborne rotorcraft is provided by one or more fins of the rotorcraft. In various such embodiments, one of the fins of the rotorcraft aligns airflow with the longitudinal axis of a fixed-wing aircraft during a launch phase of the fixed-winged aircraft flight. In various such embodiments, the yaw control of the airborne rotorcraft is provided by manual input from a joystick. In certain circumstances, the autopilot maintains no heading preference so, to perform a launch with a slight tailwind, it is sometimes necessary for the manual pilot to provide yaw input to orient the airborne aircraft, and then to dash in the direction the nose is pointed.

It should be appreciated from the above that various embodiments of the present disclosure includes a method for controlling an airborne rotorcraft, the method comprising: measuring, by a roll angle sensor, a roll angle of the rotorcraft; measuring, by a pitch angle sensor, a pitch angle of the rotorcraft; monitoring, by a controller, the measured roll angle; monitoring, by the controller, the measured pitch angle; responsive to the measured roll angle differing from a target roll angle by at least a first designated amount, controlling, by the controller, one or more rotor motors of the rotorcraft to operate to eliminate the difference between the measured roll angle and the target roll angle; responsive to the measured pitch angle differing from a target pitch angle by at least a second designated amount, controlling, by the controller, the one or more rotor motors to operate to eliminate the difference between the measured pitch angle and the target pitch angle; and enabling, by the controller, the rotorcraft to self-orient about its yaw axis in flight. In various embodiments, the method includes measuring, by a yaw angle sensor, the yaw angle of the rotorcraft.

It should be appreciated from the above that various embodiments of the present disclosure include a rotorcraft comprising: a roll angle sensor configured to measure a roll angle of the rotorcraft; a pitch angle sensor configured to measure a pitch angle of the rotorcraft; one or more rotor motors; and a controller configured to: monitor the measured roll angle and responsive to the measured roll angle differing from a target roll angle by at least a first amount, control the one or more rotor motors to operate to eliminate a difference between the measured roll angle and the target roll angle; monitor the measured pitch angle and responsive to the measured pitch angle differing from a target pitch angle by at least a second amount, control the one or more rotor motors to operate to eliminate a difference between the measured pitch angle and the target pitch angle; and enable the rotorcraft to self-orient about its yaw axis in flight. In various embodiments, the rotorcraft includes a yaw angle sensor configured to measure a yaw angle of the rotorcraft.

5.6 Conditioned Fixed-Wing Aircraft Release Method of Operation and Apparatus It should be appreciated from the above that various embodiments of the present disclosure includes a method for controlling a rotorcraft, the method comprising: monitoring, by a controller, for satisfaction of a release condition; enabling, by the controller, an actuator of the rotorcraft to move to a release position to when the release condition is satisfied; and responsive to receipt of a release signal while movement of the actuator to the release position is enabled, controlling, by the controller, the actuator to move to the release position. In various embodiments, the method includes not enabling, by the controller, the actuator to move to the release position when the release condition is not satisfied. In various embodiments, the method includes, responsive to receipt of the release signal while movement of the actuator to the release position is not enabled, not controlling, by the controller, the actuator to move to the release position. In various embodiments, the release condition is at least partially satisfied when a pitch angle of the rotorcraft is within a designated pitch angle range. In various embodiments, the method includes measuring, by a pitch angle sensor, the pitch angle of the rotorcraft. In various embodiments, the rotorcraft includes a global-positioning system receiver, and wherein the release condition is at least partially satisfied when the global-positioning system receiver has established global-positioning system connectivity. In various embodiments, the release condition is at least partially satisfied when a height of the rotorcraft above ground is greater than a designated height. In various embodiments, the method includes determining, by the controller, the height of the rotorcraft above ground.

It should be appreciated from the above that various embodiments of the present disclosure include a rotorcraft comprising: a communications interface configured to receive a release signal; an actuator movable between an attach position and a release position; and a controller configured to: monitor for satisfaction of a release condition; enable the actuator to move from the attach position to the release position when the release condition is satisfied; and responsive to receipt, by the communications interface, of the release signal while movement of the actuator to the release position is enabled, control the actuator to move to the release position. In various embodiments, the controller is configured to not enable the actuator to move to the release position when the release condition is not satisfied. In various embodiments, the controller is configured to, responsive to receipt, by the communications interface, of the release signal while movement of the actuator to the release position is not enabled, not control the actuator to move to the release position. In various embodiments, the release condition is at least partially satisfied when a pitch angle of the rotorcraft is within a designated pitch angle range. In various embodiments, the rotorcraft includes a pitch angle sensor configured to measure the pitch angle of the rotorcraft. In various embodiments, the rotorcraft includes a global-positioning system receiver, and wherein the release condition is at least partially satisfied when the GPS receiver has established global-positioning system connectivity. In various embodiments, the release condition is at least partially satisfied when a height of the rotorcraft above ground is greater than a designated height. In various embodiments, the controller is configured to determine the height of the rotorcraft above ground.

5.7 Limiting Rotorcraft Pitch Angle Rate of Change Method of Operation and Apparatus It should be appreciated from the above that various embodiments of the present disclosure includes a method for limiting a pitch angle of a rotorcraft, the method comprising: receiving, by a communications interface, a signal associated with a desired pitch angle that differs from a current pitch angle of the rotorcraft; and controlling, by the controller, one or more rotor motors of the rotorcraft to operate to change the current pitch angle to the desired pitch angle at a rate no greater than a maximum, finite pitch angle rate of change.

It should be appreciated from the above that various embodiments of the present disclosure include a rotorcraft comprising: a communications interface configured to receive a signal associated with a desired pitch angle that differs from a current pitch angle of the rotorcraft; one or more rotor motors; and a controller configured to, responsive to receipt of the signal, control the one or more rotor motors to operate to change the current pitch angle to the desired pitch angle at a rate no greater than a maximum, finite pitch angle rate of change.

5.8 Setting Maximum Rotorcraft Pitch Angle Method of Operation and Apparatus

It should be appreciated from the above that various embodiments of the present disclosure includes a method for setting a maximum pitch angle of a rotorcraft, the method comprising: receiving, by a communications interface, a signal associated with a desired one of multiple different flight modes, each flight mode associated with one of multiple different pitch angles; operating, by the controller, the rotorcraft in accordance with the desired flight mode; setting, by the controller, the maximum pitch angle of the rotorcraft to the pitch angle associated with the desired flight mode; and controlling, by the controller, one or more rotor motors of the rotorcraft during flight such that a pitch angle of the rotorcraft does not exceed the maximum pitch angle. In various such embodiments, setting the maximum pitch angle includes storing, by the controller, data representing the maximum pitch angle in a memory.

It should be appreciated from the above that various embodiments of the present disclosure include a rotorcraft comprising: a communications interface configured to receive a signal associated with a desired one of multiple different flight modes, each flight mode associated with one of multiple different pitch angles; one or more rotor motors; and a controller configured to, responsive to receipt of the signal: operate the rotorcraft in accordance with the desired flight mode; set a maximum pitch angle of the rotorcraft to the pitch angle associated with the desired flight mode; and control the one or more rotor motors during flight such that a pitch angle of the rotorcraft does not exceed the maximum pitch angle. In various such embodiments, the rotorcraft includes a memory, and wherein the controller is configured to set the maximum pitch angle by storing data representing the maximum pitch angle in the memory.

5.9 Autonomous Launch Method of Operation and Apparatus

It should be appreciated from the above that various embodiments of the present disclosure includes a method for launching a fixed-wing aircraft using a rotorcraft, the method comprising: receiving, via a communications interface, an autonomous launch signal; responsive to receipt of the autonomous launch signal, determining, by a controller and based at least in part on signals received from one or more sensors, a pre-launch heading of the rotorcraft; determining, by the controller and based at least in part on the pre-launch heading, a launch flight path; controlling, by the controller and based on rotorcraft location information, one or more rotor motors of the rotorcraft to fly the rotorcraft in accordance with the launch flight path; and controlling, by the controller, an actuator to disconnect the fixed-wing aircraft from the rotorcraft while the rotorcraft is flying in accordance with the launch flight path. In various such embodiments, the one or more sensors include a magnetometer. In various such embodiments, data representing a shape of the launch flight path is stored in a memory of the controller. In various such embodiments, determining the launch flight path includes determining, by the controller and based at least in part on the pre-launch heading, global-positioning system coordinates corresponding to the launch flight path. In various such embodiments, the rotorcraft location information includes a location of the rotorcraft on Earth. In various such embodiments, the rotorcraft location information includes global-positioning system coordinates. In various such embodiments, the method includes monitoring, by a global-positioning system receiver of the rotorcraft, the global-positioning system coordinates of the rotorcraft. In various such embodiments, the method includes aborting, by the controller, the launch if the global-positioning system receiver loses global-positioning system connectivity during the launch.

It should be appreciated from the above that various embodiments of the present disclosure include a rotorcraft comprising: a communications interface configured to receive an autonomous launch signal; one or more sensors; one or more rotor motors; an actuator; and a controller configured to: responsive to receipt of the autonomous launch signal, determine, based at least in part on signals received from one or more sensors, a pre-launch heading of the rotorcraft; determine, based at least in part on the pre-launch heading, a launch flight path; control, based on rotorcraft location information, the one or more rotors to fly the rotorcraft fly in accordance with the launch flight path; and control the actuator to disconnect a fixed-wing aircraft from the rotorcraft while the rotorcraft is flying in accordance with the launch flight path. In various such embodiments, the one or more sensors include a magnetometer. In various such embodiments, data representing a shape of the launch flight path is stored in a memory of the controller. In various such embodiments, the controller is configured to determine the launch flight path by determining, based at least in part on the pre-launch heading, global-positioning system coordinates corresponding to the launch flight path. In various such embodiments, the rotorcraft location information includes a location of the rotorcraft on Earth. In various such embodiments, the rotorcraft location information includes global-positioning system coordinates. In various such embodiments, the rotorcraft includes a global-positioning system receiver configured to monitor the global-positioning system coordinates of the rotorcraft. In various such embodiments, the controller is configured abort the launch if the global-positioning system receiver loses global-positioning system connectivity during the launch.

5.10 Rotor Motor Shut Down Method of Operation and Apparatus

It should be appreciated from the above that various embodiments of the present disclosure includes a method of operating a rotorcraft, the method comprising: monitoring, by a controller, for satisfaction of a rotor motor shut-down condition; enabling, by the controller, rotor motor shut down when the rotor motor shut-down condition is satisfied; and responsive to receipt of a rotor motor shut-down signal while rotor motor shut down is enabled and the rotorcraft is airborne, controlling, by the controller, each rotor motor of the rotorcraft to shut down. In various such embodiments, the method includes not preventing, by the controller, rotor motor shut down until the rotor motor shut-down condition is satisfied. In various such embodiments, the method includes, responsive to receipt of the rotor motor shut-down signal while rotor motor shut down is prevented, not controlling, by the controller, each rotor motor of the rotorcraft to shut down. In various such embodiments, the rotor motor shut-down condition is at least partially satisfied when a height of the rotorcraft above a landing surface is below a designated height. In various such embodiments, the method includes monitoring, by the controller, the height of the rotorcraft above the landing surface. In various such embodiments, the method includes measuring, by a barometer, a barometric pressure and determining, by the controller, the height of the rotorcraft above the landing surface based at least in part on the measured barometric pressure. In various such embodiments, the rotor motor shut-down condition is at least partially satisfied when a throttle level of each rotor motor is below a designated throttle level. In various such embodiments, the method includes monitoring, by the controller, the throttle level of each rotor motor.

It should be appreciated from the above that various embodiments of the present disclosure include a rotorcraft comprising: one or more rotor motors; and a controller configured to: monitor for satisfaction of a rotor motor shut-down condition; enable rotor motor shut down when the rotor motor shut-down condition is satisfied; and responsive to receipt of a rotor motor shut-down signal while rotor motor shut down is enabled and the rotorcraft is airborne, control each rotor motor of the rotorcraft to shut down. In various such embodiments, the controller is configured to prevent rotor motor shut down until the rotor motor shut-down condition is satisfied. In various such embodiments, the controller is configured to, responsive to receipt of the rotor motor shut-down signal while rotor motor shut down is prevented, not control each rotor motor of the rotorcraft to shut down. In various such embodiments, the rotor motor shut-down condition is at least partially satisfied when a height of the rotorcraft above a landing surface is below a designated height. In various such embodiments, the controller is configured to monitor the height of the rotorcraft above the landing surface. In various such embodiments, the rotorcraft includes a barometer configured to measure a barometric pressure, and wherein the controller is configured to determine the height of the rotorcraft above the landing surface based at least in part on the measured barometric pressure. In various such embodiments, the rotor motor shut-down condition is at least partially satisfied when a throttle level of each rotor motor is below a designated throttle level. In various such embodiments, the controller is configured to monitor the throttle level of each rotor motor.

5.11 State-Based Remote Controller Method of Operation and Apparatus

It should be appreciated from the above that various embodiments of the present disclosure includes a method of establishing communications with a rotorcraft, the method comprising: establishing, by a communications interface, communications with a rotorcraft; receiving, by an input device, an input that identifies one of multiple different flight modes; storing, by a controller and in a memory, current rotorcraft flight mode data that represents the identified flight mode; and sending, to the rotorcraft and by the communications interface, a command to operate in the identified flight mode. In various such embodiments, the method includes, responsive to losing communications with the rotorcraft: attempting, by the communications interface, to reestablish communications with the rotorcraft; after communications with the rotorcraft are reestablished, accessing, by the controller, the current rotorcraft flight mode data stored in the memory; and sending, to the rotorcraft and by the communications interface, a command to operate in the flight mode represented by the current rotorcraft flight mode data.

It should be appreciated from the above that various embodiments of the present disclosure include a remote controller comprising: a communications interface configured to establish communications with a rotorcraft; one or more flight mode selection devices; and a controller including a processor and a memory, the controller configured to: responsive to receipt, by one of the one or more flight mode selection devices, of an input that identifies one of multiple different flight modes, store in the memory current rotorcraft flight mode data that represents the identified flight mode; and cause the communications interface to send to the rotorcraft a command to operate in the identified flight mode. In various such embodiments, the controller is configured to, responsive to losing communications with the rotorcraft: cause the communications interface to attempt to reestablish communications with the rotorcraft; after communications with the rotorcraft are reestablished, access the current rotorcraft flight mode data stored in the memory; and cause the communications interface to send to the rotorcraft a command to operate in the flight mode represented by the current rotorcraft flight mode data.

5.12 Autonomous Retrieval Method of Operation and Apparatus

It should be appreciated from the above that various embodiments of the present disclosure includes a method for retrieving a fixed-wing aircraft from flight using a rotorcraft, the method comprising: receiving, via a communications interface, an autonomous retrieval signal; responsive to receipt of the autonomous retrieval signal, controlling, by a controller, one or more rotor motors of the rotorcraft to fly the rotorcraft to a retrieval location above a ground anchor; after the rotorcraft reaches the retrieval location, controlling, by the controller, the one or more rotor motors to station-keep the rotorcraft relative to the ground anchor; after a fixed-wing aircraft captures a flexible capture member attached to the rotorcraft, controlling, by the controller, the one or more rotor motors to descend the rotorcraft at a first rate of descent; and after the fixed-wing aircraft reaches a first height above a fixed-wing aircraft landing surface, controlling, by the controller, the one or more rotor motors to descend the rotorcraft at a second rate of descent that is less than the first rate of descent until the fixed-wing aircraft reaches the fixed-wing aircraft landing surface. In various such embodiments, the method includes: after the fixed-wing aircraft lands on the fixed-wing aircraft landing surface, controlling, by the controller, the one or more rotor motors to descend the rotorcraft at a third rate of descent that is greater than the second rate of descent; and after the fixed-wing aircraft reaches a second height above a rotorcraft landing surface, controlling, by the controller, the one or more rotor motors to descend the rotorcraft at a fourth rate of descent that is less than the third rate of descent. In various such embodiments, the first and third rates of descent are the same. In various such embodiments, the second and fourth rates of descent are the same. In various such embodiments, the fixed-wing aircraft landing surface and the rotorcraft landing surface are the same surface.

It should be appreciated from the above that various embodiments of the present disclosure include a rotorcraft comprising: a communications interface configured to receive an autonomous retrieval signal; one or more rotor motors; and a controller configured to: responsive to receipt of the receiving, via a communications interface, an autonomous retrieval signal; responsive to receipt of the autonomous retrieval signal, control the one or more rotor motors to fly the rotorcraft to a retrieval location above a ground anchor; after the rotorcraft reaches the retrieval location, control the one or more rotor motors to station-keep the rotorcraft relative to the ground anchor; after a fixed-wing aircraft captures a flexible capture member attached to the rotorcraft, control the one or more rotor motors to descend the rotorcraft at a first rate of descent; and after the fixed-wing aircraft reaches a first height above a fixed-wing aircraft landing surface, control the one or more rotor motors to descend the rotorcraft at a second rate of descent that is less than the first rate of descent until the fixed-wing aircraft reaches the fixed-wing aircraft landing surface. In various such embodiments, the controller is configured to: after the fixed-wing aircraft lands on the fixed-wing aircraft landing surface, control the one or more rotor motors to descend the rotorcraft at a third rate of descent that is greater than the second rate of descent; and after the fixed-wing aircraft reaches a second height above a rotorcraft landing surface, control the one or more rotor motors to descend the rotorcraft at a fourth rate of descent that is less than the third rate of descent. In various such embodiments, the first and third rates of descent are the same. In various such embodiments, the second and fourth rates of descent are the same. In various such embodiments, the fixed-wing aircraft landing surface and the rotorcraft landing surface are the same surface.

Various changes and modifications to the embodiments described herein will be apparent to those skilled in the art. These changes and modifications can be made without departing from the spirit and scope of the present subject matter and without diminishing its intended advantages. It is intended that such changes and modifications be covered by the appended claims.

The invention is claimed as follows:

1. A method for controlling an airborne rotorcraft and a fixed-wing aircraft releasably attached to the airborne rotorcraft below the airborne rotorcraft, the method comprising:
   controlling by a controller, based on a first feedback loop, movement about a longitudinal roll axis of the airborne rotorcraft and the attached fixed-wing aircraft; and
   controlling by the controller, based on a second feedback loop, movement about a horizontal pitch axis of the airborne rotorcraft and the attached fixed-wing aircraft, without controlling by the controller movement about a vertical yaw axis of the airborne rotorcraft and the attached fixed-wing aircraft to enable the airborne rotorcraft and the attached fixed-wing aircraft, while dashing to generate airspeed, to self-align while moving relative to a local airflow and such that the fixed-wing aircraft heading is aligned with respect to the local airflow for launch of the fixed-wing aircraft from the airborne rotorcraft.

2. The method of claim 1, wherein yaw control of the airborne rotorcraft is provided by one or more fins of the airborne rotorcraft.

3. The method of claim 2, wherein the one or more fins of the airborne rotorcraft aligns airflow with the longitudinal roll axis of the fixed-wing aircraft releasably attached to the airborne rotorcraft during a launch phase of the fixed-winged aircraft flight.

4. The method of claim 1, which includes controlling movement about the vertical yaw axis of the airborne rotorcraft by manual input from a joystick.

5. The method of claim 1, wherein the fixed-wing aircraft is releasably attached to the airborne rotorcraft such that a rotation of the airborne rotorcraft about the vertical yaw axis causes a matching rotation of the fixed-wing aircraft about the vertical yaw axis.

* * * * *